US012572017B2

(12) United States Patent
Crosby et al.

(10) Patent No.: US 12,572,017 B2
(45) Date of Patent: Mar. 10, 2026

(54) METHODS FOR DESIGNING DIFFRACTION GRATING FOR AUGMENTED REALITY OR VIRTUAL REALITY DISPLAY AND DIFFRACTION GRATING FOR AUGMENTED REALITY OR VIRTUAL REALITY DISPLAY

(71) Applicant: Snap Inc., Santa Monica, CA (US)

(72) Inventors: David Crosby, Oxford (GB); Ciaran Phelan, Wallingford (GB)

(73) Assignee: Snap Inc., Santa Monica, CA (US)

( * ) Notice: Subject to any disclaimer, the term of this patent is extended or adjusted under 35 U.S.C. 154(b) by 421 days.

(21) Appl. No.: 18/021,766

(22) PCT Filed: Sep. 1, 2021

(86) PCT No.: PCT/EP2021/074093
§ 371 (c)(1),
(2) Date: Feb. 16, 2023

(87) PCT Pub. No.: WO2022/049104
PCT Pub. Date: Mar. 10, 2022

(65) Prior Publication Data
US 2024/0019698 A1     Jan. 18, 2024

(30) Foreign Application Priority Data
Sep. 1, 2020     (EP) ..................................... 20193965

(51) Int. Cl.
*G02B 27/01*          (2006.01)
*G02B 5/18*           (2006.01)
*G02B 6/34*           (2006.01)

(52) U.S. Cl.
CPC ....... *G02B 27/0172* (2013.01); *G02B 5/1819* (2013.01); *G02B 6/34* (2013.01);
(Continued)

(58) Field of Classification Search
CPC .... G02B 27/0172; G02B 5/1819; G02B 6/34; G02B 2027/0118; G02B 2027/0123
See application file for complete search history.

(56) References Cited

U.S. PATENT DOCUMENTS

| 4,711,512 A | 12/1987 | Upatnieks |
| 2014/0104665 A1 | 4/2014 | Popovich et al. |

(Continued)

FOREIGN PATENT DOCUMENTS

| EP | 4208743 A1 | 7/2023 |
| WO | WO-2016020642 A1 | 2/2016 |

(Continued)

OTHER PUBLICATIONS

"European Application Serial No. 21770203.4, Communication pursuant to Rules 161(1) and 162 EPC mailed Apr. 13, 2023", 3 pgs.

(Continued)

*Primary Examiner* — Daniel Petkovsek
(74) *Attorney, Agent, or Firm* — Schwegman Lundberg & Woessner, P.A.

(57)     ABSTRACT

A diffraction grating is disclosed for use as an output element of a diffractive waveguide combiner for an augmented reality or virtual reality display. The grating includes an interleaved rectangular grating (1213) comprising a first rectangular periodic array of optical structures (1211) and a second rectangular periodic array of optical structures (1212) arranged on the plane. The first array of optical structures (1211) and the second array of optical structures (1212) differ from one another in at least one characteristic or the first array of optical structures (1211) are offset from the second array of optical structures (1212) by a factor which is different to half the period of the first or second rectangular array, such that the first array of optical structures (1211) and the second array of optical structures (1212) are configured to receive light from an input direction and to (Continued)

couple orders of the light in directions that are at angles to the input direction and to couple out orders of the light towards a viewer.

28 Claims, 70 Drawing Sheets

(52) U.S. Cl.
CPC .................. *G02B 2027/0118* (2013.01); *G02B 2027/0123* (2013.01)

(56) References Cited

U.S. PATENT DOCUMENTS

| | | | |
|---|---|---|---|
| 2019/0317450 A1* | 10/2019 | Yaroshchuk ............. | G03H 1/02 |
| 2020/0166691 A1 | 5/2020 | Vartiainen et al. | |
| 2020/0209630 A1* | 7/2020 | Schultz .............. | G02B 27/4272 |
| 2023/0266599 A1* | 8/2023 | Schultz .................. | G02B 27/44 |
| | | | 359/569 |

FOREIGN PATENT DOCUMENTS

| | | |
|---|---|---|
| WO | WO-2016020643 A1 | 2/2016 |
| WO | WO-2018178626 A1 | 10/2018 |
| WO | WO-2022049104 A1 | 3/2022 |

OTHER PUBLICATIONS

"European Application Serial No. 21770203.4, Response to Communication pursuant to Rules 161(1) and 162 EPC filed Oct. 19, 2023", 213 pgs.

"International Application Serial No. PCT/EP2021/074093, International Preliminary Report on Patentability mailed Mar. 16, 2023", 8 pgs.

"International Application Serial No. PCT/EP2021/074093, International Search Report mailed Dec. 10, 2021", 3 pgs.

"International Application Serial No. PCT/EP2021/074093, Written Opinion mailed Dec. 10, 2021", 6 pgs.

"Chinese Application Serial No. 202180052980.8, Response filed Sep. 17, 2025 to Office Action mailed May 23, 2025", W/English Claims, 19 pgs.

"European Application Serial No. 21770203.4, Response filed Sep. 8, 2025 to Communication Pursuant to Article 94(3) EPC mailed Jun. 4, 2025", 408 pgs.

"Chinese Application Serial No. 202180052980.8, Office Action mailed May 23, 2025", w/ English Translation, 22 pgs.

"European Application Serial No. 21770203.4, Communication Pursuant to Article 94(3) EPC mailed Jun. 4, 2025", 5 pgs.

"Korean Application Serial No. 10-2023-7007115, Notice of Preliminary Rejection mailed Nov. 4, 2025", w/ English translation, 8 pgs.

"Chinese Application Serial No. 202180052980.8, Response to Examiner Telephone Interview filed Nov. 7, 2025", w English claims, 20 pgs.

"Chinese Application Serial No. 202180052980.8, Response to Examiner Telephone Interview filed Dec. 1, 2025", w/ English claims, 19 pgs.

* cited by examiner

Slant
Modification →

*1702*

α

*1703* z y x

Draft
Modification →

*1704*

*1705*

*1706*

*1707*

1901

1902

1903

1904

*z*
*x*

1905

1913

1912

1911

1910

1909

1908

1907

1906

*z*
*x*

TABLE 1 – Notable cumulative orders

| Cum. order $\{r_x, r_y\}$ | xy-wavevector, $k_{xy}^{\{r_x, r_y\}}$ | Description of propagation |
|---|---|---|
| $\{0,0\}$ | $\frac{2\pi}{\lambda}(u', v') + 2\pi\left(0, \frac{1}{p_y}\right)$ | Waveguided propagation generally towards the +y direction |
| $\{1,-1\}$ | $\frac{2\pi}{\lambda}(u', v') + 2\pi\left(\frac{1}{p_x}, 0\right)$ | Waveguided propagation generally towards the +x direction |
| $\{-1,-1\}$ | $\frac{2\pi}{\lambda}(u', v') - 2\pi\left(\frac{1}{p_x}, 0\right)$ | Waveguided propagation generally towards the -x direction |
| $\{0,-2\}$ | $\frac{2\pi}{\lambda}(u', v') - 2\pi\left(0, \frac{1}{p_y}\right)$ | Waveguided propagation generally towards the -y direction – i.e. the beam is turned back towards the input grating |
| $\{1,0\}$ | $\frac{2\pi}{\lambda}(u', v') + 2\pi\left(\frac{1}{p_x}, \frac{1}{p_y}\right)$ | Waveguided propagation generally towards the diagonal +x,+y direction |
| $\{-1,0\}$ | $\frac{2\pi}{\lambda}(u', v') + 2\pi\left(-\frac{1}{p_x}, \frac{1}{p_y}\right)$ | Waveguided propagation generally towards the diagonal -x,+y direction |
| $\{1,-2\}$ | $\frac{2\pi}{\lambda}(u', v') + 2\pi\left(\frac{1}{p_x}, -\frac{1}{p_y}\right)$ | Waveguided propagation generally towards the diagonal +x,-y direction |
| $\{-1,-2\}$ | $\frac{2\pi}{\lambda}(u', v') - 2\pi\left(\frac{1}{p_x}, \frac{1}{p_y}\right)$ | Waveguided propagation generally towards the diagonal -x,-y direction |
| $\{0,-1\}$ | $\frac{2\pi}{\lambda}(u', v')$ | Free propagation, wavevector has same xy-components as the initial beam coupled into the substrate |

FIG. 45

TABLE 2 – Notable diffraction orders

| Cum. order before $i$th diffraction $\left\{r_x^{(i-1)}, r_y^{(i-1)}\right\}$ | Cum. order after $i$th diffraction $\left\{r_x^{(i)}, r_y^{(i)}\right\}$ | Diffraction order $\{m_x, m_y\}$ | Diffraction order name (abbrev. name) | Description |
|---|---|---|---|---|
| {0,0} | {0,−1} | {0,−1} | Straight to eye (STE) | Diffraction leading to output of beam that is as initially coupled into waveguide by input grating |
| {1,−1} | {0,−1} | {−1,0} | To eye after +x turn (TEAT+X) | Diffraction leading to output of beam that has first diffracted into propagating in the predominantly +x direction |
| {−1,−1} | {0,−1} | {1,0} | To eye after -x turn (TEAT-X) | Diffraction leading to output of beam that has first diffracted into propagating in the general -x direction |
| {0,−2} | {0,−1} | {0,1} | To eye after backturn (TEAT-Y) | Diffraction leading to output of beam that has first diffracted into propagating in the general -y direction |
| {0,0} | {1,−1} | {1,−1} | Turn to +x (T+X) | Diffraction of beam in general +y direction into beam propagating in the general +x direction |
| {0,0} | {−1,−1} | {−1,−1} | Turn to -x (T-X) | Diffraction of beam in general +y direction into beam propagating in the general -x direction |
| {0,0} | {0,−2} | {0,−2} | Backturn to -y (BT-Y) | Diffraction of beam in general +y direction into beam propagating in the general -y direction |
| {0,−2} | {0,0} | {0,2} | Backreturn to +y (BRT+Y) | Diffraction of beam in general -y direction into beam as initially coupled into the waveguide |
| {1,−1} | {−1,−1} | {−2,0} | Backturn to -x (BT-X) | Diffraction of beam in general +x direction into beam propagating in the general -x direction |
| {−1,−1} | {1,−1} | {2,0} | Backturn to +x (BT+X) | Diffraction of beam in general -x direction into beam propagating in the general +x direction |
| {1,−1} | {0,0} | {−1,1} | Unturn +x to +y (UT+X) | Diffraction of beam in general +x direction into beam propagating in the general +y direction |
| {−1,−1} | {0,0} | {1,1} | Unturn -x to +y (UT-X) | Diffraction of beam in general -x direction into beam propagating in the general +y direction |
| {1,−1} | {0,−2} | {−1,−1} | Turn to back from +x (TTB+X) | Diffraction of beam in general +x direction into beam propagating in the general -y direction |
| {−1,−1} | {0,−2} | {1,−1} | Turn to back from -x (TTB-X) | Diffraction of beam in general -x direction into beam propagating in the general -y direction |

*FIG. 46*

TABLE 3 – Some of the key properties of an ideal diffractive waveguide combiner

| Property | Description |
|---|---|
| Direction Uniformity | Within the DWC eyebox, the ratio of the intensity of output beams of projected light for different gaze angles is the same as the ratio of the intensity of the corresponding input beams. An input with a uniform distribution of luminance with respect to gaze angle results in an output with a uniform distribution of luminance with respect to gaze angle. |
| Colour Uniformity | Within the DWC eyebox if the colour of the input projected light is constant with respect to gaze angle then the colour of the output projected light is also constant with respect to gaze angle. |
| Colour Accuracy | Within the DWC eyebox, the colour of an output beam of projected light is the same as the colour of the corresponding input beam. |
| Eyebox Size | The eyebox is of sufficient size to allow for observation of output from the DWC at all possible positions and orientations of an observer/detector when in use. |
| Eyebox Uniformity | The intensity of a collimated detected beam for a given collimated input beam does not depend on location within the eyebox. |
| Directionality | The output from the DWC can be configured to be in only the forward or backward direction away from the waveguide. |
| Image Sharpness | The point-spread-function from focusing output beams onto an image plane allows for sharply focussed imaging, ideally at or beyond the diffraction limit of a pupil diameter $\geq 2$ mm. |
| High Efficiency | The projected light from the DWC, as averaged over the field of view and eyebox area, is as bright as possible. Ideally, all of the projected light that is incident on the input to a DWC is subsequently output only within the design eyebox of the DWC. |
| Surrounding World Visibility | Viewing of the surrounding physical world through the DWC is clear, bright, sharp, and otherwise unobstructed. Transmission efficiency of real-world light is high. |
| Wearer Artefacts | No visual artefacts such as rainbow streaks from diffraction scattering of external lights can be seen by a wearer. |
| External Artefacts | No visual artefacts such as rainbow colours from diffraction scattering of external lights can be seen by an external observer. |

FIG. 47

METHODS FOR DESIGNING DIFFRACTION GRATING FOR AUGMENTED REALITY OR VIRTUAL REALITY DISPLAY AND DIFFRACTION GRATING FOR AUGMENTED REALITY OR VIRTUAL REALITY DISPLAY

CLAIM OF PRIORITY

This application is a U.S. national-phase application filed under 35 U.S.C. § 371 from International Application Serial No. PCT/EP2021/074093, filed on Sep. 1, 2021, and published as WO 2022/049104 on Mar. 10, 2022, which claims the benefit of priority to EP Application Serial No. 20193965.9, filed on Sep. 1, 2020, each of which is incorporated herein by reference in their entireties.

FIELD

The present invention relates to a diffractive waveguide combiner for use in an augmented reality or virtual reality display. In particular, an aspect of the invention relates to a waveguide in which light coupled into the waveguide is expanded in two dimensions by an diffractive optical element as well as coupled out of a waveguide towards a viewer. This can allow pupil replication, eyebox expansion and relay of a projected image in an augmented reality or virtual reality display.

BACKGROUND

An augmented reality display provides a user, or viewer, with a view of their real-world surroundings combined with other images such as those artificially generated by a computerised display system. Often the overlaid images provide information that is relevant to the real-world surroundings. For example, in transportation applications the overlaid images may provide navigation assistance or information regarding hazards. In medical applications such as in an operating theatre the overlaid images may provide real-time information regarding a patient such as heart rate and blood oxygen levels, or provide complementary data to assist a surgeon such as x-ray images or other medical scans. In video game applications the overlaid images may include computer generated characters or objects which may then appear to interact with the real-world, including the viewer, in response to data gathered from other sensors, such as cameras.

In some augmented reality display systems the entire image provided to the viewer is in the form of a computer generated display output on a monitor or other visual display screen. In these systems cameras are used to capture images of the real-world surroundings which are then combined with computer generated images and the resulting combination shown to a viewer using the image processing software and hardware of a computerised display system. Suitable display systems are widely available and typically found in personal computers, smartphones, tablets and other devices which combine computational processing, image capture and a visual display screen.

In other augmented reality display systems a viewer directly observes the real-world through a transparent or semi-transparent optical device, often termed a combiner. The combiner provides a means by which additional images can be overlaid on this view of the real-world. These images will typically be generated by a computerised display system connected to suitable image projection hardware such as a micro-display based projector.

The provision of direct viewing of real-world surroundings to a viewer rather than via image capture and re-display provides multiple advantages, such as: the field-of-view, resolution and dynamic-range of real-world viewing considerably outstrips the capability of any artificial display hardware available at present; removal of the need to place a display screen in-front of the viewer can result in a smaller and more socially acceptable form-factor for a display system; and real-world viewing contains three-dimensional data and focus cues which are known to be important for long term wear and the avoidance of eye-strain.

Augmented reality display systems that combine direct viewing of real-world surroundings with additional, generated images may be fixed to a larger installation such as the cockpit of an aircraft, in which case they are often referred to as Head-Up Displays (or HUDs), or part of a portable device that is worn by a viewer, in which case they are often called Head-Mounted Displays (HMDs).

A virtual reality display is one where the entire image seen by a viewer is artificially generated. A combiner used in an AR-HMD may also be configured for use in a virtual reality head mounted display (VR-HMD) simply by suppressing observation of the real-world, for example, by using an opaque black screen between the combiner and the real world, but not between the combiner and a viewer's eyes.

There are several different methods by which computer generated images may be optically combined with a view of the real world. A simple method is to make the combiner a partially reflective piece of glass and place it at a tilted angle such that the reflection from the glass allows the viewer to see an image that would otherwise be outside of their field of view. This is the approach used in many autocue systems where a tilted piece of glass provides the viewer with a view of written text on a display screen, reflected from the glass, as well as a direct view of the real world via transmission of light from the real world through the glass. Here the reflected light from the display screen appears to be overlaid on the view of the real-world surroundings.

For an augmented reality head-mounted display (AR-HMD) it is advantageous if the display is not too large and cumbersome for a user, especially if long periods of wear are anticipated. This requirement makes the use of a simple, tilted partially reflective screen impractical for anything other than a small field of view for the overlaid images.

U.S. Pat. No. 4,711,512 describes an optical device that uses diffraction gratings and waveguiding of light to realise a combiner for an augmented reality display. In this approach the combiner consists of a planar slab waveguide made out of a light transmissive material such as a suitable glass or plastic. The waveguide is placed in front of the eye (or eyes) of a user with a projector provided to one side of the waveguide and outside the direct field-of-view of the user. Light from the projector is coupled into the waveguide by scattering from a diffraction grating on the surface of, or embedded in, the waveguide at a region in front of the projector. The diffraction grating is designed such that scattered projected light will be totally internally reflected within the waveguide and generally directed towards the region of the waveguide in front of the user's eye. The light is then coupled out of the waveguide by scattering from another diffraction grating so that it can be viewed by the user. The projector can provide information and/or images that augment a user's view of the real world.

The eyebox of an AR-HMD is a measure of the region of space over which a projected image output by the display can be observed by a viewer's eye. It is often desirable for an AR-HMD to have an eyebox significantly larger than the size of the pupil of the eye (typically 2-8 mm) to provide a degree of tolerance for the position of wear of a display system. A too small eyebox will lead to an image that can easily vanish if the viewer's eye is not in exactly the right place leading to frustration and strain. For direct viewing of a projector, the size of the eyebox is determined by the size and location of the exit pupil of the projector and the position of the eye relative to the projector. Increasing the eyebox size requires reducing the F-number of the projector which both complicates its design and adds weight and volume to the overall system, neither of which is desirable if a compact form-factor is to be maintained. Diffractive waveguide combiners (DWCs), meaning combiners that use diffraction gratings and waveguiding to function, can provide an alternative approach to increase the size of a display system's eyebox.

In U.S. Pat. No. 4,711,512 the diffraction grating used to output-couple waveguided light (henceforth termed the output grating) is designed to out-couple only a fraction of the energy of a light beam that is incident on it. Each time a light beam interacts with the output grating it splits into at least two beams, an output coupled beam which exits from the waveguide and a beam which continues to propagate within the waveguide. Light that remains waveguided will, after the distance required to bounce off the surfaces of the waveguide, interact again with the output grating, potentially multiple times as the size allows. In this way a single input beam of light can be output multiple times. If it can be arranged that the size of the waveguided pupil is larger than, or comparable to, the distance between the successive interactions with the output grating, then the overall output from the beam, consisting of multiple overlapping beams, will in a way synthesize a much larger output beam. Thus, the size of an output beam no longer depends on the size of the exit pupil of the projector alone. This phenomenon is termed pupil-replication and may be used to output projected light over an expanded region of space, and thus provide a larger eyebox, than would otherwise be possible. In U.S. Pat. No. 4,711,512 multiple replications of a beam are only possible in the direction of propagation of the waveguided light from the input grating. This restricts expansion of the eyebox to be only along this direction. Furthermore, beams corresponding to different points in the output field of view will be expanded along slightly different directions. This will constrain the size of the eyebox over which simultaneous observation of the entire projected field of view of the display system is possible.

An optical device is disclosed in WO 2016/020643 that features pupil replication and eyebox expansion in two dimensions as part of realising a combiner for an augmented reality display. In WO 2016/020643 an input diffractive optical element is provided to couple light from a projector into waveguided propagation within a light transmissive planar slab substrate. The optical device includes an output element consisting of two diffractive optical elements overlaid on one another so that each diffractive optical element can receive light from the input diffractive optical element and couple it towards the other diffractive optical element in the pair. These diffractive elements can scatter a proportion of incident light such that it remains waveguided but changes direction, and, depending on the direction of the light beam, scatter a proportion so that it is coupled out of the waveguide where it may then be observed. By combining both turning of the light beams in different direction and output coupling from the waveguide the diffractive elements provide pupil replication in more than one direction which in turn provides for expansion of the eyebox in two-dimensions.

In some embodiments of WO 2016/020643 the two diffractive optical elements overlaid on one another are provided in a photonic crystal. This may be achieved by an array of pillars arranged on a plane within the waveguide, where the pillars have a different refractive index compared to the surrounding waveguide medium. Alternatively, the pillars may be composed as a surface relief structure arranged on one of the outer surfaces of the waveguide. In WO 2016/020643 the pillars are described as having a circular cross-sectional shape when viewed in the plane of the waveguide. This arrangement has been found to be highly effective at simultaneously expanding light in two dimensions and coupling light out of the waveguide. Compared to other diffractive combiners the embodiments of WO 2016/02/0643 can also provide for more efficient use of space on the waveguide, which can decrease manufacturing costs.

An optical device featuring an output element with optical structures that have a diamond cross-sectional shape is disclosed in WO 2018/178626. A modified diamond cross-sectional shape is also disclosed, where the modified diamond features notches cut into two opposing vertices of a diamond profile. Compared to circular structures optical structures having such a modified diamond shape may exhibit a central strip of light along the output element with a brightness that is better balanced relative to the rest of the output element. This may reduce an undesirable "striping" effect that can otherwise occur in the output image and so improve the brightness uniformity of the output from the combiner.

In the photonic crystal embodiment of WO 2016/020643 as well as in WO 2018/178626 the diffractive optical features are arranged in a two-dimensional periodic array having hexagonal symmetry. The vector sum of the two grating vectors associated with this array and the grating vector associated with the one-dimensional input diffractive element is zero. As disclosed in WO 2018/178626 and WO 2016/020643 this arrangement can provide for two-dimensional pupil replication and eyebox expansion as well as coupling light out of the waveguide to a viewer.

Although the modified diamond structures of WO 2018/178626 are effective, they are prone to some drawbacks.

First, there is a need to ensure that the modified diamonds are accurately dimensioned, including the size of features such as notches. Small deviations in the shapes from the intended design can lead to undesirable scattering properties. For instance, variations from the diamond shape can modify the relative proportion of light coupled into various directions which may cause a bright central band in the observed image. This places challenging tolerances on the manufacturing processes by which these structures are formed.

Second, the requirement that the shape of the modified diamond structures have dimensions within a narrow range restricts the extent to which the optical element may be varied with respect to position. Rather than varying the structures to have scattering properties that are optimal for each position, the modified diamond structures have to be designed as a compromise of what is required across the whole optical element.

Third, the narrow constraints on the shape of the modified diamond structures also limits the extent to which the structures may be optimized to take into account other considerations. For example, although diffractive waveguide combiners are specifically designed and engineered to receive an input pupil of image bearing light from a projector and then propagate that single input pupil across an output region of the device to yield an eyebox that permits a user to perceive the image at a range of angular positions when looking through the waveguide; the same diffractive elements can also cause unwanted diffraction of external ambient light, such as sunlight or electric lighting, potentially resulting in the appearance of rainbow artefacts within the eyebox to a wearer of the device as the external light, which is spectrally broadband for typical light sources, is separated into its component colours due to the dispersive nature of light scattering from diffraction gratings. These rainbow artefacts may have the appearance of rainbow-coloured streaks or bands of light that can appear across the field of view for a user and thus may adversely affect a user experience by distracting the user from viewing the intended projected imagery and/or the real world. Consequently, there is a need for an improved waveguide that is less susceptible to the appearance of rainbow artefacts, at least within the central portion of the eyebox region of the waveguide where a wearer is most likely to be observing projected images. Minimizing such artefacts is desirable for many use cases. However, the extent to which this may be accomplished by the optical structures is limited if the structures have tightly constrained shapes and dimensions.

Finally, the optical elements described in both WO 2018/178626 and WO 2016/020643 require that the output element is extended in size so that the two-dimensional expansion can fan-out diagonally to fill the design eyebox in the direction orthogonal to the direction from the input grating to the output grating. This adds to the size of the device, compared to the minimum required for a given eyebox.

An object of the present invention is to overcome these issues and limitations.

SUMMARY OF INVENTION

An appropriately configured diffractive waveguide combiner may provide two functions as part of an AR-HMD system: first, that of relaying an image from a projector and outputting it such that it is combined with transmissive viewing of real-world surroundings; and second, that of providing expansion of the eyebox via pupil replication. Generally, in performing these functions it is desirable that the combiner provides a high level of optical efficiency, meaning that as much of the light that is projected onto the combiner is coupled out of the combiner over the designed eyebox. It is also desirable that the combiner provides high image fidelity to the user both for real-world viewing and the overlaid projected image which means good uniformity of luminance and colour over all relevant gaze angles, high contrast, low haze and high image sharpness. In some applications it is also important that attenuation of real-world viewing is low and artefacts such as rainbow-coloured scattering from bright lights are minimal.

A diffractive waveguide combiner for use in an AR-HMD system may comprise: a substrate of material for waveguiding light; at least one region containing a diffraction grating for coupling light into the combiner, termed here the input grating; and at least one region containing a diffraction grating for coupling light out of the combiner as well as towards the eye or eyes of a viewer, termed here the output grating. The substrate may be composed of a transparent optical material, preferably one with low absorption and haze at visible wavelengths such as an optical glass or optical polymer. The output grating may at a minimum provide the function of coupling light out of the waveguide but it may also provide additional functions such as pupil replication for eyebox expansion, as disclosed in the prior art discussed above. The input and output grating are usually distinct spatially so that a projector can be placed pointing at the input grating and a viewer can arrange themselves to observe the light coupled out by the output grating, as well as observe the real world without interference with the projector.

According to an aspect of the invention there is provided a grating for use as an output element of a diffractive waveguide combiner for an augmented reality or virtual reality display, comprising: a first rectangular periodic array of optical structures arranged on a plane, wherein a period of the first rectangular array is defined by a spacing between neighbouring optical structures of the first rectangular array; a second rectangular periodic array of optical structures arranged on the plane, wherein a period of the second rectangular array is defined by a spacing between neighbouring optical structures of the second rectangular array; wherein the first rectangular array of optical structures is overlaid on the second rectangular array of optical structures in the plane such that the arrays are spatially offset from one another on the plane; wherein the first array of optical structures and the second array of optical structures differ from one another in at least one characteristic or the first array of optical structures are offset from the second array of optical structures by a factor which is different to half the period of the first or second rectangular array, such that the first array of optical structures and the second array of optical structures are configured to receive light from an input direction and to couple orders of the light in directions that are at angles to the input direction and to couple out orders of the light towards a viewer.

A grating of this type may be referred to as an interleaved rectangular grating (IRG). The grating may have the array of optical structure arranged in a repeating pattern, with the optical structures of the first array overlaying with the optical structures of the second array. Both arrays of optical structures are arranged such that the orientation of their rectangular pattern that they form are identical to each other. By overlaying the optical structures the first array of optical structures are interspersed in or on the plane around the optical structures of the second array of optical structures. In some embodiments the arrays of optical structures may comprise arrays of holes within a layer of material on or within the substrate. For instance, the optical structures may be apertures filled with air, such that there is a refractive index difference between the air within the holes and the surrounding material, which may either be on the substrate or which may be the substrate into which the holes are formed. In other embodiments the arrays of optical structures may comprise surface relief structures, which extend from the substrate surface and are surrounded by air or a material with a distinct refractive index.

In the plane there is defined a first direction, termed the x-direction of the grating, which is arranged to be parallel to one of the sides of the first rectangular periodic array, and a second direction, termed the y-direction of the grating, which is arranged to be orthogonal to the first direction and parallel to one of the other sides of the first rectangular array. The z-direction of the grating can be defined to be in the direction normal to the plane of the grating. In this way, an x-period can be defined as the separation between nearest pairs (i.e. neighbouring optical structures) of optical structures of the first rectangular array, as measured along the x-direction. The y-period is defined as the separation between nearest pairs (i.e. neighbouring optical structures) of optical structures of the first rectangular array, as measured along the y-direction. The second rectangular array has the same x- and y-period as the first rectangular array as determined by the distance between the nearest pairs of optical structures of the second rectangular array, as measured along the x- and y-direction, respectively.

The offset may be an x-offset, defined as the separation between a fixed point on one of the optical structures of the first rectangular array and a fixed point on one of the optical structures of the second rectangular array as measured along the x-direction. Alternatively, the offset may be a y-offset defined as the separation between a fixed point on one of the optical structures of the first rectangular array and a fixed point on one of the optical structures of the second rectangular array as measured along the y-direction. The factor may comprise a first parameter that describes the offset between the first and second rectangular arrays in the x-direction and/or a second parameter that describes the offset between the first and second rectangular arrays in the y-direction. In this way, the offset being different to half the period may be different to half a period in the x-direction and/or half a period in the y-direction.

The offset is preferably measured between an optical structure of the first array and an optical structure of the second array that are closest to each other. The fixed point may be chosen to suit convenience but for simple optical structures will normally be the centre of the structure as seen when the structure is viewed in the plane of the grating.

Preferably, the first array of optical structures and the second array of optical structures are configured to receive light from an input direction and to couple orders of the light in directions that are at angles to the input direction thereby providing two-dimensional expansion of the light and to couple out orders of the light towards a viewer.

Preferably, the first rectangular periodic array forms a first 2D lattice with rectangular symmetry, and the second rectangular periodic array forms a second 2D lattice with rectangular symmetry. The grating may have a finite extent to be physically realisable. As such the first and second rectangular periodic arrays may be truncated to a region or a set of distinct regions within the plane associated with the grating. Each of these regions may be described by a closed profile defining a shape within which the grating will be present and noting that whilst the spatial extent of the first and second periodic arrays can be near identical, the offset between the arrays requires that they cannot be cropped to exactly the same profile within the plane, but this may be accomplished to within one period in the x- and y-directions and this will have a negligible consequence for the light scattering properties of the grating.

The grating may act as an output element of a waveguide. This may be a DWC for an AR or VR display. An IRG configured as an output element of a DWC will scatter incident light according to the principles of diffraction from periodic structures. Specifically this means that an incident monochromatic beam of light will be scattered in various directions as described by diffraction orders derived from the periodicity of the IRG.

Diffraction orders which change the direction of light but do not couple light out of the waveguide are termed turn-orders whereas those that couple-light out of the waveguide are known as to-eye orders. As described in WO 2016/020642 together turn-orders and to-eye orders can provide the functions of pupil replication, eyebox expansion and output coupling. In order for a device that operates on these principles to perform well it is important that these diffraction orders are balanced in strength with respect to each other and with respect to the direction, wavelength and polarization of incident beams of light.

By having an IRG where the first array of optical structures are offset from the second array of optical structures by a factor which is different to half the period of the first or second rectangular array, and where the second array of structures is otherwise identical to the first array, it can be ensured that there exists to-eye orders. The directional properties and magnitude of these to eye orders will depend on the extent to which the offset is different to half the period. Specifically, where the x-offset is different from half the x-period, and/or a y-offset that is different from half the y-period, it can be ensured that there exists to-eye orders where the directional properties and magnitude of the to eye orders will depend on the extent to which the x-offset is different from half the x-period and/or the y-offset is different from half the y-period. In this way, the scattering properties of such an IRG used as an output element can be varied as required.

By having an IRG where the optical structures of the first periodic rectangular array are different by at least one characteristic to the optical structures of the second periodic rectangular array this too can ensure that there exists to-eye orders.

The turn-orders of the IRG may also depend on the shape and material composition of the optical structures of the first and second periodic rectangular arrays as well as the offsets between these arrays.

If the optical structures of the first and second periodic rectangular array are identical and the x- and y-offsets are equal to half the x- and y-periods, respectively, then this can ensure that no to-eye orders exist and only turn orders will be allowed. Therefore, by exploiting differences in how the various turn-orders and to-eye orders depend on the shapes of the optical structures, the x- and y-offsets, and differences in a characteristic between the optical structures of the first and second arrays the scattering properties of an IRG used as an output element of a DWC can be varied as required. In particular, it is possible to use turn orders to distribute light in two dimensions across an interleaved rectangular grating and so provide a function of pupil replication to expand the eyebox provided whilst also using to-eye orders to output coupling light towards a viewer so that a projected image appropriately input coupled into the DWC can be seen.

The optical structures may differ from one another in at least one characteristic by the optical structures of the first array having a different shape in the plane to the optical structures in the second array. By providing optical structures of the first or second array with a different shape to the optical structures of the other array it is possible to enable to-eye-orders. This may be the case even if the x- and y-offsets are equal to half the x- and y-periods, respectively. The shape may be the cross-sectional shape in the plane. For instance, the optical structures in the first array may have a circular cross-section, and the optical structures in the second array may have a rectangular cross-section. Alternatively, the optical structures in the first array may have a circular cross-section, and the optical structures in the second array may be composed of multiple elements with a triangular cross-section. Any shape, and any combination of shapes may be envisaged, so long as they are different between the arrays. This means shapes such as circular, square, rectangular, triangular, or any other shape that may be envisaged, may be used and the number of elements making up the optical structures of each of the arrays can be one, two or more.

Alternatively, or in addition, the optical structures of the first and second array may differ from each other in at least one intrinsic optical property including refractive index, electric permittivity, magnetic permeability, absorptivity and/or birefringence. In this way, the optical structures of the first array could be composed of material with a different refractive index, electric permittivity, magnetic permeability, absorptivity and/or birefringence to those of the second array. The optical structures of both arrays may be composed of a variety of different materials. As long as the spatial distribution of the refractive index, electric permittivity, magnetic permeability, absorptivity and/or birefringence of these materials is not the same for the structures of the first array compared to the second array, then to-eye orders with non-zero scattering strength may exist.

Alternatively, or in addition, the optical structures may differ from one another in at least one characteristic by the optical structures of the first array having a different size in the plane to the optical structures in the second array. The size may be the size of the cross-section of the optical structures, when viewed in the plane. For instance, the size of the optical structures of the first array may be smaller than the optical structures of the second array.

Alternatively, or in addition, the optical structures may differ from one another in at least one characteristic by the optical structures of the first array having a different orientation in the plane to the optical structures in the second array. For instance, the optical structures of the first array may be orientated at an angle in the plane with respect to the optical structures of the second array. They may be orientated at an angle of 30°, 45°, or 90° to one another. Alternatively, they may be orientated at any other angle with respect to one another. In some arrangements, the optical structures of the first array may be a mirror image of the optical structures of the second array.

In other arrangements, in addition or instead of the above, the optical structures may differ from one another in at least one characteristic by the optical structures of the first array having a different height, or physical extent, in a direction perpendicular to the plane to the optical structures in the second array. The optical structures have a three-dimensional profile. The height is perpendicular to the cross-sectional area as described above. This may be in the z-direction. For instance, the optical structures of the first array may extend in a direction orthogonal to the plane by a larger amount than the optical structures of the second array, or vice versa.

In some arrangements, the different physical extent may involve the optical structures of the first array having a different blaze to the optical structures in the second array. For instance, least one of the optical structures in the first and/or second array may have a height or physical extent in a direction perpendicular to the plane which varies along the plane. In this way, a blazed grating may be formed. In some arrangements this may only apply to the optical structures of the first array. In other arrangements, it may apply to optical structures of both arrays so long as there is a difference between the variation in height between the two optical structures of each array, or due to different characteristics as described herein. This may enable further control of directional scattering properties. The variation of height may be along a single axis of the plane, or along multiple axis of the plane.

The different characteristics described above between the first and second rectangular arrays can be selected to enable control of the diffraction orders for light scattering from an output grating of a diffractive waveguide combiner composed of such interleaved rectangular gratings.

In some arrangements the second array of optical structures may be offset from the first array of optical structures in the x-direction by a distance which is different to half the x-period and in the y-direction by a distance which is equal to half the y-period. Alternatively, the second array of optical structures may be offset from the first array of optical structures in the y-direction by a distance which is different to half the y-period and in the x-direction by a distance which is equal to half the x-period. In another variation the second array of optical structures may be offset from the first array of optical structures in the x-direction by a distance which is different to half the x-period and in the y-direction by a distance which is different to half the y-period. In this way, the offset that is different to half a period may be in the x-direction, the y-direction or both directions.

It has been found that when the offset is by a factor that is different to half a period in only a direction of a single axis then turn orders are produced that are symmetric about the plane normal to the direction in which the offset is different to half a period. A symmetric turn order is one where the scattering properties are the same if both the sign of the diffraction order is flipped and the direction of light is mirrored with respect to the plane of symmetry. Whereas when the offset is by a factor that is different to half a period in both directions it can be found that more directional differences between turn orders can be produced. This can provide the flexibility of tuning the output element to vary the strength of specific turn orders.

It has been found that if the optical structures of the first and second array are identical then when the x-offset is zero and the y-offset is equal to half a period then there will be no to-eye orders in the y-direction. To eye orders in the x-direction may still be present. The only diffraction orders that may be allowed in the y-direction are the zeroth order and diffraction orders that turn a light beam back in the y-direction. If such an arrangement were to be used at the edge of an IRG configured as an output element of a DWC, then it could serve to take light which would otherwise escape towards the edge of the DWC and send it back towards the interior region of an IRG where it may then be output towards a viewer. Such recycling of light that would otherwise be lost may serve to increase the optical efficiency of the IRG.

Similarly, it has also been found that when the y-offset is zero and the x-offset is equal to half a period then there will be no to-eye orders in the x-direction. To eye orders in the y-direction may still be present. The only diffraction orders that may be allowed in the x-direction are the zeroth order and diffraction orders that turn a light beam back in the x-direction. Such turn-back orders may be used to redirect light back towards the interior region of an IRG where it may then be output towards a viewer. By selectively configuring an IRG with regions at the edges of the IRG that provide turning back of light in either the x- or y-direction, depending on which is advantageous according to the predominant direction of light at a particular part of the IRG then it is possible to increase optical efficiency with which light may be output from a waveguide.

The period of the optical structures in the first array is constant across the plane, and the period of the optical structures in the second array is constant across the plane.

This means that the optical structures of both arrays have long range periodicity across the waveguide in both the x and y direction.

In some arrangements, the optical structures of the first and/or second array may form a continuous structure. In this way, the optical structures of the first array need not be distinct entities but may join together to form a continuous structure or a series of continuous structures. This may also be the case for the optical structures of the second array. Conceptually there is no difference between a blended optical structure with the periodicity of a rectangular array and a rectangular array composed of discrete structures repeated at each node of the array and with a shape such that when repeated they are contiguous with each other.

An interleaved rectangular grating may also be created by combining the first array of optical structures and the second array of optical structures by methods other than overlaying the structures. If the first and second arrays of optical structures may each be represented as arrays of surface relief structures of the same material with height as measured relative to a reference plane that varies with position then an interleaved rectangular grating may be created as a surface relief structure with height at a given position in the plane that depends on the heights of the first and second arrays of optical structures at that position in a variety of ways. Possible values for the resulting height at a given position on a reference plane of an interleaved rectangular grating with a surface relief structure so created include, but are not limited to:

the sum of the heights of the first and second arrays of optical structures at the position in the reference plane;

the average of the heights of the first and second arrays of optical structures at the position in the reference plane;

the maximum of the height of the first and second array of optical structures at the position in the reference plane;

the minimum of the height of the first and second array of optical structures at the position in the reference plane;

the height of the first array of optical structures at the position in the reference plane, unless it is zero wherein the height will be that of the second array of optical structures;

the height of the second array of optical structures at the position in the reference plane, unless it is zero wherein the height will be that of the second array of optical structures; or the difference in the height of the first array of optical structures compared to the second array of optical structures at the position in the reference plane and where the difference could be the heights of the second array of optical structures subtracted from the heights of the first array of optical structures, the heights of the first array of optical structures subtracted from the heights of the second array of optical structures or the absolute value of the difference of the heights of the first array of optical structures subtracted from the heights of the second array of optical structures.

It should be noted that here any x- and/or y-offset between the first and second arrays of optical structures would be applied to the relevant array of optical structures before they are combined.

Alternatively, if both the first and second arrays of optical structures are arrays of shapes that may be represented using a three-dimensional geometric description such as a mesh surface, a collection of geometry primitives such as cuboids, cylinders, ellipsoids and tetrahedra, or otherwise, then an interleaved rectangular grating may be created with a representation that is the result of the application of a geometric union, geometric intersection or geometric subtraction operation between the first and second arrays of optical structures. Again, it should be noted that here any x- and/or y-offset between the first and second arrays of optical structures would be applied to the relevant array of optical structures before they are combined.

Alternatively, if both the first and second arrays of optical structures are represented as arrays of three-dimensional volumetric functions or three-dimensional voxels describing the optical properties of the structures with respect to position then an interleaved rectangular grating may be created with a representation that is a volumetric function or voxel-based description wherein the optical properties described by the function or voxels at a given position in three-dimensional space depends on a mathematical relationship involving the optical properties of the corresponding volumetric function or three-dimensional voxels representing the first and second arrays of optical structures at that position. With this approach possible values for the optical properties of an interleaved rectangular grating at a given position include, but are not limited to:

the sum of the values of the corresponding optical properties of the first and second arrays of optical structures at the position;

the average of the values of the corresponding optical properties of the first and second arrays of optical structures at the position;

the maximum of the values of the corresponding optical properties of the first and second arrays of optical structures at the position;

the minimum of the values of the corresponding optical properties of the first and second arrays of optical structures at the position;

the values of the corresponding optical properties of the first array of optical structures at the position unless they are that of vacuum in which case the values of the corresponding optical properties will the those of the second array of optical structures;

the values of the corresponding optical properties of the second array of optical structures at the position unless they are that of vacuum in which case the values of the corresponding optical properties will the those of first array of optical structures; or the difference of the values of the corresponding optical properties of the first array of optical structures at the position compared to the second array of optical structures at the position and where the difference may be computed by the values of the first array subtracted from those of the second array, the values of the second array subtracted from those of the first array or the absolute value of the difference in values between the two arrays.

Again, it should be noted that here any x- and/or y-offset between the first and second arrays of optical structures would be applied to the relevant array of optical structures before they are combined.

The interleaved rectangular grating resulting from the combination of two arrays of optical structures may be modified by application of one or more layers of coating on the surface of the structures. Each layer of coating may have optical properties that are different to the other layers of coating and/or the optical structures atop of which the coating is applied. It is also possible for multiple layers of optical structures as well as multiple layers of coating to be formed on top of each other to create an interleaved rectangular grating with a multi-layered structure.

In some embodiments, a characteristic of the optical structures of the first array of optical structures of the diffraction grating may vary spatially across the plane. Alternatively or additionally, a characteristic of the optical structures of the second array of optical structure of the diffraction grating may vary spatially across the plane. Such a variation to the individual optical structures could be the size of the structures in the plane of the grating, the height of the structures perpendicular to the plane of the grating, the orientation of the structures and/or the shape of any blaze that is applied to the structures. Alternatively, the variation of the structures could be a more complicated change of shape or even involve individual structures of one or both of the arrays being split into multiple separate elements. Advantageously, this allows for variations in the scattering properties of the grating to be altered in different positions to suit the requirements of those positions. For example, outside the central region of a grating it may be advantageous to increase the diffraction efficiency of non-zero diffraction orders to increase the brightness and uniformity of light coming from such regions.

Alternatively, or in addition, the diffraction grating varies spatially across the plane through a measure of the difference in the characteristics between the first and second array of optical structures or a measure of the factor which the offset between the first and second array of optical structures is different to half the period varying across the plane. Advantageously, this enables the output from different regions of the waveguide to vary. This means that the scattering properties across the output element can be varied according to requirements. For instance, the shape, orientation, height, variation in height, or any other difference in characteristic, or combination of differences in characteristics, between the optical structures of the first and second array may vary across the plane. For instance, the first and second array of optical structures may in one region of the plane have similar characteristics to one another, and in a different region of the plane have more pronounced differences. This variation of the measure of difference may be gradual. For instance, the optical structures of the first and/or second array may gradually change in an area of transition from having a first shape, orientation, height, or variation in height in a first region to a second shape, orientation, height, or variation in height in a second region of the plane. In this way, the optical structures of the first and/or second array may gradually transition from having a first shape, orientation, height, or variation in height in a first region to a second shape, orientation, height, or variation in height in a second region of the plane. This may be through geometry morphing (also known as geometric metamorphosis or mesh morphing) which is the smooth transformation of the shape of one 3D object into another by the application of warping and other distortion transformations. Advantageously, this prevents abrupt changes between grating regions which may affect scattering.

In other arrangements, this variation across the plane may not be gradual. For instance, there may be one region with the first and second array of optical structures each having a first shape, orientation, height, or variation in height and a second neighbouring region where the first and second array of optical structures each have a second shape, orientation, height, or variation in height.

Alternatively, or in addition, the factor by which the first and second arrays are offset from each other, may vary across the plane which may be in the x-direction, y-direction or both directions in the plane. In some regions of the plane the factor may be almost equal to, or exactly equal to, half the x- and y-periods in the x- and y-directions, respectively, with the factor varying across the plane such that the factor is shifted from half the period.

By having a variation of the first and second optical structures across the grating, and/or a variation in the difference between them, then the grating may be made up of a plurality of sub-regions. Each sub-region may have a specific arrangement of optical structures such that each sub-region has diffractive properties that are tailored as required to that specific location on the grating. For instance, as outlined above, a sub region at the edge of the grating may be arranged to take light which would otherwise escape towards the edge of the DWC and send it back towards the IRG enclosed region of the DWC where it may then be output towards a viewer. The transition between sub-regions may be abrupt in some arrangements. In other arrangements, the transition may be smooth such that there is a gradual change of the optical structures between sub-regions.

In some arrangements the grating may comprise a region where either the first array of optical structures or the second array of optical structures provides negligible diffraction of the light. In this arrangement the other of the first or second array of optical structures forms a rectangular grating. Alternatively, or in addition, the grating may comprise regions where neighbouring optical structures in the first and/or second array of optical structures form continuous structures thereby forming a one-dimensional grating in said region. This may be one-dimensional horizontal gratings for providing to-eye order, one-dimensional horizontal gratings for providing turn back orders, one-dimensional vertical gratings for providing to-eye orders, one-dimensional vertical gratings for providing turn back orders, and/or one-dimensional diagonal gratings for providing turning orders.

In other arrangements, there may be provided an interleaved rectangular grating containing regions where the optical structures of the first and second arrays are the same and where the position offset between the first and second array is equal to half the x-period in the x-direction and is zero in the y-direction. In this way such a region of the interleaved rectangular grating will provide for to-eye orders for beams travelling predominantly in the y-direction within a DWC and turn orders that will tend to turn back beams travelling in the x-direction. Alternatively, there may be provided an interleaved rectangular grating containing regions where the optical structures of the first and second arrays are the same and where the position offset between the first and second array is equal to half the y-period in the y-direction and is zero in the x-direction. In this way such a region of the interleaved rectangular grating will provide for to-eye orders for beams travelling predominantly in the x-direction within a DWC and turn orders that will tend to turn back beams travelling in the y-direction.

The first array of optical structures and the second array of optical structures may differ from one another in at least one characteristic and the first array of optical structures are offset from the second array of optical structures by a factor which is different to half the period of the first or second rectangular array in at least one axis of the plane.

The axis may be in the x- or y-direction. This factor may be a distance which is different to half the x- and/or y-periods. By controlling both the different characteristics between the optical structures of the first and second arrays and the position offset between the first and second optical arrays, further control of the scattering characteristics can be achieved.

In some spatially varying IRGs the diffraction grating may vary spatially across the plane through the optical structures of the first array and the optical structures of the second array having a gradually decreasing size in the plane or height in a direction perpendicular to the plane towards an edge of the diffraction grating. In some arrangements, the size of the optical structures of the first and/or second array may vary across the plane. In some instances, the size of the optical structures may decrease across the plane. This may be in the x-direction and/or the y-direction. This may be the cross-sectional size, and/or the height of the optical structures. In this arrangement, the size of the optical structures may decrease towards the edge of the optical element. Advantageously, this may reduce the scattering strength of the optical structures towards the edges. This can have the effect of reducing the visibility of the edges of the grating region on the waveguide as seen by external observers. Preferably, this decrease in size is consistent between the first and second arrays. This may ensure that any undesirable scattering effects are reduced such as anomalous strong scattering orders. Alternatively, the optical structures can be varied such that they increase in cross-sectional size such that they blend together with their nearest neighbours. By increasing the size of the cross-section to fill in any gaps in the structure the strength of undesirable scattering effects can also be reduced, so reducing the visibility of the edges of the grating region to external observers.

In some arrangements, the first array of optical structures may be arranged on a first lattice, and the second array of optical structures may be arranged on a second lattice. The first and second lattice may be overlaid and offset from one another, as described above. In some arrangements the first and second lattices may in some regions both be shifted from their expected position. This shift may be in the x-direction, the y-direction or both the x- and y-direction. Preferably this shift will be the same for both lattices. This shift may consist of discrete steps over different regions of the grating or may be continuous in fashion. This shift may be described by a first position dependent function that provides a value for the position shift of the first and second lattices in the x-direction and a second position dependent function that provides a value for the position shift of the first and second lattices in the y-direction. In some arrangements, where the grating comprises a number of different sub-regions (i.e. a spatially varying IRG) a different position shift of the first and second lattices may be associated with each sub-region. The introduction of a position shift to the first and second lattices will provide for a phase shift of any beams of light that scatter from the grating with non-zero diffraction orders. Here the size of the phase shift at a given position depends on the size of the lattice position shift in each of the x- and y-directions at that position as well as the x- and y-periods of the grating and the diffraction order if the interaction. In this way, a position and diffraction-order dependent phase shift may be incorporated into a grating.

As a result of such an arrangement, the overall phase of a given light beam propagating through a DWC may depend on the path taken by the beam of light including the phase shifts arising by the interactions of the beam with the grating as well as the distance propagated by the beam. Advantageously, the use of a phase shift arising from a position shift of the first and second lattices may provide phase compensation of variations of the phase imparted into the various diffraction orders of the IRG as a result of spatial variations of the IRG. Another possible advantage is that an additional phase shift that depends on the path taken through the DWC may reduce the impact of multi-beam interference effects from the combination of separate light beams which may otherwise have a negative effect on the uniformity of the output from the DWC.

Instead of shifting the position of lattices associated with the optical structures another method of introducing position and diffraction-order dependent phase shifts is to apply a distortion in the plane of the grating. A suitable distortion may apply a shift to the positions of the optical structures as well as perturbing the shape of the structures slightly. The shift to the position of the structures of the grating may be in any direction in the plane of the grating. In general, the distortion may vary with position across the plane of the grating such that the position shifts to the structures resulting from the distortion varies over a wide range of directions. Preferably, the magnitude of the distortion may be small such that the change in the shift in the position of the structures between adjacent unit cells of the grating is a small fraction of the size of periods of the unperturbed grating. Preferably, this change between adjacent unit cells may be less than 0.1% of the x-period for shifts along the x-direction and 0.1% of the y-period for shifts along the y-direction. As long as the perturbation to the shape of the structures is small then the effect on the diffraction efficiency will also be small. Under such circumstances the main effect of the distortion will be to introduce a phase shift for any beams of light that scatter from the grating with non-zero diffraction orders. Here, the size of the phase shift at a given position depends on the size of the position shift in each of the x- and y-directions at that position as well as the x- and y-periods of the grating and the diffraction order of the interaction. In this way a position and diffraction-order dependent phase shift may be incorporated into a grating. Advantageously, the use of a phase shift arising from distortion of the grating may be used to provide phase compensation to various diffraction orders of the IRG as a result of spatial variations of the IRG, or the phase shifts may be used to mitigate multi-beam interference effects which may otherwise impact on the uniformity of the output from the DWC.

Alternatively, the thickness of the waveguide may be varied in a direction perpendicular to the plane of the waveguide. This variation may be to a small degree. This may be the thickness of the substrate of the waveguide, the thickness of a base layer underneath the grating or through having an additional layer that has varying thickness. The layer may preferably be transparent resin. Small variations of the thickness may be used to introduce a path-dependent phase shifts of the various beams propagating through a DWC. Such extra phase differences between different beams, depending on their path, may help to reduce the impact of multi-beam interference effects on the uniformity of the output from the DWC.

According to a further aspect there is provided a diffractive waveguide combiner for an augmented reality or virtual reality display, comprising a waveguide, the waveguide being a substrate configured to transmit light, having arranged in or on the waveguide: an output grating being the diffraction grating of the above aspect, and an input grating for coupling in light into the waveguide towards the output grating.

The substrate may be planar. The waveguide may be a planar slab waveguide. The grating may be placed in or on the waveguide. For instance, it may be placed on one of the external faces of the slab. Alternatively, it may be placed within the slab as long as the refractive indices of the optical structures of the grating are different from the refractive index of the slab. The plane of the waveguide may be the same as the plane on which the first and second rectangular arrays are arranged.

The waveguide may comprise: a planar slab of transparent optical material surrounded by a medium with a refractive index lower than the refractive index of the planar slab such that light arranged to have a sufficiently large angle of incidence will be confined within the slab in the direction normal to the planar faces of the slab by total internal reflection. Preferably, the planar faces of the slab are parallel to the plane of the grating.

The grating need not cover the complete spatial extent of the slab. However, in some arrangements it may do such that the slab has a finite spatial extent of at least the size of the grating.

The grating is configured to receive light from an input direction and scatter diffraction orders of the light in directions at various prescribed angles relative to the input direction including towards the eye or eyes of a viewer. In this way it acts as an output element of the waveguide combiner. Preferably, the waveguide comprises an input diffractive optical element configured to couple light into the waveguide and to provide light to the first and second arrays of optical structures in the input direction. The input diffractive optical element may be a one-dimensional diffraction grating comprising grooves in one surface of the waveguide and where the orientation of the grooves matches either the x-direction or y-direction of the interleaved rectangular grating. The input grating may be an input grating as described in WO 2016/020643.

Preferably the input grating has a high efficiency for coupling light into the waveguide. One way this may be achieved is by blazing the structures of the diffraction grating so that light is preferentially directed towards the interleaved rectangular grating, and has a grating vector which is parallel to either the x- or y-direction of the IRG.

In some arrangements it may be advantageous for the first or second arrays of one the IRGs to consist of null structures that do not produce any physical geometry.

The arrays of optical structures in the waveguide may be referred to as a one- or two-dimensional photonic crystal. The waveguide may be provided within an optical display. The optical display may be a VR or AR device. This may include VR or AR headsets, head-mounted displays or head-up displays.

Preferably a projector is provided to project light towards the input diffractive optical element. The projector may be polychromatic and provided in an orientation such that the optical axis of the projector lies out of the plane of the waveguide.

As outlined above, the optical structures may be provided in substantially the same plane in the waveguide. This may be achieved by placing the structures on one of the outer surfaces of the waveguide and creating a surface relief structure on the grating. Alternatively, the structures may be embedded within the waveguide as variations in refractive index, electric permittivity, magnetic permeability, absorptivity and/or birefringence. Both of these being examples of one- or two-dimensional photonic crystals, depending on whether the structures are periodic in one or two dimensions.

In some arrangements the input grating may also be an interleaved rectangular grating. In such a configuration the to-eye orders are equivalent to the input coupling orders and preferably the IRG would be designed such that these orders provide efficient coupling of light into waveguiding within the combiner.

In other arrangements, the waveguide may comprise a single grating according to the above aspect that acts as both the input and output grating. In other words, a single interleaved rectangular grating may be used to both receive input light from a projector and couple light out to an observer. Preferably, in this arrangement the optical structures and/or offset between rectangular arrays would vary with respect to position in the plane of the IRG in order to provide efficient coupling of light from a projector at the input region and efficient pupil replication and output of light over the output regions, meaning regions that direct light to within an observer's eyebox.

According to a further aspect there is provided a method of manufacture of a diffraction grating for an augmented reality or virtual reality display, comprising the steps of: providing a plurality of optical structures; arranging the plurality of optical structures as described above.

According to a further aspect of this invention, there is provided a grating for use in a diffractive waveguide combiner (DWC) for an augmented reality or virtual reality display, comprising: a first rectangular periodic array of optical structures arranged on a plane, wherein a period of the first rectangular array is defined by a spacing between neighbouring optical structures of the first rectangular array; a second rectangular periodic array of optical structures arranged on the plane, wherein a period of the second rectangular array is defined by a spacing between neighbouring optical structures of the second rectangular array; wherein the first rectangular array of optical structures is overlaid on the second rectangular array of optical structures in the plane such that the arrays are spatially offset from one another in the plane, wherein the first array of optical structures and the second array of optical structures are identical and the first array of optical structures are offset from the second array of optical structures by a factor which is equal to half the period of the first or second rectangular array, such that the first array of optical structures and the second array of optical structures are configured to receive light from an input direction and to couple orders of the light in directions that are at angles to the input direction. This may be an interleaved rectangular grating that is considered to be fully symmetric. Alternatively, an interleaved rectangular grating according to the above aspect may be configured to contain regions that corresponds to this arrangement.

A diffractive element of this type may not preferentially couple light out to the viewer. Instead only turn orders are preferentially present meaning that to eye-orders are suppressed. A diffractive element of this type can be used to provide spatial distribution across the waveguide. This type of diffractive element may be combined with a diffractive output element as described in relation to the above aspect to enable out-coupling. Alternatively, a diffractive element of this type may be combined near or adjacent to a diffractive output element having a single 2D rectangular array of optical structures or another IRG which is suitably configured to also provide to-eye orders so that light can be out coupled out to an observer.

In other arrangements, there may be provided a waveguide comprising a plurality of output gratings each of which may be an IRG according to the various arrangements described above. The multiple output gratings may at least partially overlap in the plane of the waveguide and be offset from each other in the direction perpendicular to the plane of the waveguide. In some arrangements, the period of the first and second rectangular arrays of each of the multiple output gratings are identical. The planes of these IRGs may be parallel to each other. The individual IRGs may be positioned on opposing surfaces of the waveguide or embedded within the waveguide. The planes of the IRGs may be offset by a distance considerably longer than the wavelength of light. In some arrangements it is preferable that the separation between these distinct IRGs is longer than the coherence length of the light from the projector.

In some arrangements the regions covered by the IRGs, as projected onto a plane parallel to the plane of the IRGs may overlap to at least some extent. The x-periods of the IRGs may be the same as each other. Similarly, the y-periods of the IRGs may be the same as each other. Other aspects of the IRGs such as the shape and composition of the various optical structures and the offset between the first and second arrays of the IRGs may be different. Each IRG may be spatially varying according to the methods and arrangements described above. The use of multiple IRGs can provide for increased control over the scattering of light within the waveguide. For example, one grating may be configured to preferentially provide turn-order scattering whereas another grating may be configured to preferentially provide to-eye orders, or specific to-eye orders.

According to a further aspect there may be provided an augmented reality or virtual reality display comprising a diffractive waveguide combiner according to any of the above aspects.

According to a further aspect there is provided a diffraction grating for use as an output element of a diffractive waveguide combiner for an augmented reality or virtual reality display, comprising: a first rectangular periodic array of optical structures arranged on a plane, wherein a period of the first rectangular array is defined by a spacing between neighbouring optical structures of the first rectangular array; a second rectangular periodic array of optical structures arranged on the plane, wherein a period of the second rectangular array is defined by a spacing between neighbouring optical structures of the second rectangular array; wherein the first rectangular array of optical structures is overlaid on the second rectangular array of optical structures in the plane such that the arrays are spatially offset from one another on the plane; wherein the first array of optical structures and the second array of optical structures differ from one another in at least one characteristic or the first array of optical structures are offset from the second array of optical structures by a factor which is different to half the period of the first or second rectangular array, such that the first array of optical structures and the second array of optical structures are configured to receive light from an input direction and to couple orders of the light in directions that are at angles to the input direction and to couple out orders of the light towards a viewer.

Preferably, the optical structures differ from one another in at least one characteristic by the optical structures of the first array having a different shape in the plane to the optical structures in the second array.

Preferably, the optical structures differ from one another in at least one characteristic by the optical structures of the first array having a different size in the plane to the optical structures in the second array.

Preferably, the optical structures differ from one another in at least one characteristic by the optical structures of the first array having a different orientation in the plane to the optical structures in the second array.

Preferably, the optical structures differ from one another in at least one characteristic by the optical structures of the first array having a different physical extent or height in a direction perpendicular to the plane to the optical structures in the second array.

Preferably, the different physical extent involves the optical structures of the first array having a different blaze to the optical structures in the second array.

Preferably, the optical structures differ from one another in at least one characteristic by the optical structures of the first array having at least one of a different refractive index, electric permittivity, magnetic permeability, absorptivity, or birefringence, to the optical structures of the second array.

Preferably, the first array of optical structures and the second array of optical structures differ from one another in at least one characteristic and the first array of optical structures is offset from the second array of optical structures by a factor which is different to half the period of the first or second rectangular array in at least one axis of the plane.

Preferably, the diffraction grating of any preceding claim, wherein a characteristic of the optical structures of the first array of optical structures of the diffraction grating varies spatially across the plane.

Preferably, the diffraction grating varies spatially across the plane through a measure of the difference in the characteristics varying across the plane.

Preferably, a measure of the factor which is different to half the period varies across the plane.

Preferably, the grating varies spatially across the plane along a first axis in the plane and/or in a second axis in the plane, the second axis orthogonal to the first axis, such that the grating comprises at least one region where the first array of optical structures and the second array of optical structures do not differ from one another in at least one characteristic and in this region:

the first array of optical structures are offset from the second array of optical structures in both the first and second axis by a factor which is identical to half the period of the first and second rectangular array; and/or the first array of optical structures are offset from the second array of optical structures in the first axis by a factor which is identical to half the period of the first and second rectangular array, and having no offset from the second array of optical structures in the second axis; and/or the first array of optical structures are offset from the second array of optical structures in the second axis by a factor which is identical to half the period of the first and second rectangular array, and having no offset from the second array of optical structures in the first axis.

Preferably, the diffraction grating varies spatially across the plane forming a region of the grating where either the first array of optical structures or the second array of optical structures provides negligible diffraction of the light.

Preferably, the diffraction grating varies spatially across the plane through having a region of the grating which comprises neighbouring optical structures in the first and/or second array of optical structures forming continuous structures thereby forming a one-dimensional grating in said region.

Preferably, the diffraction grating varies spatially across the plane through the optical structures of the first array and the optical structures of the second array having a gradually decreasing size in the plane or height in a direction perpendicular to the plane towards an edge of the diffraction grating.

Preferably, the diffraction grating varies spatially across the plane forming a plurality of regions, different regions having a different measure of the difference in the characteristics or a measure of the factor which is different to half the period.

Preferably, each of the plurality of regions has a boundary between the other plurality of regions at which the spatial variation occurs.

Preferably, the change in the optical structures between the plurality of different regions is gradual across an area of transition between the regions.

Preferably, the area of transition between a first region and a second region comprises the optical structures in the first region gradually transitioning into the form of the optical structures in the second region.

Preferably, the first array of optical structures are arranged on a first lattice and the second array of optical structures are arranged on a second lattice wherein the lattices both experience a spatially dependent shift in one or more regions across the plane of the grating thereby to provide phase variation to compensate for grating variations or reduce multi-beam interference effects.

Preferably, the diffraction grating comprises one or more layers of coating applied on top of a surface relief structure from which the optical structures are formed. Preferably, the one or more of the layers of coating may be applied directionally so that the thickness of coating depends on the direction of the surface normal of the optical structures. Preferably, the directionality of each layer of coating need not be the same. Preferably, the one of more layers of coating may be applied such that the thickness of coating on the optical structures is uniform, irrespective of the orientation of the structures.

Preferably, the diffraction grating is comprised of multiple layers, and/or materials, forming the optical structures.

According to a further aspect there is provided a diffractive waveguide combiner for an augmented reality or virtual reality display, comprising a waveguide, the waveguide being a substrate configured to transmit light, having arranged in or on the waveguide: an output grating being the diffraction grating according to the previous aspect; and an input grating for coupling in light into the waveguide towards the output grating.

Preferably, the waveguide comprises multiple output gratings according to the above aspect, wherein the multiple output gratings at least partially overlap in the plane of the waveguide and are offset from each other in the direction perpendicular to the plane of the waveguide.

Preferably, the arrangement of the optical structures between the multiple output gratings differ from one another. By having different arrangements of optical structures (e.g. different offsets between the first and second arrays, or different characteristic) between the multiple output gratings each multiple output grating can be tailored such that it has a different diffraction characteristic. In some arrangements, the arrangement of the optical structures of a first of the multiple output gratings may be such that the first multiple output grating predominantly provides two dimensional expansion of the light, whilst the arrangement of the optical structures of a second of the multiple output gratings may be such that the second multiple output grating predominantly couples out orders of the light towards a viewer.

Preferably, the waveguide comprises multiple output gratings according to the above aspect, wherein the period of the first and second rectangular arrays of each of the multiple output gratings are identical.

Preferably, the waveguide comprises multiple output gratings according to the above aspect, each output grating having an associated input grating forming a grating pair, wherein each grating pair is configured to interact with light of a specific wavelength range.

Preferably the output grating is a spatially varying diffraction grating according the above aspect, and wherein the input grating is formed from a region of the output grating.

Preferably, the output diffractive waveguide combiner comprises a plurality of waveguides arranged on top of one another thereby forming a composite stack of waveguides.

Preferably, the waveguide comprises a plurality of waveguides adjacent to one another.

Preferably, the first array of optical structures are arranged on a first lattice and the second array of optical structures are arranged on a second lattice wherein the lattices both experience a spatially dependent shift in one or more regions across the plane of the grating thereby to provide phase variation to compensate for grating variations or reduce multi-beam interference effects. Both lattices shifted in the x- and/or y-direction by separate position-dependent parameters that vary spatially across the grating. In this way, a light beam that scatters from the grating with a non-zero diffraction order will acquire a phase shift that depends on the degree to which the lattices are shifted at the location of the interaction. Such phase shifts may be used to compensate for grating variations or reduce multi-beam interference effects. Alternatively, the grating may undergo a distortion within the plane of the grating the distortion comprising a shift in a position of the optical structures of the grating thereby to provide phase variation to compensate for grating variations or reduce multi-beam interference effects. A distortion within the plane of the grating may shift the position of the optical structures of the grating to a small degree. In this way, a light beam that scatters from the grating with a non-zero diffraction order will acquire a phase shift that depends on the shift in the position of the optical structures as a result of the distortion. Such phase shifts may be used to compensate for grating variations or reduce multi-beam interference effects.

Preferably, the waveguide has a thickness in a direction perpendicular to the plane of the waveguide which varies across the plane of the waveguide such that phase variation of light is achieved to compensate for grating variations or reduce multi-beam interference effects.

Preferably, the output grating is a surface relief grating comprising a base layer having a thickness in a direction perpendicular to the plane of the waveguide which varies across the plane of the waveguide such that phase variation of light is achieved to compensate for grating variations or reduce multi-beam interference effects.

Preferably, the output grating and/or the input grating are formed of a surface relief structure on the waveguide or an embedded structure in the waveguide.

Preferably, the optical structures of the output grating are composed of multiple distinct elements located at different positions orthogonal to the plane of the waveguide.

Preferably, the output grating is comprised of a layer within the waveguide having a variation of optical properties to the surrounding waveguide.

According to a further aspect there is provided an augmented reality or virtual reality display comprising the diffractive waveguide combiner according to the above aspect.

According to a further aspect there is provided a method of manufacture of a diffraction grating for an augmented reality or virtual reality display, comprising the steps of: providing a plurality of optical structures; arranging the plurality of optical structures as described in the above aspect.

DESCRIPTION OF DRAWINGS

Embodiments of the present invention will now be described, by way of example only, with reference to the accompanying drawings in which:

FIGS. 1a-e are a series of diagrams showing the relationship between a lattice of points, a structure and a periodic array of structures, and the identification of possible unit cells of the periodic array of structures;

FIG. 9b is a top view of the same diffractive waveguide combiner as FIG. 9a;

FIGS. 12e-f show top views of profiles of example optical structures for use in embodiments of the present invention;

FIG. 21b is a top view of the same diffractive waveguide combiner as FIG. 21a;

FIG. 35b shows a perspective view of part of an interleaved rectangular grating based on a periodic array of unit cells according to FIG. 35a;

FIG. 36 shows a series of heatmaps demonstrating the variation of diffraction efficiency of various diffraction orders with respect to parameters governing the shape of the optical element in FIG. 35a;

FIG. 45 is a table showing for a DWC with suitable grating periods for $p_x$ and $p_y$ several qualitatively distinct behaviours associated with a beam depending on the 2D cumulative order $\{r_x, r_y\}$;

FIG. 46 is a table of various diffraction orders between cumulative order values that may be particularly important for the operation of a DWC; and FIG. 47 is a table summarising key properties of an ideal diffractive waveguide combiner.

DETAILED DESCRIPTION

Figures 1A, 1B, 1C:
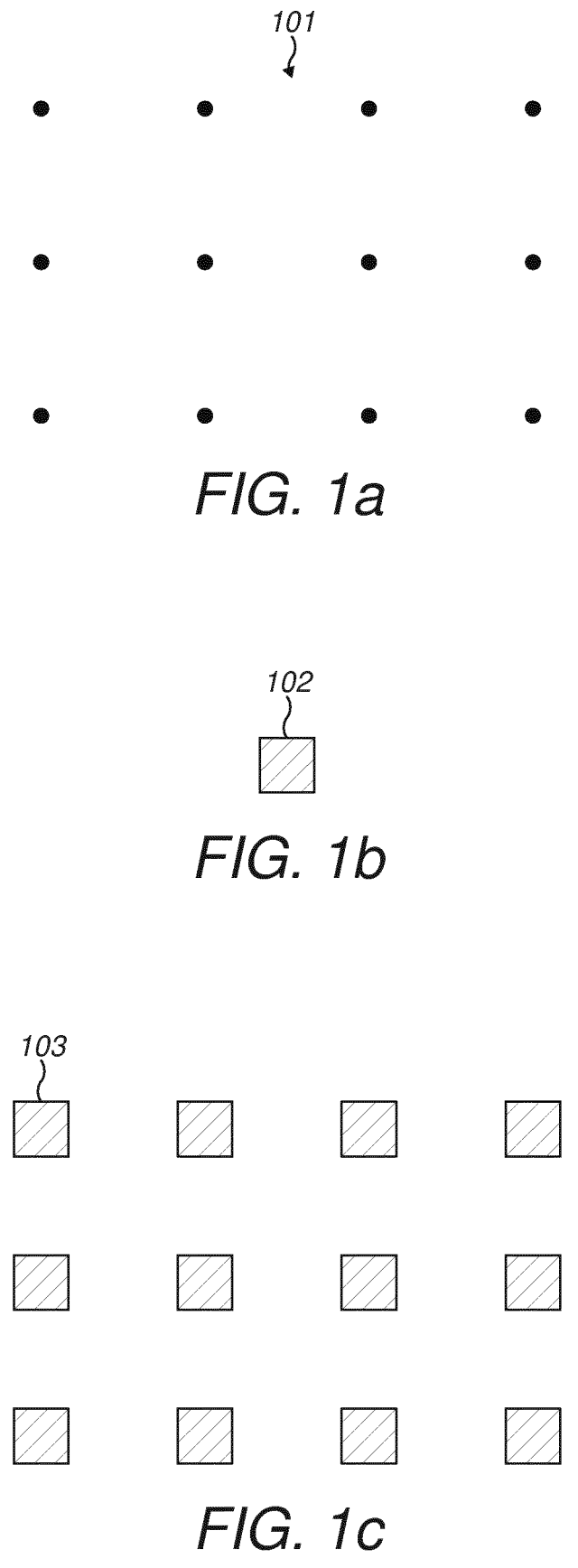

It is well established that a spatially periodic array of structures (an object that possesses translational symmetry) may be decomposed into an array of discrete points, termed a lattice, at each point of which an identical structure is placed. FIG. 1a shows part of a two-dimensional infinite lattice of points with rectangular symmetry, 101. FIG. 1b shows a single square structure 102. FIG. 1c shows the result of applying an identical copy of the structure 102 at each of the points of the lattice 101 to create a periodic rectangular array of structures 103. A unit cell is a section of a periodic array which when repeated by placing copies of itself next to each other with the translational symmetry of the lattice will recreate the full periodic structure. The simple unit cell is the smallest section of a periodic array of structures

Figure 1D:
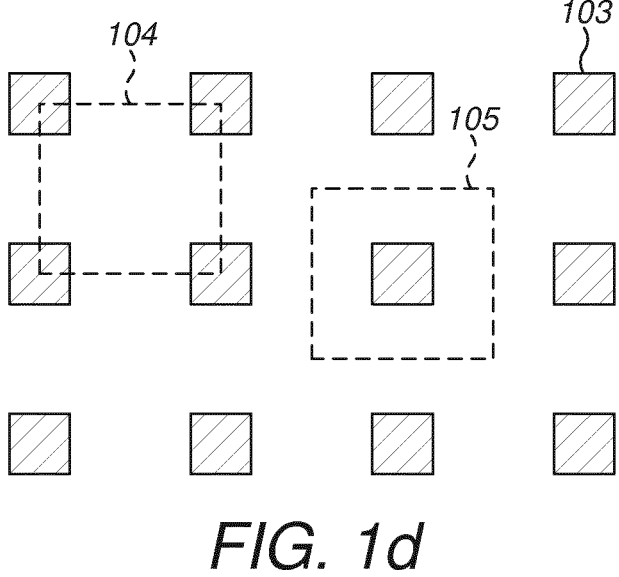
Figure 1E:
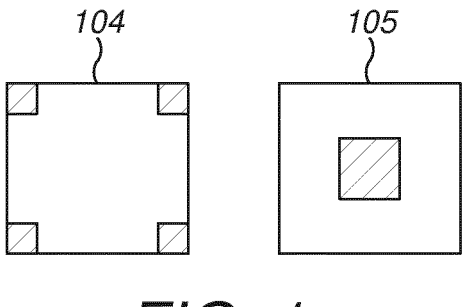

27 necessary to recreate the array. The simple unit cell is not unique and may be chosen for convenience. FIG. 1*d* shows the lattice 103 with one possible unit cell, 104, which has been defined to have corners coincident with the centres of a 2×2 array of optical structures and another possible unit cell, 105, which has been defined to have a centre coincident with the centre of one of the optical structures. When repeated at each lattice point both 103 and 104 will create the same rectangular periodic array. These unit cells are shown again for clarity in FIG. 1*e*.

It is well known that a system with optical properties that vary in a spatially periodic fashion, such as a periodic array of surface relief structures created between media with different refractive indices or a periodic array of structures of one refractive index encapsulated in a medium of a different refractive index, will scatter incident light in directions determined by the direction and wavelength of the light and the periodicity and orientation of the lattice associated with the periodic array of structures. The strength of scattering in various directions depends on the shape and composition of the variation in optical properties, as well as the wavelength, direction and polarization of the incident light.

When a periodic structure is configured in a plane and used to scatter waves, such as electromagnetic waves, it is typically referred to as a diffraction grating. A structure that is periodic along one direction only is often termed a one-dimensional diffraction grating, or 1D grating, and a structure that is periodic in two-dimensions is often termed a two-dimensional grating, or 2D grating. Other terms are also used for periodic light scattering structures such as photonic crystals of various dimensionality. Layered periodic structures are also possible, and when used to scatter electromagnetic waves are often referred to as 1D-, 2D-, or 3D-Bragg gratings, after the physicist Sir Lawrence Bragg, and depending on the dimensionality of the periodicity.

A diffractive waveguide combiner (DWC) is an optical device that employs diffraction gratings to perform functions that may facilitate an augmented reality (AR) or virtual reality (VR) display system. When used as part of such a display system a DWC may receive light from an artificial source which may be a computer-controlled image-based display system such as a micro-projector and then output this light again from a different position of the combiner such that it may be received by an observer or other detection system. In an augmented reality display system a DWC may also provide transmissive viewing of the surrounding physical world. The intended result being that images from the artificial source will be seen by a viewer as overlaid on the view of the surrounding physical world, thus providing an augmented reality display experience. This description will use the term real-world light to refer to light from the surrounding physical world as seen via transmissive viewing through a DWC, and the term projected light for light from an artificial source that is received by a DWC in order to be overlaid on the view of the surrounding physical world.

This invention is concerned with novel configurations of two-dimensional gratings with properties and features suited to application as an output element of a diffractive waveguide combiner (DWC).

Electromagnetic Waves and K-Space

In principle, any electromagnetic radiation field may be decomposed into a superposition of monochromatic plane waves. The electric field of a given plane wave in a linear, isotropic, homogeneous medium with refractive index n may be expressed as a function of position, r, and time, t, as $$E(r,t)=E_0 \exp i(k \cdot r - \omega t) + c.c. \tag{1}$$

Where $E_0$ is a constant vector describing the amplitude and polarization of the plane wave, k is the wavevector of

28 the wave, $\omega$ is the angular frequency of the wave, $i=\sqrt{-1}$, and c.c. refers to the complex conjugate of the first part of the expression so that E(r, t) is real-valued only (often this term is dropped for simplicity). The wavevector and angular frequency are related to the speed of light, c, by the dispersion relation $$\frac{\omega}{|k|} = \frac{c}{n}. \tag{2}$$

The length of the wavevector k, $|k|=k$, is related to the to the wavelength of light in vacuum, $\lambda$, and refractive index of the material in which the wavevector is propagating n by $$|k| = \frac{2\pi n}{\lambda} = nk_{0r} \tag{3}$$

$$k_0 = \frac{2\pi}{\lambda}. \tag{4}$$

It should be noted that for most materials the refractive index n depends on the wavelength in vacuum but for the sake of clarity we do not show this explicitly throughout this description.

Using a Cartesian (x, y, z)-coordinate system for position we may write the components of position as a row vector, $$r=(x,y,z). \tag{5}$$

We may also define a Cartesian coordinate system for the wavevector with basis vectors parallel to those of the physical space Cartesian (x, y, z)-coordinate system. We refer to this vector space as k-space and we may write the components of the wavevector as a row vector, $$k=(k_x,k_y,k_z). \tag{6}$$

If we define the spherical angles $\theta$ and $\phi$ to describe the direction of the wavevector k, where $\theta$ describes the angle subtended between k and the z-direction of the Cartesian coordinate system and $\phi$ describes the polar angle of k as projected onto the xy-plane, then we may write the wavevector as $$k=nk_0(\sin \theta \cos \phi, \sin \theta \sin \phi, \cos \theta). \tag{7}$$

Without loss of generality, but with considerable convenience, we may define the plane of the spatially periodic structures with which we are concerned to be the xy-plane of a three-dimensional Cartesian (x, y, z)-coordinate system. Unless stated otherwise for the rest of this description it will be assumed that the plane of any spatially periodic structures arranged in a plane is parallel to such an xy-plane, which may be a globally applied coordinate system or one that has been defined locally in order to provide this convenience. We also define $k_{xy}$ to be the subvector of k in the two-dimensional subspace of k-space that is parallel to the xy-plane (and so the $(k_x, k_y)$-plane), which gives $$k_{xy}=(k_x,k_y). \tag{8}$$

We will term wavevector subvectors in this two-dimensional subspace as xy-wavevectors and the associated subspace of k-space as kxy-space. In many circumstances the interaction of light with a grating will be in a medium such as a glass waveguide and light will undergo refraction in order to couple into this medium. Such refraction may be computed by using Snell's law. Alternatively, we may note that, as a consequence of the boundary conditions at a smooth interface between different media and absent of any features such as a diffraction grating, the components of a wavevector in the local plane tangent to the interface remain unchanged upon refraction. Thus, if the interface between media is in the xy-plane of a Cartesian (x, y, z)-coordinate system, as will the case for much of the description herein, then the xy-wavevector will remain the same upon refraction, which can help clarify analysis and enable a more succinct presentation of the optical phenomena at work.

Any structure realised in the physical world cannot be truly infinite in extent meaning that translational symmetry does not extend beyond the edges of a finite periodic array. This invention is concerned with spatially periodic arrays that although not infinite extent, consist of a large number of unit cells, numbering at least in the millions. The invention is also concerned with the propagation of beams of light that are smaller than the spatial extent of the lattice. As such, the treatment of the scattering of light beams off the grating is well approximated by considering an infinite periodic array, with deviations for finite size effects taken into account where appropriate.

Waveguide Coupling Via One-Dimensional Diffraction Gratings

It is a well-established principle of optics that light will scatter from a spatially periodic structure in directions characterised by a vector equation involving the wavevector components of light and vectors derived from the lattice associated with the periodic structure. These vectors are termed grating vectors. If the lattice is arranged in a plane, then this equation will only involve subvectors within the plane of the lattice.

Figure 2:
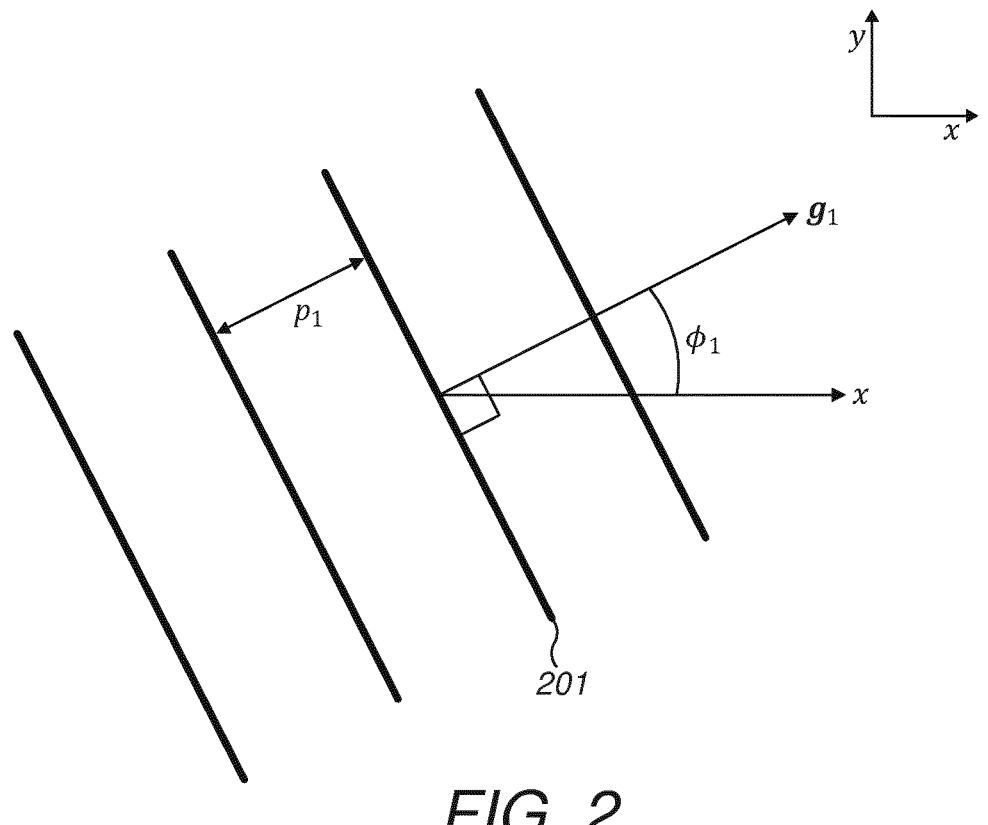
FIG. 2 is a top view of a representation of a one-dimensional diffraction grating.

FIG. 2 shows a top view of a one-dimensional diffraction grating 201 arranged in the xy-plane. The grating consists of rows of identical features, also termed grooves, separated by a distance $p_1$ which is the period of the grating. In FIG. 2 the grating grooves are represented by a series of lines. The grooves are oriented such that a line drawn orthogonal to the grooves and also within the xy-plane makes an angle $\phi_1$ to the x-axis. The lines of the grating may be described mathematically via the use of a series of Dirac delta functions, $\delta(x)$, $$L_1(x, y) = \sum_{i=-\infty}^{\infty} \delta(x\cos\phi_1 + y\sin\phi_1 - ip_1), \tag{9}$$

where we term $L_1(x, y)$ as the lattice function associated with the 1D diffraction grating shown in FIG. 2. Such functions can be used in the mathematical treatment of the interaction of light with grating structures, for example via the well-established methods and principles of Fourier optics. The grating vector associated with the grating 201, $g_1$, is defined as a vector within the plane of the grating, with direction orthogonal to the grooves of the grating and is given by $$g_1 = (g_{1x}, g_{1y}) = \frac{2\pi}{p_1}(\cos\phi_1, \sin\phi_1). \tag{10}$$

We note that $g_1$ is a two-dimensional vector within kxy-space as a consequence of arranging for the plane of the grating to be parallel to the xy-plane of the coordinate system.

The diffraction of monochromatic plane waves from such a grating will result in diffracted plane wave beams of light with xy-wavevectors given by the 1D grating equation, $$k_{xy}^{\{m1\}} = k_{xy} + m_1 g_1, \tag{11}$$

or in terms of row-vectors of scalar components, $$(k_x^{\{m1\}}, k_y^{\{m1\}}) = (k_x, k_y) + m_1(g_{1x}, g_{1y}), \tag{12}$$

where $m_1$ is a parameter describing the diffraction order of the interaction and is either zero, a positive integer or a negative integer. Here $k_{xy}$ is the xy-wavevector of the incident plane wave with x- and y-direction components given by $k_x$ and $k_y$, respectively; $k_{xy}^{\{m1\}}$ is the xy-wavevector of the scattered wave corresponding to a diffraction order characterised by $m_1$, and has x- and y-direction components given by $k_x^{\{m1\}}$ and $k_y^{\{m1\}}$, respectively; and $g_1$ is the two-dimensional grating vector in the $(k_x, k_y)$-plane associated with the 1D diffraction grating. Interactions of light with a grating characterised by a non-zero diffraction order may be termed diffractive interactions. Light beams resulting from an interaction with a grating where the value of the diffraction order is non-zero may be referred to as light beams that have undergone diffractive interactions.

If a plane wave beam of light, which may also be termed a collimated beam of light, undergoes successive interactions with a given 1D-diffraction grating then each interaction will obey the 1D grating equation. Under such circumstances, the following relationship will necessarily hold for the xy-wavevector of a beam $k'_{xy}$ after any number of interactions with the same grating, $$k'_{xy} = k_{xy}^{\{r1\}} = k_{xy} + r_1 g_1, \tag{13}$$

where $k_{xy}$ is the xy-wavevector of the original beam before it first interacted with the grating and $r_1$ is an integer formed from the sum of all the diffraction orders of the previous interactions, which we term here the cumulative order for interactions of a light beam with grating having grating vector $g_1$. For example, if our beam has undergone N interactions with the same diffraction grating and $m_1^{(i)}$ is the diffraction order of the ith interaction, then $r_1$ is given by $$r_1 = \sum_{i=1}^{N} m_1^{(i)}. \tag{14}$$

In general, the value of $r_1$ may be zero, positive or negative. A light beam corresponding to a particular value of $r_1$ must obey the same dispersion relation as the incident light and so the magnitude of the full three-dimensional wavevector of the scattered light will be given by $$|k^{\{r1\}}| = \frac{2\pi n'}{\lambda} = \frac{2\pi n' f}{c} = n' k_0, \tag{15}$$

where n' is the refractive index of the medium in which the beam propagates. Here $\lambda$ the wavelength of the wave in vacuum, f is the frequency of the wave and c is the speed of light in a vacuum, which all remain constant for a given monochromatic light beam. We can relate this to the Cartesian components of the wavevector by noting the definition of the scalar components of the diffracted wavevector, $$k^{\{r1\}} = (k_x^{\{r1\}}, k_y^{\{r1\}}, k_z^{\{r1\}}), \tag{16}$$

and expanding the expression for the magnitude of the wavevector, $$|k^{\{r1\}}|^2 = \left(k_x^{\{r1\}}\right)^2 + \left(k_y^{\{r1\}}\right)^2 + \left(k_z^{\{r1\}}\right)^2 = n'^2\left(\frac{2\pi}{\lambda}\right)^2 = n'^2 k_0^2, \tag{17}$$

which we can rearrange to solve to give, $$k_z^{\{r1\}} = \pm\sqrt{n'^2 k_0^2 - (k_x^{\{r1\}})^2 - (k_y^{\{r1\}})^2}, \tag{18}$$

and so $$k_z^{\{r1\}} = \pm\sqrt{n'^2 k_0^2 - (k_x + r_1 g_{1x})^2 - (k_y + r_1 g_{1y})^2}. \tag{19}$$

Values of $k_z^{\{r1\}}$ with the same sign as the z-component of the incident beam are referred to as transmitted diffraction orders, whereas those where the z-component of the wavevector changes in sign are termed reflected diffraction orders. Zero or complex values of $k_z$ corresponding to solutions where $$(k_x + r_1 g_{1x})^2 + (k_y + r_1 g_{1y})^2 \geq n'^2 k_0^2 \tag{20}$$

and describe light beams which do not freely propagate away from the grating. Such beams are referred to as evanescent orders to indicate corresponding evanescent electromagnetic waves. These orders will not transport energy without an additional structure interacting with them, such as another layer of optically structures. For a grating that is placed at an interface between two mediums with different refractive index the value of n' for a transmitted order may differ from a reflected order. Consequently, a different range of orders may be non-evanescent for transmitted and reflected diffraction orders.

For light propagating in a medium of refractive index n incident on an interface with a medium of refractive index $n_0$ and that is parallel to the xy-plane the condition that a beam will undergo total internal reflection (TIR) requires that the beam in the medium of refractive index $n_0$ is evanescent. This is given by $$(k_x + r_1 g_{1x})^2 + (k_y + r_1 g_{1y})^2 \geq n_0^2 k_0^2. \tag{21}$$

Thus, for a collimated light beam propagating in a system consisting of a planar slab waveguide of refractive index n arranged with surfaces parallel to the xy-plane and in a surrounding medium of refractive index $n_0$ we can identify three regions of k-space based on the xy-wavevector of the beam:

1. Free propagation region of k-space—wavevectors in this region of k-space characterise light beams that may freely propagate both in the slab waveguide and the surrounding medium. Wavevectors in the free propagation region of k-space satisfy the inequality $$k_x'^2 + k_y'^2 < n_0^2 k_0^2. \tag{22}$$

2. Waveguided propagation region of k-space—wavevectors in this region of k-space characterise light beams that may freely propagate within the slab waveguide but not the surrounding medium and thus such light beams in the waveguide will undergo total internal reflection from interfaces with the surrounding medium that are parallel to the xy-plane and where the xy-wavevector is unchanged. Wavevectors in the wave-guiding region of k-space satisfy the inequality $$n_0^2 k_0^2 \leq k_x'^2 + k_y'^2 < n^2 k_0^2. \tag{23}$$

3. Evanescent region of k-space—wavevectors in this region of k-space characterise light beams that are evanescent in both the waveguide and the surrounding medium, no propagation or transport of energy is possible for such light beams without some modification to the system. Wavevectors in the evanescent region of k-space satisfy the inequality $$k_x'^2 + k_y'^2 \geq n^2 k_0^2. \tag{24}$$

The use of diffraction gratings to transform beams of light between the free and waveguided propagation regions of k-space, whilst respecting the limits imposed by the evanescent region, is key to the function of a DWC.

By taking a slab of material of refractive index n with parallel, planar sides we may confine light beams in the direction orthogonal to the planar surfaces of the waveguide whilst allowing propagation of light within the waveguide. Such confinement may be used to allow light beams to be transported (i.e. relayed) from one location to another within a slim device: Light exiting a projector will satisfy the condition for the free propagation region and so freely propagate through the medium between the projector and the waveguide, typically air; a diffraction grating of suitable period and orientation on a slab waveguide may be used to diffract light from this projector such that it satisfies the condition for waveguided propagation and undergoes confinement within the slab by TIR; at some separate location from the first diffraction grating, a second diffraction grating with period and orientation identical to the first may be used to diffract some or all of the light beam out of the wave-guiding region and into the free propagation region of k-space where it may then exit the waveguide, for example, towards the eye of an observer.

It is possible that the second grating may have a different period and orientation to the first, in this case the same inequalities apply for governing the regions of k-space. In this case the xy-wavevector in terms of the initial wavevector and the grating vectors that have interacted with the beam will acquire an additional term due to the distinct grating vector of the second grating, resulting in $$k_{xy}' = k_{xy}^{\{r1,q1\}} = k_{xy} + r_1 g_1 + q_1 h_1. \tag{25}$$

Here $h_1$ is the grating vector of the second grating and $q_1$ the cumulative order for interactions with this grating.

Figure 3A:
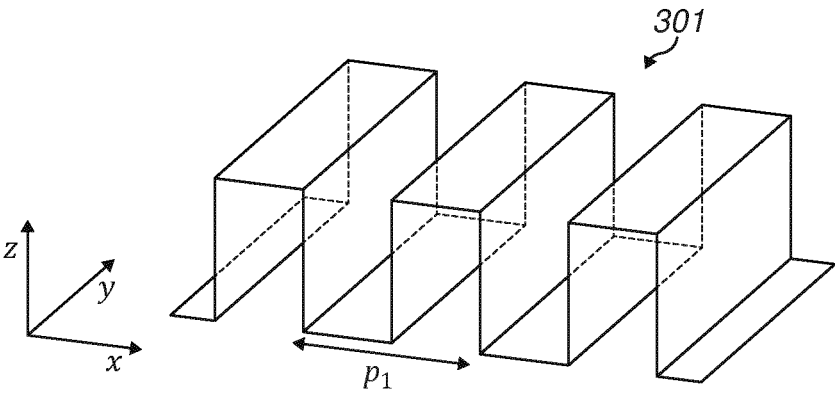
FIGS. 3a-c show perspective views of part of various one-dimensional diffraction gratings with different shapes but the same grating vector.
Figure 3B:
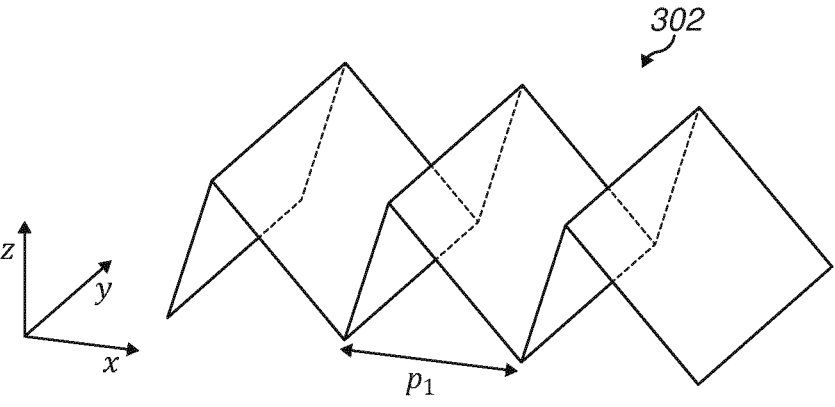
Figure 3C:
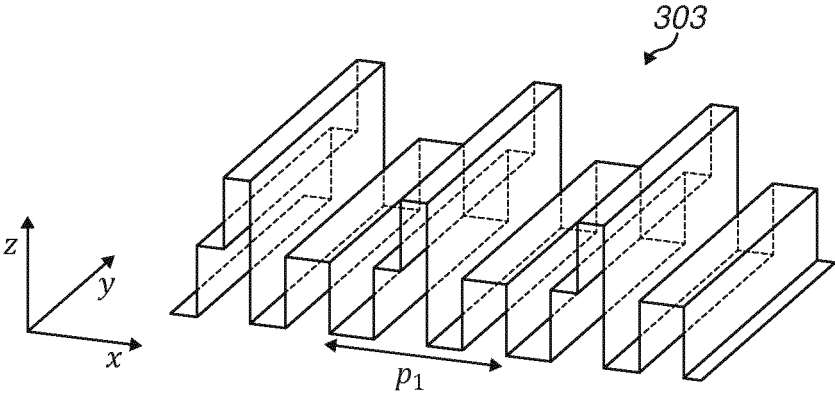

The spatially repeating features of a 1D diffraction grating are often termed grooves. These grooves can be complex in shape, and even composed out of a variety of materials. FIGS. 3a, 3b, and 3c show perspective views of part of three different 1D diffraction gratings all lying in the xy-plane and having the same grating vector pointing in the x-direction ($\phi_1 = 0$), and the same grating period $p_1$, but with different surface relief structure in the z-direction. To form a complete three-dimensional relief structure each of these cross-sections is extruded in the y-direction to form one-dimensional arrays of grooves.

Figure 3D:
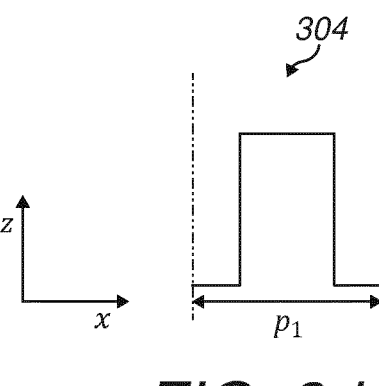
FIGS. 3d-f show cross-section views in the xz-plane of the unit cells of the diffraction gratings shown in FIGS. 3a-c.

FIG. 3a shows a perspective view of a grating 301 with a two level surface-relief structure. A cross-section view of the unit cell of this grating 304 is shown in isolation in FIG. 3d and consists of a single protrusion from the surface.

Figure 3E:
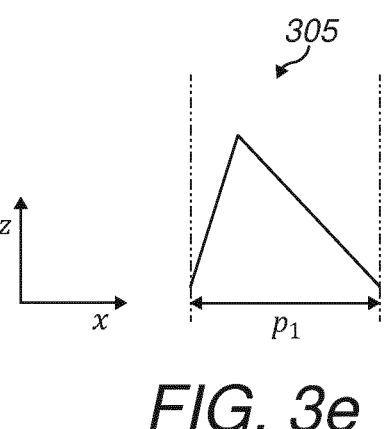

FIG. 3b shows a perspective view of a grating 302 cross-section with a saw-tooth surface relief structure, and where the grating relief consists of sloped ramps along the direction of the grating vector. Such a grating structure is also termed a blazed structure. A cross-section view of the unit cell of this grating 305 is shown in isolation in FIG. 3e and consists of a single peak with different sloped surfaces on each side.

Figure 3F:
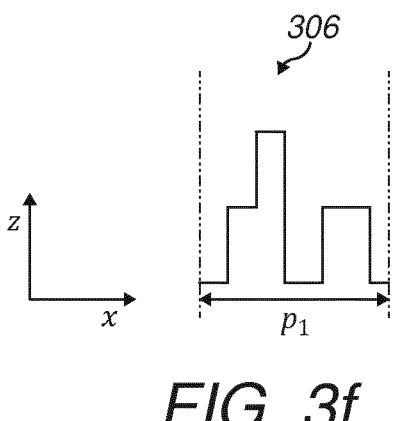

FIG. 3c shows a perspective view of a grating 303 with a multi-element, multi-level relief structure. A cross-section view of the unit cell 306 is shown in FIG. 3f and consists of two separate elements. Despite the existence of distinct elements within the unit cell the grating 303 nonetheless possesses the same grating vector as gratings 301 and 302 as this derives from the periodicity of the array.

Since the gratings 301, 302, and 303 have the same grating vector any non-evanescent orders of an incident light beam will diffract in the same direction. However, the different shape of the structures will mean that in general the proportion of light coupled into non-evanescent transmitted and reflected diffraction orders will be different for each of the structures for a given incident beam direction, wavelength and polarization.

Waveguided Light Interactions with Two-Dimensional Diffraction Gratings

Figures 4A, 4B, 4C:
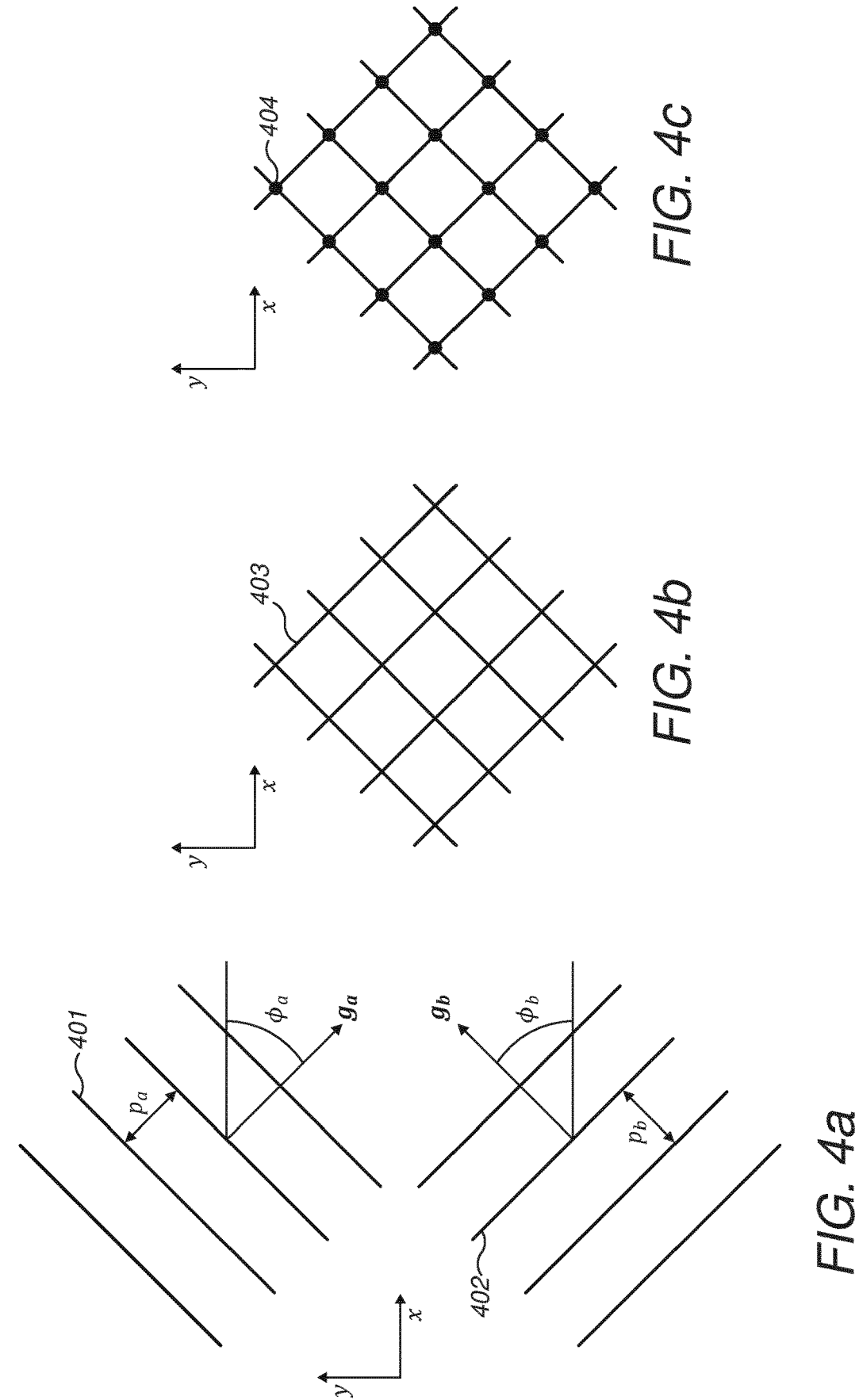
FIGS. 4a-f show a series of top views of diffraction gratings demonstrating how a two-dimensional grating may be constructed from the overlap of two one-dimensional gratings, producing a two-dimensional lattice, and examples of different two-dimensional gratings with the same underlying lattice.

We can generalise the lattice function (9) to provide a method for the mathematical representation for two-dimensional gratings lying in the xy-plane by taking the product of lattice functions for two different one-dimensional gratings. FIG. 4a shows a schematic of two one-dimensional gratings in the xy-plane, 401 and 402, which have grating vectors $g_a$ and $g_b$, respectively. In row vector form these grating vectors are given by $$g_a = (g_{ax}, g_{ay}) = \frac{2\pi}{p_a}(\cos\phi_a, \sin\phi_a) \text{ and} \tag{26}$$

$$g_b = (g_{bx}, g_{by}) = \frac{2\pi}{p_b}(\cos\phi_b, \sin\phi_b), \tag{27}$$

where $p_a$ and $p_b$ are the periods of gratings 401 and 402, respectively, and $\phi_a$ and $\phi_b$ are angles describing the orientation of the grating vectors of gratings 401 and 402, respectively (note as drawn in FIG. 4a the angle for grating 401 is negative). The 2D lattice function arising from the overlap of these lattices, $L_{ab}(x, y)$, can be written as a product of series of Dirac delta functions, $$L_{ab}(x, y) =$$

$$\sum_{i=-\infty}^{\infty} \delta(x\cos\phi_a + y\sin\phi_a - ip_a) \times \sum_{j=-\infty}^{\infty} \delta(x\cos\phi_b + y\sin\phi_b - jp_b). \tag{28}$$

FIG. 4b shows that overlapping 1D grating patterns results in a crossed grating structure, 403. The product of delta functions in equation (28) will only be non-zero at the points where the gratings cross, leading to an array of points 404 shown with the crossed grating structure in FIG. 4c and without the crossed structure in FIG. 4d. This is the lattice of the two-dimensional grating described by the lattice function $L_{ab}(x, y)$. The positions of each lattice point can be found from analysis of the lattice function $L_{ab}(x, y)$, giving, $$x_{ij} = \frac{1}{\sin(\phi_b - \phi_a)}(ip_a\sin\phi_b - jp_b\sin\phi_a), \text{ and} \tag{29}$$

$$y_{ij} = \frac{1}{\sin(\phi_b - \phi_a)}(jp_b\cos\phi_a - ip_a\cos\phi_b), \tag{30}$$

where $(x_{ij}, y_{ij})$ gives the (x, y)-coordinates of a lattice point described by the index values i and j. These indices may be positive or negative integers, or zero.

Figure 4F:
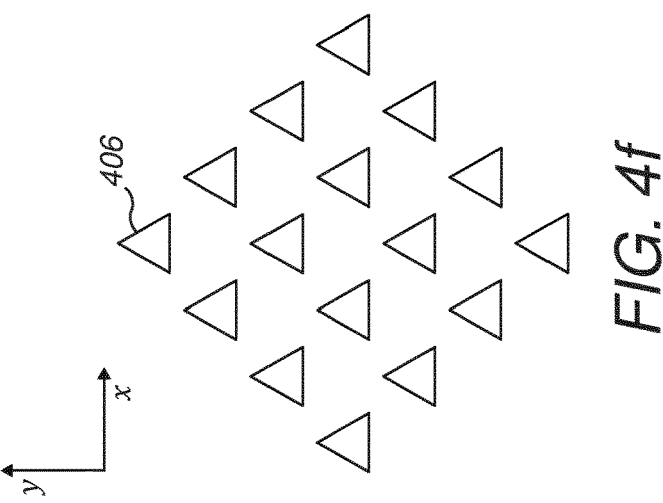
Figure 4E:
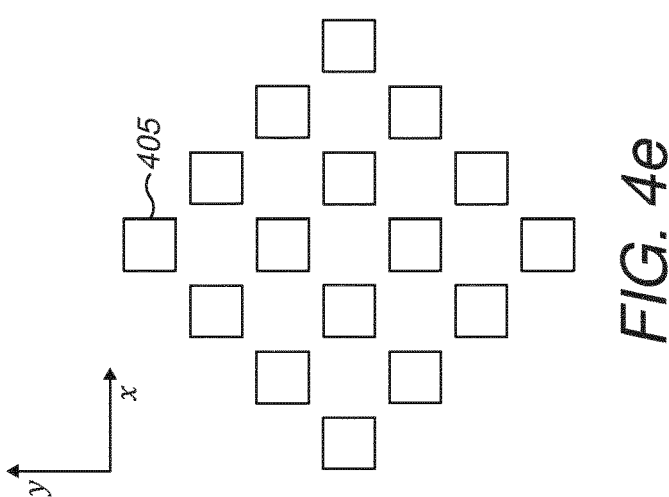
Figure 4D:
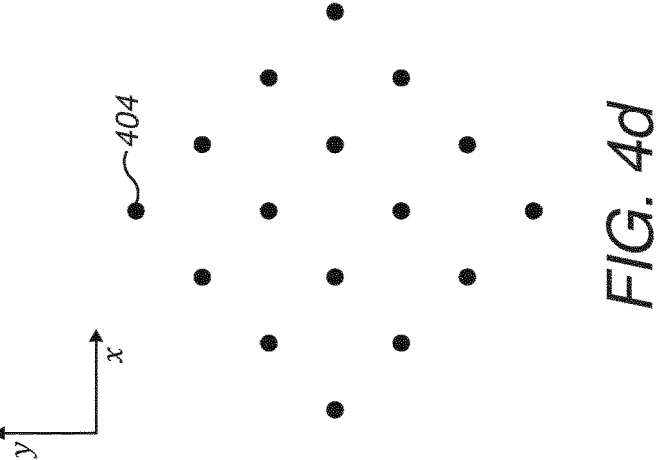

A diffraction grating for scattering of light may be generated based on this lattice by associating with each point an identical structure, or ensemble of structures. Such structures should exhibit at least some variation of an optical property such as refractive index, electric permittivity, magnetic permeability, birefringence and/or absorptivity, either within the structures or relative to the medium surrounding the structures. FIGS. 4e and 4f show top view representations of periodic arrays of pillar-shaped structures arranged in the xy-plane with periodicity based on the lattice 404. FIG. 4e shows a top view of an array of rectangular pillar structures 405, and FIG. 4f shows a top view of an array of triangular pillar structures 406. As in the case of one-dimensional gratings the directions that these or other structures based on lattice 404 will diffract monochromatic plane waves will depend on the periodicity and orientation of the lattice but not on the shape of the individual structures. Such scattering is governed by the 2D grating equation, which in vector form may be expressed as $$k_{xy}^{\{m_a, m_b\}} = k_{xy} + m_a g_a + m_b g_b, \tag{31}$$

or in terms of row-vectors of scalar components, $$(k_x^{\{m_a, m_b\}}, k_y^{\{m_a, m_b\}}) = (k_x, k_y) + m_a(g_{ax}, g_{ay}) + m_b(g_{bx}, g_{by}). \tag{32}$$

Here $\{m_a, m_b\}$ describes the two-dimensional diffraction order of the interaction, each component of which may be either zero, a positive integer or a negative integer; and $k_{xy}^{\{m_a, m_b\}}$ is the xy-wavevector of the scattered wave corresponding to a two-dimensional diffraction order indexed by $\{m_a, m_b\}$ with x-component $k_x^{\{m_a, m_b\}}$, and y-component $k_y^{\{m_a, m_b\}}$. Similar to the one-dimensional grating, a beam after successive interactions with the same 2D diffraction grating will have a wavevector $k'_{xy}$ that satisfies the equation, $$k'_{xy} = k_{xy}^{\{r_2, r_3\}} = k_{xy} + r_a g_a + r_b g_b. \tag{33}$$

Here $k_{xy}$ is the xy-wavevector of the original beam before it first interacted with the 2D gratings and $r_a$ and $r_b$ are integers formed from the sum of all the diffraction orders of the previous interactions. Here, we term the set of values $\{r_a, r_b\}$ the 2D cumulative order of the 2D grating. If we consider a beam undergoing multiple diffraction events with a 2D grating and select just a single diffracted beam after each diffraction event with diffraction order $\{m_a^{(i)}, m_b^{(i)}\}$ for the ith interaction, then the cumulative order before and after the ith interaction, $\{r_a^{(i-1)}, r_b^{(i-1)}\}$ and $\{r_a^{(i)}, r_b^{(i)}\}$, respectively, have values related by $$r_a^{(i)} = r_a^{(i-1)} + m_a^{(i)}, \tag{34}$$

and $$r_b^{(i)} = r_b^{(i-1)} + m_b^{(i)}. \tag{35}$$

If $\{r_a^{(N)}, r_b^{(N)}\}$ is the cumulative order of a beam after it has undergone N interactions with the same diffraction grating, and $\{m_a^{(i)}, m_b^{(i)}\}$ is the two-dimensional diffraction order of the ith interaction with the grating, then the values $r_a^{(N)}$ and $r_b^{(N)}$ are given by $$r_a^{(N)} = \sum_{i=1}^{N} m_a^{(i)}, \text{ and} \tag{36}$$

$$r_b^{(N)} = \sum_{i=1}^{N} m_b^{(i)}. \tag{37}$$

From these equations we can clearly see that that since $m_a^{(i)}$ and $m_b^{(i)}$ are positive integers, negative integers or zero then $r_a^{(N)}$ and $r_b^{(N)}$ must also be positive integers, negative integers or zero.

The z-component of the full three-dimensional wavevector may be found from the wavelength of the light beam in vacuum, which does not change, the refractive index of the medium in which the beam propagates, n', and the diffracted xy-components of the wavevector, $$k_z^{\{r_a,r_b\}} = \pm\sqrt{n'^2 k_0^2 - (k_x + r_a g_{ax} + r_b g_{bx})^2 - (k_y + r_a g_{ay} + r_b g_{by})^2}. \tag{38}$$

As in the case with a one-dimensional grating, values of $k_z^{\{r_a,r_b\}}$ with the same sign as the z-component of the incident beam are referred to as transmitted diffraction orders, whereas those where the z-component of the wavevector changes in sign are termed reflected diffraction orders. Zero or complex values of $k_z$ corresponding to solutions where $$(k_x + r_a g_{ax} + r_b g_{bx})^2 + (k_y + r_a g_{ay} + r_b g_{by})^2 \geq n'^2 k_0^2 \tag{39}$$

are evanescent orders and do not couple energy or result in freely propagating light beams. It is quite possible that for some orders only the transmitted or reflected beam will be non-evanescent.

As with the 1D grating we may identify three regions of k-space where different modes of propagation are possible for a system consisting of a planar slab waveguide of refractive index n arranged with surfaces parallel to the xy-plane in a surrounding medium of refractive index $n_0$. The xy-wavevector of a beam that has undergone multiple interactions with a 2D grating leading to a cumulative order of $\{r_a, r_b\}$ may be written as $$k'_{xy} = (k'_x, k'_y) = (k_x + r_a g_{ax} + r_b g_{bx}, k_y + r_a g_{ay} + r_b g_{by}), \tag{40}$$

where $(k_x, k_y)$ is the xy-wavevector of the beam prior to interacting with the 2D grating. The three regions of k-space may then be defined as follows:
1. Free Propagation Region of k-Space:

$$(k_x + r_a g_{ax} + r_b g_{bx})^2 + (k_y + r_a g_{ay} + r_b g_{by})^2 < n_0^2 k_0^2. \tag{41}$$

2. Waveguided Propagation Region of k-Space:

$$n_0^2 k_0^2 \leq (k_x + r_a g_{ax} + r_b g_{bx})^2 + (k_y + r_a g_{ay} + r_b g_{by})^2 < n^2 k_0^2. \tag{42}$$

3. Evanescent Region of k-Space:

$$(k_x + r_a g_{ax} + r_b g_{bx})^2 + (k_y + r_a g_{ay} + r_b g_{by})^2 \geq n^2 k_0^2. \tag{43}$$

As with 1D gratings a light beam may undergo transitions between the free propagation and waveguiding regions upon interaction with a suitably configured 2D grating. However, in the case of a 2D grating the xy-wavevector may be deflected in more than one direction, as long as $g_a$ and $g_b$ are not collinear. This additional degree of freedom provides for a greater capacity for a grating to distribute light spatially within a waveguide. This may be used advantageously to support functions such as two-dimensional exit pupil expansion in a DWC.

In a slab-waveguide with a suitably configured 2D diffraction grating a beam may undergo waveguided propagation and at some regions of the waveguide interact with a 2D-grating. At each interaction the beam may split into multiple separate beams corresponding to different diffraction orders of the grating. Some of these beams may continue to be confined within the waveguide by TIR and so may interact again with the grating, again potentially splitting into multiple beams. This process will continue until the various light beams are absorbed, escape the grating region due to transmission out of the waveguide medium (which is allowed for xy-wavevectors in the free propagation region of k-space), escape the grating region due to propagation out of the region of the waveguide covered by the grating, and/or are absorbed or otherwise escape from the waveguide, for example by hitting the sides of the slab waveguide other than the surfaces parallel to the xy-plane.

The direction of a beam after a two-dimensional grating interaction will depend on the 2D cumulative order for that beam as determined up to the most recent grating interaction. This beam will thus have undergone an evolution of its cumulative order and in doing so will have traced out a branching path through the waveguide. Multiple beams with different evolutions of cumulative order but derived from the same incident collimated monochromatic beam coupled into the waveguide will trace out different paths. The accumulation of these beams may thus provide for a spatially extended distribution of the input light throughout part of a suitably configured waveguide. Such paths can be analysed analytically or by computational methods such as raytracing.

Having related the layout of two-dimensional periodic structures to the 2D grating equation it is now possible to design 2D gratings with prescribed directional scattering properties. As with the 1D grating case, the proportion of light coupled into a particular grating order will depend on the actual structure associated with the lattice, as well as the wavelength, direction and polarization of incident light.

Diffraction Efficiency of Diffraction Gratings

We will use the term diffraction efficiency to describe the radiant power of a particular diffracted order relative to the radiant power of an incident beam. Here we will distinguish transmitted and reflected orders from a diffraction grating since they correspond to different beams, albeit with the same xy-wavevector. In mathematical notation we may use an index value, T to indicate whether a beam is a transmitted or reflected order of the associated grating. Here we will term T the transmission index and define that T=1 for a transmitted beam and T=−1 for a reflected beam, thus we can state that $$\mathrm{sgn}(k'_z) = T\,\mathrm{sgn}(k_z), \tag{44}$$

where $k_z$, $k'_z$ is the z-component of the wavevector of the incident and scattered beam, respectively, and sgn(x) is the sign or signum function. If we define $$\eta^{\{m_a, m_b, T\}}(k, \hat{E}) \tag{45}$$

as the diffraction efficiency of a beam with diffraction order $\{m_a, m_b\}$ and transmission index T then as a function of incident wavevector k and normalized electric vector $\hat{E}$ the diffraction efficiency will be given by $$\eta^{\{m_a, m_b, T\}}(k, E) = \frac{\left| k^{\{m_a, m_b, T\}} \cdot \hat{z} \right|}{|k \cdot \hat{z}|} \frac{I^{\{m_a, m_b, T\}}(k, \hat{E})}{I_0(k, \hat{E})} \tag{46}$$

$$I_0(k, \hat{E}) \tag{47}$$

is the intensity of the incident beam and $$I^{\{m_a, m_b, T\}}(k, \hat{E}) \tag{48}$$

is the intensity of the scattered beam for diffraction order $\{m_a, m_b\}$ and transmission index T. Since intensity is the radiant power per unit area as measured in a plane perpendicular to the direction of propagation we must account for the possible change in the size of the beams upon diffraction, hence the inclusion of the term $$\frac{\left|k^{\{m_a,m_b,T\}} \cdot \hat{z}\right|}{\left|k \cdot \hat{z}\right|},$$ (49)

where $\hat{z}$ is a unit vector in the direction normal to the surface of the grating, k is the incident wavevector and $k^{\{m_a,m_b,T\}}$ is the diffracted wavevector. The intensity of a beam of monochromatic plane wave electromagnetic radiation may be computed from the Poynting vector associated with the electromagnetic wave. In general, computation of the scattering properties of a grating, and thus its diffraction efficiencies, will take into account the vector nature of the electromagnetic field and so include polarization effects for both the incident and exit beams.

Various methods may be used for the mathematical or computational analysis of grating designs to compute the scattering of light into the various diffraction orders. For simple cases and under certain approximations it is possible to perform analytical calculations. Here the use of mathematical convolution can allow for the description of a periodic array of finite structures. Such methods are well established in the field of Fourier optics and are particularly effective for gratings that introduce only a small perturbation to an incident wave.

In general it is not possible to use purely analytical methods to solve for the optical scattering properties of gratings and instead it is necessary to use numerical techniques such as the finite-difference-time domain method (FDTD) with periodic boundary conditions, or semi-analytical methods such as rigorous coupled-wave analysis (RCWA). These methods are well established and there exists an extensive literature in the public domain describing their use for the analysis of diffraction gratings. Furthermore, there are several sophisticated software packages available both commercially (e.g. the Lumerical DEVICE suite from Lumerical Inc.) and free-of-charge (e.g. the Meep software package, originally from the Massachusetts Institute of Technology), which make such techniques readily accessible to a person sufficiently skilled in the art.

Projectors for Augmented Reality Displays Using Diffractive Waveguide Combiners

To understand the operation of a DWC it is helpful to appreciate the principles by which projected light may be configured for use with a DWC. The eyebox is the region of space over which viewing of the entire field of view of projected light output by the DWC is possible. Such a region is required in order to ensure that viewing of the output from the DWC is possible for a range of eye motions relative to the DWC such as rotation of the eye to vary the position of the centre of gaze and variations of the position of wear of the display system. The size, shape and location of an eyebox at a specified distance, or range of distances, is often a design requirement for a DWC. In many cases the size and shape of a design eyebox is a minimum that must be achieved rather than an exact requirement.

Many DWCs will output a waveguided beam multiple times in order to expand the size of the eyebox. For such DWCs it may be advantageous for each beam of projected light to be collimated such that the wavefront of the beam is planar. Assuming that the beams are of moderate size and the propagation distances are not too large (e.g. beam diameter >0.25 mm, propagation distances <100 mm) then in such a case the wavefront of the various beams output from the DWC will also be planar, even though the propagation distance of each of the beams may be different. This will mean that different outputs derived from the same initial beam, as long as they have the same direction, will appear to come from the same location. If the beams are not collimated, then different outputs derived from the same initial beam may appear to be from a slightly different location, owing to evolution of the wavefront between different output events. This may cause undesirable artefacts for the viewer such as loss of image sharpness, or small shifts in the apparent position of parts of the image depending on the location of the observing eye within the eyebox. In order to avoid such artefacts it may be advantageous to ensure that the projected light provided to a DWC is collimated.

Figure 5A:
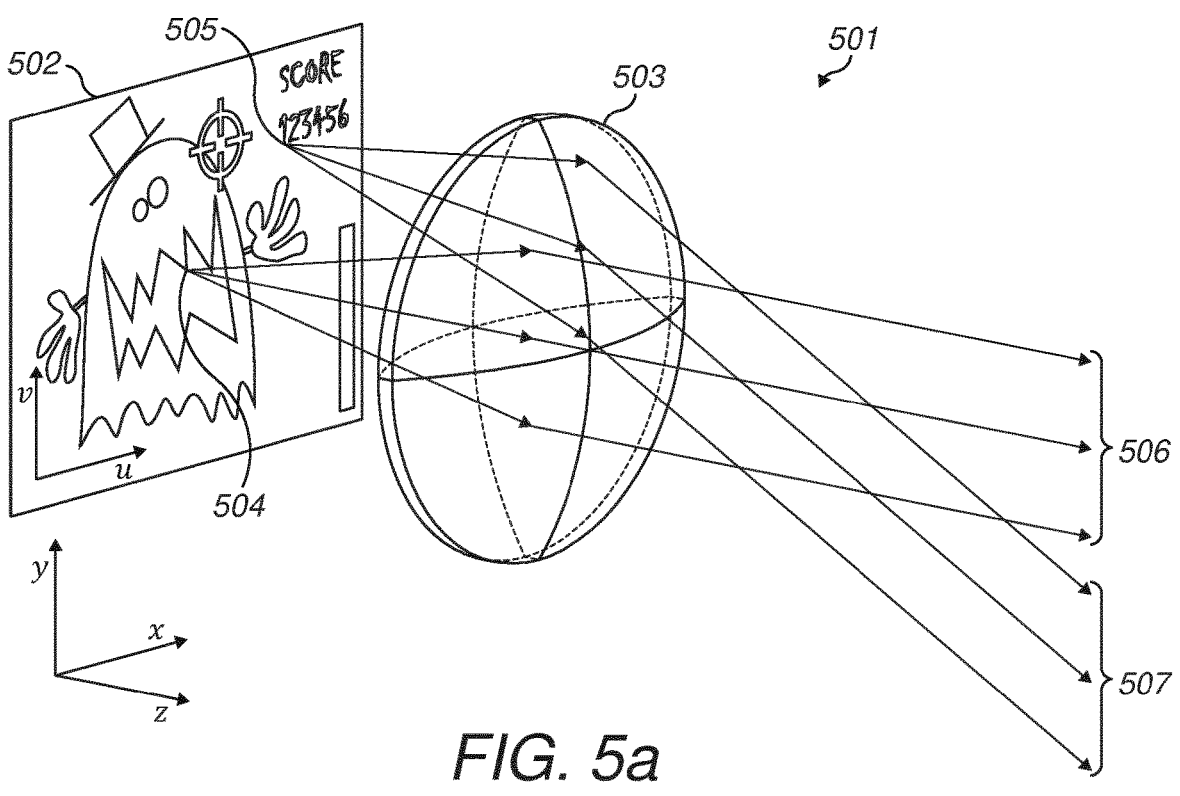
FIGS. 5a-b show a simplified representation of a projector for an augmented reality or virtual reality display system.
Figure 5B:
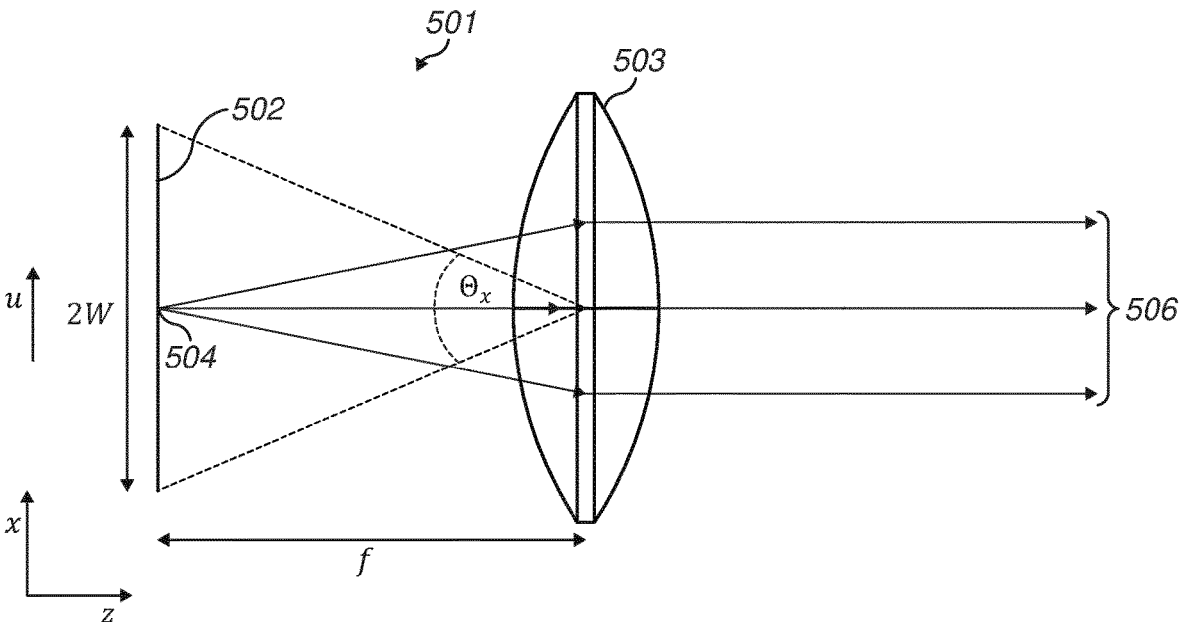

FIG. 5a shows a perspective view of a simplified representation of a projector system 501 which may be used to provide projected light for an augmented reality or virtual reality display based on a DWC. FIG. 5b shows a cross-sectional view of the same projector 501. In this system a source image consisting of a computer-controlled pixel-based image display 502 outputs light which is collimated by a lens system 503 and directed towards an input coupling element of a DWC to provide projected light for an AR or VR display system.

Suitable technologies for the display 502 include emissive displays such as organic light emitting device based pixel displays (OLED displays), micro light emitting device based pixel displays (µLED displays) or miniature cathode-ray tubes (CRT displays), and reflective displays such as those based on digital micro-mirror devices (DMD displays) or liquid-crystal on silicon displays (LCOS displays). For projectors based on reflective displays additional optical elements not shown in FIG. 5a are required to provide incident illumination on the display 502 as well as filtering or redirection of light based on polarization or using total internal reflection. The operating principles of various display technologies suitable for providing projected light are well established and widely disseminated, the purpose of the description here is to outline some requirements that may be preferable for an AR or VR display system based on a DWC as well as to provide a mathematical description which will help to explain the invention.

During operation each point of display 502 emits or reflects light towards the lens system 503 resulting in a collimated beam with a unique direction determined by the point on the display. For example, points 504 and 505 result in the collimated beams 506 and 507, respectively, each of which is shown schematically in FIG. 5a by three rays. In this way the projector transforms positions of pixels at the display 502 into directions of plane waves after the lens 503. Thus, we may decompose the projected light from the whole display 502 into an ensemble of plane waves, knowing that each of these waves is associated with a unique point on the display. In general the light from the display will not be monochromatic so we may further decompose each collimated beam over a range of wavelengths.

In order to write an expression for the electromagnetic waves produced by a projector it is useful to define the following:

f→focal length of imaging system 503 of projector 501;

W→half-width of image display 502 (total length of display in x-direction is 2W);

H→half-height of image display 502 (total length of display in y-direction is 2H);

(u, v)→horizontal (u) and vertical (v) Cartesian coordinates for position on display 502, as measured relative to the centre of the display and within the plane of the display;

$P_D(x, y) \rightarrow$ function describing the exit pupil of the projector 501, typically this will be a function with a value of unity within region and zero everywhere else, the pupil is often circular in shape but this does not need to be the case, note this may also be a function of ($\lambda$, u, v) but for simplicity this is kept to zero here;

$E_0(\lambda, u, v) \rightarrow$ function describing the electric field amplitude generated at the output due to the image display position (u, v) at wavelength $\lambda$; and $k(\lambda, u, v) \rightarrow$ wave-vector of collimated beam of light from the image display 502 at position (u, v) and with wavelength $\lambda$, as collimated by the imaging system 503 and output by the projector 501.

As an example we assume that the projector is in a Cartesian (x, y, z)-coordinate system where the z-axis is normal to the plane of the display 502, the optical axis of the imaging system 503 is coincident with the normal projected from the centre of the display and the u- and v-directions of the display 502 are parallel to the x- and y-directions of the (x, y, z)-coordinate system. For a projector with a high-quality imaging system exhibiting negligible aberrations and distortion the wavevector $k(\lambda, u, v)$ can be written in row vector form as $$k(\lambda, u, v) = \frac{2\pi}{\lambda} \frac{1}{\sqrt{u^2 + v^2 + f^2}} (-u, -v, f) \quad (50)$$

The field of view of the output of the projector 503 may then be found by considering the extents of the display and using equation (50). It is sometimes advantageous to refer to the horizontal and vertical gaze angle of a projected light beam. The horizontal angle, $\theta_x$, is the angle subtended by the beam to the z-axis when projected into the xz-plane and the vertical gaze angle, $\theta_y$, is the angle subtended by the beam to the z-axis when projected into the yz-plane. With this definition the wavevector of the light beam is given by $$k(\lambda, \theta_x, \theta_y) = \frac{2\pi}{\lambda} \frac{1}{\sqrt{1 + \tan^2\theta_x + \tan^2\theta_y}} (\tan\theta_x, \tan\theta_y, 1). \quad (51)$$

Thus, we can see that $$\tan\theta_x = -\frac{u}{f}, \text{ and} \quad (52)$$

$$\tan\theta_y = -\frac{v}{f}.$$

The horizontal field of view, $\Theta_x$, is defined as the angle subtended by the range of output wavevectors when projected into the xz-plane and is given by $$\Theta_x = 2\text{atan}\frac{W}{f} \quad (53)$$

Similarly, the vertical field of view, $\Theta_y$, is defined as the angle subtended by the range of output wavevectors when projected into the yz-plane and is given by $$\Theta_y = 2\text{atan}\frac{H}{f} \quad (54)$$

The electromagnetic field output by the projector 501 as observed at the exit pupil, $E_D(r, t)$ can be written as an ensemble of plane waves, truncated by the spatial extent of the exit pupil, $$E_D(r, t) = \quad (55)$$

$$P_D(x, y) \int_{\lambda_0}^{\lambda_1} \int_{-H}^{H} \int_{-W}^{W} E_0(\lambda, u, v)\exp i(k(\lambda, u, v) \cdot r - \omega t) + c.c. \, du \, dv \, d\lambda.$$

This decomposition means that rather than be concerned with a complicated arbitrary electromagnetic field we may instead treat the output from a projector as an ensemble of separate, spatially truncated, monochromatic plane wave components, each of which is simpler to analyse. A complete description is then given by a superposition of these components. Furthermore, for many projector systems these components will not be coherent with respect to each other, so this superposition may be performed in the intensity domain of a detected images. By analysing the propagation of the various plane wave components we may understand how a DWC can be used to map the output from a projector into an observation device, such as a wearer's eye.

Having established this formalism we can now define a collimated beam of light as being a electromagnetic plane wave which has a wavefront amplitude that is non-zero over a finite region, typically dictated by the exit pupil of a projector. In this scheme the projected light of an AR- or VR-display system is an ensemble of collimated beams, where each beam corresponds to a point in the projected image being conveyed by the display system.

The transformation of a spatially distributed source object into an ensemble of collimated beams where the direction of a given beam depends on the position on the source object in a fashion similar to equation (50) is often referred to placing an object at infinity, in analogy with having a much larger object at a very large distance such that the wavefront from any point source on the object becomes planar when interacting with the system at hand. An imaging system, such as a camera or an observer's eye that is focused to infinity and configured to receive a collimated beam of light will produce a sharp point at a location determined by the direction of the incident plane wave. Thus, an imaging system focused to infinity and trained to observe the ensemble of collimated beams generated from optically placing an object at infinity will produce an image of the original object.

Strictly speaking as these plane waves will be finite in extent, owing to the introduction of the pupil function, diffraction will cause the waves to being to spread as they propagate. However, for the purposes of this invention the pupil sizes and propagation distances of interest are such that any spreading has a negligible effect, aside from the usual diffraction limiting effects on image resolution. Furthermore, in order for an analysis based on the decomposition of projected light into an ensemble of collimated beams to be valid up until the moment of detection by the eye or an image sensor, we require that any effects that are nonlinear with respect to the amplitude of the electromagnetic waves remain negligible. For the range of wavelengths and light intensities typically employed in AR- and VR-display systems this condition is well satisfied.

Other image generating devices for use with augmented reality or virtual reality displays using DWCs are possible such as those based on scanning laser beams or using holographic principles. These may also be decomposed along the lines of that outlined above, although coherent interference effects between different parts of the image and elsewhere may be more important for these systems.

It is often advantageous for a projector system configured for use with a DWC if the exit pupil of the imaging system of the projector is externally located such that it may be placed close to, or coincident with, an input coupling element of the DWC.

Prior Art Examples of Diffractive Waveguide Combiners

Figure 6:
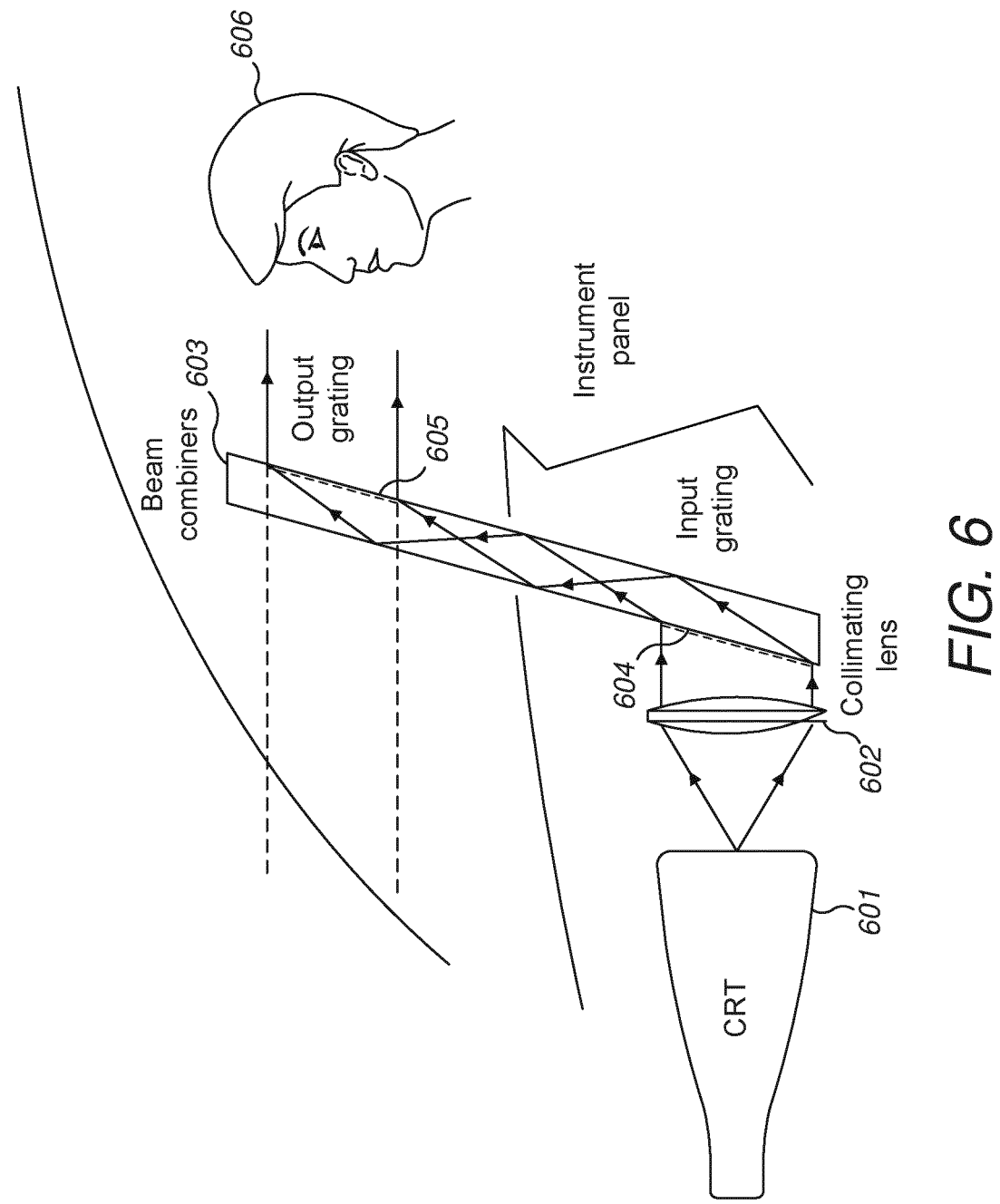
FIG. 6 shows a prior art head up display system that makes use of a diffractive waveguide combiner.

FIG. 6 shows a schematic view of a head-up display system based on a DWC as described in U.S. Pat. No. 4,711,512. Here an image is formed by a CRT display 601 and collimated by a lens 602, thus transforming the image into an ensemble of collimated beams. The collimated beams of light impinge on a waveguide 603 at a region of which there is a 1D diffraction grating 604, called the input grating. The input grating has a pitch and orientation to couple incident light within a target range of angles of incidence into total internal reflection (TIR) within the waveguide 603 and direct this light up towards another 1D diffraction grating 605, called the output grating. Light remains confined within the waveguide 603 by total internal reflection until it impinges on the output grating 605, at this point some of the light is diffracted into angles that are below the threshold for TIR and exits from the waveguide towards an observer 606.

Figure 7:
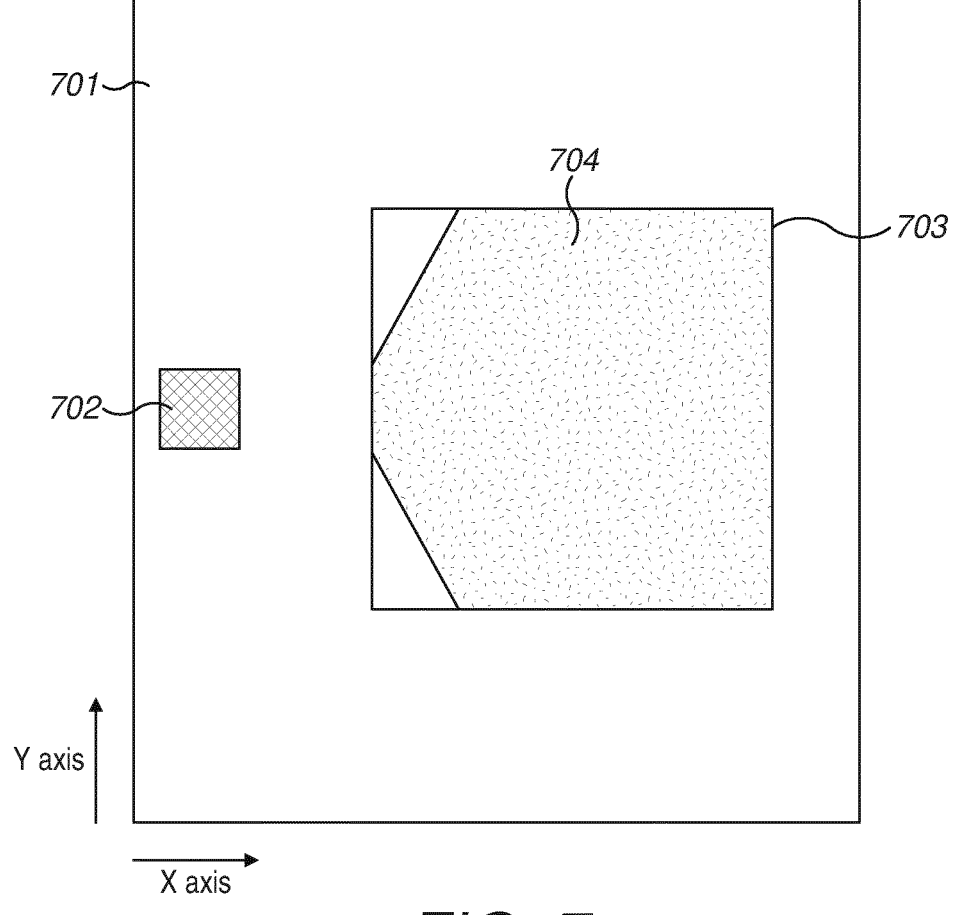
FIG. 7 is a top view of a prior art optical device for expanding an input beam in two orthogonal directions.

FIG. 7 is a top view of a known waveguide 701 (as described in WO 2016/020643) that may be used as a diffractive combiner in an augmented reality display system. The described system has an input diffraction grating 702 provided on a surface of the planar slab waveguide 701 for coupling light from a projector (not shown) into the waveguide. The input grating 702 consists of a 1D grating with grating vector pointing along the X axis direction. Light that is coupled into the waveguide travels by total internal reflection towards an output element 703 which includes a two-dimensional photonic crystal 704. In this example the photonic crystal 704 includes pillars (not shown) having a circular cross-sectional shape from the perspective of these top views. The pillars have a different refractive index relative to the refractive index of the surrounding waveguide medium and they are arranged in an array having hexagonal symmetry. The hexagonal lattice from which this array is derived has grating vectors at an angle of 60° to the grating vector associated with the input grating. In certain arrangements the grating vector of the input grating has the same length as the grating vectors of the output grating. In the coordinate system shown in FIG. 7 the grating vector of the input grating $g_1$ is given by $$g_1 = \frac{2\pi}{p}(1, 0),\qquad(56)$$

where p is the period of the input grating, and the grating vectors of the output grating $g_2$, $g_3$ are given by $$g_2 = \frac{2\pi}{p}\left(-\frac{1}{2}, \frac{\sqrt{3}}{2}\right),\qquad(57)$$

-continued $$g_3 = \frac{2\pi}{p}\left(-\frac{1}{2}, -\frac{\sqrt{3}}{2}\right).\qquad(58)$$

We note that from this definition the grating vector of the input grating and the grating vectors of the output grating sum to zero, $$g_1+g_2+g_3=(0,0).\qquad(59)$$

The result of equation (59) is important to the function of the waveguide when used as the DWC of an augmented reality display with non-monochromatic light. Essentially this result shows that the accumulated change to an xy-wavevector after first order diffraction by grating vectors $g_1$, $g_2$ and $g_3$ is zero. Note that this relationship makes no statement regarding the z-direction of a light beam. Thus, a beam of light after such a series of diffraction orders will travel in the same direction in the xy-plane as the initial beam prior to scattering by any of these diffraction orders whilst the direction of propagation of the beam in three dimensions will either be the same as the initial beam or as reflected about the xy-plane.

Two-Dimensional Gratings with a Rectangular Lattice

Figure 8B:
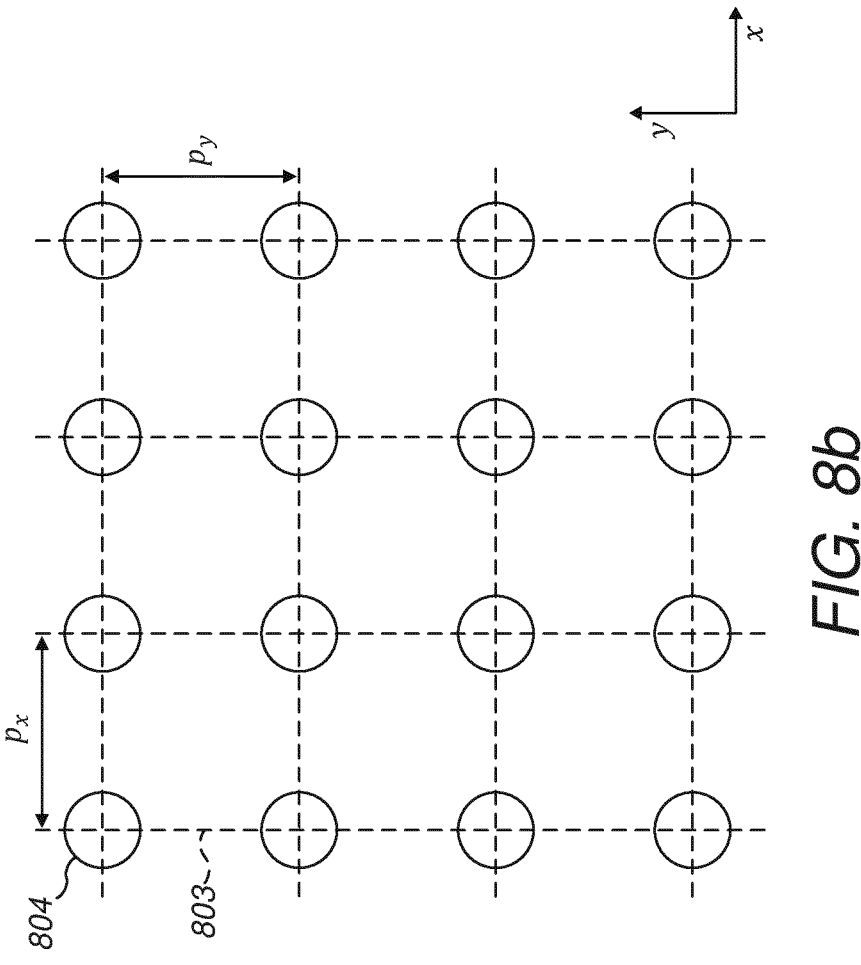
FIG. 8b shows a top view of part of a two-dimensional diffraction grating with a rectangular lattice.
Figure 8A:
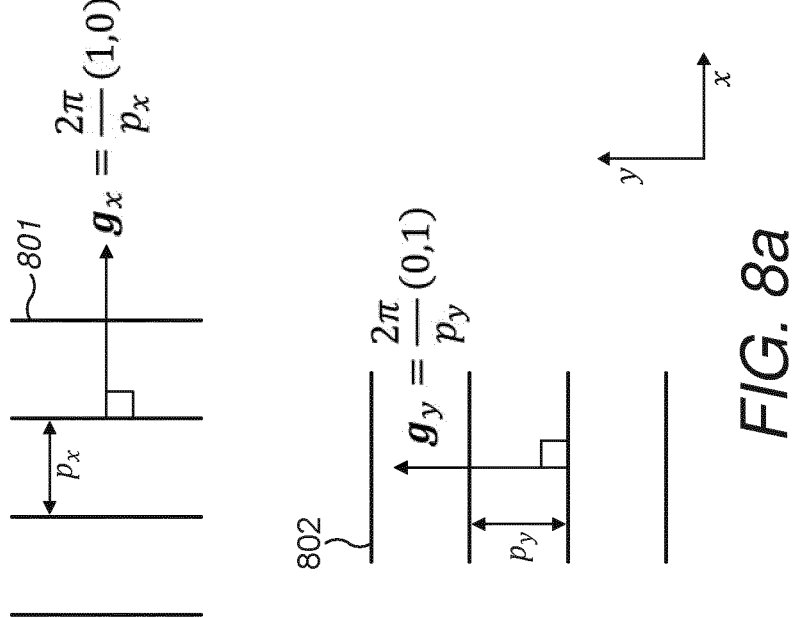
FIG. 8a shows grating vectors used to construct a two-dimensional diffraction grating with a rectangular lattice.

FIG. 8a shows two one-dimensional gratings. Grating 801 is a one-dimensional grating arranged on the xy-plane and with grating vector aligned parallel to the x-axis and grating 802 is a one-dimensional grating arranged on the xy-plane with grating vector parallel to the y-axis of a Cartesian coordinate system. The grating vectors for 801 and 802 are given by $$g_x = \frac{2\pi}{p_x}(1, 0),\qquad(60)$$

for grating 801 and $$g_y = \frac{2\pi}{p_y}(0, 1),\qquad(61)$$

for grating 802 where $p_x$ is the period of grating 801 and $p_y$ is the period of grating 802.

FIG. 8b shows a top view of a two-dimensional grating 803 with a rectangular orthorhombic lattice. Grating 803 is arranged on the xy-plane and has a lattice derived from overlapping the gratings 801 and 802. The dashed lines on FIG. 8b show the original gratings 801 and 802 and are not intended to imply any physical structure. At each point of the lattice derived from overlapping gratings 801 and 802 a pillar 804 is placed of a material with different refractive index to the medium surrounding the grating. In this way a two-dimensional diffraction grating capable of scattering light is realised. For a diffraction order $\{m_x, m_y\}$ the relationship between an xy-wavevector before and after scattering from the grating, denoted $k_{xy}$ and $k'_{xy}$, respectively, is given by $$k'_{xy}=k_{xy}+m_x g_x+m_y g_y,\qquad(62)$$

which can be expanded into row vector form to give $$(k'_x, k'_y) = (k_x, k_y) + \frac{2\pi m_x}{p_x}(1, 0) + \frac{2\pi m_y}{p_y}(0, 1),\qquad(63)$$

where $k_{xy}=(k_x, k_y)$ and $k'_{xy}=(k'_x, k'_y)$. We will term a diffraction grating constructed using orthogonal grating vectors a rectangular grating.

Figure 9A:
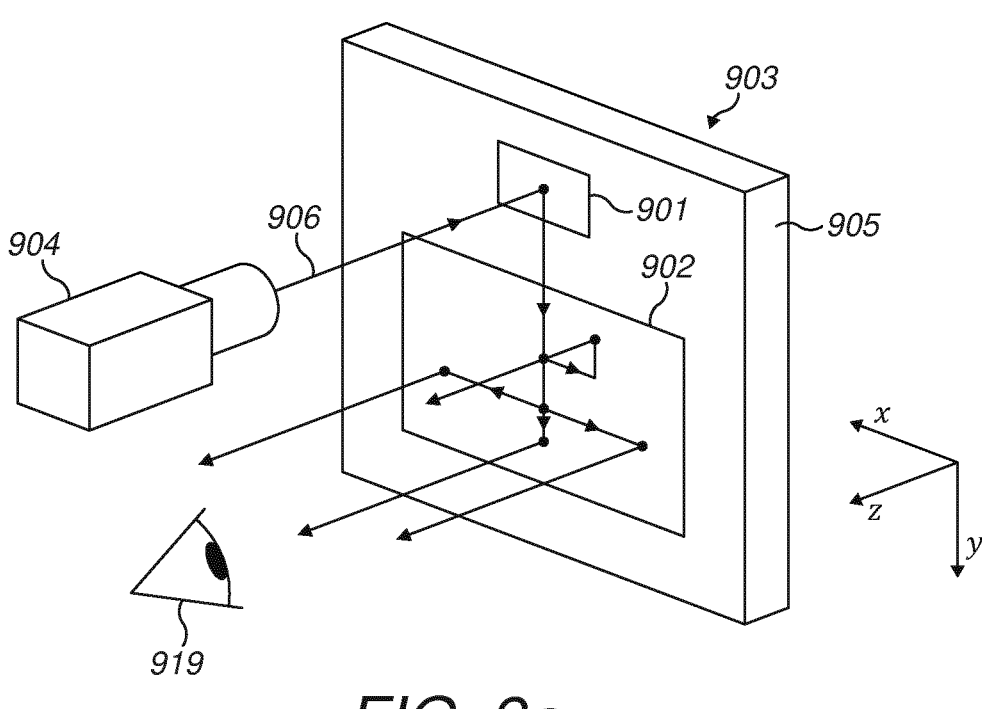
FIG. 9a is a perspective view of a diffractive waveguide combiner including an output grating according to an aspect of the invention.
Figure 9B:
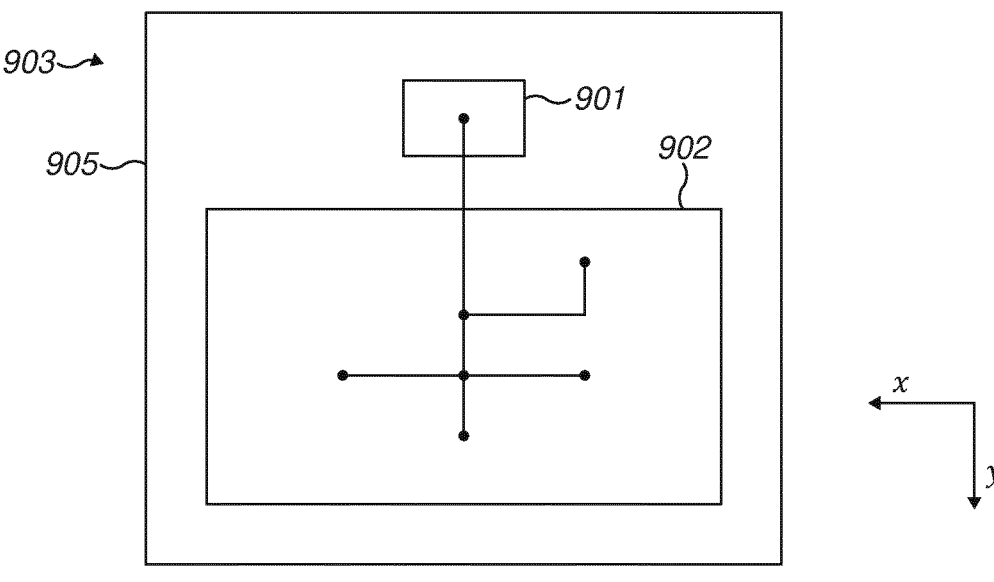

FIG. 9a shows a perspective view of a diffractive waveguide combiner 903 consisting of a light transmissive substrate 905 configured as a planar slab waveguide arranged with main optical surfaces parallel to the xy-plane of a Cartesian (x, y, z)-coordinate system and having a region with an input grating 901 and a region with an output grating 902. The input grating 901 and output grating 902 may each be on either the front surface or back surface of the waveguide, or embedded in a planar surface within the waveguide. The gratings need not be on the same surface. The output grating 902 is arranged so that it is located separate from the input grating 901. The output grating 902 may be adjacent to the input grating 901 or there may be a region in-between the two gratings that contains no gratings or other optical structures. The output grating 902 may be positioned so that the direction of a line drawn between centre of the input grating 901 to the centre of the output grating 902 is along the y-direction of the Cartesian coordinate system associated with the waveguide. FIG. 9b shows a top view of the DWC 903 showing the surface of the waveguide substrate 905, the input grating 901 and the output grating 902 all of which are parallel to the xy-plane of the associated Cartesian coordinate system.

A micro-projector 904 is arranged to output an image optically transformed into an ensemble of collimated beams of light of finite size in a manner as described above and which are directed to fall incident on the input grating 901. Typically the output from the micro-projector 904 is part of a computer controlled display system (not shown). As detailed above each point in the image for a given wavelength in vacuum, $\lambda$, will be associated with a unique wavevector, which we denote here as $k(\lambda, u, v)$ where $(u, v)$ are coordinates describing a point in the projected image from the micro-projector 904. The xy-wavevector associated with $k(\lambda, u, v)$ is denoted by $k_{xy}(\lambda, u, v)$. The exact parameterization of the coordinates $(u, v)$ is not unique and need not be specified, instead it is sufficient to note that each coordinate pair should uniquely describe a point in the image, and so a direction for a collimated beam from the micro-projector. For the sake of convenience we will define an associated pair of coordinates derived from $(u, v)$, $(u'(u, v), v'(u, v))$, where $u'(u, v)$ and $v'(u, v)$ are each functions of $(u, v)$ such that the wavevector of a point is given by $$k(\lambda, u, v) = \frac{2\pi}{\lambda}\left(u'(u, v), v'(u, v), \sqrt{1 - u'(u, v)^2 - v'(u, v)^2}\right). \quad (64)$$

We can re-write this in a more compact notation in terms of $(u', v')$ as $$k(\lambda, u', v') = \frac{2\pi}{\lambda}\left(u', v', \sqrt{1 - u'^2 - v'^2}\right). \quad (65)$$

The input grating 901 is arranged to have a grating vector $g_1$ pointing in the direction from the centre of the input grating 901 to the centre of the output grating 902 and is given by $$g_1 = \frac{2\pi}{p_1}(0, 1). \quad (66)$$

Here $p_1$ is the period of the input grating and is chosen so that the range of collimated output beams from the micro-projector 904 will be coupled into the waveguiding range of the waveguide substrate 905 after first order diffraction by the input grating 901. This requires that for all xy-wavevectors associated with beams from the micro-projector 904, $k_{xy}(\lambda, u', v')=(k_x, k_y)$, we satisfy the inequality $$\frac{4\pi^2 n_0^2}{\lambda^2} \le k_x^2 + \left(k_y + \frac{2\pi}{p_1}\right)^2 < \frac{4\pi^2 n^2}{\lambda^2}, \quad (67)$$

where $n_0$ is the refractive index of the medium surrounding the waveguide and n is the refractive index of the waveguide substrate 905. Noting that our definition of $(u', v')$ allows us to write $$k_{xy}(\lambda, u', v') = \frac{2\pi}{\lambda}(u', v'), \quad (68)$$

we may write the inequality for the waveguiding region of k-space in terms of $(u', v')$ as $$n_0^2 \le u'^2 + \left(v' + \frac{\lambda}{p_1}\right)^2 < n^2. \quad (69)$$

In general both $n_0$ and n depend on wavelength, however, for the sake of clarity we do not show this explicitly here.

Output grating 902 has a rectangular orthorhombic lattice similar to the grating 803 shown in FIG. 8b and is defined to have grating vectors $g_x$ and $g_y$ given by $$g_x = \frac{2\pi}{p_x}(1, 0), \quad (70)$$

and $$g_y = \frac{2\pi}{p_y}(0, 1). \quad (71)$$

We note that the periods of the gratings $p_x$ and $p_y$ need not be equal. For the purposes of a DWC these periods may have a similar magnitude such that $$0.5 \le \frac{p_x}{p_y} \le 2. \quad (72)$$

Upon interaction with the output grating 902 the xy-wavevector $k_{xy}^{\{m_x, m_y\}}$ will depend on the order of the interaction $\{m_x, m_y\}$ and the grating vectors $g_1, g_x,$ and $g_y$ such that $$k_{xy}^{\{m_x, m_y\}} = k_{xy}(\lambda, u', v') + g_1 + m_x g_x + m_y g_y, \quad (73)$$

or, in terms of components, $$k_x^{\{m_x, m_y\}} = \frac{2\pi}{\lambda}u' + \frac{2\pi}{p_x}m_x, \quad (74)$$

$$k_y^{\{m_x, m_y\}} = \frac{2\pi}{\lambda}v' + \frac{2\pi}{p_1} + \frac{2\pi}{p_y}m_y. \quad (75)$$

In general, multiple interactions with the output grating 902 are possible for a waveguided light beam, in which case the xy-wavevector of the beam will be characterised by the 2D cumulative order $\{r_x, r_y\}$, giving $$k_{xy}{}^{\{r_x,r_y\}} = k_{xy}(\lambda, u', v') + g_1 + r_x g_x + r_y g_y, \tag{76}$$

or in terms of components $$k_x^{\{r_x,r_y\}} = \frac{2\pi}{\lambda} u' + \frac{2\pi}{p_x} r_x, \tag{77}$$

$$k_y^{\{r_x,r_y\}} = \frac{2\pi}{\lambda} v' + \frac{2\pi}{p_1} + \frac{2\pi}{p_y} r_y. \tag{78}$$

We can see here that the x-component of the xy-wavevector depends only on the x-component of the wavevector of the collimated monochromatic beam prior to coupling into the waveguide, the grating vector $g_x$ and the cumulative order $r_x$. Similarly we note that the y-component of the xy-wavevector depends only on the y-component of the wavevector of the collimated monochromatic beam prior to coupling into the waveguide, the grating vectors $g_1$, $g_y$ and the cumulative order $r_y$.

A particularly relevant case for a DWC occurs if we set $p_1 = p_y$. Under this circumstance the expression for $k_y^{\{r_x,r_y\}}$ becomes $$k_y^{\{r_x,r_y\}} = \frac{2\pi}{\lambda} v' + \frac{2\pi}{p_y}(1 + r_y). \tag{79}$$

We can then express the condition that a wavevector is in the waveguiding region of k-space when $r_x = \pm 1$, $r_y = -1$ by selecting a value of $p_x$ that satisfies the inequality $$n_0^2 \le \left(u' \pm \frac{\lambda}{p_x}\right)^2 + v'^2 < n^2. \tag{80}$$

For a DWC with suitable grating periods for $p_x$ and $p_y$, we may describe several qualitatively distinct behaviours associated with a beam depending on the 2D cumulative order $\{r_x, r_y\}$. These are described in Table 1 in FIG. 45. In table 1 in FIG. 45 the term generally towards is intended to refer to the direction of a light beam as projected onto the xy-plane and so without regard to the z-direction of the wavevector. Furthermore, the general directions described in table 1 in FIG. 45 are intended to refer to the dominant component of the xy-wavevector. For example, the general +y direction would refer to a xy-wavevector where the y-component has the largest magnitude and is positive in sign. In the case that (u', v')=(0,0) these directions are exact. Light beams undergoing waveguided propagation the z-direction of a wavevector necessarily flips in sign each time the beam reflects off a surface of the waveguide.

In all cases shown in table 1 in FIG. 45 the z-component of the beam will satisfy the relationship $$k_z = \pm\sqrt{\frac{4\pi^2 n'^2}{\lambda^2} - \left(k_x^{\{r_x,r_y\}}\right)^2 - \left(k_y^{\{r_x,r_y\}}\right)^2}, \tag{81}$$

where $n'=n$ or $n'=n_0$, depending on whether the light beam described by the wavevector is inside the waveguide substrate 905 or the medium surrounding the waveguide, respectively.

The free-propagation case, where $\{r_x, r_y\}=\{0, -1\}$ corresponds to a restoration of the xy-wavevector to be the same as its initial value. This case describes a collimated beam that can exit from the waveguide, thus if the incident collimated beam corresponds to part of an image, then so will the exit beam. The existence of this case demonstrates the potential for the DWC to provide a relay function for light beams from the micro-projector 904; if the ensemble of collimated beams produced from the micro-projector 904 is both coupled into the waveguide by the input grating 901 and then out of the waveguide again by the cumulative order $\{0, -1\}$ of the output grating 902, and if we ensure that this ensemble of beams is observed by a suitable imaging detector such as a viewer's eye or a camera, then we can ensure that the image from the micro-projector 904 is seen by a viewer thus successfully completing the relay.

The z-component of the wavevector of the beam with cumulative order $\{0, -1\}$ will, upon exiting the waveguide, have either the same value as the initial beam from the micro-projector 904 or the same magnitude but opposite sign. The first case is termed here as transmission mode output, as it has a direction as though the wavevector has passed through the waveguide by conventional optical transmission, except that noting of course that the position of the beam will have been shifted as a consequence of the waveguided confinement and propagation of the beam between the input grating 901 and output grating 902. The case where the sign of $k_z$ is opposite to that of the initial beam from the micro-projector 904 is termed here as reflection mode output, in this case by analogy with the expected direction of the wavevector had it reflected from a conventional mirrored surface parallel to the xy-plane. Again we note that the position of the beam will be shifted due to waveguided confinement and propagation between the input grating 901 and the output grating 902. As with other diffraction orders the strength of diffraction into a transmission or reflection output mode will depend on the structure and composition of the grating as well as the wavelength, direction and polarization of the incident beam.

Other values of $\{r_x, r_y\}$ are possible in principle, depending on $\lambda$, u', v' and n but in many practical cases beams where $$|r_x| \ge 2 \text{ or } |1+r_y| \ge 2, \tag{82}$$

will be evanescent. It is also possible that some combinations of $\lambda$, u' and v' will result in evanescent waves for the various other cases above, apart from $\{r_x, r_y\}=\{0, -1\}$. Where this arises this means that propagation along paths which require use of such values of the 2D cumulative order must be forbidden for such values of $\lambda$, u' and v'. It is also possible that some values of $\lambda$, u' and v' may result in free propagation of waves, in particular for cases where $\{r_x, r_y\}=\{\pm 1, -1\}$ or where $\{r_x, r_y\}=\{0, -2\}$. In such cases this provides an additional mechanism for output from a DWC, but one that is generally undesirable as it will usually cause image artefacts. These issues may be suppressed by choosing grating periods that ensure that any light beams generated by these modes of propagation will be very weak and/or lie outside the eyebox of the DWC.

In addition to the 2D cumulative orders noted in table 1 in FIG. 45, it is helpful to note various diffraction orders between cumulative order values that may be particularly important for the operation of a DWC. These orders are listed in table 2 in FIG. 46. As with table 1 in FIG. 45 the directions refer to the directions of the beams in the xy-plane and neglect the z-component of the wavevector.

As noted above the diffraction efficiency for coupling between non-evanescent orders will in general depend on the structure and composition of the grating as well as the wavelength, direction and polarization of the incident light beam.

The diffraction orders noted in table 2 in FIG. 46 can be broadly grouped as either to-eye orders (STE, TEAT+X, TEAT−X, TEAT−Y) or turn orders (T+X, T−X, BT−Y, BT−X, BT+X, TTB+X, TTB−X). Notably for the to-eye orders the sum of the order values $m_x$ and $m_y$ is given by $$m_x + m_y = +1 \text{ or } -1, \tag{83}$$

whereas for the turn orders the sum of the order values is $$m_x + m_y = +2, 0 \text{ or } -2. \tag{84}$$

The other diffraction order that is important is the zeroth order interaction, $\{m_x, m_y\} = \{0,0\}$. This order corresponds to the case where the xy-wavevector does not change, so a beam that is confined by TIR within the waveguide will remain confined and a beam that is freely propagating through the waveguide will remain freely propagating (although it may reflect from the waveguide surface). This is important both for projected light beams being conveyed within the DWC as well as real-world light beams. Generally it is preferable for real-world light to pass through the waveguide towards an observer in augmented reality applications. It is the zeroth order interactions with the grating that primarily allows for such transmissive viewing. In many AR applications it is desirable for viewing of the surrounding physical world to be as bright as possible, meaning that the transmission efficiency of real-world light is as high as possible. This requires that the zeroth-order diffraction efficiency is as close as possible to unity for angles of incidence corresponding to beams of light corresponding to the free propagation region of k-space. We note that the directions of light beams for real world light are necessarily different from those for waveguiding of projected light. Thus, in some systems it may be advantageous to employ diffraction structures which provide scattering properties that are particularly dependent on whether a light beam falls within the range of directions relevant for waveguided projected light or freely propagating real-world light.

The various cumulative orders $\{r_x, r_y\}$ and diffraction orders $\{m_x, m_y\}$ to couple between these orders provides for a large range of paths of TIR confined light beams that interact one or more times with the output grating 902. In general several new beams will occur at each interaction with the output grating 902 since multiple diffraction orders will occur simultaneously, each of which will result in a new beam with a different cumulative order $\{r_x, r_y\}$ travelling in a different direction. The number of beam paths that light beams may take through the waveguide will tend to increase exponentially with the number of interactions with the output grating 902.

FIGS. 9c-f show perspective views of a number of exemplary paths for light beams through the DWC 903. Here the paths are represented by ray lines (rays) pointing in the direction of the wavevector of a corresponding collimated light beam. All paths begin with the same ray 906 from the micro-projector 904 which hits the input grating 901 and is coupled into waveguided propagating ray 907 in the general +y direction. Ray 907 therefore corresponds to the cumulative order $\{0,0\}$. For clarity the bouncing of the rays between the surfaces of the DWC due to waveguided propagation, which would lead to a zig-zag path in the figures, is not shown. Generally many bounces will occur between the waveguide surfaces as the beam propagates through the waveguide, those bounces which do not change the direction of the beam correspond to zeroth-order diffraction with the output grating 902 and mean that the xy-wavevector does not change.

Figure 9C:
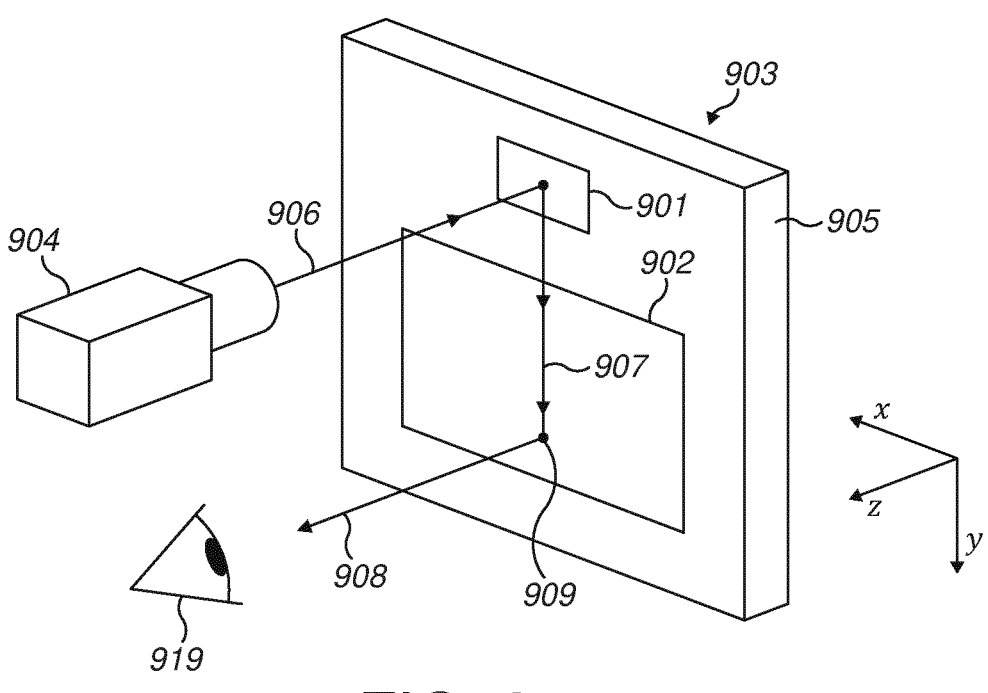
FIGS. 9c-f are perspective views of a diffractive waveguide combiner showing example paths for a light beam through the waveguide.

FIG. 9c illustrates a path where the beam 907 undergoes waveguided propagation until it reaches the point 909 where the beam is coupled out of the waveguide via a reflection mode of the STE order along the path 908 and towards an observer 919.

Figure 9D:
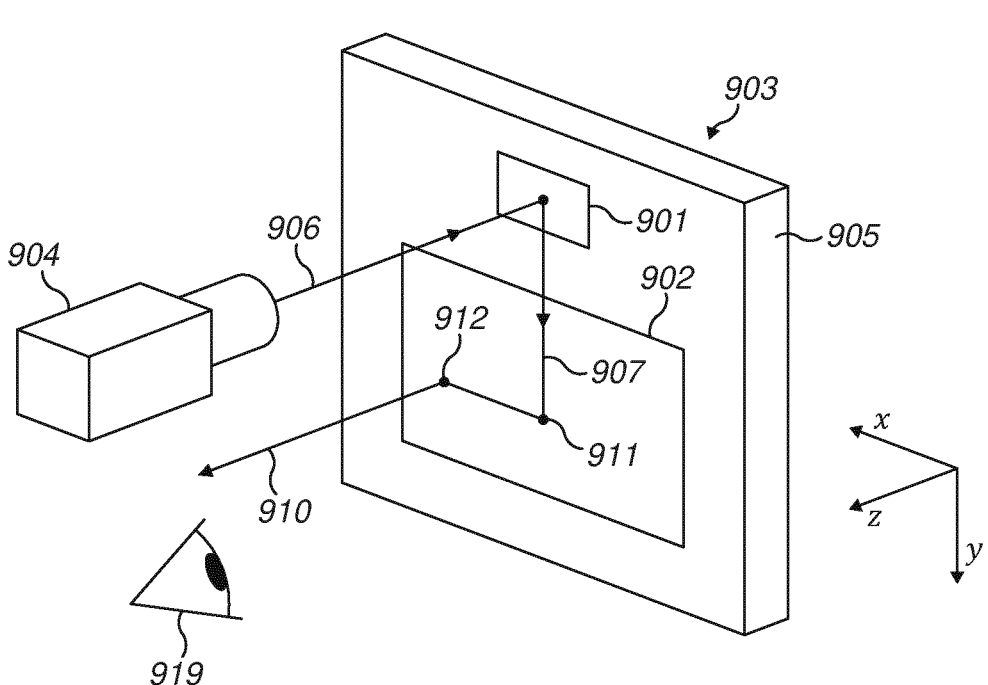

FIG. 9d illustrates a path where the beam 907 undergoes waveguided propagation until it reaches the point 911 where the beam is redirected in the general +x direction by the T+X order. The beam then undergoes waveguided propagation until it reaches the point 912 where the beam is then coupled out of the waveguide via a reflection mode of the TEAT+X order along the path 910 and towards an observer 919.

Figures 9E, 9F:
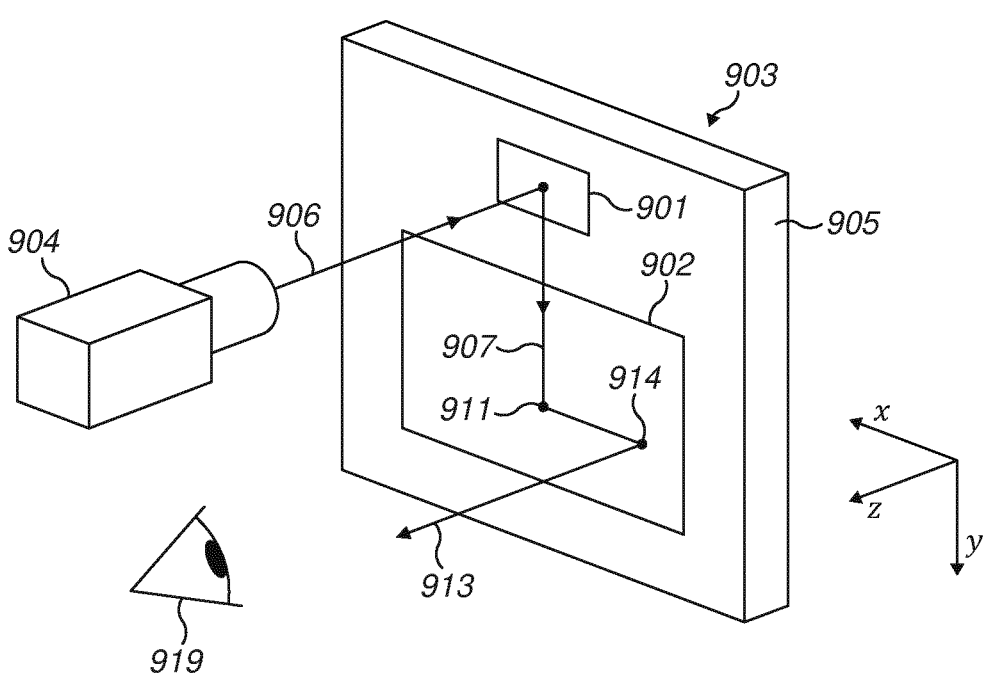

FIG. 9e illustrates a similar path to that in FIG. 9d, except at the point 911 the beam is redirected in the general −x direction by the T−X order. After waveguided propagation to the point 914 the beam is then coupled out of the waveguide via a reflection mode of the TEAT−X order along the path 913 and towards an observer 919.

FIG. 9f illustrates a path where the beam 907 undergoes waveguided propagation until it reaches the point 916 where the beam is redirected in the general −x direction by the T−X order. The beam then undergoes waveguided propagation until it reaches the point 917 where it is redirected in the general −y direction by the TTB−X order. The beam then undergoes waveguided propagation until it reaches the point 918 where the beam is then coupled out of the waveguide via a reflection mode of the TEAT−Y order along the path 915 and towards an observer 919.

The relay function of a DWC is provided by the examples shown in FIG. 9a-f by virtue of the spatial separation of the input grating 901 from the output grating 902. The requirement that light beams must travel between different regions of the waveguide 903 necessarily requires that when the beam is coupled out of the waveguide 903 by the output grating 902 it must be in a spatially distinct location from the input grating 901.

The pupil expansion function of the DWC is provided by the examples shown in FIG. 9a-f by virtue of the multiple paths which allow the same input beam to be output from the waveguide at different locations but with the same direction as each other, and also the same xy-wavevector as the input beam. In order for such pupil expansion to be accomplished effectively it is important that the distance between interactions with the output grating 902 are kept short enough so that separate output beams will lie close to or overlap each other. This will ensure that the pupil of the observer 919 overlaps at least part of one output beam, a necessary condition for observation to be possible.

The distance between interactions with an output grating 902 on the surface of the waveguide 903, $d^{\{r_x, r_y\}}$, depends on the wavevector $k^{\{r_x, r_y\}}$ of a given cumulative order $\{r_x, r_y\}$, and the thickness of the waveguide, t:

$$d^{\{r_x, r_y\}} = 2t \sqrt{\frac{\left(k_x^{\{r_x, r_y\}}\right)^2 + \left(k_y^{\{r_x, r_y\}}\right)^2}{\frac{4\pi^2 n^2}{\lambda^2} - \left(k_x^{\{r_x, r_y\}}\right)^2 - \left(k_y^{\{r_x, r_y\}}\right)^2}}. \tag{85}$$

We may write equation (85) in terms of the initial wavevector direction parameters (u', v') as $$d^{\{r_x, r_y\}} = 2t \sqrt{\frac{\left(u' + \frac{\lambda}{p_x} r_x\right)^2 + \left(v' + \frac{\lambda}{p_y}(1 + r_y)\right)^2}{n^2 - \left(u' + \frac{\lambda}{p_x} r_x\right)^2 - \left(v' + \frac{\lambda}{p_y}(1 + r_y)\right)^2}}. \tag{86}$$

The size of each output beam will depend on the overlap of the input grating 901 with the beams from the micro-projector 904. Generally the input grating 901 will have a size and shape sufficient to accommodate all of the beams from the micro-projector 904 within the interior of the grating. In this circumstance the size of the output beams will be determined by the beams from the micro-projector 904.

Assuming that good overlap with the input grating 901 is achieved then in order to achieve good pupil expansion it is in general desirable to ensure that $d_b(\lambda, u', v') > d^{\{r_x, r_y\}}$ where $d_b(\lambda, u', v')$ is a width of the beam corresponding to the wavelength $\lambda$ and direction (u', v') from the micro-projector 904 as projected onto the xy-plane of the input grating 901 and as measured in the direction of the xy-wavevector corresponding to $\lambda$, u', v', $r_x$, and $r_y$. For many projector designs the value $d_b(\lambda, u', v')$ will be the diameter of a circular exit pupil.

Figure 10:
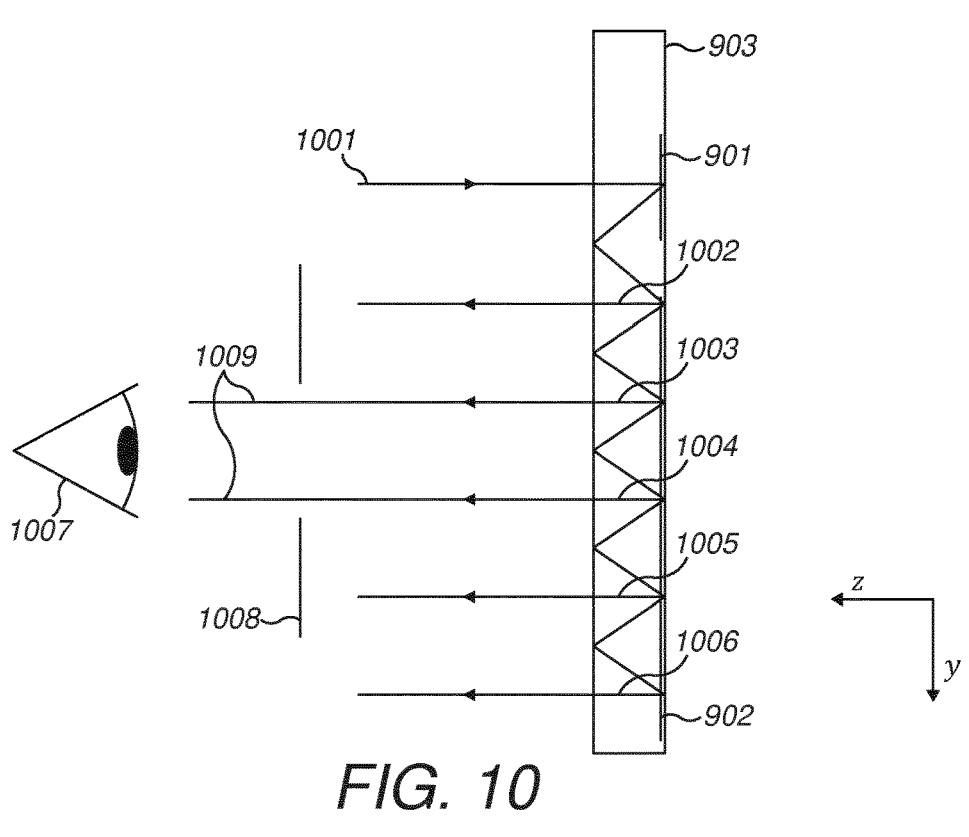
FIG. 10 shows a cross-section view of the diffractive waveguide combiner of FIG. 9a showing the generation of multiple output beams from a single input beam.

FIG. 10 shows a cross-section view of the diffractive waveguide combiner 903. A collimated light beam, represented in FIG. 10 by a ray 1001, from a micro-projector (not shown) is incident on the input grating 901 of the DWC 903 and coupled into waveguided propagation. This beam propagates in the general +y direction towards the output grating 902 where it is split into multiple, branched paths. Some of these paths lead to output beams, as represented by rays 1002, 1003, 1004, 1005 and 1006 which are shown by way of example. The output beams are directed towards a detector 1007, which could be a camera, an observer's eye or some other optical detection system. The detector 1007 has a limiting aperture 1008 (also referred to as an entrance pupil) which blocks part or all of some of the output beams 1002, 1003, 1004, 1005 and 1006. For clarity the aperture 1008 is shown as separated from the detector 1007, however in practice this aperture will typically be internal to the detector, for example, the pupil of a human eye or aperture stop of a camera lens. The parts of the beams that transmit through the aperture 1008 constitute what is essentially a new light beam 1009, termed here the detected beam. In general each input beam to a DWC will have associated with it a corresponding detected beam, derived from the intersection of the overlapping ensemble of output beams and the detector aperture used to observe the output from the DWC.
Properties of an Ideal Diffractive Waveguide Combiner In general terms a diffractive waveguide combiner functions by using diffraction gratings to couple light into a waveguide, spatially distributing the light across part of the waveguide via multiple branched paths and coupling at least some of the light out again towards an observer or other detector. These key functions have been explained at length and are termed input coupling (to describe transforming incident light into waveguided propagation), output coupling (to describe transforming waveguided light into freely propagating light travelling outside the waveguide), relay (to describe transport of light from one spatial region to another), and eyebox expansion (to describe generating multiple, overlapping beams from a single input beam thus expanding the size of the spatial region over which viewing is possible, compared to the input).

It is helpful to articulate some of the properties required for a DWC to perform effectively. Some of the key properties of an ideal diffractive waveguide combiner are summarised in table 3 in FIG. 47.

In practice it is impossible to satisfy the ideal requirements of a DWC simultaneously and any practical realisation will be a balanced compromise depending on the relative importance of the various properties for the task at hand, as constrained by the limitations of both design and manufacture.

As noted previously, the many different paths that a light beam may take through a DWC will occur with a relative intensity that depends on both the structure and composition of the grating as well as the wavelength, direction and polarization of the light beams. It has been found that for output gratings based on rectangular orthorhombic lattices it is difficult to achieve good uniformity across the eyebox. In particular, for some parts of the eyebox output of light beams may occur mostly via the STE order, whereas for other parts of the eyebox require light beams that have undergone at least one T+X or T−X turn order so that the required location within the waveguide can be reached. These beams are then followed by a TEAT to-eye orders to output the beam. A large difference in the combined efficiency of turn orders and TEAT to-eye orders compared to the STE order may result in non-uniformities in the observed image either with respect to the position of the viewer's eye within the eyebox and/or with respect to the gaze angle of the image.
Definition of Interleaved Rectangular Grating (IRG)

The interleaved rectangular grating (IRG) introduced as the subject of the invention provides a new method for the design and control of the diffraction efficiency of different diffraction orders of a rectangular grating. This additional control can help provide superior performance for a diffractive optical element in applications such as use as an output grating of a diffractive waveguide combiner.

An interleaved rectangular grating can be defined as follows:

i) two periodic rectangular arrays of structures, periodic structure PS1 and periodic structure PS2, are each defined to have a rectangular orthorhombic lattice arranged in the same plane; for the sake of convenience, without loss of generality, and unless stated otherwise, we define this plane to be the xy-plane of a Cartesian (x, y, z)-coordinate system; this coordinate system may be a locally defined coordinate system created purely for the purposes of the description of the grating itself, or may be the global coordinate reference of a larger system;

ii) the lattice of periodic structure PS1, lattice L1, and the lattice of periodic structure PS2, lattice L2, are both constructed from grating vectors $g_x$ and $g_y$ which both lie in the plane of the periodic structures PS1 and PS2; $g_x$ and $g_y$ are orthogonal to each other;

iii) the IRG unit cell has a rectangular shape which lies in the plane of the periodic structures PS1 and PS2; a pair of sides of the IRG unit cell are parallel to the grating vector $g_x$ and have a length equal to the period associated with grating vector $g_x$; the other pair of sides of the IRG unit cell are parallel to the grating vector $g_y$ and have a length equal to the period associated with grating vector $g_y$; the position of the IRG unit cell is not uniquely defined within the xy-plane and may be chosen for convenience;

iv) within the plane of the periodic structures PS1 and PS2, lattice L2 is offset in position from lattice L1 by a vector that lies in the plane of the periodic structures and is termed the lattice offset vector $o_{xy}$; the lattice offset vector provides for an offset of lattice L2 in both the x-direction and the y-direction;

v) at each point of lattice L1 an identical structure S1 is associated, this structure is finite in extent and may be composed out of multiple materials, the periodic structure PS1 is thus created from placing identical copies of structure S1 at each point of lattice L1;

vi) at each point of lattice L2 an identical structure S2 is associated, this structure is finite in extent and may be composed out of multiple materials, the periodic structure PS2 is thus created from placing identical copies of structure S2 at each point of lattice L2;

vii) the interleaved rectangular grating is created by combining the periodic structures PS1 and PS2 on substantially the same plane and which may then be placed on the surface of a substrate or embedded within a substrate.

For the sake of convenience and unless stated otherwise any embodiment of an interleaved rectangular grating described herein is based on the definition detailed in i)-vii) above and will have associated with it a set of structures S1 and S2, lattices L1 and L2, grating vectors $g_2$ and $g_3$, lattice offset vector $o_{xy}$, periodic structure PS1 formed from lattice L1 and structure S1, periodic structure PS2 formed from lattice L2 and structure S2, and an IRG unit cell. Further modifications and variations of an IRG may be possible and any such changes will be detailed explicitly in the following description.

It should be noted here that the term structure is intended to imply any sort of variation of a physical property with respect to position. For example, the term may refer to geometries of materials with different refractive index, or it may refer to a variation of optical properties within a single material, such as a variation of alignment of liquid crystal molecules resulting in spatial variations of birefringence. Furthermore, the term structure may refer to more than one material or type of variation, and so structures S1 and S2 could be constructed as a composite of multiple sub-structures, which may be separate or joined to each other and each of which may be composed out of different materials.

In some arrangements the structures S1 and/or S2 are made from materials with different optical properties to the medium surrounding the combined structure. Such differences in optical properties include, but are not limited to, refractive index, electric permittivity, magnetic permeability, birefringence, and/or absorptivity. In general, a structure that features such a variation of optical properties may serve as a two-dimensional diffraction grating for the scattering of light, including use as a diffraction grating element in a diffractive waveguide combiner.

If the periodic structures PS1 and PS2 are spatially separate so they do not overlap, then they may be directly superimposed in a plane to form the IRG. However, if the structures overlap, then some principle of combination should be applied. For example, a geometric union may be conceived where regions of overlap between PS1 and PS2 are merged in space. If the optical properties where PS1 and PS2 overlap are different, then a rule may be used to dictate the combined result. For example, if the variation is in refractive index, the rule could be to favour the index of one structure over the other, take the average, or take the maximum/minimum value, or take a third value. In some cases the combination may be determined by manufacturing methods.

Any structure realised in the real world must have some thickness in a direction orthogonal to the plane of the IRG, even if this is a single atomic layer. IRGs for the scattering of light for use in a DWC will typically have a thickness in the range 1 nm to 10000 nm, or the range 10 nm to 2000 nm, or the range 20 nm to 500 nm.

Figure 11:
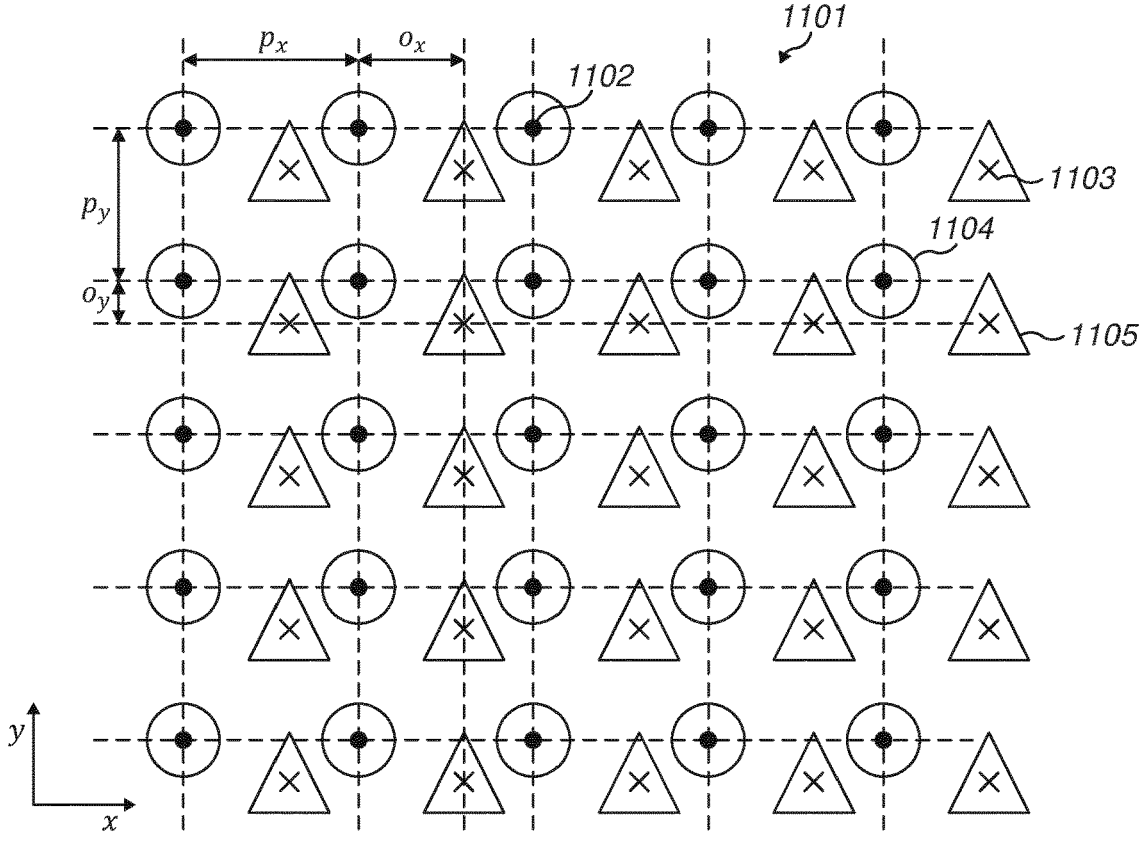
FIG. 11 shows a top view of part of an interleaved rectangular grating according to an aspect of the present invention.

FIG. 11 shows a top view of a section of an exemplary interleaved rectangular grating (IRG) 1101 according to the present invention. IRG 1101 is composed of a superimposition of periodic structure PS1 and periodic structure PS2. In FIG. 11 the points of the lattice L1, from which periodic structure PS1 is constructed, are indicated by dots 1102 and the points of the lattice L2, from which periodic structure PS2 is constructed, are indicated by crosses 1103. As can be seen from FIG. 11 the lattice L1 of periodic structure PS1 and the lattice L2 of periodic structure PS2 are overlaid on each other on the plane. Neither the dots 1102 or the crosses 1103 are intended to convey physical structure. The grating vectors $g_x$ and $g_y$ used to construct lattice L1 and lattice L2, are necessarily the same for both lattices, as required by the general definition of the IRG. For convenience, and without loss of generality we may define a local Cartesian (x, y, z)-coordinate system such that these grating vectors are aligned to the x- and y-axes of the coordinate system and so arrange for the lattices to lie in the xy-plane of the new coordinate system. Thus, the grating vectors may be written as $$g_x = \frac{2\pi}{p_x}(1, 0), \tag{87}$$

and $$g_y = \frac{2\pi}{p_y}(0, 1). \tag{88}$$

Lattice L2 is positioned in the same plane as lattice L1 but with an offset in position. As the lattice is arranged in a plane this position offset may be specified by a two-dimensional vector, termed the lattice offset vector $o_{xy}$, with components describing the position offset in the x- and y-directions, $$o_{xy} = (o_x, o_y). \tag{89}$$

Here $o_x$ is the offset between lattices L1 and L2 in the x-direction and $o_y$ is the offset between L1 and L2 in the y-direction. The (x, y)-coordinates of the points of lattice L1 and L2 may be found from equations (29) and (30), using the expressions for the grating vectors given in (87) and (88) to give $$(x_{ij}^{(1)}, y_{ij}^{(1)}) = (ip_x + x_0, jp_y + y_0), \tag{90}$$

for the position of points of lattice L1, $(x_{ij}^{(1)}, y_{ij}^{(1)})$, as indexed by i and j, and $$(x_{ij}^{(2)}, y_{ij}^{(2)}) = (ip_x + o_x + x_0, jp_y + o_y + y_0), \tag{91}$$

for the position of points of lattice L2, $(x_{ij}^{(2)}, y_{ij}^{(2)})$, as also indexed by i and j. The indices i and j are used for counting lattice position and are either positive or negative integers, or zero. The coordinates $(x_0, y_0)$ define an origin for the lattice. As we may redefine the origin of the Cartesian coordinate system to suit our convenience and for the sake of clarity we set this coordinate to (0,0) and neglect including these terms for the rest of this description, unless noted otherwise.

In this example, the shape of structure S1 is a pillar with circular cross-section 1104 and the shape of structure S2 is a pillar with triangular cross-section 1105.

Since the lattices of each of the periodic structures making up the IRG have identical periodicity which the IRG also possesses we expect that the diffraction orders of the IRG will conform to those of a rectangular grating as given by equation (62). If the IRG 1101 is used as the output grating 902 in the diffractive waveguide combiner 901 shown in FIG. 9*a*, then we may adopt the nomenclature for the diffraction orders given in table 2 in FIG. 46 and take note of the particular cumulative orders given in table 1 in FIG. 45. As with other diffraction gratings the efficiency of the various diffraction orders for a given incident beam will depend on the shape and composition of the structures, the layout of the grating, and the wavelength, direction and polarization of the incident beam.

Diffraction Scattering Properties of Interleaved Rectangular Gratings

A particular type of IRG, termed here as the fully symmetric interleaved rectangular grating (FSIRG), is defined as an interleaved rectangular grating satisfying the following additional constraints:

i) structure S1 and structure S2 of the FSIRG are identical to each other in shape, composition and optical properties, and ii) the lattice offset vector is chosen so that the points of lattice L2 lie mid-way between the points of lattice L1 in both the x- and y-directions, $$o_{xy} = \frac{1}{2}(p_x, p_y). \tag{92}$$

Figure 12A:
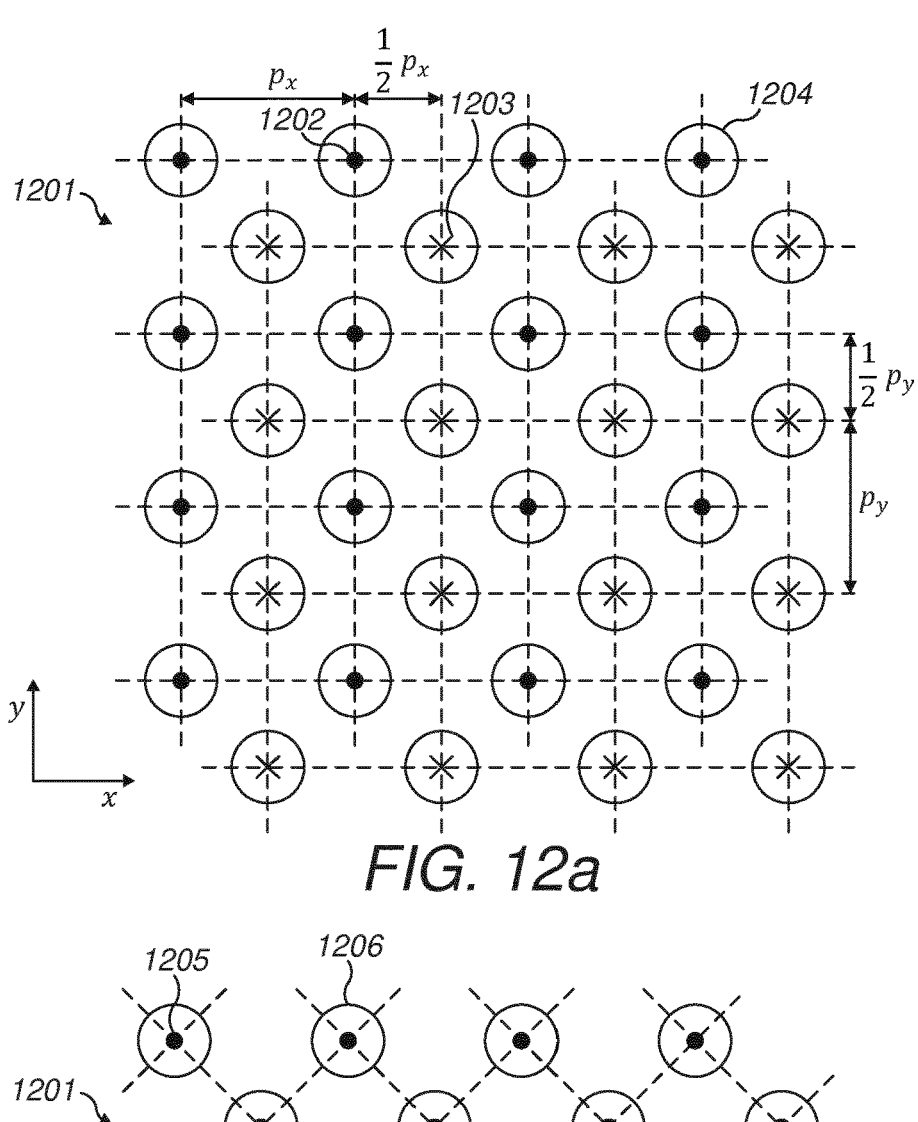
FIGS. 12a-b shows a top view of part of a fully symmetric interleaved rectangular grating according to an aspect of the present invention.

FIG. 12*a* shows an FSIRG 1201 where structures S1 and S2 are pillars with circular cross-section 1204. The points of lattice L1 of the FSIRG 1201 are indicated by dots 1202 and the points of lattice L2 are indicated by crosses 1203 (again the dots and points are for clarity and do not indicate physical differences). The lattices are arranged such that the grating vectors are given by equations (87) and (88). The (x, y)-coordinates of the points of lattice L1, as indexed by i and j, are $$(x_{ij}^{(1)}, y_{ij}^{(1)}) = (ip_x, jp_y), \tag{93}$$

and the (x, y)-coordinates of the points of lattice L2, as indexed by i and j, are $$\left(x_{ij}^{(2)}, y_{ij}^{(2)}\right) = \left(\left(i + \frac{1}{2}\right)p_x, \left(j + \frac{1}{2}\right)p_y\right). \tag{94}$$

Figure 12B:
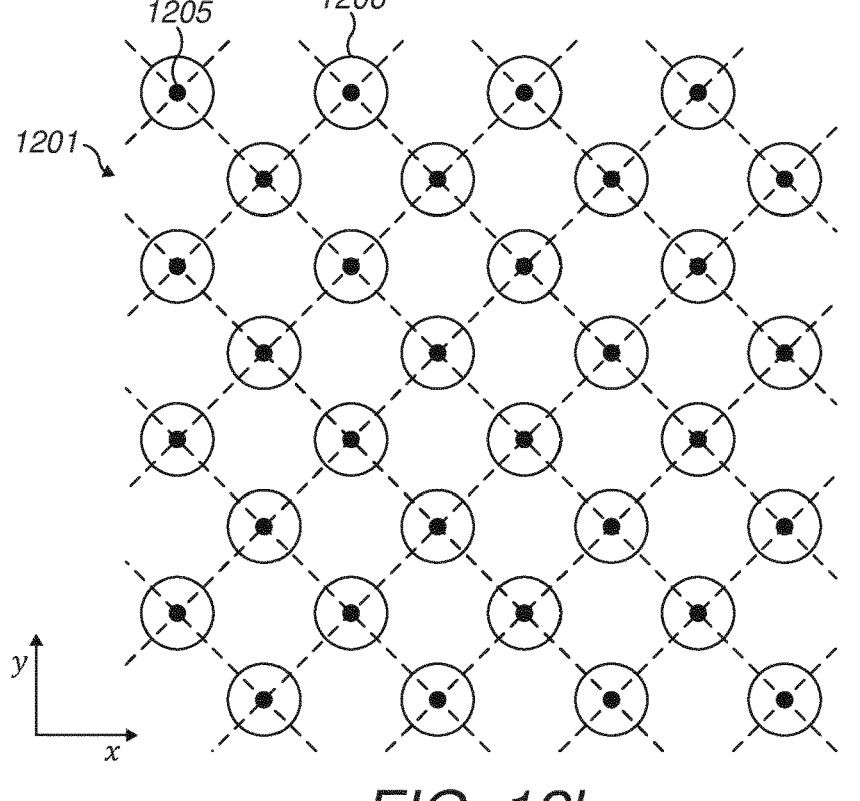

FIG. 12*b* shows the same fully symmetric interleaved rectangular grating 1201 as FIG. 12*a*. As a consequence of setting structure S1 and S2 to be the same and setting the offset vector to ½(p_x, p_y) it is possible to identify an alternative primitive lattice from which the periodic structure may be generated. Instead of interleaving two lattices, it is possible to derive the same overall structure from a new lattice L3 with structure S1 repeated at each point of the lattice. The lattice L3 is indicated by the dots 1205 and the dotted lines shown on FIG. 12*b*, neither of which are intended to convey physical structure.

Figure 12C:
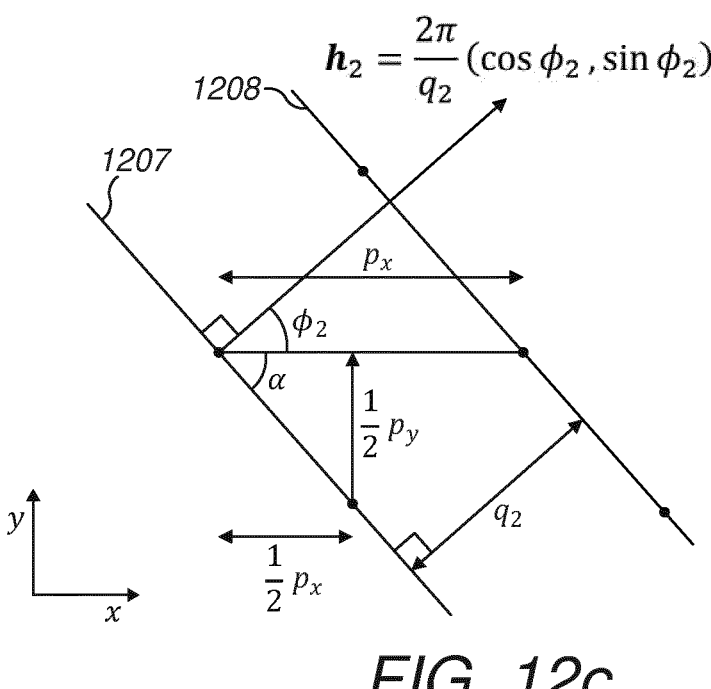
FIGS. 12c-d show the identification of alternative grating vectors in the lattice of a fully symmetric interleaved rectangular grating.

The grating vectors for lattice L3, $h_2$ and $h_3$, may be deduced by considering the geometry derived from diagonal rows drawn through the lattice points. FIG. 12*c* shows two adjacent rows 1207 and 1208 of the grating with grating vector $h_2$ used to construct lattice L3. From this geometry we can determine the angle the rows of the grating make with respect to the x-axis, $\alpha$, is given by $$\alpha = \operatorname{atan}\frac{p_y}{p_x}, \tag{95}$$

and so the angle subtended by the grating vector $h_2$ to the x-axis, $\phi_2$, as well as the related sine and cosines thereof are given by $$\phi_2 = 90° - \alpha = \operatorname{atan}\frac{p_x}{p_y}, \tag{96}$$

$$\sin\phi_2 = \frac{p_x}{\sqrt{p_x^2 + p_y^2}}, \tag{97}$$

$$\cos\phi_2 = \frac{p_y}{\sqrt{p_x^2 + p_y^2}}. \tag{98}$$

The distance between adjacent rows of the grating with grating vector $h_2$, $q_2$, may also be found from the geometric construction and is given by $$q_2 = p_x\cos\phi_2 = \frac{p_x p_y}{\sqrt{p_x^2 + p_y^2}}. \tag{99}$$

In row vector form the grating vector $h_2$ has a form similar to equation (26) and is given by $$h_2 = \frac{2\pi}{q_2}(\cos\phi_2, \sin\phi_2), \tag{100}$$

which we can write in terms of $p_x$, $p_y$ as $$h_2 = 2\pi\left(\frac{1}{p_x}, \frac{1}{p_y}\right). \tag{101}$$

Figure 12D:
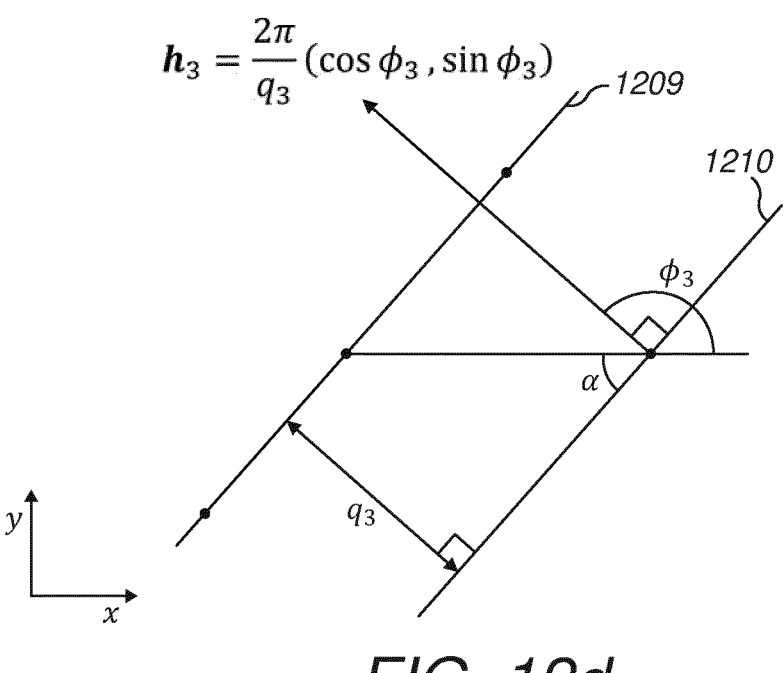

FIG. 12*d* shows two adjacent rows 1209 and 1210 of the grating with grating vector $h_3$ used to construct lattice L3. The angle subtended by the grating vector $h_3$ to the x-axis, $\phi_3$, as well as the related sine and cosines thereof are given by $$\phi_3 = 90° + \alpha = -\operatorname{atan}\frac{p_x}{p_y}, \tag{102}$$

$$\sin\phi_3 = -\frac{p_x}{\sqrt{p_x^2 + p_y^2}}, \tag{103}$$

$$\cos\phi_3 = \frac{p_y}{\sqrt{p_x^2 + p_y^2}}. \tag{104}$$

The distance between adjacent rows of the grating with grating vector $h_3$, $q_3$, may also be found from the geometric construction and is given by $$q_3 = p_x \cos\phi_2 = \frac{p_x p_y}{\sqrt{p_x^2 + p_y^2}}, \tag{105}$$

which is the same as $q_2$. In row vector form the grating vector $h_3$ has a form similar to equation (27) and is given by $$h_3 = \frac{2\pi}{q_3}(\cos\phi_3, \sin\phi_3), \tag{106}$$

which we can write in terms of $p_x$, $p_y$ as $$h_3 = 2\pi\left(-\frac{1}{p_x}, \frac{1}{p_y}\right). \tag{107}$$

We can use the expressions given in equations (29) and (30) to determine the coordinates of points of the lattice L3 based on the parameterization of the grating vectors $h_2$ and $h_3$ in terms of the lattice periods $p_x$ and $p_y$. Substitution of the parameterization into expressions of the form of (29) and (30) gives $$x_{ab}^{(3)} = \frac{p_x}{2}(a+b), \tag{108}$$

and $$y_{ab}^{(3)} = \frac{p_y}{2}(a-b), \tag{109}$$

where $(x_{ab}^{(3)}, y_{ab}^{(3)})$ is the xy-coordinate of a point in the lattice L3 as indexed by values a and b which are positive or negative integers, or zero.

Since a and b in equations (108) and (109) are integers, or zero, the quantities a+b and a−b must also be integers or zero. Furthermore, if a+b is an even number then a−b must also be an even number since evenness of a+b implies that either a and b are both odd or both even numbers. Similarly, if a+b is an odd number then a−b must also be an odd number.

If we suppose that a+b is even, then we may write $$a+b=2c, \tag{110}$$

and $$a-b=2d, \tag{111}$$

where c, d are positive or negative integers, or zero. The coordinates of the points on the lattice for even values of a+b are thus given by $$(x_{cd}^{(3,even)}, y_{cd}^{(3,even)}) = (cp_x, dp_y), \tag{112}$$

which we note is identical to the coordinates of lattice L1 given by equation (93) if i=c and j=d. If we suppose instead that a+b is odd, then we may write $$a+b=2e+1, \tag{113}$$

and $$a-b=2f+1, \tag{114}$$

where e, f are positive or negative integers, or zero. The coordinates of the points on the lattice for odd values of a+b are thus given by $$\left(x_{ef}^{(3,odd)}, y_{ef}^{(3,odd)}\right) = \left(\left(e+\frac{1}{2}\right)p_x, \left(f+\frac{1}{2}\right)p_y\right), \tag{115}$$

which we note is identical to the coordinates of lattice L2 given by equation (94) if i=e and j=f. Equations (112) and (115) prove that the points of lattice L3 are identical to the combination of the points of lattice L1 and lattice L2, as given by equations (93) and (94), thus proving that the equivalence of the two approaches described for the construction of the FSIRG. It has been found that construction of the FSIRG in terms of lattice L3 allows for the deduction of profound consequences for the diffraction orders of an FSIRG.

Proof of Suppression of Certain Diffraction Orders for an FSIRG

By considering the FSIRG 1201 as constructed from lattice L3 we can write a grating equation for the scattering of light beams from a grating in terms of the grating vectors $h_2$, $h_3$ as given by equations (101) and (107), $$k_{xy}^{\{l_2,l_3\}} = k_{xy} + l_2 h_2 + l_3 h_3, \tag{116}$$

where $k_{xy}$ is the xy-wavevector of the incident beam on the grating, and $\{l_2, l_3\}$ is the diffraction order for the scattered beam with xy-wavevector $k_{xy}^{\{l_2,l_3\}}$. As per the nature of the scattering of waves from diffraction gratings the order numbers $l_2$ and $l_3$ must be positive or negative integers, or zero. As previously noted we also expect scattering from the grating to satisfy the grating equation $$k_{xy}^{\{m_2,m_3\}} = k_{xy} + m_2 g_2 + m_3 g_3, \tag{117}$$

where $g_2$ and $g_3$ are grating vectors given by equations (87) and (88) and $\{m_2, m_3\}$ is the diffraction order for the scattered beam with xy-wavevector $k_{xy}^{\{m_2,m_3\}}$.

We note that equations (116) and (117) describe scattering from the same grating. As such there must exist a correspondence between the possible wavevectors $k_{xy}^{\{l_2,l_3\}}$ of equation (116) and the possible wavevectors $k_{xy}^{\{m_2,m_3\}}$ of equation (117) such that they may be the same. Given this, we should be able to draw some relationship between the diffraction order $\{l_2, l_3\}$ as related to the grating vectors $h_2$ and $h_3$ and the order $\{m_x, m_y\}$ as related to the grating vectors $g_x$ and $g_y$. From the definitions of $g_x$, $g_y$, $h_2$ and $h_3$ given in equations (87), (88), (101) and (107), respectively, we can determine that $$h_2 = g_x + g_y, \tag{118}$$

and $$h_3 = -g_x + g_y, \tag{119}$$

Substituting these results into equation (116) gives $$k_{xy}^{\{l_2,l_3\}} = k_{xy} + (l_2 - l_3)g_x + (l_2 + l_3)g_y. \tag{120}$$

If we set this equal to the expression for $k_{xy}^{\{m_x,m_y\}}$, which must be true if $k_{xy}^{\{l_2,l_3\}}$ describes the same vector as $k_{xy}^{\{m_2,m_3\}}$, gives $$m_x = l_2 - l_3, \tag{121}$$

and $$m_y = l_2 + l_3. \tag{122}$$

Taking the sum of $m_x$ and $m_y$ gives $$m_x + m_y = 2l_2. \tag{123}$$

Since $l_2$ is a positive or negative integer, or zero, equation (123) shows that the sum of the diffraction order values $m_x$ and $m_y$ must be an even number, or zero. However, based on the grating equation for the rectangular grating, equation (117), it is possible to choose pairs of values of $m_x$ and $m_y$ which sum to an odd number. This creates an apparent contradiction since such value pairs cannot correspond to a diffraction order of equation (116). The resolution of this apparent contradiction is that the diffraction efficiency of diffraction orders $\{m_x, m_y\}$ where $m_x+m_y$ is an odd number must be zero. Essentially, although the grating equation for the rectangular lattice (117), shows that these orders exist in a mathematical sense, the fact they will necessarily have zero intensity means that they won't exist physically and so there is no contradiction in terms of any physically measurable consequence. Under this circumstance, the two descriptions of the FSIRG produce consistent predictions for the directions of diffracted beams in the physical world. Since they arise from considerations of the lattices of an FSIRG, not the actual structures, these conclusions will apply to any FSIRG capable of scattering diffraction orders of incident light.

This result for the scattering properties of FSIRGs may be checked by methods that will be familiar to those skilled in the art. For example, an analytical calculation is possible by application of the Floquet-Bloch theorem using the symmetry of lattice L3 imposed on the solution for a plane wave scattered by an interleaved rectangular grating, as defined here. Alternatively, one may employ computational methods, such as the finite-difference-time domain method (FDTD) with periodic boundary conditions, or semi-analytical methods such as rigorous coupled-wave analysis (RCWA).

Thus, if a fully symmetric interleaved rectangular grating is suitably configured for use as an output grating element of a DWC such that the order nomenclature of table 2 in FIG. 46 is appropriate we can state that all of the to-eye orders listed in table 2 in FIG. 46 must have zero diffraction efficiency and only turn orders, as well as the zeroth order, can have non-zero efficiency. In other words, an output grating configured as an FSIRG will not in fact be able to couple light out of the waveguide via the to-eye orders of table 2 in FIG. 46.

Symmetry Breaking to Modify Diffraction Orders

Figure 12G:
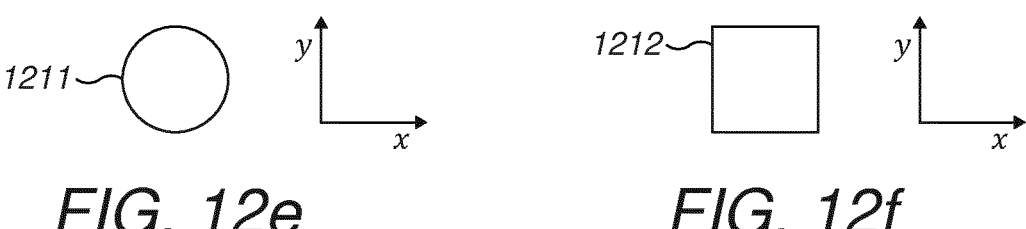
FIG. 12g shows a top view of part of an interleaved rectangular grating according to an aspect of the present invention that makes use of the structures shown in FIGS. 12e-f.
Figure 12G:
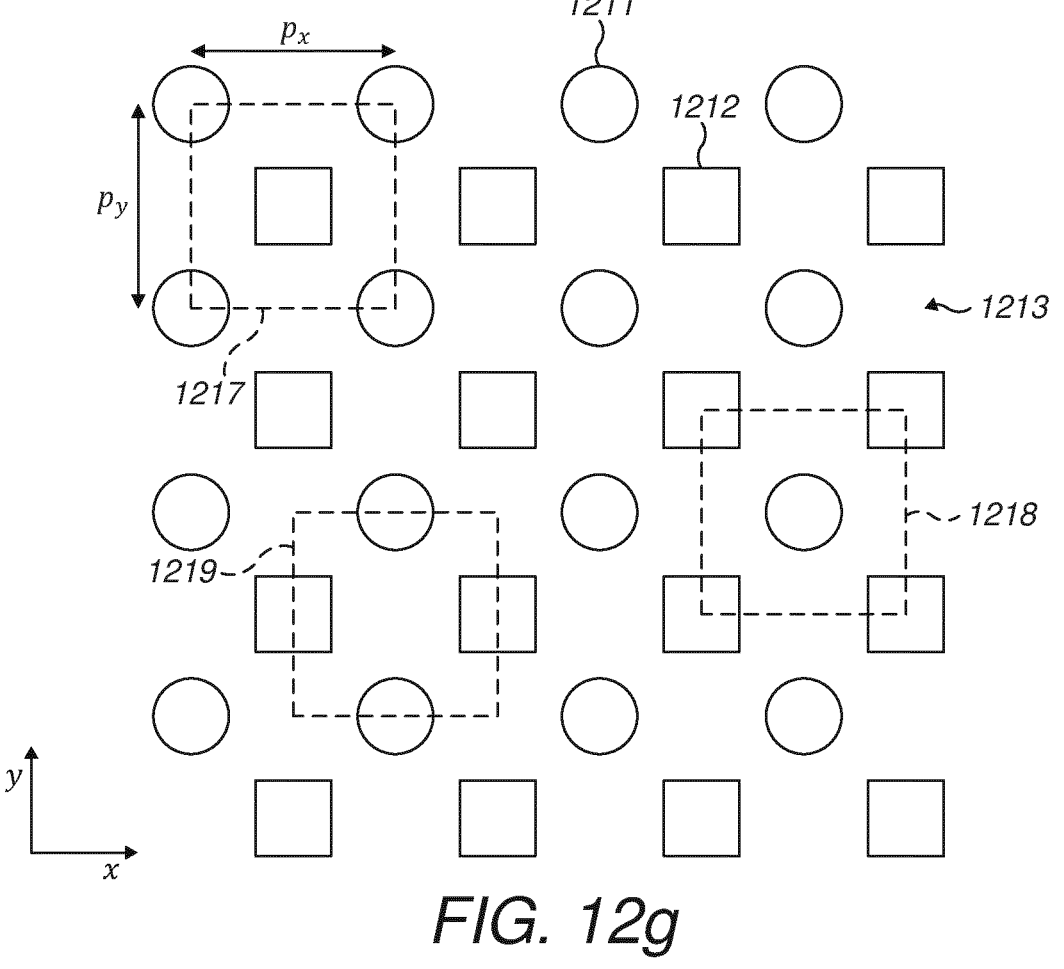

FIG. 12e shows a cross-section view of a pillar-shaped structure 1211 with a circular cross-section and FIG. 12f shows a cross-section view of a pillar-shaped structure 1212 with a square cross-section. FIG. 12g shows an interleaved rectangular grating 1213 with the same periods as the FSIRG 1201. In IRG 1213, the structure S1 is the circular cross-section pillar 1211 and the structure S2 is the square cross-section pillar 1212. Because of the difference between structures S1 and S2 it is no longer possible to construct the grating using a single structure repeated at the points of a single lattice constructed from the vectors $h_2$ and $h_3$ given in equations (101) and (107). Thus, we can no longer conclude that diffraction orders $\{m_x, m_y\}$ of the rectangular grating used to construct this IRG necessarily have zero efficiency if $m_x+m_y$ is odd. Instead, the diffraction efficiency must depend on the shapes of S1 and S2, and also the difference between the shape of structures S1 and S2.

As will be demonstrated, the diffraction efficiencies for orders where $m_x+m_y$ is an odd number are particularly sensitive to the difference between the shape of structures S1 and S2 compared to the diffraction efficiencies for orders where $m_x+m_y$ is zero or an even number.

Figures 12H, 12I:
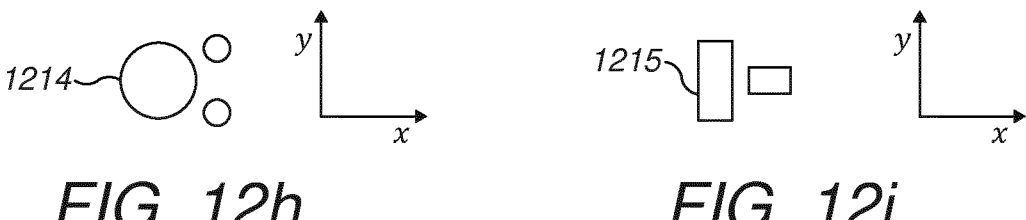
FIGS. 12h-i show top views of profiles of example multi-element optical structures for use in embodiments of the present invention.
Figure 12J:
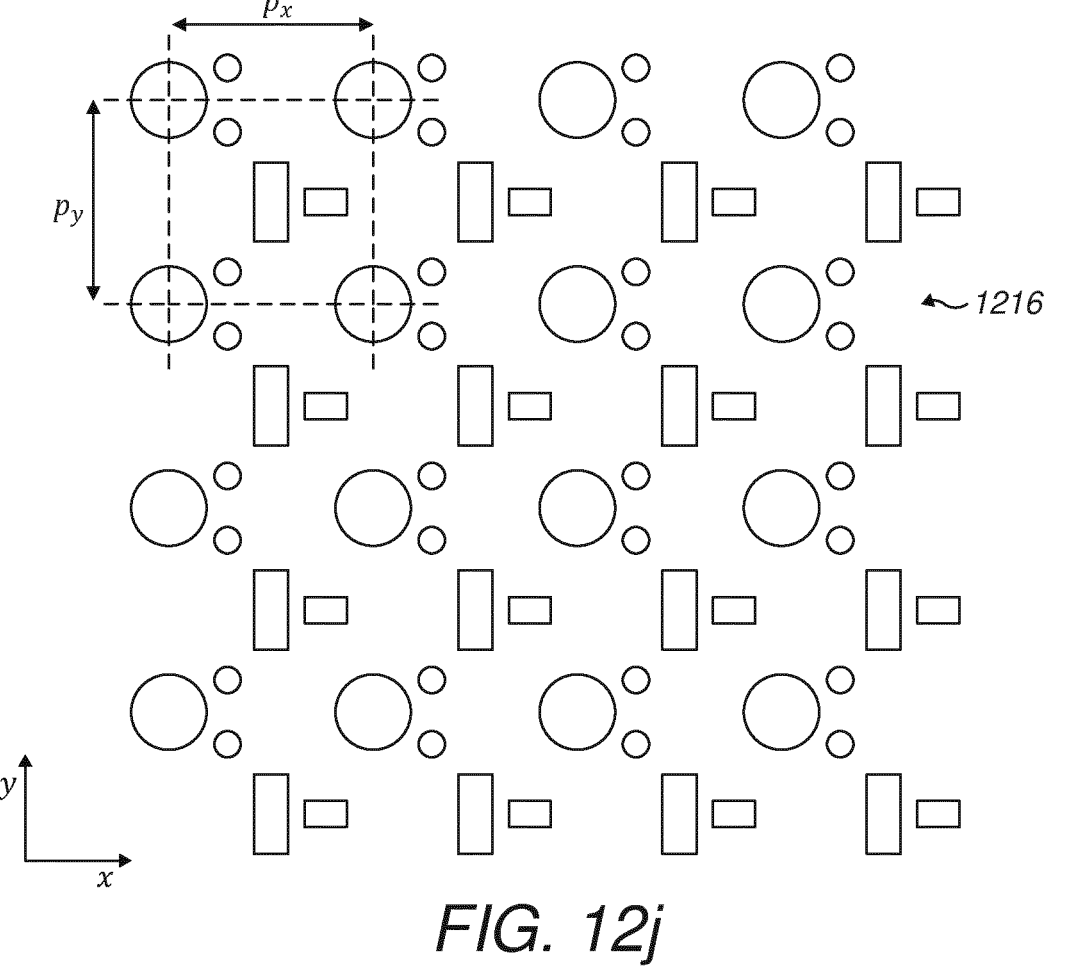
FIG. 12j shows a top view of part of an interleaved rectangular grating according to an aspect of the present invention that makes use of the structures shown in FIGS. 12h-i.

It is important to note that the structures S1 or S2 need not be composed of a single element for these conclusions to apply. By way of example FIG. 12j shows an interleaved rectangular grating 1216 where the structure S1 is composed of three circular pillars 1214 as shown in FIG. 12h and the structure S2 is composed of two rectangular pillars 1215 as shown in FIG. 12i. For this IRG we would expect non-evanescent to-eye orders to have non-zero diffraction efficiency. If an IRG were formed by the structure S1 and S2 both being composed of the three circular pillars 1214, then the grating formed will be an FSIRG where the efficiency of the to-eye orders is necessarily zero.

The IRG unit cell as described here is a rectangle with sides aligned to the x- and y-directions, length in the x-direction equal to the x-period of lattice L1 (or equally lattice L2) and length in the y-direction equal to the y-period lattice L1 (or equally lattice L2). As noted above, within the plane of the grating the position of the unit cell relative to the periodic structure may be chosen arbitrarily. The IRG 1213 shown in FIG. 12g shows several possible unit cells, as indicated by the dotted lines: one unit cell 1217 has structure S2 at its centre; another possible simple unit cell 1218 has the structure S1 at its centre; and another simple unit cell 1219 is constructed to horizontally bisect two vertically adjacent copies of structure S1 and vertically bisect two horizontally adjacent copies of structure S2.

Symmetry Breaking by Change of Composition

Another approach for introducing a difference between structure S1 and S2 is to vary the composition of the structures in a way that their optical properties differ. For example, if the electric permittivity of the structures is made different to each other, then they will scatter light differently resulting in an IRG that is no longer fully symmetric and so non-evanescent orders where $m_x+m_y$ is odd do not necessarily have zero diffraction efficiency.

Symmetry Breaking by Change of Lattice Offset

We now consider a modification to an FSIRG such that the lattice offset vector between lattices L1 and L2 is no longer equal to $\frac{1}{2}(p_x, p_y)$, where $p_x$ and $p_y$ are the periods of L1 and L2 in the x- and y-directions, respectively. With this change we may no longer construct the grating using a single structure repeated at the points of a lattice constructed from the vectors $h_2$ and $h_3$ shown in equations (101) and (107). So again the argument leading to the requirement that diffraction orders where $m_x+m_y$ is odd must have zero diffraction efficiency no longer applies.

If we now consider a very slight deviation of the lattice offset vector from $\frac{1}{2}(p_x, p_y)$ we may expect that although non-evanescent diffraction orders where $m_x+m_y$ is odd will not be exactly cancelled we may expect that the deviation from zero efficiency will also be very slight, and depend on the degree to which the lattice offset vector deviates from $\frac{1}{2}(p_x, p_y)$. Thus, we may expect that the diffraction efficiency of orders where $m_x+m_y$ is odd will exhibit a much greater sensitivity to small deviations of the lattice offset vector from $\frac{1}{2}(p_x, p_y)$ when compared to diffraction orders where $m_x+m_y$ is even or zero.

Methods to Control Efficiency of Diffraction Orders

By allowing control of both the difference between structures S1 and S2 as well as control of the position offset between the rectangular lattices L1 and L2 used to construct an interleaved rectangular grating, an additional method of control of the diffraction efficiency of certain diffraction orders may be provided. In such a scheme a fully symmetric interleaved rectangular grating and a rectangular grating may be seen as two extreme cases of a general interleaved rectangular grating, providing on the one hand a case where certain diffraction orders must necessarily be zero and on the other a situation where for similar structures the magnitude of these orders will in generally be much larger, as long as they are not evanescent.

For convenience we will use the following terminology to refer to the extent to which an IRG may deviate from an FSIRG: the extent to which structure S1 and S2 differ from each other in shape is termed the degree of broken shape symmetry of the IRG; the extent to which S1 and S2 differ in composition is termed the degree of broken composition symmetry of the IRG; the extent of an overall difference between structure S1 and S2, whether it is in shape, composition, optical properties or a combination of these, is termed the degree of broken structure symmetry for the IRG; the deviation of position offset between lattices L1 and L2 from $\frac{1}{2}(p_x, p_y)$ is termed the degree of broken position symmetry of the IRG; and the extent to which there is a difference between structures S1 and S2 and/or a deviation of the offset of lattices L1 and L2 from $\frac{1}{2}(p_x, p_y)$ is termed the degree of broken symmetry of the IRG.

With reference to the criteria listed in table 3 in FIG. 47, it has been found that achieving a good level of performance from a rectangular grating when used as an output grating in a diffractive waveguide combiner requires a degree of control of the relative diffraction efficiencies of various turn orders and to-eye orders. As will be demonstrated by examples of the invention, the provision of additional control over the diffraction efficiency of to-eye diffraction orders made possible by the use of interleaved rectangular gratings with some controlled degree of broken symmetry may provide for advantageous performance for applications making use of such gratings as the output element of a diffractive waveguide combiner.

Figure 13A:
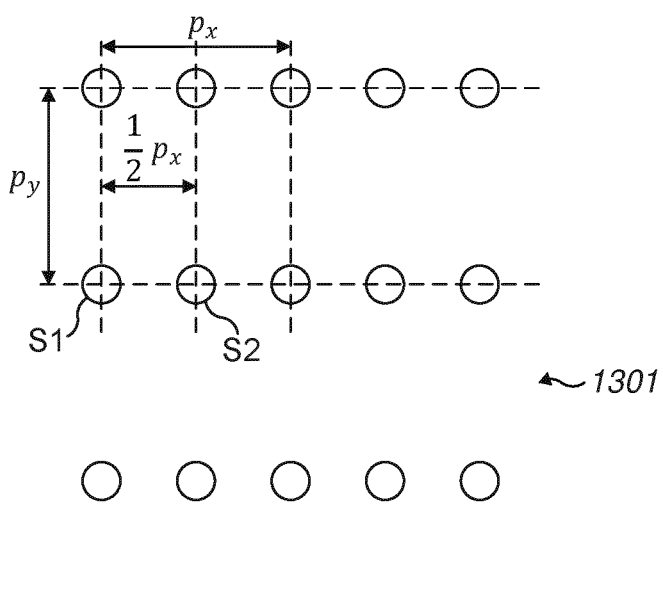
FIG. 13a shows a top view of part of an interleaved rectangular grating with a particular arrangement in the x-direction.
Figure 13B:
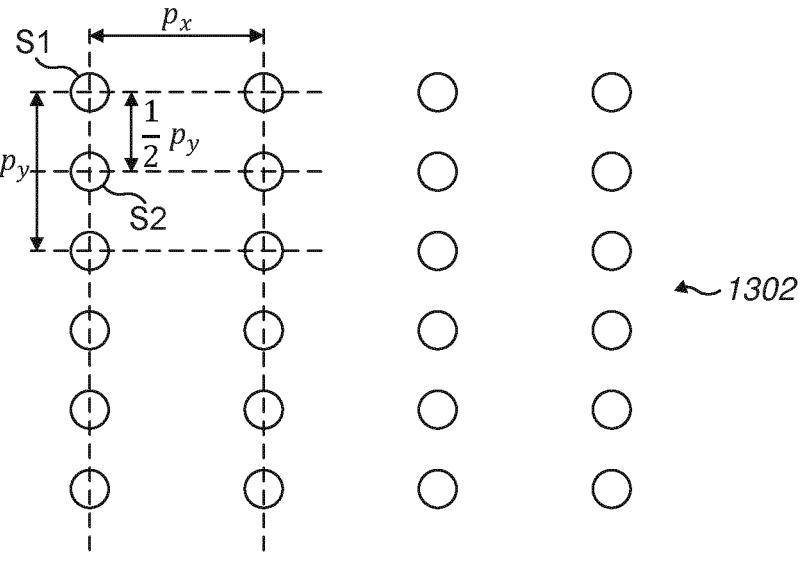
FIG. 13b shows a top view of part of an interleaved rectangular grating with a particular arrangement in the y-direction.

Alternative Arrangements for Interleaved Rectangular Gratings with a High Degree of Symmetry FIG. 13_a_ shows a top view of an example of a particular case of an interleaved rectangular grating 1301, which we term as a horizontally symmetric interleaved rectangular grating (HSIRG) and define as an IRG having the following particular properties:
  i) the period of lattice L1 and L2 is $p_x$ in the x-direction and $p_y$ in the y-direction;
  ii) the lattice offset vector is given by $$o_{xy} = \frac{1}{2}(p_x, 0);$$

iii) the structures S1 and S2 are identical, in the diagram shown here they are assumed to be pillars with a circular cross-section.

The diffraction orders for this grating will obey equation (117). However, we note that this grating can also be constructed as a rectangular grating with a x-direction period of $\frac{1}{2}p_x$. As in the case of an FSIRG, in order to reconcile the two methods for constructing the HSIRG we require that certain diffraction orders of equation (117) must have zero diffraction efficiency. For the HSIRG the requirement is that orders will have zero efficiency if $m_x$ is an odd number. With reference to the diffraction orders listed in table 2 in FIG. 46 this means that the only to-eye orders with non-zero efficiency are STE and TEAT−Y and the only turn orders with non-zero efficiency are the backturn orders BT−X, BT+X, BT−Y, and BRT+Y. The other turn and to-eye orders have been completely suppressed by this arrangement FIG. 13_b_ shows a top view of an example of an interleaved grating 1302, which we term as a vertically symmetric interleaved rectangular grating (VSIRG) and define as an IRG having the following particular properties:
  i) the period of lattice L1 and L2 is $p_x$ in the x-direction and $p_y$ in the y-direction;
  ii) the lattice offset vector is given by $$o_{xy} = \frac{1}{2}(0, p_y);$$

iii) the structures S1 and S2 are identical, in the diagram shown here they are assumed to be pillars with a circular cross-section.

The diffraction orders for this grating will obey equation (117). However, we note that this grating can also be constructed as a rectangular grating with a y-direction period of $\frac{1}{2}p_y$. As in the case of an FSIRG, in order to reconcile the two methods for constructing the VSIRG we require that certain diffraction orders of equation (117) must have zero diffraction efficiency. For the VSIRG the requirement is that orders will have zero efficiency if $m_y$ is an odd number. With reference to the diffraction orders listed in table 2 in FIG. 46 this means that the only to-eye orders with non-zero efficiency are TEAT+X and TEAT−X and the only turn orders with non-zero efficiency are the backturn orders BT−X, BT+X, BT−Y, and BRT+Y. The other turn and to-eye orders have been completely suppressed by this arrangement.

Similar to the FSIRG, the introduction of a degree of broken symmetry by deviating from the exact condition of the HSIRG or VSIRG will result in non-evanescent diffraction orders with zero efficiency receiving some of the energy from an incident beam of light. For small deviations we may expect that for an incident beam of a given direction, wavelength and polarization, the magnitude of the diffraction efficiency of the suppressed diffraction orders will depend on the size, shape and optical properties of the structures S1 and S2 as well as the degree of broken symmetry. With respect to the HSIRG the degree of broken position symmetry will be the extent to which the lattice offset vector deviates from $$o_{xy} = \frac{1}{2}(p_x, 0).$$

Similarly, with respect to the HSIRG the degree of broken position symmetry will be the extent to which the lattice offset vector deviates from $$o_{xy} = \frac{1}{2}(0, p_y).$$

Thus, with the concept of the FSIRG, HSIRG and VSIRG, in conjunction with the use of broken symmetry the invention provides for a range of approaches for providing considerable control over to-eye orders, or certain combinations of to-eye orders and turn orders.

Advantages for the Use of Interleaved Rectangular Gratings as Diffractive Waveguide Combiners in Display Systems WO 2018/178626 describes an approach for a two-dimensional grating design based on modified diamond structures. This approach is shown to have certain scattering properties which are advantageous for use as an output grating of a DWC. However, it has been found that in order to control the relative strength of certain to-eye diffraction orders it is necessary to ensure that the parameters describing the shape of the modified diamonds must lie within a certain range. This constrains the extent to which the scattering properties of the grating may be optimized for improved performance, for example, by varying the shape of the diamonds with respect to position across the grating, as this can lead to a loss of control of the efficiency of certain to-eye diffraction orders, resulting in a loss of uniformity for the wearer. The interleaved rectangular grating described in this invention may make use of the degree of broken symmetry in addition to the shape and optical properties of the structures of the grating to provide for additional degrees of control over the scattering of the grating. In turn this may provide more control over the optimization of the scattering properties to suit an application such as using an IRG as the output element of a DWC.

An additional advantage of the present invention is that diffraction orders which turn rays back towards the direction of input into the IRG are more accessible. With reference to table 1 in FIG. 45 this refers to light beams with a cumulative order of $\{0, -2\}$. The grating provided by this invention may provide for more efficient coupling into this cumulative order than approaches such as those described in WO 2018/1786262 owing to the reduction in the number of waveguided diffraction orders. This may allow for a designs that provide for an increase in the diffraction efficiency for diffraction orders leading to the $\{0, -2\}$ cumulative order without inducing excessive losses by scattering of beams into unwanted diffraction orders. The symmetry of the structure of many designs enabled by this invention may also provide for more advantageous coupling into the $\{0, -2\}$ cumulative order. Possible paths for coupling a beam into the $\{0, -2\}$ order include the diffraction of the $\{0,0\}$ cumulative order beam by the BT–Y diffraction order and diffraction of the $\{\pm1, -1\}$ cumulative order beams by the TTB+X, TTB–X diffraction orders. An increase in the availability of directions such as the $\{0, -2\}$ cumulative order may improve the uniformity of the output from the DWC by providing for more paths for light beams through the waveguide, and so a greater degree of homogeneity in the output arising from the combination of these beams. The use of rays that turn back may also provide for an increase in the overall efficiency of the DWC as such beam paths may provide more opportunities for light beams to be coupled out of the waveguide towards an observer.

Another advantage of the present invention compared to the prior art is that for a given size of eyebox the size of the output grating may be smaller. This can be seen via use of pupil replication maps. A pupil replication map is a graph showing the location of positions at which the output of a beam can occur as a result of the various branching paths through the DWC as provided by repeat interactions with a diffraction element such as an IRG or other two-dimensional diffraction grating. Essentially, at each output location a replica of the input beam is considered to be output. The result of the entire ensemble of beams is the expanded exit pupil described previously, which in turn provides for an extended eyebox. Thus, the extent and coverage of the pupil replication map is one of the main factors that determines the eyebox of a system. It should be noted that for a given DWC each input beam direction and wavelength will result in its own corresponding pupil replication map.

The projected eyebox for a given gaze angle is found by taking the eyebox of a system at its defined location relative to the DWC, which is usually spatially separated from the DWC, and projecting it back along the gaze angle onto the output grating of the DWC. The region of the output grating covered by this projected eyebox is the part of the output grating that should output light at the given gaze angle in order to cover the eyebox at that gaze angle. In order for the image to be seen at all positions within the eyebox of the DWC, pupil replication events for a point in the field of view must cover the corresponding projected eyebox of that point in the field of view. Since light can only be output from the DWC at points where there is a diffraction grating, the extreme positions of the projected eyeboxes as computed over the whole field of view projected into the DWC will set a minimum size for the output grating.

Figure 14B:
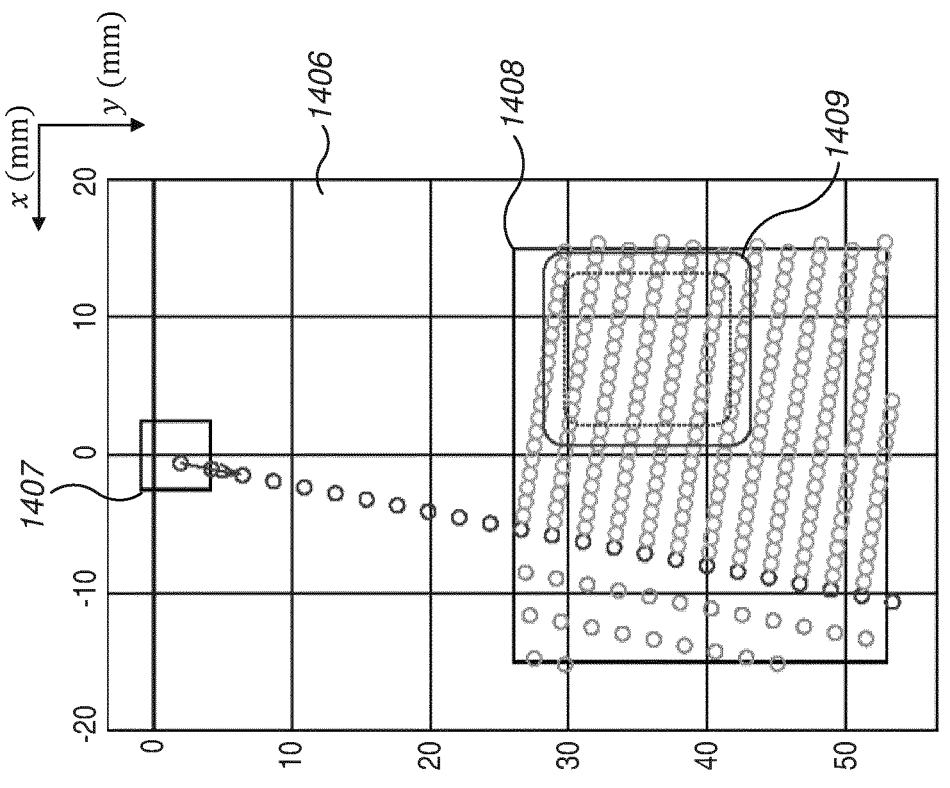
FIG. 14b shows a pupil replication map for a diffractive waveguide combiner using a two-dimensional output grating according to an aspect of the present invention.
Figure 14A:
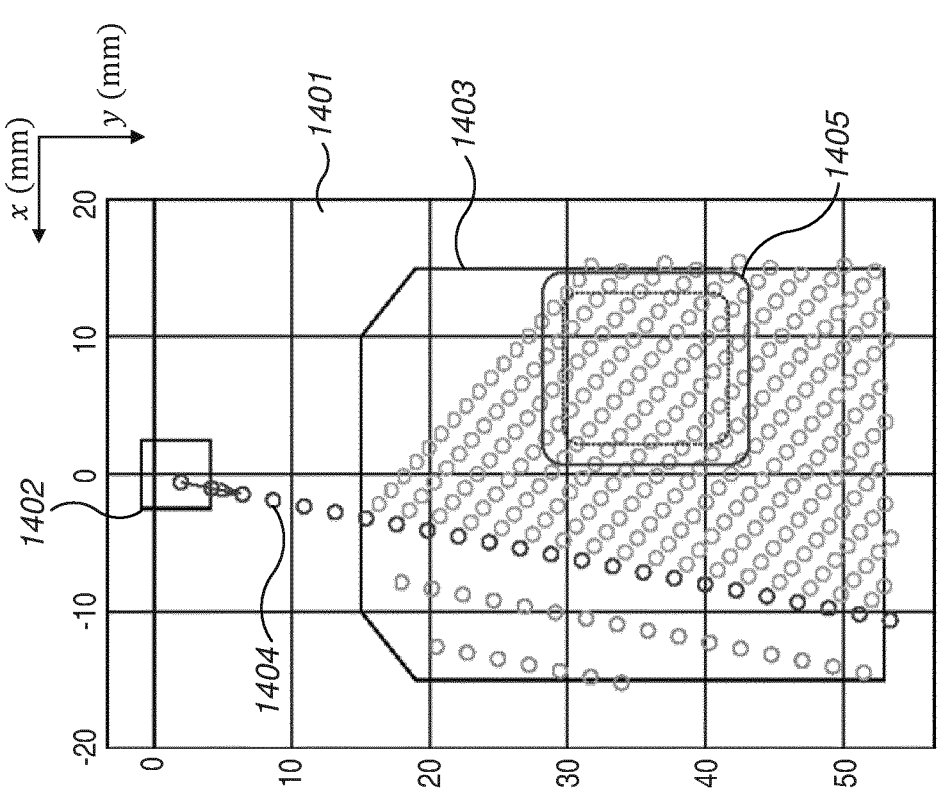
FIG. 14a shows a pupil replication map for a diffractive waveguide combiner using a two-dimensional output grating of a prior art device.

FIG. 14a shows a pupil replication map 1401 of a DWC configured according to the 2D diffraction grating described by WO 2018/178626. Here only the dominant turn orders of the grating design are included when considering the allowed paths. The pupil replication map 1401 shows the position of the input grating 1402 of the DWC which is a 1D diffraction grating with grating vector pointing parallel to the y-axis of the graph. The output grating 1403 is a 2D diffraction grating according to WO 2018/178626, with grating vectors at ±60° to the y-axis of the graph. Each pupil replication event is shown as a circle 1404. Here the pupil replication map is shown for the top-right corner field. The projected eyebox 1405 for this field is computed by projecting the eyebox back from the intended position of an observer's eye to the waveguide surface.

For this grating the pupil replication map shows that the xy-wavevector after one of the dominant turn orders points in a substantially diagonal direction. In order to ensure that the projected eyebox 1405 is covered by pupil replication events the pupils must be made to start turning at a significantly closer distance to the input grating than the eyebox 1405. This requires that the output grating has an additional region above the most extreme eyebox position 1405, which increases the minimum size of the grating. For the example shown in FIG. 14a to achieve an 11×12 mm eyebox with a 35°×20° field of view the output grating must have a minimum size of 38×30 mm.

FIG. 14b shows a pupil replication map 1406 for a DWC with an output grating according to the present invention. The input grating 1407 is identical to the input grating 1402 but the output grating 1408 is an IRG with and x- and y-period equal to the period of the input grating 1402. The field of view of the projected display used with the display is the same. Compared to grating 1403 the pupil replication positions after a turn order from grating 1408 travel in a much more horizontal direction. As a result the additional space required above the projected eyebox 1409 to ensure coverage with pupil replication events can be much smaller and the size of the output grating may be reduced considerably. For the example shown in FIG. 14b to achieve a 11×12 mm eyebox with a 35°×20° field of view the output grating must have a minimum size of 27×30 mm. This is a reduction of 11 mm in the y-direction compared to the example in FIG. 14a. A smaller grating will impose fewer constraints on the size and shape of the overall DWC, potentially reducing manufacturing costs as well as providing greater freedom of the form factor of designs incorporating a DWC that makes use of such a grating.

Simulation Methods for Interleaved Rectangular Gratings in Diffractive Waveguide Combiners It is important to emphasise that although we may employ symmetry-based arguments to determine that the efficiency of certain diffraction orders of an FSIRG, HSIRG or VSIRG must be zero, for an arbitrary IRG it is often necessary to use computational techniques to determine diffraction efficiencies or related polarization-dependent coefficients. As mentioned previously, appropriate methods include numerical techniques such as the finite-difference-time domain method (FDTD) with periodic boundary conditions, or semi-analytical methods such as rigorous coupled-wave analysis (RCWA).

In general numerical simulation methods are required to compute the performance of an IRG in practical applications, such as if used as a grating element in a DWC. For situations where the coherence length of the light sources used is shorter than the distance between successive grating interactions, a reasonable approximation is to consider each interaction independently of the others and use numerical ray-tracing to compute the various beam paths resulting from successive interactions with the surfaces of a waveguide. The contribution of each of these paths to the overall output may be computed by considering the grating interactions required for a given path. At each interaction the diffraction efficiency of the various orders may be computed using the methods described above given the wavelength, direction, and polarization of the incident beam as represented by one or more rays. The subsequent radiant flux, direction and polarization of the various diffracted beams will then be determined by the computed diffraction efficiencies as well as the grating equation acting on the xy-wavevector described by the rays. By aggregating contributions from a large number of paths and determining those that will be detected by a representation of the observer the output from a DWC may be simulated.

Ray-tracing methods have found widespread application in optical simulation, including systems featuring waveguides and/or diffraction gratings. Such methods may be readily implemented using custom simulation codes or commercial software such as Zemax OpticStudio® (Zemax LLC). In ray-tracing simulations it is possible to take into account various practical features for a physical world realisation of a DWC. For example, the finite extent of a grating can be considered by using the hit coordinate of a ray interaction with a surface and performing a test as to whether such coordinates lie within a region defined to have a grating, which would could be described by a polygon or other method. The edges of the DWC itself can also be simulated using ray-tracing, for example, by describing the edges using polygons, curved surfaces or other geometry primitives and performing tests to determine which surface a given ray will strike next on its path through the DWC. Processes such as absorption or scattering may then be applied to a ray based on the surfaces it strikes. In this way a sophisticated simulation model for the behaviour of a DWC may be developed and used in order to predict the performance of the DWC.

Methods for the Design and Representation of Interleaved Rectangular Gratings

In order for a diffraction grating to scatter light there must exist within the grating and its surroundings some variation of at least one optical property including, but not limited to refractive index, electric permittivity, magnetic permeability, birefringence and/or absorptivity. In many instances this variation may be accomplished by the use of embedded structures of at least one dissimilar optical property within a surrounding matrix of material, or as a surface relief structure composed of at least one material upon a substrate of either the same or a different material and which protrudes into a surrounding medium of a dissimilar material to the surface relief structure. In order to diffract light, at least one optical property of the medium surrounding a surface relief structure must differ from at least part of the surface relief structure. A surrounding medium typically used for gratings arranged as surface relief structures on the surfaces of a DWC is air but this need not be the case. In a sense any surface relief structure may be considered to be an embedded structure in the matrix of a surrounding medium. As such similar methods may be employed to design and represent surface relief structures and embedded structures.

Any design of grating will require some representation, or description, which provides details of the shape and composition of the IRG so that it may be designed, simulated and manufactured in the physical world. Here various representations suitable for describing a range of surface relief structures are developed in order to elucidate various aspects of the invention as well as demonstrate how such aspects may be realised in practical applications such as simulation and manufacture. It will be appreciated by those skilled in the art that there exists a wide range of methods available for viable representations of an IRG beyond those outlined here.

Method for the Design and Representation of Interleaved Rectangular Grating Geometry Based on Mathematical Construction In some approaches a grating may be created from three-dimensional structures created in one or more materials. For gratings constructed along such principles, a representation may seek to describe the geometry of each interface between the various materials used. In some approaches we may include in our representation augmentations to the geometry, such as the addition of layers of new geometry derived from the existing geometry to represent the outcome of processes such as coating. In other approaches we may consider modifications to the geometry of the grating such as rounding of sharp features either as a tool to alter the performance of a design or as a method to represent manufacturing limitations. We may consider applying these approaches in various combinations and multiple times to potentially yield quite complex geometries composed of many distinct regions of different materials.

In a system where materials are described by surface geometry each material must be associated with its own surface geometry description. One method for generating a surface geometry description of an interleaved rectangular grating comprises the following steps:

1. We assume that the bottom of the grating is the xy-plane (i.e. z=0). We define the grating vectors used to construct lattices L1 and L2 of the IRG as $$g_x = \frac{2\pi}{p_x}(1, 0), \tag{124}$$

and $$g_y = \frac{2\pi}{p_y}(0, 1). \tag{125}$$

2. We define a cropping function C(x, y) to describe the finite extent of the IRG. C(x, y) has a value of 1 over the region where the grating exists and zero everywhere else. If no cropping is required, then C(x, y)=1 irrespective of (x, y)-coordinate.

3. We represent lattice L1 with a lattice function $L_1(x, y)$ given by $$L_1(x, y) = C(x, y) \sum_{i=-\infty}^{\infty} \delta(x - ip_x) \sum_{j=-\infty}^{\infty} \delta(y - jp_y), \tag{126}$$

US 12,572,017 B2

65 and we represent lattice L2 is with a lattice function $L_2(x, y)$ given by $$L_2(x, y) = C(x, y) \sum_{i=-\infty}^{\infty} \delta(x - ip_x - o_x) \sum_{j=-\infty}^{\infty} \delta(y - jp_y - o_y), \quad (127)$$

where $o_{xy}=(o_x, o_y)$ is the lattice offset vector.

4. We define a surface geometry function $S_1(x, y)$ as a representation of structure S1 of the IRG and which describes the distance in the z-direction that the structure protrudes from the plane of the grating as a function of (x, y)-coordinate. Similarly, we define a function $S_2(x, y)$ as a representation of structure S2 of the IRG. The functions $S_1(x, y)$ and $S_2(x, y)$ may be a mathematical function, an output from a computational algorithm, a grid or mesh of discrete values combined with an interpolation scheme, or a set of parametric surfaces such as Non-Uniform Rational B-Spline surfaces. Importantly, for the definition here the functions $S_1(x, y)$ and $S_2(x, y)$ should return only a single value for each (x, y)-coordinate input. Both $S_1(x, y)$ and $S_2(x, y)$ are defined to have non-zero values only within a rectangular region in the xy-plane of the same size and orientation as the IRG unit cell, which is a rectangle of length $p_x$ in the x-direction and length $p_y$ in the y-direction. Typically this region is centred on the origin (0,0) but this does not have to be the case.

5. Based on the representation of the lattice L1 and structure S1 we may represent the periodic structure PS1 by a periodic surface geometry function $P_1(x, y)$, which is defined to be the convolution of the lattice function $L_1(x, y)$ with the structure function $S_1(x, y)$, $$P_1(x,y)=L_1(x,y)*S_1(x,y). \quad (128)$$

Here the symbol a(x, y)*b(x, y) indicates a two-dimensional convolution of the functions a( ) and b( ) on the (x, y) space. $P_1(x, y)$ describes the distance in the z-direction that the periodic structure protrudes from the plane of the grating as a function of (x, y)-coordinate. Similarly, the periodic structure PS2 may be represented by the periodic surface geometry function $$P_2(x,y)=L_2(x,y)*S_2(x,y). \quad (129)$$

Executing the convolutions in equations (128) and (129) provides $$P_1(x, y) = \sum_{i=-\infty}^{\infty} \sum_{j=-\infty}^{\infty} C(ip_x, jp_y)S_1(x - ip_x, y - jp_y), \quad (130)$$

and $$P_2(x, y) = \sum_{i=-\infty}^{\infty} \sum_{j=-\infty}^{\infty} C(ip_x, jp_y)S_2(x - ip_x - o_x, y - jp_y - o_y). \quad (131)$$

Note these definitions ensure that the IRG will always include whole copies of structures S1 and S2.

6. The IRG is constructed by combining PS1 and PS2 together and is represented by the IRG surface function I(x, y). This describes the distance in the z-direction that the combined periodic structure protrudes from the plane of the grating as a function of (x, y)-coordinate. The combination of the periodic structure functions $P_1(x, y)$ and $P_2(x, y)$ may be performed by a variety of methods. The simplest approach is to add the structures giving $$I(x,y)=P_1(x,y)+P_2(x,y). \quad (132)$$

However, overlapping regions where both structure functions are non-zero will lead to the structures stacking on top of each other. This may not reflect either design intent or be consistent with manufacturing limitations. A more general method of combination may be defined by use of a masking function defined as:

$$mask(x) = \begin{cases} 1 & \text{if } |x| > 0 \\ 0 & \text{if } x = 0 \end{cases}. \quad (133)$$

By computing the product of mask functions evaluated for each periodic structure at a given (x, y)-coordinate, $mask(P_1(x, y))\times mask(P_2(x, y))$, we may mathematically identify parts of the grating where the two structures overlap. In order to determine the IRG surface function at overlapping regions we may define a combiner function X(a, b) which may be constructed from a variety of expressions according to the requirements and intent of the representation. Valid definitions for the combiner function include, but are not limited to the following examples:

$$\text{Sum Combiner: } X_{sum}(a, b) = a + b \quad (134)$$
$$\text{Difference Combiner, variant 1: } X_{d1}(a, b) = a - b \quad (135)$$
$$\text{Difference Combiner, variant 2: } X_{d2}(a, b) = b - a \quad (136)$$
$$\text{Absolute Difference Combiner: } X_{ad}(a, b) = |a - b| \quad (137)$$
$$\text{Average Combiner: } X_{av}(a, b) = \frac{1}{2}(a + b) \quad (138)$$
$$\text{Minimum Combiner: } X_{min}(a, b) = \begin{cases} a & \text{if } a < b \\ b & \text{if } a \geq b \end{cases} \quad (139)$$
$$\text{Maximum Combiner: } X_{max}(a, b) = \begin{cases} a & \text{if } a > b \\ b & \text{if } a \leq b \end{cases} \quad (140)$$
$$\text{First Element Preference Combiner: } X_{1st}(a, b) = a \quad (141)$$
$$\text{Second Element Preference Combiner: } X_{2nd}(a, b) = b \quad (142)$$

The IRG surface function may then be defined as $$I(x,y)=[1-mask(P_1(x,y))mask(P_2(x,y))][P_1(x,y)+ P_2(x,y)] \ldots +mask(P_1(x,y))mask(P_2(x,y)) X(P_1(x,y),P_2(x,y)). \quad (143)$$

For some representations it may be helpful to allow the periodic structure functions to have a range of values such that it is difficult to use z=0 as the criterion for determining whether both structures are present and so whether an overlap has occurred. Instead, a masking function may be defined based on detection of a specially designated value $\xi$, chosen to be easily distinguished from the range of values of $P_1(x, y)$ and $P_2(x, y)$ required to represent the intended structures. In this case the mask function may now be defined as $$mask(x) = \begin{cases} 0 & \text{if } x = \xi \\ 1 & \text{otherwise} \end{cases}. \quad (144)$$

If the IRG surface function is defined to have a value of $P_0$ at regions where both periodic structure functions are undefined, then the IRG function may now be defined as $$I(x,y)=(1-\text{mask}(P_1(x,y)))(1-\text{mask}(P_2(x,y)))P_0 \ldots$$
$$+\text{mask}(P_1(x,y))(1-\text{mask}(P_2(x,y)))P_1(x,y) \ldots$$
$$+\text{mask}(P_2(x,y))(1-\text{mask}(P_1(x,y)))P_2(x,y) \ldots$$
$$+\text{mask}(P_1(x,y))\text{mask}(P_2(x,y))X(P_1(x,y),P_2(x,y)). \quad (145)$$

This completes the description of a layer of geometry of the IRG. Multiple layers may be computed by following the same procedure. These layers may be shifted in position with respect to each other by applying a position shift to the IRG surface functions, where such shifts may be in the x-, y- and/or z-direction.

In the representation scheme above both $S_1(x, y)$ and $S_2(x, y)$ are defined to only have non-zero values within a rectangular region of the same size as the IRG unit cell of the IRG. Typically this region is centred on the origin (0,0) but this does not have to be the case. Outside this rectangular region both $S_1(x, y)$ and $S_2(x, y)$ are zero by definition. This may be forced by use of the rectangle function, rect(x) defined as $$rect(x) = \begin{cases} 1 & |x| < \frac{1}{2} \\ \frac{1}{2} & |x| = \frac{1}{2} \\ 0 & \text{otherwise} \end{cases} \quad (146)$$

If S'(x, y) is a function that does not respect the rules regarding being zero-valued outside the IRG unit cell, then a suitable truncated version of this function, centred on the origin (0,0) is given by $$S(x, y) = rect\left(\frac{x}{p_x}\right)rect\left(\frac{y}{p_y}\right)S'(x, y). \quad (147)$$

On its own equation (147) constrains the extent of any structures defined by $S_1(x, y)$ and $S_2(x, y)$. However, for some systems it may be desirable to represent structures that extend beyond the limits of the IRG unit cell as this may bring advantageous properties for the performance of the IRG. From the definition of our periodic structures we know that everything about the shape of the structure may be represented within a unit cell of the IRG. Therefore, in order to represent long structures we require a method of accommodating them within a single unit cell.

Figure 15A:
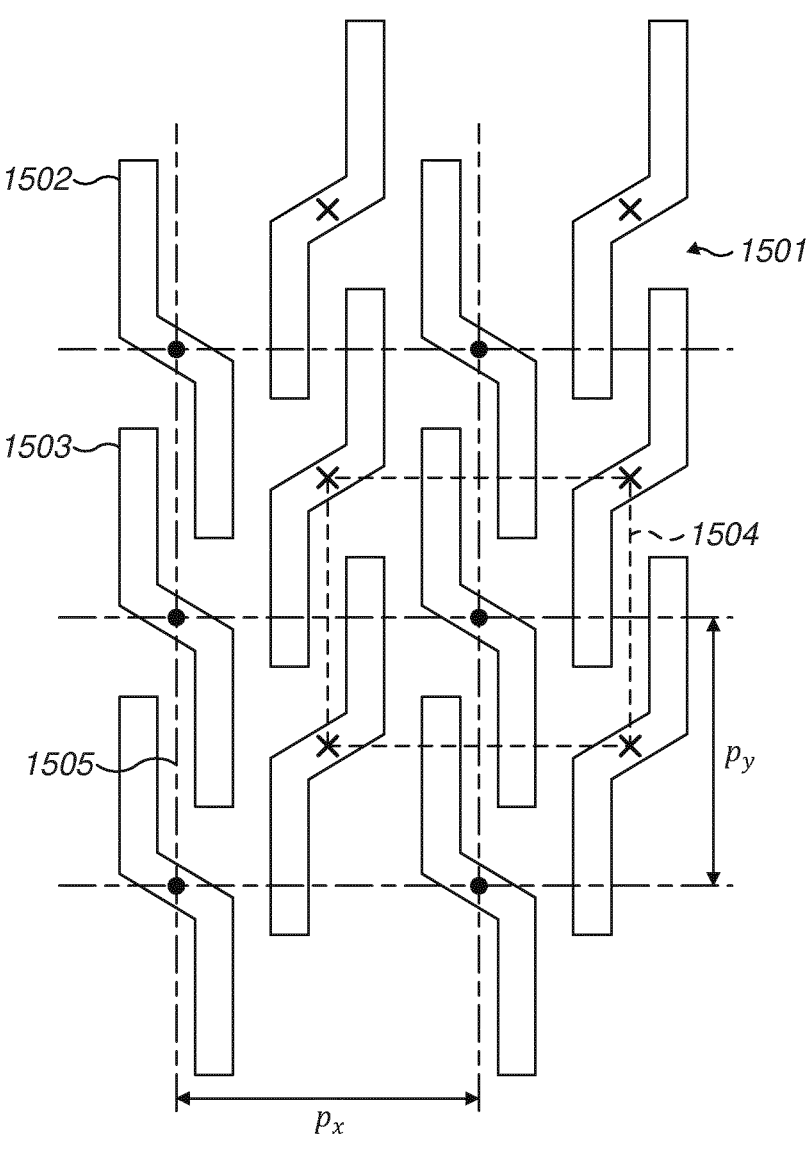
FIG. 15a shows a top view of part of an interleaved rectangular grating with individual structures longer than the unit cell of the grating.

FIG. 15a shows a top view of a part of an IRG 1501 where structures S1 and S2 consist of pillars 1502 and 1503, respectively, that have an extent in the y-direction that is longer than the y-dimension of the IRG unit cell. A rectangular region 1504 of dimensions equal to the IRG unit cell may be drawn around one of the copies of structure S1, similarly a rectangular region 1505 may be drawn around one of the copies of structure S2. A suitable structure function $S_1(x, y)$ that is entirely defined within a unit cell rectangle 1504 may be defined by finding the parts of the periodic array of structures PS1 that lies within the rectangle 1504.

Figures 15B, 15C:
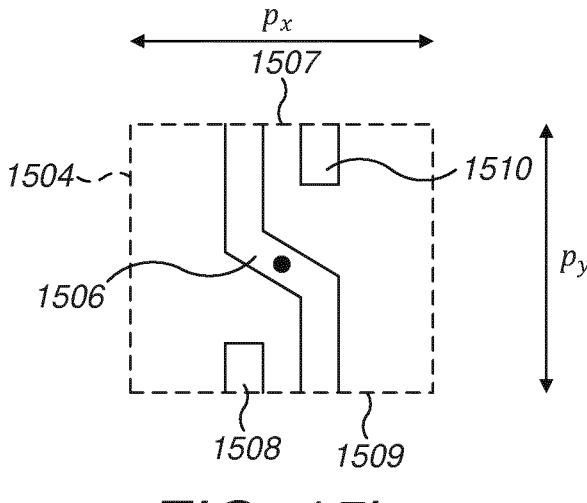
FIG. 15b shows a unit cell for a periodic structure consisting of individual structures that are longer than the unit cell.
FIG. 15c shows a single structure overlapping adjacent regions with the same size and shape as the unit cell.
Figure 15D:
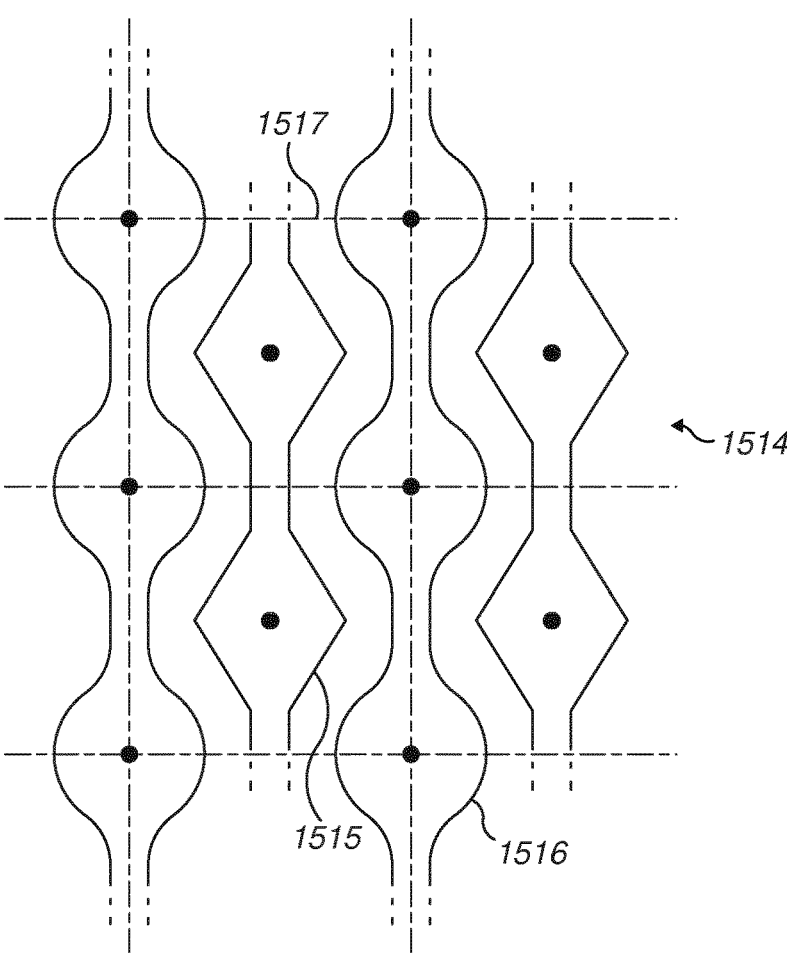
FIG. 15d shows a top view of an interleaved rectangular grating with structures that join up to make continuous periodic features.
Figure 15E:
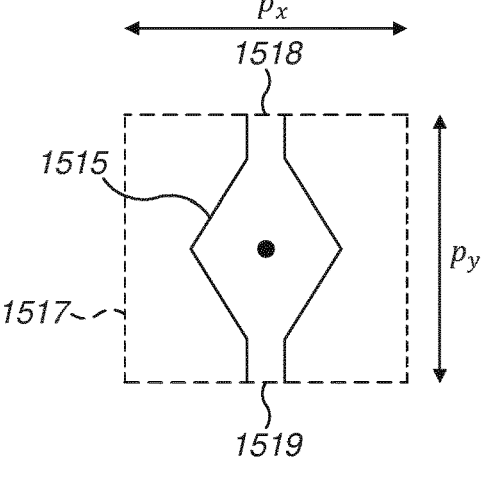
FIG. 15e shows a unit cell of a structure that will join up to form continuous periodic features.

FIG. 15b shows the periodic structure PS1 of the IRG 1501 lying within the rectangle 1504. A copy of structure S1 1506 lies at the centre of the rectangle and extends beyond the top and bottom edges of the structure. To form the structure function $S_1(x, y)$ we first crop structure S1 where it crosses the top edge 1507 and the bottom edge 1509. The unit cell is completed by adding the parts of vertically adjacent copies of structure S1 where they overlap the rectangle 1504 leading to extra features at the bottom 1508 and top 1510 of the structure function $S_1(x, y)$. An equivalent procedure may be applied for structure function $S_2(x, y)$ within the rectangle 1505 and also for structures which extend beyond the x-direction limits of the unit cell length, or structures that extend beyond both the x- and y-direction limits of the unit cell rectangle.

A mathematical representation of this process may be constructed by taking the sum of shifted versions of a structure function that describe the whole structure but cropping each of these to the unit cell rectangle. FIG. 15c shows a single structure S1 1513 placed at the centre of the unit cell rectangle 1504, additional rectangles with the same size as 1504, 1511 and 1512, are placed at the top and bottom of 1504, respectively, as shown. The portion of S1 that must be wrapped into the rectangle 1504 can be seen within each of these rectangles. Mathematically, if S'$_1$(x, y) is a function describing a structure that extends beyond the unit cell rectangle, then the structure function correctly limited to a single unit cell, $S_1(x, y)$, is given by $$S_1(x, y) = rect\left(\frac{x}{p_x}\right)rect\left(\frac{y}{p_y}\right)[S_1'(x, y) + S_1'(x, y - p_y) + S_1'(x, y + p_y)]. \quad (148)$$

Here it is assumed that S'$_1$(x, y) has a value of zero outside the parts that are wanted of the structure. If a value of $\xi$ is used instead to indicate a lack of structure, then masking functions may be employed leading to the expression $$S_1(x, y) = rect\left(\frac{x}{p_x}\right)$$
$$rect\left(\frac{y}{p_y}\right)[\text{mask}(S_1'(x, y))S_1'(x, y) + \text{mask}(S_1'(x, y - p_y))S_1'(x, y - p_y) +$$
$$\text{mask}(S_1'(x, y + p_y))S_1'(x, y + p_y) + \xi(1 - \text{mask}(S_1'(x, y)))$$
$$(1 - \text{mask}(S_1'(x, y - p_y))) \times (1 - \text{mask}(S_1'(x, y + p_y)))]. \quad (149)$$

Equations (148) and (149) may be generalised to as many adjacent rectangles as necessary to ensure that a structure is correctly represented by a structure function confined within a single unit cell. For example, if extension is required into the 8 rectangles surrounding the unit cell rectangle (horizontal and vertical edges, plus diagonal corners), and if S'(x, y) is a function describing the extended structure, then the structure function wrapped into a unit cell sized rectangle is given by $$S(x, y) =$$
$$rect\left(\frac{x}{p_x}\right)rect\left(\frac{y}{p_y}\right)[S'(x, y) + S'(x - p_x, y - p_y) \ldots + S'(x, y - p_y) +$$
$$S'(x + p_x, y - p_y) + S'(x - p_x, y) \ldots + S'(x + p_x, y) +$$
$$S'(x - p_x, y + p_y) + S'(x, y + p_y) \ldots + S'(x + p_x, y + p_y)]. \quad (150)$$

Here it is assumed that parts without structure are indicated by S'(x, y)=0, again, if an alternative value is used to indicate a lack of structure, then mask functions may be used as demonstrated by equation (149).

If the structures S1 or S2 overlap each other within their own periodic structures when repeated over their respective lattices, then in the procedure outlined here the resulting structure will have the sum of the heights of the overlapping components. This does not preclude use of this procedure but should be born in mind when designing structures and considering their suitability once repeated as a periodic structure.

As well as extending beyond the IRG unit cell it is also possible for the periodic structures PS1 and PS2 to be composed of continuous structures. In this case the appropriate structure function would be one that is defined entirely within a rectangle of dimensions equal to the IRG unit cell, with the structure function defined so that opposite edges align with each other to join up and form a continuous structure. FIG. 15$d$ shows an IRG 1514 composed of structures 1515 and 1516 which are continuous in the y-direction for both periodic structure PS1 and PS2, respectively. FIG. 15$e$ shows a suitable structure S1 for creating the periodic structure PS1 as defined within a rectangle of dimensions equal to the unit cell 1517. The edges of the structure 1518, 1519 are such that a single continuous structure is formed when the unit cells are placed adjacent to each other. Essentially, we note that a continuous structure is simply an isolated structure of a size and shape within the unit cell that when repeated across the periodic array is contiguous with copies of itself and thus forms a continuous structure. Thus, the definition of the interleaved rectangular grating can include continuous structures as well as isolated structures.

A common class of structures consists of one or more shape profiles that are extruded in the z-direction to form pillars. If a structure is formed from pillars that are all extruded to the same height, then the resulting structure is often referred to as a binary structure. If the profile of a pillar can be described in the xy-plane as a polar function of angle $\rho(\theta)$, then a suitable definition for a suitable structure function S(x, y) is given by $$S(x, y) = hrect\left(\frac{\sqrt{x^2 + y^2}}{2\rho(atan2(y, x))}\right),$$ \hfill (151)

where h is the height of the pillar and we have used $\theta$=a tan 2(y, x). Here, a tan 2(y, x) is the quadrant-sensitive arctangent function to find the value of the polar angle $\theta$ when converting from Cartesian (x, y)-coordinates to polar ($\rho$, $\theta$)-coordinates. In another approach to describe an extruded surface geometry we can define an N-sided polygon P as a list of (x, y)-coordinates for the N vertices of the polygon, where $P_{xy}$={$(x_1, y_1)$, $(x_2, y_2)$, . . . , $(x_N, y_N)$} is a list of the (x, y) coordinate pairs of polygon P. We can then define a function, pip(x, y, $P_{xy}$), with the following properties:

$$pip(x, y, P_{xy}) = \begin{cases} 1 & \text{if the point } (x, y) \text{ is inside or on polygon } P \\ 0 & \text{if the point } (x, y) \text{ is outside polygon } P \end{cases}$$ \hfill (152)

For a single structure the corresponding structure function S(x, y) would therefore be $$S(x,y)=hpip(x,y,P_{xy}).$$ \hfill (153)

Multiple structures where the height of the ith structure is given by $h_i$ and the x- and y-coordinates of the polygon of the ith structure are given by $P_{xy}^{(i)}$, can be represented by the structure function $$S(x, y) = \sum_{i=1}^{M} h_i pip\left(x, y, P_{xy}^{(i)}\right),$$ \hfill (154)

where M is the number of elements in the structure. In this way a sophisticated multiple element structure may be created. It should be noted that this approach may also be applied to create a multilevel structure. By defining polygons which lie on top of each other equation (154) may be used to represent a multilevel structure.

Having constructed a surface representation via mathematical formulae it is often necessary to convert this representation into a format suitable for other purposes such as simulation or fabrication. The necessary format is dictated by the requirements of the process, but there are many methods available to those skilled in the art which may be applied in a straightforward fashion.

For example, some uses may require the grating to be represented as a mesh of triangular polygons. A mathematical representation may be converted into a mesh format by first constructing a mesh of triangles in the xy-plane and at each vertex on this mesh evaluating the mathematical function to obtain the z-value of the mesh. The result will be a contoured mesh of triangles that approximates the mathematical function. Such a representation will necessarily be an approximation of the true geometry; for example, infinitely steep walls in the structure caused by a sudden step in z-values will be limited by the choice of mesh resolution around such transitions. However, the resolution of a grid may be adjusted such that the difference between the approximate and true representations are essentially negligible for practical purposes.

Some uses may require a voxel-based representation of a grating. A voxel-based description is provided as a three-dimensional grid of coordinates where at each coordinate one or more value of interest is described. Such values would typically be material properties relevant for the interaction with electromagnetic radiation, such as electric permittivity.

A voxel representation may be constructed by first creating a three-dimensional grid of size and resolution dictated by the requirements. The grid is deemed to describe to the corner vertices of a set of contiguous three-dimensional cuboids which are the voxels of the representation. Each voxel has associated with it a Cartesian ($x_i$, $y_i$, $z_i$)-coordinate for the centre of the cuboid, typically computed as the arithmetic mean of the coordinates for the corner vertices, and a set of properties {$V_i$} relevant to the requirements of the use for the representation, such as values of intrinsic optical properties and/or an index value describing the material at that voxel. Note here the index i is used to denote the ith voxel of the representation.

Conversion of a mathematical representation into a voxel space may then be accomplished by iterating through all the voxels and for each voxel comparing the z-value of the voxel centre with the value of the function at that point, in accordance with the material assignations of the geometry of the surface representation.

For example, suppose an IRG composed of a material with refractive index $n_2$ is placed on a substrate with a material of refractive index $n_1$ and surrounded by a medium with refractive index $n_0$. If the substrate surface sits at z=0 and the definition of the IRG function I(x, y) is such that I(x, y)>0 $\forall$(x, y), then we know that where z≤0 the material of the system is that of the substrate and where z>I(x, y) the material will be that of the surroundings. In-between these limits the material will be that of the IRG.

Thus for the ith voxel with coordinates $(x_i, y_i, z_i)$ we can determine the refractive index $n_i$ by the following equation $$n_i = \begin{cases} n_1 & \text{if } z_i \leq 0 \\ n_2 & \text{if } 0 < z_i \leq I(x_i, y_i) \\ n_3 & \text{if } z_i > I(x_i, y_i) \end{cases} \quad (155)$$

This procedure may be applied over the complete set of properties $\{V_i\}$ by substitution of the refractive index values for the values of the relevant properties. Alternatively, in some systems one may use equation (155) but substitute the refractive indices with index values corresponding a selection of a material. A separate look-up table of material property values may then be associated with each material index value. As with a mesh representation, a voxel-based representation will in general be an approximation of the original representation, but by adjusting the resolution of the voxel grid the differences may be made negligible from a practical point of view.

Ultimately the accuracy of any numerical representation will be dictated by limits to computational resources such as memory and computing power. Fortunately, it has been found that the computing power of modern personal computers is sufficient to handle a wide range of designs and representations with sufficient precision.

Method for the Design and Representation of Interleaved Rectangular Grating Geometry Based on Three-Dimensional Geometry Modelling Techniques The procedure leading to the IRG surface function given in equation (143) requires that the resultant surface geometry has a single z-value at each (x, y)-coordinate. This precludes the description of certain geometries, such as those that feature structures where the geometry has more than one z-value at some (x, y)-coordinates such as undercut geometries or highly slanted faces. Instead of seeking a mathematical description for the structures S1 and S2 we could instead build these structures using methods developed for the design of three-dimensional geometry such as employed in three-dimensional computer aided design systems (3D CAD) or three-dimensional computer graphic systems.

These systems typically provide a wide variety of geometry modelling processes for the construction and manipulation of three-dimensional geometry, including tools for extruding, lofting and sweeping 2D profiles, 3D geometry primitives such as cuboids, cylinders, ellipsoids and tetrahedra, tools for the generation and manipulation of polygon meshes and tools for the creation and manipulation of curved surfaces including those based on non-uniform rational B-splines (NURBS), which can be used to represent a wide range of geometry. Typical computer modelling systems also provide extensive tools for trimming, stitching, blending, distorting and otherwise manipulating geometries as well as tools for combining geometries via operations such as geometric union (also called Boolean union, Boolean combine and addition in various modelling systems), geometric intersection and geometric subtraction. By applying such geometry modelling and creation tools successively and by combining multiple elements a wide range of geometries complex three-dimensional structures may be created.

Commercially available software demonstrating geometry creation and modification methods described here are widely available and include SolidWorks® (Dassault Systèmes SolidWorks Corporation), Catia (Dassault Systèmes SE), Autodesk Maya (Autodesk, Inc). Examples of open-source software include the Blender project and FreeCAD (both licensed under GPLv2+).

Generally speaking, geometry modelled in a given system may be exported in a number of vendor-neutral file formats. Suitable formats capable of describing a diverse range of types of geometry include the Initial Graphics Exchange Specification (IGES) file format, and the Standard for the Exchange of Product model data (STEP) file format. For data converted into polygon meshes files such as stereo-lithography (STL) file format from 3D Systems Corporation and the Polygon File Format (PLY) developed at Stanford University. Such files may then be imported for use in simulation and manufacturing software. Specifications for these file formats are publicly available, thus if a given system does not support the required format it is possible to write a software module to import the data and parse it into a suitable format for the onward purpose, such as simulation of the scattering properties of a grating design based on the geometry described or production of a manufacturing tool to create a physical world embodiment of a design. Such an importation routine could also perform labelling of the material types of the different entities described by a file, allowing for the assignment of material properties and labels as may be required.

It is important to appreciate that although these systems are intended for the creation of much larger structures, it is straightforward to incorporate a scaling function in a simulation tool which uses geometry created by such systems. For example, 1 mm in a CAD system could be scaled to correspond to 1 nm in a simulation system. It is also important to appreciate that only a single unit cell of the IRG need be modelled in a CAD system and exported into a simulation or other design tool. Replication of the structure to a full array may then be performed, as required, although for some purposes, such as simulation of the scattering of electromagnetic waves from a periodic structure, only a single unit cell is normally required due to the invocation of periodic boundary conditions as part of the simulation process.

Figure 16A:
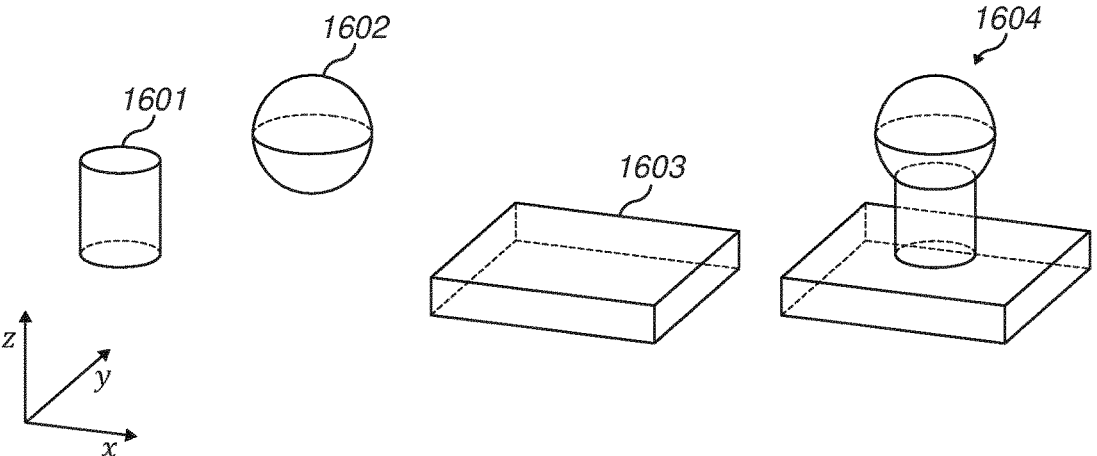
FIGS. 16a-c shows perspective views of methods for the geometric construction of grating structures.

By way of example FIG. 16a shows a cylindrical structure 1601, a spherical structure 1602 and a cuboid structure 1603. By placing the sphere 1602 at the end of the cylinder 1601 and performing a geometric union operation followed by placing the result on the cuboid 1603 and performing another geometric union operation the composite structure 1604 may be created. Such a structure could be used as structure S1 or S2 of an IRG.

Structures S1 and S2 must be constructed in a way such that in the x- and y-directions they are each entirely defined within a rectangular region of the xy-plane of dimensions and orientation equal to the IRG unit cell. This may require the use of copy and trim operations to take parts of structures which overlap the edges of the IRG unit cell to create a version of the structures that lie within the IRG unit cell. For example, the extended structure 1502 forming part of the IRG 1501 shown in FIG. 15a can be replaced by the modified multi-element structure shown in FIG. 15b and which is entirely defined within a single unit cell 1504. This modified structure is formed by taking three successive copies of structure 1501 from vertically adjacent unit cells and trimming the structures so that only the portions that lie within a single unit cell remain. Such a geometry editing procedure is straightforward with modern three-dimensional modelling tools such as those mentioned above.

In this method the periodic structures PS1 and PS2 will be created by a straightforward pattern replication operation where a copy of structure S1 is placed at each point of the lattice L1 of the IRG and a copy of structure S2 is placed at each point of the lattice L2 of the IRG. This is an analogy with the convolution operation shown in equations (128) and (129). A geometric union operation of adjacent copies of structure S1 and S2 may be used to join the structures together to form periodic structures PS1 and PS2, respectively.

Figure 16B:
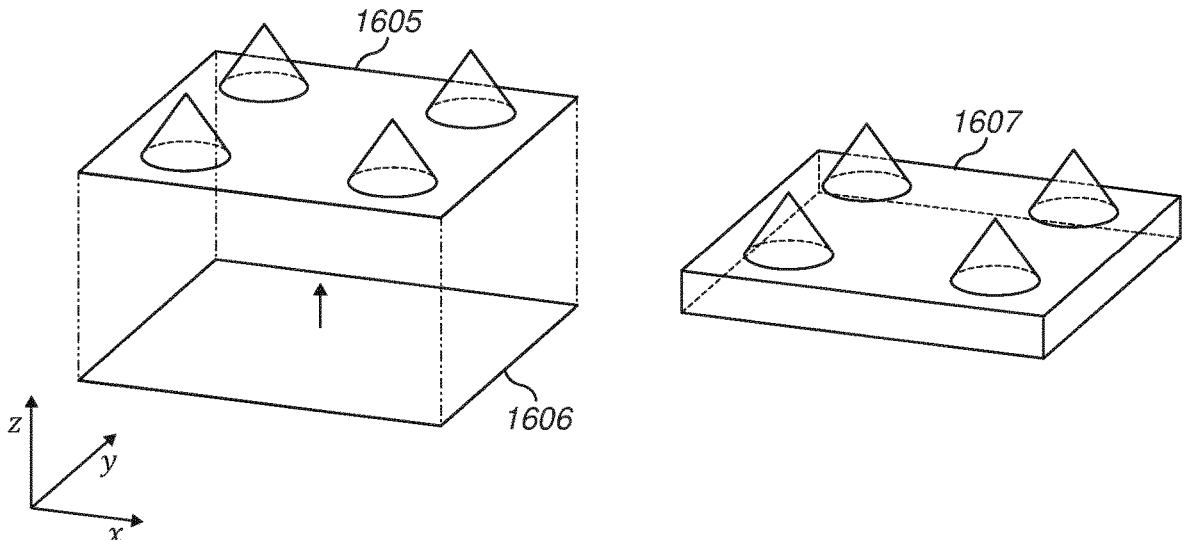

The IRG is formed from a combination of periodic structures PS1 and PS2. In this method some consideration must be given to how overlapping regions of PS1 and PS2 are handled when constructing the IRG. Generally this combination will be a geometric union of the structures. If PS1 and PS2 consist of closed geometries it is possible to perform tests to see if the geometry of one part lies within the other and so determine the appropriate trim and stitch operations required to create the geometry union. If open surfaces are used for PS1 and PS2 it is generally advantageous to add extra geometry to the representation to create one of more closed bodies, that is bodies where all the surfaces join to close around a finite volume, so that operations such as geometric union may be applied correctly in three dimensions. One method is to use an extrusion operation from a plane parallel to the xy-plane. FIG. 16*b* shows part of an unclosed surface 1605 representing a periodic structure of protrusions in the z-direction. The profile of surface 1605 on a plane parallel to the xy-plane may be used to define a planar surface 1606. Extruding in the z-direction from the surface 1606 up to the surface 1605 creates the enclosed geometry 1607, which is suitable for geometric union operations.

In some embodiments an IRG will be a surface relief structure on a substrate. Such a combination may be accomplished by a geometric union between the IRG and a cuboid with one face parallel to the xy-plane of the IRG. If the substrate has different optical properties to the IRG, such as due to being composed of a different material, then the boundaries between the substrate and IRG must be maintained in the geometric representation and a method must be chosen to determine whether the optical properties of overlapping geometries between the substrate and the IRG with those of the substrate, the IRG or some combination of the two. For such an IRG to be physically realisable it is necessary for all parts of the surface relief structure to be joined in some way to the substrate.

Figure 16C:
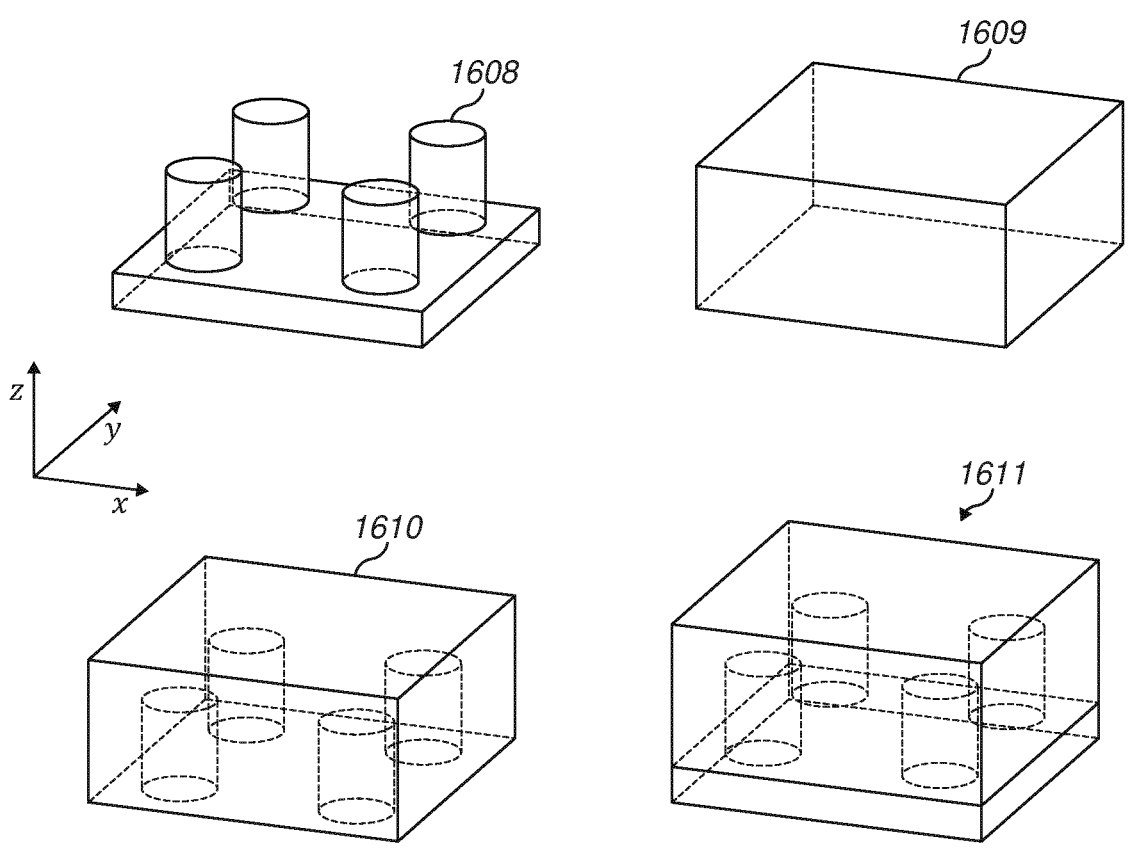
Figure 16D:
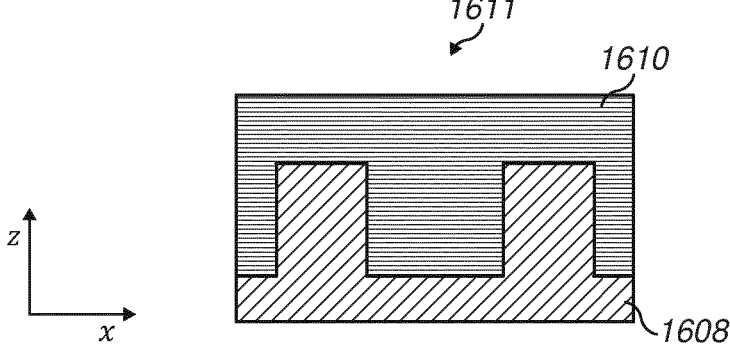
FIG. 16d shows a cross-sectional view of a surface relief grating structure embedded inside a medium.

In other embodiments an IRG will be embedded in a medium M, such as the substrate itself, where the optical properties of the medium and the IRG differ in at least one aspect. FIG. 16*c* shows a surface relief structure 1608 which is to be embedded inside a medium M. A geometry representation of the medium M may be constructed by extruding a 2D profile in the xy-plane in the z-direction. The resulting slab 1609 should have an extent in the x-, y- and z-directions of at least those of the IRG. A representation that combines the medium M and the IRG may be accomplished by first performing a geometric subtraction of a copy of the surface relief structure 1608 from the slab 1609, resulting in a slab with the IRG geometry cut out of it 1610. A geometric union of this cut slab 1610 and the surface relief structure 1608, where internal faces between the IRG and the slab SL are preserved, will complete the representation of the composite embedded structure 1611. FIG. 16*d* shows a cross-sectional view of the composite embedded structure 1611, showing the regions of the cut medium 1610 and the surface relief structure 1608.

A representation of an IRG constructed out of various 3D geometries may also need to be converted into other representations for other purposes such as simulation and fabrication. A mesh-based representation may be achieved by using various well-established tessellation methods to convert various geometries into approximations constructed from triangular polygons. A voxel-based representation may be constructed by considering whether the central coordinate of each voxel lies within the geometry for the IRG. Based on such a test the properties associated with the voxel may be set to those of the IRG material or the surrounding material accordingly.

Methods for the Modification of the Geometry of Interleaved Rectangular Gratings In some instances it is useful to apply modifications to a geometry representation. Such modifications may be appropriate in order to have a geometry that better matches the limits of manufacturing processes or may be analogous to steps of a manufacturing process. A modification may be a mathematical transformation of a surface described by a mathematical formula, 2D and 3D geometry primitives or a derived geometric mesh. Alternatively, a modification may be an algorithm which performs an analysis of the input geometry and computes a derived result based on this. Some modifications may be applied selectively to just part of the geometry of the IRG. Furthermore, many modifications can be applied sequentially, with the input to one modification taking the geometry output from another. If the modifications are representative of fabrication processes, then by this approach complex geometrical features which are also practically realisable by current manufacturing methods may be created. Modifications need not be applied to an entire IRG and instead may be applied to the structures S1 and S2 or the periodic structures PS1 and PS2 before constructing the IRG. Some examples of geometry modifications are provided as follows:

i) Linear Coordinate Transformation: A range of transformations of a system may be derived based on a linear transformation of coordinates. Essentially a set of new (x', y', z')-coordinates may be derived from an input set of (x, y, z)-coordinates according to the relationship $$(x',y',z')^T = M \cdot (x,y,z)^T \tag{156}$$

where M is a 3×3 transformation matrix which completely describes the transform and $x^T$ denotes the transpose of the vector or matrix x. Such a transformation may be applied to the results of a mathematical function representation or the coordinates associated with a mesh representation. Particularly notable transformations include:

a. Scale transform—Scaling of the geometry in the x-, y- and z-directions by a factor of $S_x$, $S_y$, and $S_z$, respectively, is achieved by the transformation matrix $$M_{scl} = \begin{pmatrix} S_x & 0 & 0 \\ 0 & S_y & 0 \\ 0 & 0 & S_z \end{pmatrix}. \tag{157}$$

b. Rotation about z-axis—Counter-clockwise rotation of the geometry about the z-axis by an angle $\gamma$ is achieved by the transformation matrix $$M_{rotz} = \begin{pmatrix} \cos\gamma & \sin\gamma & 0 \\ -\sin\gamma & \cos\gamma & 0 \\ 0 & 0 & 1 \end{pmatrix}. \tag{158}$$

Figures 17A, 17B:
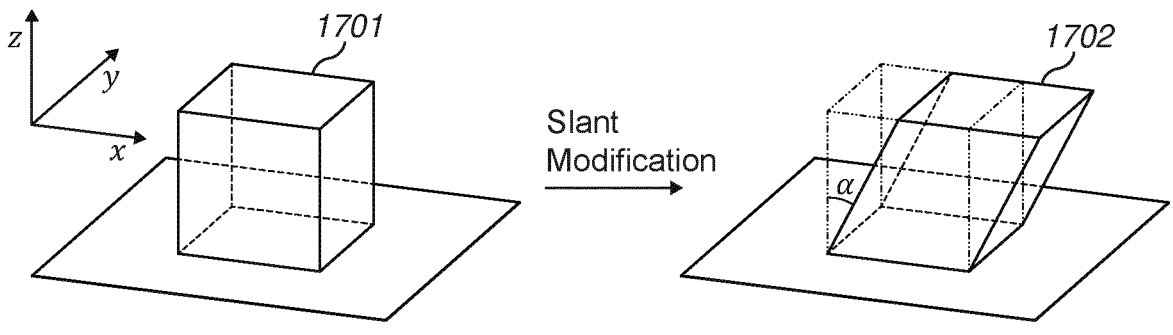
FIG. 17a shows a perspective view of modification of structures that introduces a height dependent slant of the structures.
FIG. 17b shows a perspective view of modification of structures by adding various types of draft to the side wall of the structures.

Rotations about the x- and y-axes are also possible, and may be relevant for isolated structures, but are not appropriate for application to an entire IRG owing to the constraint that the lattice of the grating is parallel to the xy-plane. Such rotations may be applicable, however, for the structures S1 and S2.

c. Slant Modification—FIG. 17a shows a perspective view of a single surface relief structure 1701 as an example of an single element of an IRG. By applying a shift to the position of this structure as a function of height above the xy-plane a slanted structure 1702 may be derived. Such a slant is achieved by the transformation matrix $$M_{slant} = \begin{pmatrix} 1 & 0 & \tan\alpha \\ 0 & 1 & \tan\beta \\ 0 & 0 & 1 \end{pmatrix}, \tag{159}$$

where $\alpha$, $\beta$ are the angles of the slant as projected onto the xz- and yz-planes, respectively. In the example shown in FIG. 17a $\beta$=0. Skew operations within the xy-plane, or between all three coordinate axes are also possible, but will affect the grating vectors of the IRG or render the lattice of the grating no longer parallel to the xy-plane. Such skew operations may be applicable, however, for the structures S1 and S2.

Figure 17C:
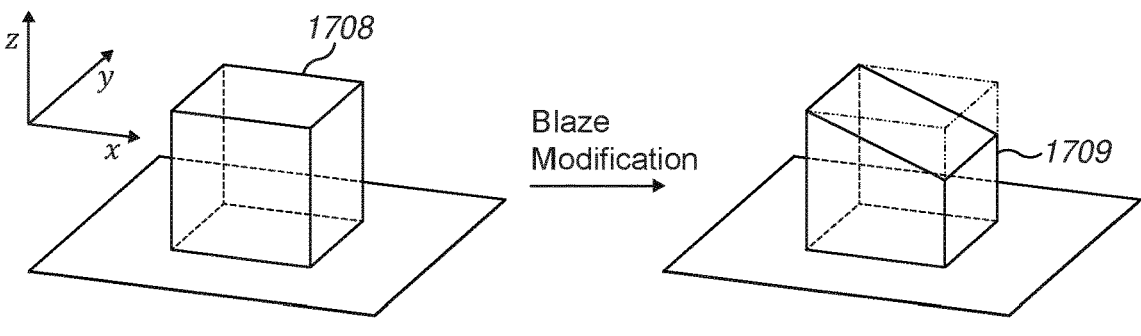
FIG. 17c shows a perspective view of modification of structures that introduces blaze to the top surface of the structures.
Figure 17D:
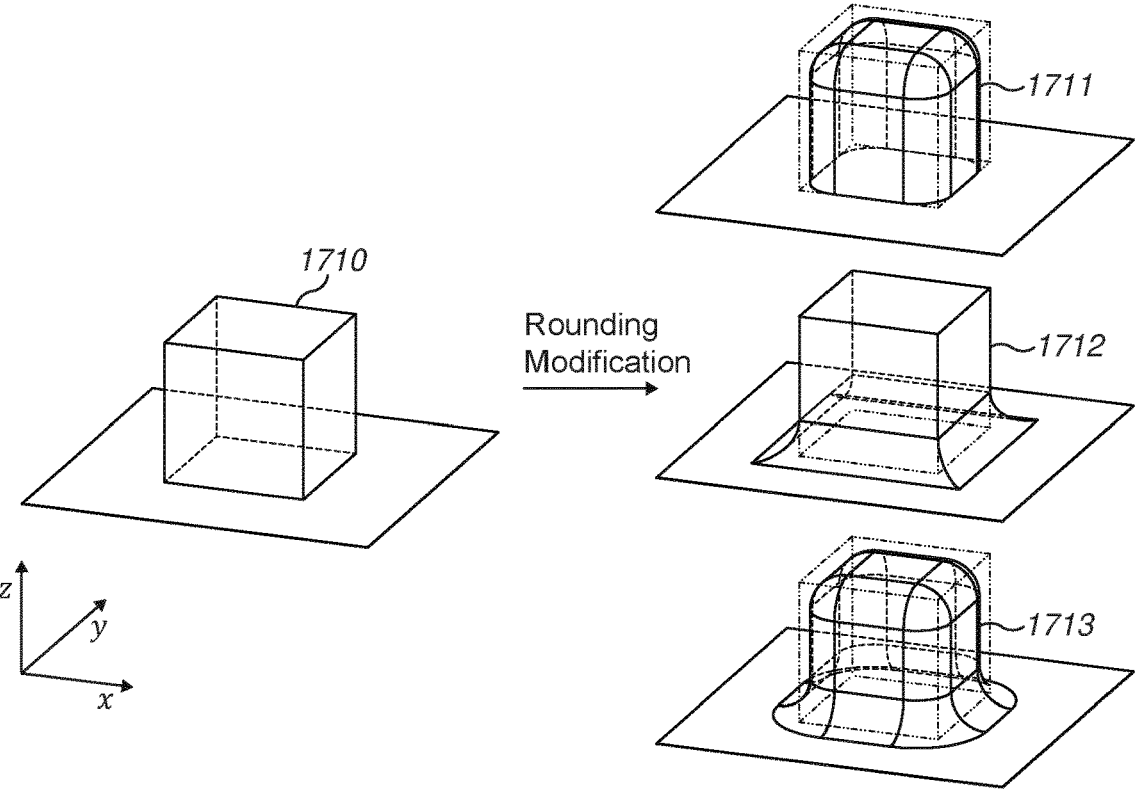
FIG. 17d shows a perspective view of modification of structures that rounds the corners and/or edges of the structures.
Figure 17E:
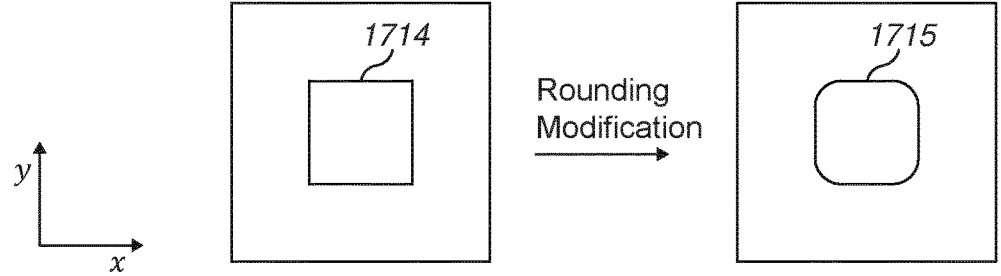
FIG. 17e shows a top view of modification of structures that rounds the cross-section profile of structures when viewed in the plane of a grating with which the structures will be associated.
Figure 17F:
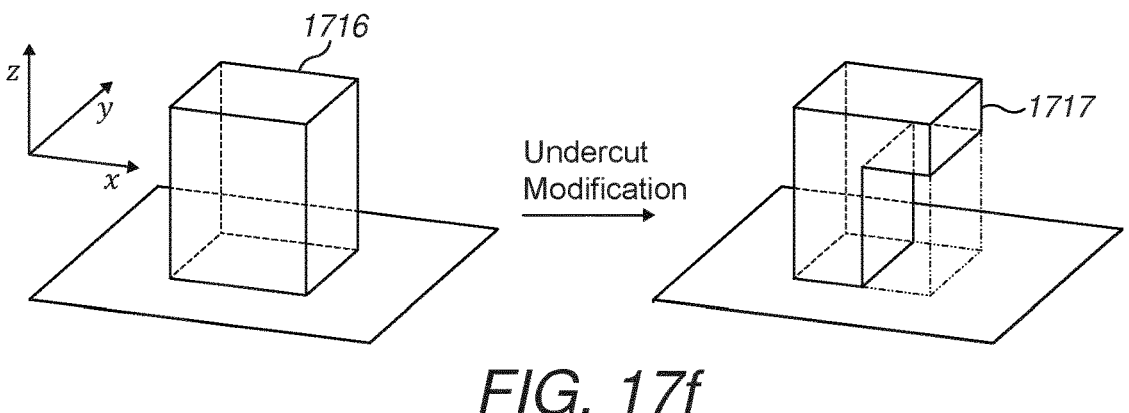
FIG. 17f shows a perspective view of modification of structures that introduces an undercut in the structure.
Figure 17G:
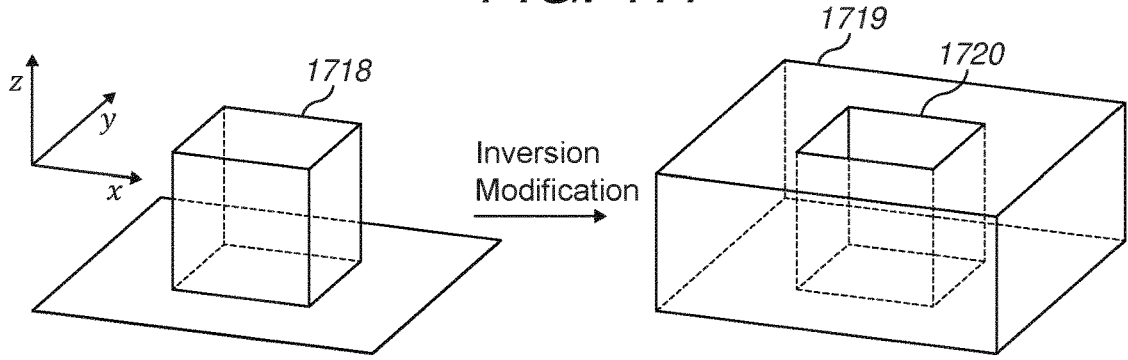
FIG. 17g shows a perspective view of modification of structures that produces the inverse of a structure.
Figure 17H:
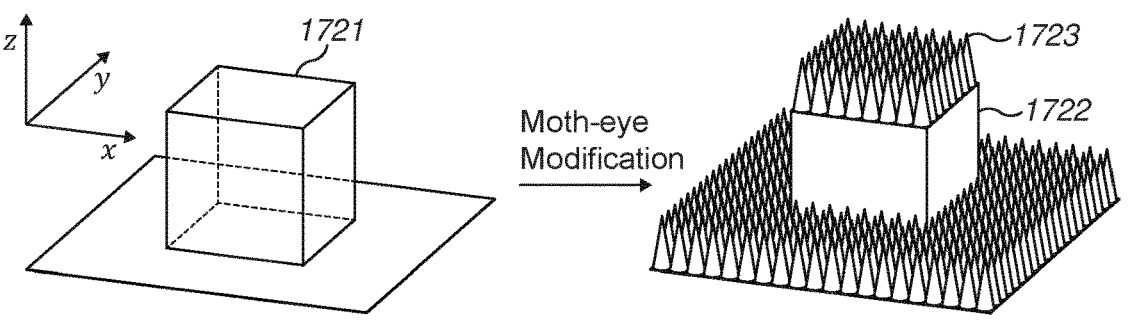
FIG. 17h shows a perspective view of modification of structures that places additional small structures on the surfaces of the structure.
Figure 17I:
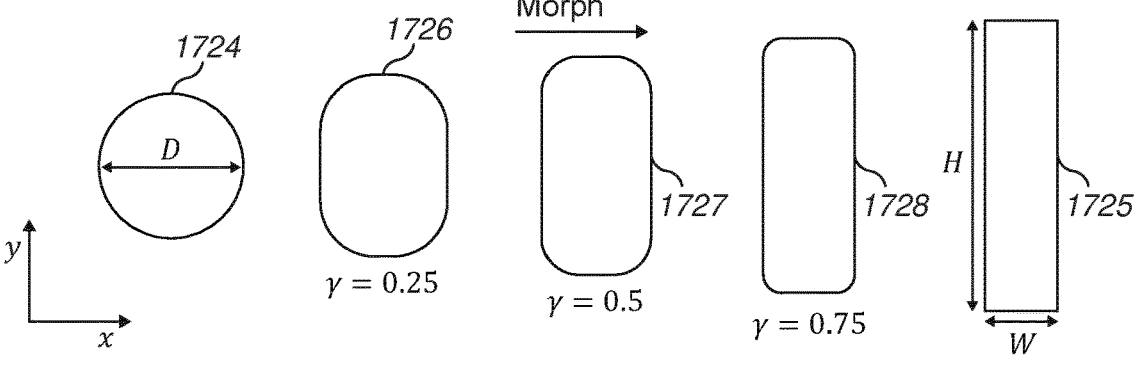
FIG. 17i shows a top view of intermediate shapes of a geometric morph applied between two structures with different shaped profiles.

The compounded action of a series of linear transformations $M_1$, $M_2$, . . . , $M_N$ may be computed by multiplying the transformation matrices together $$M_{tot} = \prod_{i=1}^{N} M_i, \tag{160}$$

where $M_{tot}$ is the compound transformation. In general, any transformations affecting the x- and y-coordinates, other than by translation (which may depend on the z-coordinate), will, when applied to the entire grating, also transform the grating vectors of the IRG, and will typically alter its operation.

ii) Draft Modification—FIG. 17b shows a perspective view of a single surface relief structure 1703 as an example of a single element of an IRG. Draft modification involves adding a controlled taper to the faces of the model so that walls are less steep and so the size of a structure varies with height. Positive draft means that vertical walls are tapered such that a structure becomes smaller with increasing height and negative draft means the opposite. Structure 1704 shows a cross-section view of the result of positive draft applied to structure 1703 in a way that conserves the shape of the top of the structure. Similarly, structure 1705 is the result of positive draft applied in a way that conserves the shape of the bottom of structure 1703, structure 1706 is the result of positive draft applied in a way that conserves the shape of structure 1703 at some mid-point between the top and bottom of the structure. Structure 1707 is the result of negative draft applied in a way that conserves the shape of the top of structure 1703. Draft modification may be applied selectively to a structure based on position or criteria such as the gradient of the surface prior to applying draft (i.e. the modification may be constrained to apply to steep walls only). Application of such draft may be appropriate in order to better represent the limitations of fabrication processes, such a e-beam lithography followed by chemical etching, or to ensure that a structure is better suited for mass-manufacture. For example, the use of positive draft on the side-walls of a structure may aid release in moulding processes such as injection moulding or nanoimprint lithography.

iii) Blaze Modification—FIG. 17c shows a perspective view of a single surface relief structure 1708 as an example of a single element of an IRG. Structure 1709 shows a cross-section view of the result of a blaze modification to structure 1708 where the slope of the top of the structure has been modified by an angle which is specified and controlled. The application of blaze can influence the direction dependence of the diffraction efficiency of a grating and so may be advantageous for the optimization of a design to preferentially alter the distribution of light in the various directions allowed by the grating equation.

iv) Rounding Modification—FIG. 17d shows a perspective view of a single surface relief structure 1710 as an example of a single element of an IRG. In rounding modification sharp corners of structures are replaced with rounded curves, the radius of which may be controlled. Structure 1711 shows a cross-section view of the result of applying rounding to the external corners of structure 1710. Structure 1712 shows a cross-section view of the result of applying rounding to the internal corners of structure 1710. Structure 1713 shows the result of applying rounding to both internal and external corners of structure 1710. Depending on the process used to create rounding it may be appropriate to apply it selectively to just parts or the structure or apply it in two two-dimensional projections, rather than all three dimensions. FIG. 17e shows a top view of a pillar shaped structure 1714 with square profile. Rounding in the xy-plane the results in the modified structure 1715, which may nonetheless have a cross-section showing a sharp transition when looking at a projection that contains the z-axis. Rounding is relevant as any manufacturing process will have limits to the degree to which sharp corners are reproduced. For example, nanoscale fabrication technologies have limits to the resolution of the features that they can create, meaning that on a scale of <100 nm corners are often significantly rounded as a natural consequence of the resolution of the process. Modification processes may also introduce a controlled degree of rounding, for example plasma processes may be configured which preferentially erode sharp features, introducing a degree of rounding. The shape of rounding itself may be described using various curved geometry including arc sections, sphere sections, cylinder sections or generally curved surfaces such as appropriately configured patches of NURBS surfaces. Rounding is sometimes referred to as filleting, and is a function that is widely available feature in many 3D modelling systems.

v) Undercut Modification—Undercut modification involves the removal of material from parts of the structure such that an undercut is created, that is the structure is no longer single valued in z position for all (x, y)-coordinates. FIG. 17f shows a perspective view of a single surface relief structure 1716 as an example of a single element of an IRG. By removing material from one side of the base of 1716 an undercut structure 1717 is created, the result of which may have advantageous properties for the direction, wavelength, and polarization dependence of the light scattering properties of the diffraction grating.

vi) Inversion Modification—FIG. 17g shows a perspective view of a single surface relief structure 1718 as an example of a single element of an IRG. Inversion modification is defined here to mean swapping the material designation of a structure within some range of heights, typically with that of the surrounding material, which is often air. Structure 1719 shows the result of applying an inversion modification to structure 1718, which means that the pillar of the structure 1718 is now a pocket 1720 within the structure 1719. Many nanoscale fabrication processes involve replication steps where a surface-relief imprint is made of a structure. Such an imprint is a practical example of inversion modification and so it is important to understand the role that this modification may have and a method to describe it. For example, if mass manufacture is replicated by a moulding process from a master surface, then the master surface must be the inversion modified version of the final surface. Although the periodic structures PS1 and PS2 making up the IRG will be characterised by an absence of material rather than its presence after inversion modification the same symmetry rules governing whether the to-eye diffraction orders of the IRG have non-zero efficiency will apply.

vii) Moth-Eye Modification—FIG. 17h shows a cross-section view of a single surface relief structure 1721 as an example of a single element of an IRG. Moth-eye modification involves the addition of small structures onto the surfaces of an existing structure which then alter the optical properties of the overall structure. Often the additional structures are similar in shape. Structure 1722 shows the cross-section-view of the result of adding sharp needle-shaped protuberances 1723 to the structure 1721 as an example of a moth-eye modification. Other modifications may involve other high-aspect ratio protuberances or conversion of a smooth external surface into one that is porous on a nanoscale. Such structures may be created as part of a primary fabrication process or by secondary processes such as plasma etching.

viii) Geometry Morph Modification—FIG. 17i shows a top view of a pillar-shaped structure with circular profile 1724 and a pillar shaped structure with rectangular profile 1725. Three-dimensional geometry morphing (also known as geometric metamorphosis or mesh morphing) is the smooth transformation of the shape of one 3D object into another by the application of warping and other distortion transformations. The shapes 1726, 1727, and 1728 show a range of intermediate shapes that could be created by a morphing method. For simple shapes such an approach may be accomplished within the parameters of a 3D geometry modelling system such as described above. For example, although the profile of structure 1724 is most easily described as a circle of diameter D, it can also be constructed as a square of side length D followed by application of a corner rounding operation (also known as a fileting operation) to all four corners where the sharp corners are replaced by a 90° arc-section with a radius of D/2. The profile of structure 1725 is a rectangle with length W in the x-direction and length H in the y-direction. Intermediate shapes may be created by first constructing a rectangle with a rectangle that has dimensions intermediate between the square used to construct the profile of structure 1724 and the rectangular profile of structure 1725. A corner rounding operation may then be applied to the four corners of this rectangle using a radius between D/2, as used to modify the profile 1724 from a square to a circle, and zero, as would apply to the sharp corners of the profile 1725. Finally an extrusion operation would be used to create the three-dimensional pillar. Such an extrusion would be to a height between the two structures. The dimensions required for this process may be represented parametrically. For example, suppose we define y as a morph transition parameter governing the extent to which one shape has transitioned into the other, such that $\gamma=0$ corresponds to the structure 1724, $\gamma=1$ corresponds to the structure 1725 and $0<\gamma<1$ corresponds to intermediate shapes that smoothly transition between the profiles. We may then use $\gamma$ to interpolate between the dimensions required for the geometry construction operations described above: first, we construct a rectangle with a length in the x-direction given by the function $$L_x(\gamma)=D+\gamma(W-D), \tag{161}$$

and a length in the y-direction given by the function $$L_y(\gamma)=D+\gamma(H-D). \tag{162}$$

We then apply a corner rounding operation where the corners of the rectangle are replaced by a 90° arc-section with a radius given by the function $$r(\gamma) = \frac{1}{2}D(1 - \gamma). \tag{163}$$

Finally, to create the pillar shape a geometry extrusion operation to the required height should be applied to the shape. If the height of structure 1724 is $H_1$ and the height of structure 1725 is $H_2$, then the height for the extrusion operation is given by $$H(\gamma)=H_1+\gamma(H_2-H_1). \tag{164}$$

Structures 1726, 1727, and 1728 show the results of this approach used to transition between the structures 1724 and 1725 for the values $\gamma=0.25$, 0.5, and 0.75, respectively. It should be noted that this parameterization is just an example, and many others may be used, including those that transition different dimensions of the features at different rates (for example, the height could be transitioned from one form to another much more rapidly with respect to a morph transition parameter than the corner radius). A range of algorithms are provided in the computational literature for computing morphed geometry between more complex shapes, in particular as these methods have attracted considerable interest over the years in film-making and the videogame industry. The PhD Thesis "3D Mesh Morphing" by B. Mocanu (Pierre and Marie Curie University, 2012) provides a review of various methods. Many algorithms rely on mesh geometry, so it may be necessary to convert the shapes of the end-points of the morph into a geometrically equivalent mesh representation. Some algorithms rely on user interaction to identify features or regions that are to be commonly associated by the morph whereas other methods attempt to do this automatically. For practical applications care will be needed to ensure that intermediate shapes are feasible for an intended fabrication method. Modification to the geometry produced by a complex morph may be required in order to ensure that this is the case. Furthermore, one may use morphing methods iteratively and successively. For example, an intermediate shape may be created between a first shape and a second shape, this shape may then be manipulated and new morphs computed between the first or second shape and the manipulated intermediate shape.

In many cases to create representations of these modifications it will be necessary to convert to a mesh representation rather than a mathematical function. This is especially true for transformations which render the surface no longer single valued in the z-direction. Furthermore, it will be appreciated by those skilled in the art that these modifications are merely exemplary of the great range of techniques for the manipulation and modification of geometry as demonstrated by the modelling tools provided in the academic literature as well as by 3D computer aided design and 3D computer graphics systems.

Methods for the Modification of Interleaved Rectangular Gratings by the Application of Single or Multiple Layers of Coating Another form of modification to an IRG composed as a surface relief structure, both in terms of the geometric representation and as a practical step in manufacturing a device in the physical world is to apply one or more coatings on top of the grating surface. It has been found that advantageous performance benefits may be yielded by application of a thin-film of a distinct material on top of the surface relief structure. One advantage of this approach is that materials with a high refractive index may be used which are not otherwise available for fabrication of a nanostructured surface relief geometry. The use of higher index materials may bring advantageous benefits for the magnitude of the diffraction efficiencies of the various non-zero diffraction orders, as well as provide an additional degree of freedom for the design and optimization of the IRG.

There are various techniques for coating processes which may be used, depending on the requirements and which may give different results for the resulting structures.

Figure 18A:
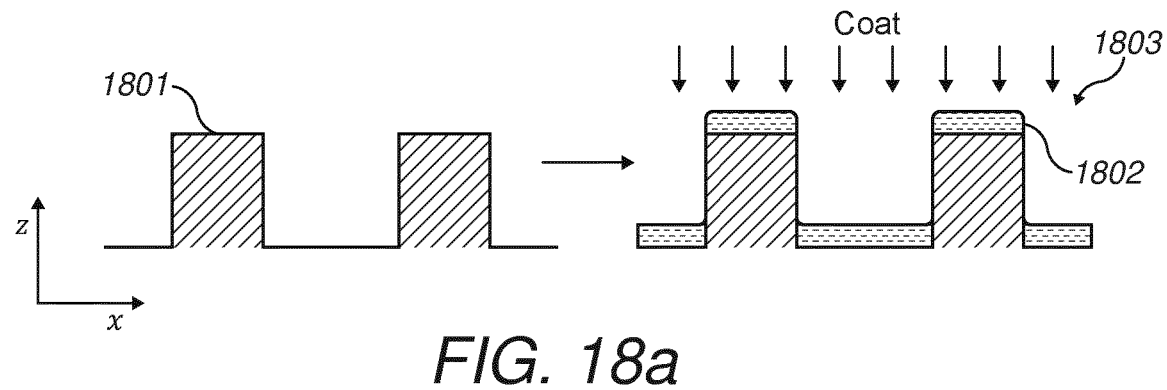
FIGS. 18a-d show various methods for the addition of coatings to an interleaved rectangular grating.

In one approach material may be added on top of a surface relief structure in the z-direction. FIG. 18a shows a cross-section view of an IRG with a surface relief structure 1801 of part of an IRG. By adding material in the z-direction a layer of coating 1802 is introduced on top of the structure forming the compound structure 1803. A practical approach for achieving such a directional coating is to use physical vapour deposition (PVD), configured with a well collimated beam and with the xy-plane of the grating arranged normal to the direction of the coating vapour.

Figure 18B:
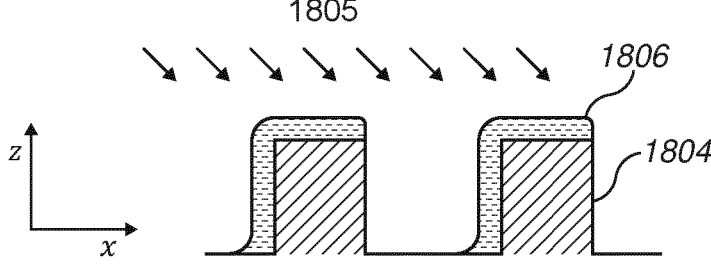

A directional coating may instead be applied in a direction tilted away from the normal to the surface. FIG. 18b shows a cross-section view of an IRG with a surface relief structure 1804 where a deposition vapour 1805 is applied in a direction tilted away from the normal to the grating, resulting in a directional build-up of coating material 1806, including shadowing effects. Such a coating may also be achieved by methods such as PVD, by tilting the plane of the gratings such that the direction of the coating matches the intent of the design.

Figure 18C:
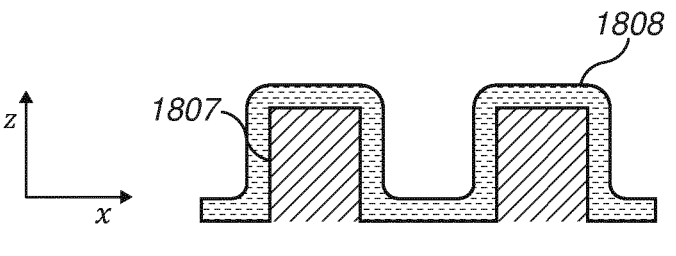

In another approach a coating may be applied to an IRG that is conformal in all directions, meaning of equal thickness as far as possible. FIG. 18c shows a cross-section view of an IRG with a surface relief structure 1807 on top of which a conformal coating 1808 has been applied, except for the internal corners of this surface this coating has the same thickness, as measured in the direction normal to the surface, at all points of the surface. Such a coating may be applied using methods such as atomic layer deposition, or, depending on the geometry of the coating and the potential for shadowing effects, by rotating the coating over a wide range of tilt angles relative to a PVD source.

By varying the tilt of the grating relative to a directional coating source, or otherwise, it is possible to create a coating which is an intermediate condition between these various cases. For example, one may not wish to have an extreme directional variation in the thickness of the coating 1806. Instead vary the tilt of the grating surface dynamically during the coating deposition process, and noting that the time spent at a given tilt angle will influence the rate of coating build-up on the surfaces at such an angle it is possible to ensure that a prescribed thickness of material accumulates on the various sides of the structure 1804.

Figure 18D:
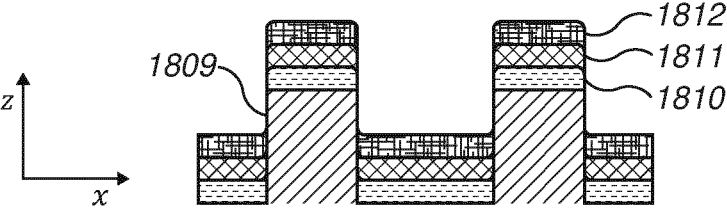

Coatings may be applied successively in a variety of materials in order to further modify the scattering properties of an IRG. FIG. 18d shows a cross-section view of an IRG with a surface relief structure 1809 on top of which a first layer of coating 1810 is applied, on top of which a second layer of coating 1811 is applies. This layer in turn has a third layer of coating 1812 applied on top. In principle, the coating process of each layer may be different, meaning that successive coating layers could be variously directional, conformal or an intermediate between the two, as well as of different thickness and material. In this way a complex modification of a base surface relief structure is possible bringing extra degrees of freedom for the design and optimization of the scattering properties of an IRG.

Geometry representations of coatings may be generated by a number of methods. In general these will result in a surface geometry representation of each layer of material that results. For a mathematical-based description derived geometry for a coating may be generated by computing a derived function based on the existing surface function. First, suppose we define the IRG coating surface function as $\Im_c^{(i)}(x, y)$ where i is an index representing the coating layer for systems with more than one coating. For coatings applied in the z-direction where the ith layer has a thickness of $t_i$ the corresponding IRG coating surface function is given by $$I_c^{(i)}(x, y) = I(x, y) + \sum_{j=1}^{i} t_j, \tag{165}$$

For coatings applied in other directions it is difficult to write a general expression as it is possible for the offset surface to become self-intersecting, or intersect with the base geometry. However, such geometry may be found via numerical algorithms using a mesh-based representation of a surface. Furthermore, for IRG surface functions where the x- and y-direction gradients may be evaluated, then the surface function for a directional coating of the ith layer may be described approximately by projection of the coating offset in the z-direction at a given (x, y)-coordinate which leads to the definition of the IRG coating surface function $$I_c^{(i)}(x, y) = I_c^{(i-1)}(x, y) + t_i D(N^{(i-1)}, V)\sqrt{1 + \left(\frac{\partial I_c^{(i-1)}}{\partial x}\right)^2 + \left(\frac{\partial I_c^{(i-1)}}{\partial y}\right)^2}, \tag{166}$$

where we define the zeroth layer of coating as the underlying IRG surface function, $I_c^{(0)}(x, y) = I(x, y)$ and $D(N^{(i-1)}, V)$ is defined as the coating direction function and is a scalar function of the normalized surface normal vector $N^{(i-1)}$ and normalized coating direction vector V. Here, the normalized surface normal vector is given by $$N^{(i-1)} = \frac{1}{\sqrt{1 + \left(\frac{\partial I_c^{(i-1)}}{\partial x}\right)^2 + \left(\frac{\partial I_c^{(i-1)}}{\partial y}\right)^2}}\left(-\frac{\partial I_c^{(i-1)}}{\partial x}, -\frac{\partial I_c^{(i-1)}}{\partial x}, 1\right). \quad (167)$$

For a convention where the surface relief structure protrudes in the +z direction and the coating direction points from +z towards the surface then a simple definition for the coating direction function which ensures that coating is only possible within an angle of ±90° relative to the coating direction vector V is given by $$\mathcal{D}(N^{(i-1)}, V) = \begin{cases} -N^{(i-1)} \cdot V & \text{if } N^{(i-1)} \cdot V < 0 \\ 0 & \text{if } N^{(i-1)} \cdot V \geq 0 \end{cases}, \quad (168)$$

where $N^{(i-1)} \cdot V$ is the dot product of the vectors $N^{(i-1)}$ and V.

In general the approach embodied by equations (166) to (168) will reach limitations for all except very thin coatings. For thicker coatings a suitable representation can be derived based on 2D and 3D geometry primitives or mesh-based geometries, wherein each layer of coating, including the underlying structure will be represented by its own mesh or composite of 2D and 3D geometry primitives. For such representations well established methods may be used to create derived geometries with an offset prescribed according to the rules of the coating. Methods may then be used to check these derived geometries for self-intersecting features, or interference with a base geometry and appropriate cutting and stitching methods employed to create a valid geometric representation of the coating surface.

Practical realisations of coatings often exhibit more complicated effects in the thickness of the coating over the surface, as well as variations in the composition and properties of the coating. Such effects can be captured by a representation via the use of appropriate modifiers to the geometry, such as use of rounded corners to represent the in-fill that can happen at internal corners or raytracing and shadow casting methods to represent line-of-sight variations in coating thickness.

Figure 19A:
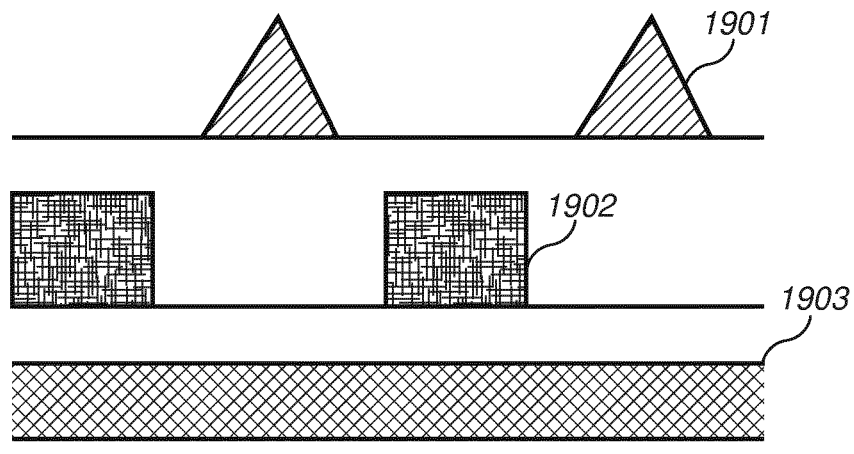
FIGS. 19a-b show cross-sectional views of examples of multi-layer grating structure.

Methods for Construction of Interleaved Rectangular Gratings from Multiple Layers of Structures and Coatings The application of layers of coating is one approach to introduce a range of new materials to a grating. Another approach is to apply new layers of structures. FIG. 19a shows a cross-section view of a grating with a surface relief structure 1901 composed of a first material M1, a cross-section view of a grating with a surface relief structure 1902 composed of a second material M2, and a cross-section view of a layer of material of uniform thickness 1903 composed of a third material M3. By applying the structure 1903 on a substrate followed by structure 1901 and structure 1902 a new multi-layer grating, which may be an IRG, is created with a surface relief structure 1904 composed out of the materials of the structures 1901, 1902 and 1903.

In this approach a representation of this geometry may be created by simple addition of surface functions. For example, if $I_1(x, y)$ is the IRG surface function of the structure 1901, $I_2(x, y)$ is the IRG surface function of the structure 1902 and $t_3$ is the thickness of the base layer then we may define the following surface geometry functions for the layers of the multi-layer IRG:

First layer composed of material M3: $I^{(1)}(x,y)=t_3$,

Second layer composed of material M1: $I^{(2)}(x,y)=t_3+I_1(x,y)$,

Third layer composed of material M2: $I^{(3)}(x,y)=t_3+I_1(x,y)+I_2(x,y)$. $\quad (169)$ Alternatively, a mesh-based representation of the geometry may involve multiple meshes where the mesh of each layer other than the first is generated by taking the sum of the z-positions of the meshes of the previous layers. If the meshes have identical (x, y)-coordinates for the vertices of the polygons making up the respective meshes, then it is sufficient to compute the sum of the z-positions of the meshes for the layers to compute the mesh for a derived layer. In general, such an overlap of the (x, y)-coordinates of the vertices of different meshes is not guaranteed and instead it may be necessary to subdivide the polygons of each of the mesh layers until this condition is achieved.

When combining layers of surface geometry such as meshes where at least part of the geometry is single valued in the z-direction care must be taken to handle intersections between mesh layers should they arise. Various methods may be used should such circumstances arise. One method is to use trimming operations to remove parts of one geometry based on some method of assigning priority between geometry, such as choosing which materials have precedence. The prioritisation of materials may be accomplished by consideration of a manufacturing process, wherein materials have priority in the order that they are deposited, so the first material deposited on the substrate has priority over the second material deposited and so on.

Approaches based on 3D geometries describing enclosed volumes may proceed by overlapping the different geometries on top of each other and adopting rules governing overlap regions. As with a surface geometry one rule may be to assigning an order of priority between different materials and the designated material of any overlapping region may be set to be the higher priority material.

Figure 19B:
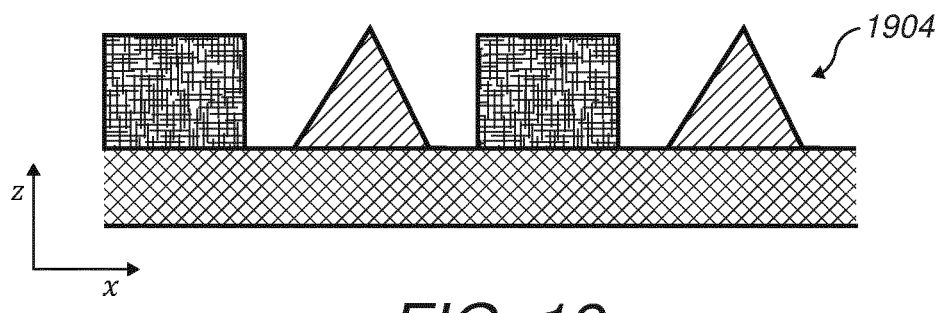

Another approach for a multi-layer grating is to encapsulate structures in different distinct layers of surrounding material, the various methods described above for the representation and modification of geometry may be employed for each layer of material. This may allow for the creation of a complex multi-layer geometry for a grating which may be an IRG. For example, FIG. 19b shows a cross-section view of part of a multi-layer IRG 1905 consisting of: a planar base layer 1906 of a first material M1; a first periodic IRG structure 1907 composed of a second material M2 placed on the base layer 1906; a medium 1908 composed of a third material M3 surrounding the structure 1907 and forming a new planar layer 1909 above the top of structure 1907; a second periodic IRG structure 1910 composed of a fourth material M4 placed on the planar layer 1909; a medium 1911 composed of a fifth material M5 surrounding the structure 1910 and forming a new planar layer 1912 above the top of structure 1910 and a medium 1913 which may be the medium surrounding the grating (typically air), the same medium as the planar base layer 1906 or a sixth material M6. It will be appreciated by those skilled in the art that additional layers may be added to provide further degrees of freedom for a design.

It should be noted that in a multi-layer IRG each layer of periodic structures must be an IRG, a rectangular grating or a 1D grating. For all layers with a 2D-grating the various layers must have the same grating vectors as each other. Layers with a 1D grating must have a grating vector equal to one of the grating vectors of the 2D grating layers, the sum of the grating vectors of the 2D grating layers or the difference of the grating vectors of the 2D grating layers. If this is not the case new grating vectors may be introduced resulting in additional scattering directions for each beam and resulting in a breakdown of the image relay function of the IRG. It is quite possible that for some layers the structure S1 or S2 of the IRG will be null, which is equivalent to a rectangular grating. It is also possible that the position of the lattice of each layer may be shifted with respect to the others. It should also be noted that coherent scattering effects may only be possible for a multi-layer system where the optical path length through the system is shorter than the coherence length of the light sources used with the system. Grating layers separated by more than the coherence length may be considered to be independent from each other and treated separately for the purposes of the calculation of scattering properties such as diffraction efficiencies.

The assignment of materials and properties of materials in a multi-layer representation, where systems with coatings are included in the definition of a multi-layer system may proceed in a similar fashion to the methods outlined for a single-layer structure with some modification. In one approach each surface is assigned a material index and a priority index. The priority index may be based on consideration of the intended method of manufacture and wherein surface geometries are given priority based on the order in which they are fabricated. The material assignment at a coordinate (x, y, z) is then determined by finding the highest priority surface that this point lies under (or lies within for encapsulated geometry). In this way descriptions such as voxel-based representations may be realised from a representation of the geometry of a multi-layer IRG composed out of multiple materials.

Method for the Design and Representation of Interleaved Rectangular Gratings Based on Mathematical Description of Volumetric Properties The use of representations based on surface geometry is well suited for IRGs based on distinct materials with different shapes. In other embodiments of the invention an IRG may be constructed from variations of one or more optical properties within a region of material. For example, periodic variations of the orientation pattern of birefringent materials such as liquid crystals may be created and provide grating structures with particular sensitivity to the polarization of an incident light beam.

Instead of representing a grating in terms of the geometry of structures composed of different materials, an alternative approach is to describe the optical properties of a volume containing an IRG directly in terms of position coordinates. One possible approach for such a volumetric description of an IRG consists of the following steps:

1. We assume that the plane of the grating is the xy-plane and is located at z=0. We define the grating vectors used to construct lattices L1 and L2 of the IRG as $$g_2 = \frac{2\pi}{p_x}(1, 0), \text{ and} \tag{170}$$

$$g_3 = \frac{2\pi}{p_y}(0, 1). \tag{171}$$

2. We define a cropping function C(x, y) to describe the finite extent of the IRG. C(x, y) has a value of 1 over the region where the grating exists and zero everywhere else. If no cropping is required, then C(x, y)=1, irrespective of (x, y)-coordinate.

3. We represent lattice L1 with a lattice function $L_1(x, y, z)$ given by $$L_1(x, y, z) = C(x, y)\delta(z) \sum_{i=-\infty}^{\infty} \delta(x - ip_x) \sum_{j=-\infty}^{\infty} \delta(y - jp_y), \tag{172}$$

and we represent lattice L2 is with a lattice function $L_2(x, y, z)$ given by $$L_2(x, y, z) = C(x, y)\delta(z) \sum_{i=-\infty}^{\infty} \delta(x - ip_x - o_x) \sum_{j=-\infty}^{\infty} \delta(y - jp_y - o_y), \tag{173}$$

where $o_{xy}=(o_x, o_y)$ is the lattice offset vector.

4. We define a volumetric property function $N_1(x, y, z)$ as a representation of an optical property of structure S1 of the IRG and which essentially describes how S1 introduces some modification to a surrounding medium. Similarly we define a volumetric property function $N_2(x, y, z)$ as a representation of the optical properties of structure S2 of the IRG. The property described by the volumetric property functions can be any physical quantity relevant to the representation of the grating, including but not limited to the refractive index, electric permittivity, magnetic permeability, birefringence, absorptivity or an index value indicating material composition. Each of the functions $N_1(x, y, z)$ and $N_2(x, y, z)$ can be a mathematical function, an output of a computational algorithm, a three-dimensional grid of values combined with an interpolation scheme, or any other approach by which a unique property value may be generated based on (x, y, z)-coordinate inputs. The finite extent of any features of structures S1 and S2 may be represented by defining a special value of the respective volumetric property functions $N_1(x, y, z)$ and $N_2(x, y, z)$ which may be a null value, or a number with special significance and of a value sufficiently distinct from the range of numerical values required to describe the corresponding range in values of the optical property. In the x- and y-directions, both $N_1(x, y, z)$ and $N_2(x, y, z)$ are entirely defined within a rectangular region with dimensions equal to the IRG unit cell. As such $N_1(x, y, z)$ and $N_2(x, y, z)$ are defined to only have non-zero values within a rectangular region of the xy-plane of the same size and orientation as the IRG unit cell. Typically this region is centred on the origin (0,0) but this does not have to be the case. The volumetric property functions may contain regions within the unit cell where they are not defined. This may be useful when considering how the structures will overlap when constructing the IRG. One method of indicating a lack of definition is to use a specially designated value $\xi$, which should then be taken into account when combining the structures together.

5. The periodic structure PS1 of the IRG is represented by a periodic volumetric property function $P_1(x, y, z)$ which is defined to be the three-dimensional convolution of the lattice function $L_1(x, y, z)$ with the volumetric property function $N_1(x, y, z)$ and is given by $$P_1(x,y,z)=L_1(x,y,z)*N_1(x,y,z). \tag{174}$$

Similarly, the periodic structure PS2 may be represented by the periodic volumetric property function $$P_2(x,y,z)=L_2(x,y,z)*N_2(x,y,z). \tag{175}$$

The convolutions in equations (174) and (175) may be expanded to give $$(176)$$

$$P_1(x, y, z) = \sum_{i=-\infty}^{\infty} \sum_{j=-\infty}^{\infty} C(ip_x, jp_y)N_1(x - ip_x, y - jp_y, z), \text{ and}$$

$$P_2(x, y, z) = \sum_{i=-\infty}^{\infty} \sum_{j=-\infty}^{\infty} C(ip_x, jp_y)N_2(x - ip_x - o_x, y - jp_Y - o_y, z). \tag{177}$$

6. The IRG is constructed by combining PS1 and PS2 together and is represented by the IRG volumetric function I(x, y, z). This function describes the variation of a given optical property as a function of (x, y, z)-coordinate. The process of combining together the periodic structure functions $P_1(x, y, z)$ and $P_2(x, y, z)$ should take into account possible regions where the functions are deemed to be absent as well as note that that the structures may be embedded in a surrounding medium. The periodic structure functions $P_1(x, y, z)$ and $P_2(x, y, z)$ may be defined using volumetric property functions in such a way that the absence of a feature at an (x, y, z)-coordinate is indicated by the specially designated value $\xi$. In this case then we may define the masking functions $$M_1(x,y,z)=\text{mask}(P_1(x,y,z)), \tag{178}$$

for periodic structure PS1, and $$M_2(x,y,z)=\text{mask}(P_2(x,y,z)), \tag{179}$$

for periodic structure PS2 where $$\text{mask}(x) = \begin{cases} 0 & \text{if } x = \xi \\ 1 & \text{otherwise} \end{cases}. \tag{180}$$

The regions where the periodic structure functions $P_1(x, y, z)$ and $P_2(x, y, z)$ overlap require some method for combining the properties described by each periodic structure. One method by which such overlaps may be governed is by the definition of a combiner function X(a, b) which may be constructed from a variety of expressions according to the requirements and intent of the representation. The definitions of possible functions given in equations (134)-(142) are valid for use in volumetric representations as well. By using masking functions and a selected combiner function and noting that the medium surrounding the IRG is defined to have a property value of $P_0$ then the IRG volumetric function for the required property can be written as $$I(x,y,z)=(1-M_1(x,y,z))(1-M_2(x,y,z))P_0+M_1(x,y,z)(1-M_2(x,y,z))P_1(x,y,z)+(1-M_1(x,y,z))M_2(x,y,z)P_2(x,y,z)+M_1(x,y,z)M_2(x,y,z)X(P_1(x,y,z),P_2(x,y,z)). \tag{181}$$

This completes the representation of the IRG using volumetric functions.

It should be noted that for the sake of clarity single-valued scalar functions have been defined here for the property of the IRG and the corresponding contributions from S1 and S2. It will be clear to those skilled in the art that this definition may be generalised to many separate functions that follow the same general scheme but each describing a different property of the volume. In doing so the full range of properties of a volume may be described. This may include tensor properties, such as the electric permittivity tensor, as required for anisotropic media such as liquid crystals, since any tensor can be constructed from a sufficient number of scalar values. Alternatively, by providing a volumetric description of an index value corresponding to a choice of material the optical properties at a given point may be determined by finding the material index at a given (x, y, z)-coordinate followed by referencing a table providing the optical properties of this material.

By facilitating a direct representation of the three-dimensional variation of properties required to understand the response of an IRG to electromagnetic radiation the use of a volumetric representation lends itself advantageously to design and simulation. Conversion to a voxel-based representation, or data associated with a three-dimensional mesh, as required for many simulation approaches such as RCWA or FDTD, may be accomplished simply by evaluation of the IRG volumetric function at each voxel centre coordinate or mesh-node. A volumetric approach is also well suited to representing IRG systems where the optical properties of a material may be varied with respect to position. Examples of such systems include those relying on variations in the alignment of liquid crystal molecules or phase change polymers including certain photopolymers, as well as certain meta materials.

For some practical applications conversion between volumetric and surface geometry representations may be advantageous. Conversion from a surface geometry representation to a volumetric representation may be accomplished by similar methods to those used for construction of a voxel-based representation. The IRG volumetric function at a given (x, y, z)-coordinate may be evaluated by using the surface geometry data to determine the material at that point in space and then referencing the required optical property from a look-up table associate with the material. Conversion from a volumetric representation to a surface geometry representation requires that the optical properties described by the volumetric description be matched to materials that are available. Computation of surface geometry may be accomplished by looking for the edges of three-dimensional regions with the same properties (potentially to within a tolerance threshold). This is an example of an isosurface calculation for which there exists a variety of well-established methods as well as support in various software packages such as the isosurface function provided as part of the Matlab® language (MathWorks, Inc.). The construction of surface geometry from volumetric data is particularly important for the manufacture of surface relief IRGs where three-dimensional geometry is required for the fabrication of tooling such as mastering tools.

Methods for Creating Differences in Interleaved Rectangular Gratings

Figure 20A:
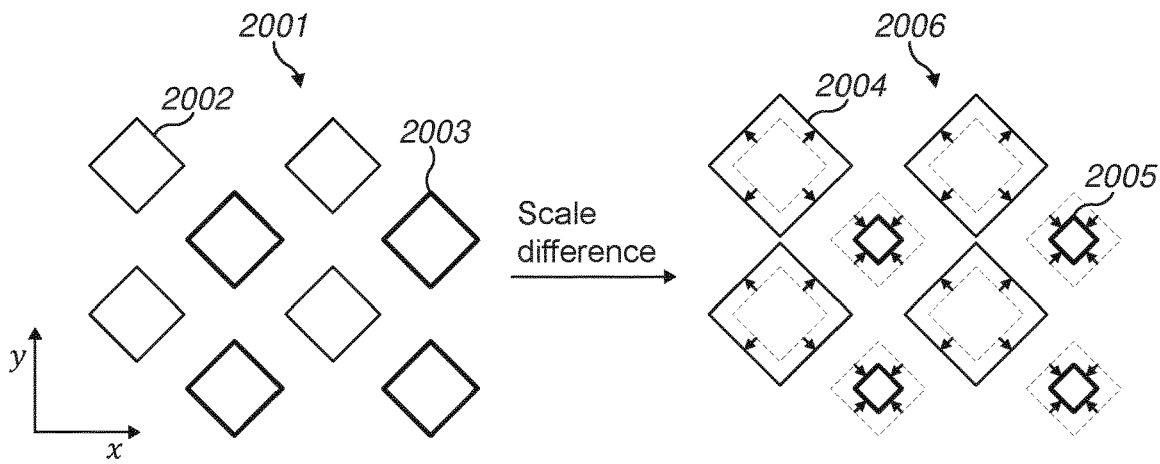
FIGS. 20a-j show various methods for creating differences between periodic structures.
Figure 20B:
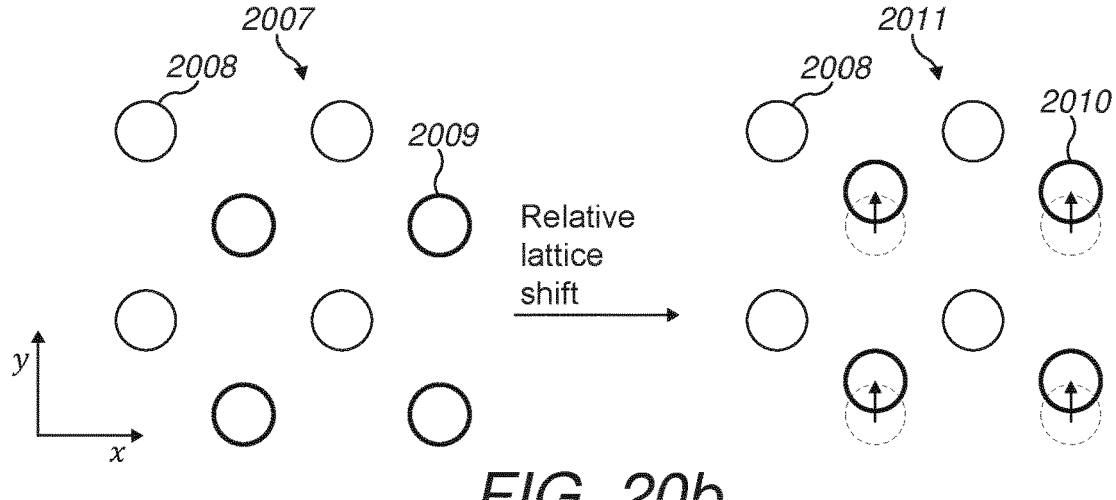
Figure 20C:
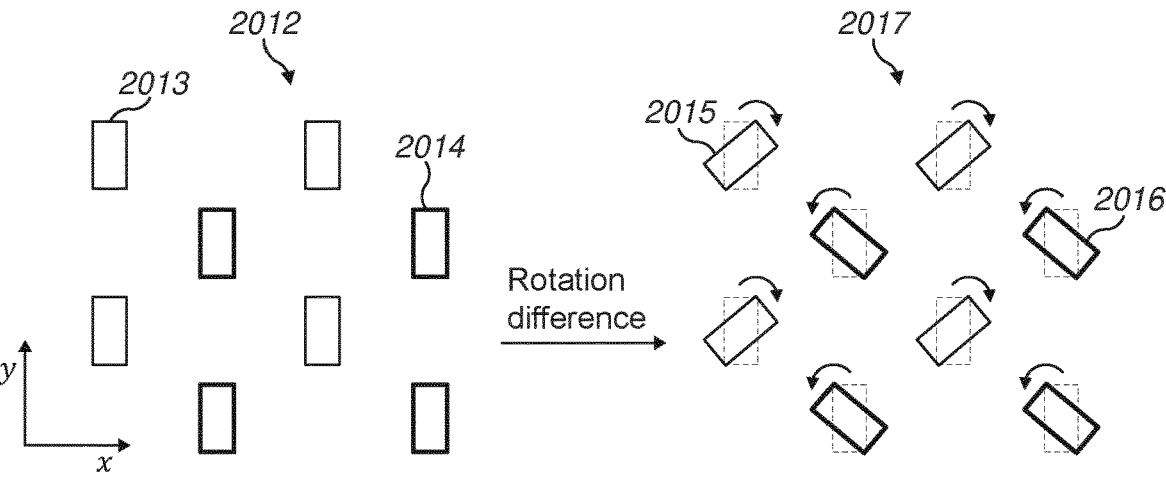
Figure 20D:
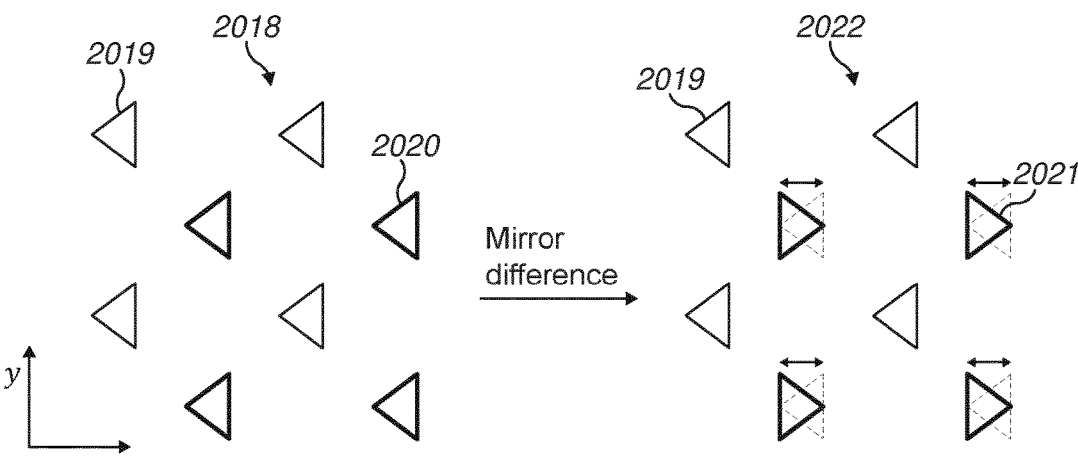
Figure 20E:
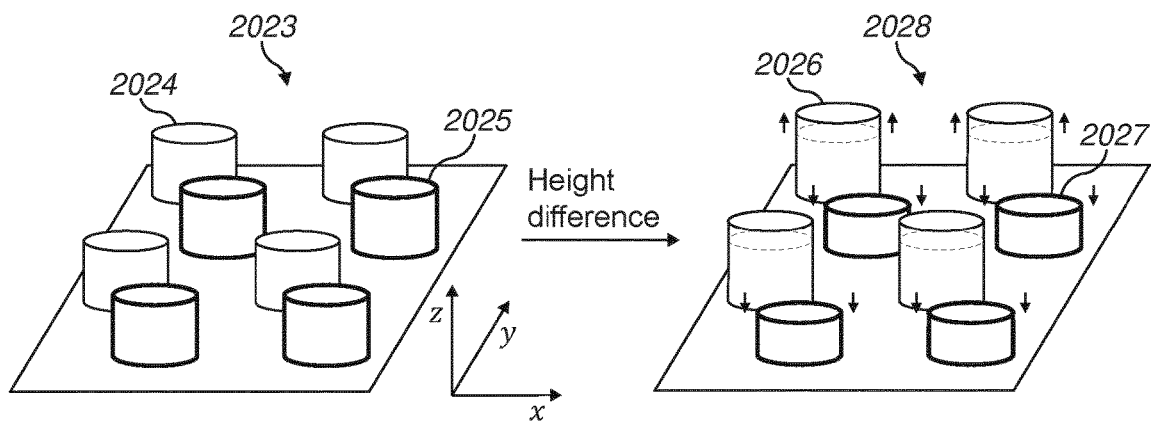
Figure 20F:
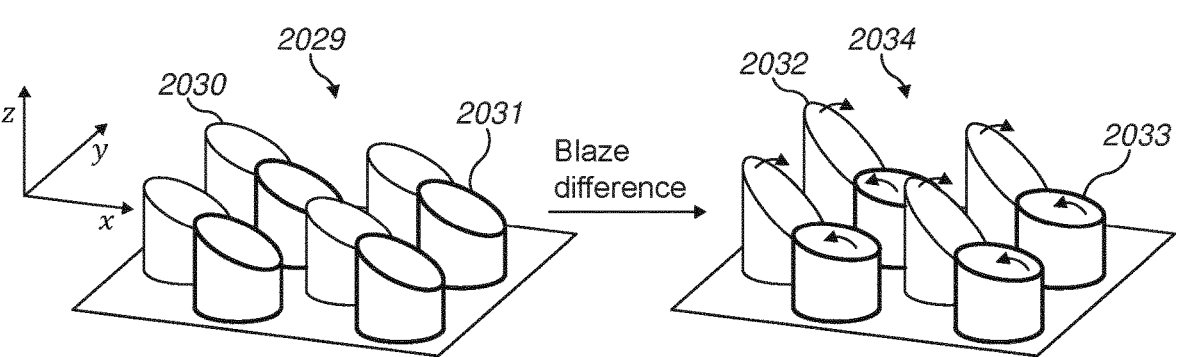
Figure 20G:
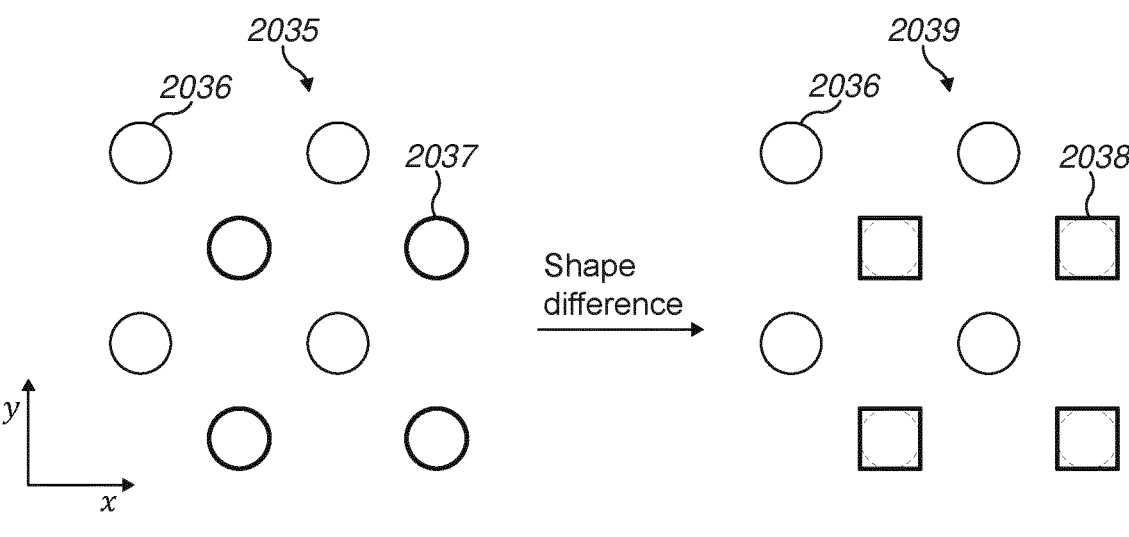
Figure 20H:
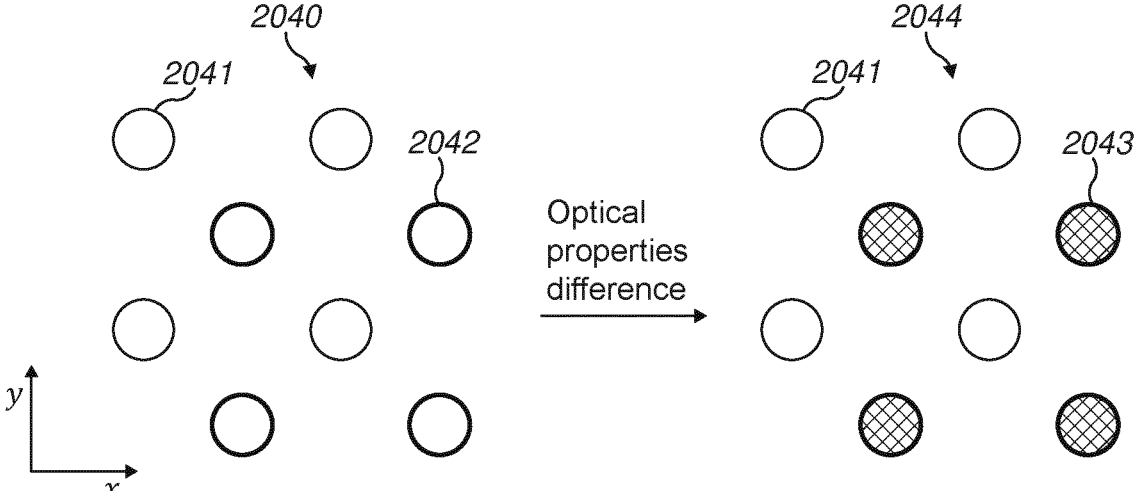
Figure 20I:
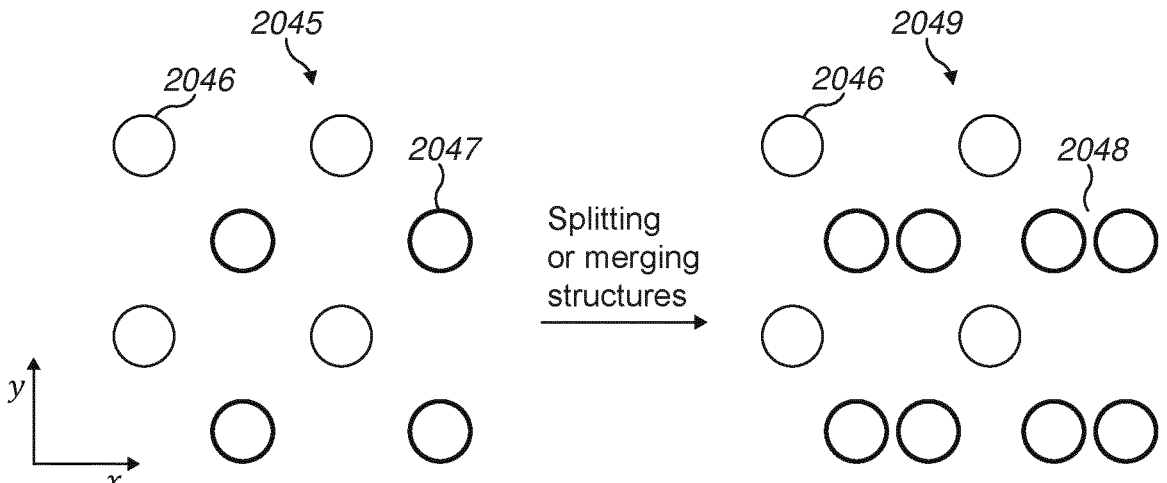
Figure 20J:
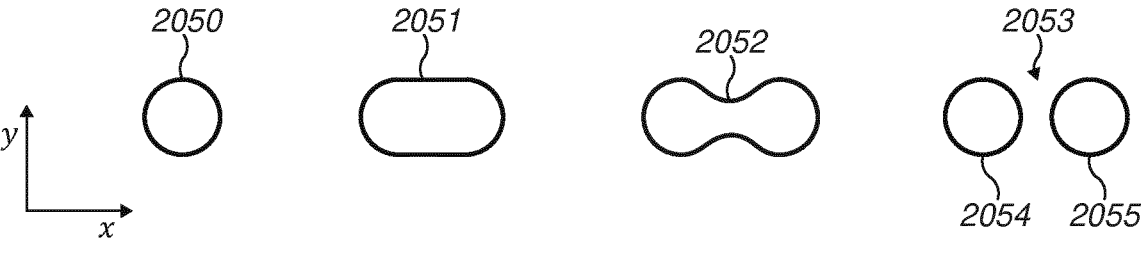

As detailed above, for an IRG to have to-eye orders with non-zero diffraction orders, and so be capable of output coupling waveguided light for observation, some method for symmetry breaking should be employed. FIGS. 20a-j show examples of a range of methods for engineering differences between periodic structures PS1 and PS2 of an IRG. In all cases the structures are shown as either surface relief structures in perspective or as profiles from a top down view, however, the methods described will apply equally to embedded structures, structures composed out of multiple materials or multiple-layers, and structures created as a volumetric variations in material properties. Furthermore in all cases the structures are assumed to be composed of materials with at least one optical property different to their surroundings such that they will scatter light. The methods shown in FIGS. 20*a-j* are identified as follows:

a) Scale difference—FIG. 20*a* shows a top view of part of an IRG 2001. Here the structures S1 2002 and S2 2003 are the same and the lattice offset vector is ½(p$_x$, p$_y$), which means that IRG 2001 is an FSIRG. By increasing the size of structure S1 2002 as viewed in the xy-plane to form a new structure S1 2004, and decreasing the size of structure S2 2003 as viewed in the xy-plane to form a new structure S2 2005 a modified IRG 2006 is created. Owing to the breaking of shape symmetry by the scale change, this new IRG 2006 may have to-eye orders with non-zero diffraction efficiency, the magnitude of which we expect to depend on the difference in scale between structures S1 and S2. Alternatively, this scaling may also be applied to just one of the structures, along just a single direction in the xy-plane, or by different amounts along two directions in the xy-plane.

b) Relative lattice shift—FIG. 20*b* shows a top view of part of an IRG 2007. Here the structures S1 2008 and S2 2009 are the same and the lattice offset vector is given by ½(p$_x$, p$_y$), which means that IRG 2007 is an FSIRG. By changing the lattice offset vector to shift the lattices L1 and L2 relative to each other the copies of structures S2 2010 can be moved closer to some of the nearest neighbouring copies of structures S1 2008. In the example shown this shift in the y-direction. Owing to the breaking of position symmetry, this new IRG 2011 will have non-zero to-eye orders, the magnitude of which will depend on the size and direction of the relative lattice shift.

c) Rotation difference—FIG. 20*c* shows a top view of part of an IRG 2012. Here the structures S1 2013 and S2 2014 are the same and the lattice offset vector is given by ½(p$_x$, p$_y$), which means that IRG 2012 is an FSIRG. By rotating structure S1 2013 about the z-axis in a clockwise direction to form a new structure S1 2015 and rotating structure S2 2014 about the z-axis in a counter-clockwise direction to form a new structure S2 2016 a modified IRG 2017 is created. Owing to the breaking of shape symmetry by the rotations, this new IRG 2017 may have to-eye orders with non-zero diffraction efficiency, the magnitude of which in general will depend on the rotation angles applied to structures S1 and S2. Alternatively, the rotation may be applied to just structure S1 or S2.

d) Mirror difference—FIG. 20*d* shows a top view of part of an IRG 2018. Here the structures S1 2019 and S2 2020 are the same and the lattice offset vector is given by ½(p$_x$, p$_y$), which means that IRG 2018 is an FSIRG. By mirroring structure S2 2019 about the yz plane to form a new structure S2 2021, a modified IRG 2022 is created. Owing to the breaking of shape symmetry by the mirroring, this new IRG 2022 may have to-eye orders with non-zero diffraction efficiency. Unlike the other operations mirroring cannot be applied gradually, the only choice being the plane through which the structures are mirrored and which structures are chosen for mirroring.

e) Height difference—FIG. 20*e* shows a perspective view of part of an IRG 2023. Here the structures S1 2024 and S2 2025 are the same and the lattice offset vector is given by ½(p$_x$, p$_y$), which means that IRG 2023 is an FSIRG. By increasing the height of structure S1 2024 to form a new structure S1 2026 and decreasing the height of structure S2 2025 to form a new structure S2 2027 a modified IRG 2028 is created. Owing to the breaking of shape symmetry by the change in heights, this new IRG 2028 may have to-eye orders with non-zero diffraction efficiency, the magnitude of which we expect to depend on the difference in height introduced between structures S1 and S2. Alternatively, the change in height may also be applied to just one set of structures.

f) Blaze difference—FIG. 20*f* shows a perspective view of part of an IRG 2029. Here the structures S1 2030 and S2 2031 are the same and the lattice offset vector is given by ½(p$_x$, p$_y$), which means that IRG 2029 is an FSIRG. The structures exhibit a slanted top owing to blaze modification. By increasing the blaze angle of structure S1 2030 to form a new structure S1 2032 and reducing the blaze angle structure S2 2031 to form a new structure S2 2033 a modified IRG 2034 is created. Owing to the breaking of shape symmetry by the change in blaze, this new IRG 2034 may have to-eye orders with non-zero diffraction efficiency, the magnitude of which we expect to depend on the change in blaze angle applied to structures S1 and S2. Alternatively the change in blaze may apply to just one of the structures, or may include a change in the orientation of the slope.

g) Shape difference—FIG. 20*g* shows a top view of part of an IRG 2035. Here the structures S1 2036 and S2 2037 are the same and the lattice offset vector is given by ½(p$_x$, p$_y$), which means that IRG 2035 is an FSIRG. By changing the shape of structure S2 2037 from having a circular profile to having a square profile 2038 a modified IRG 2039 is created. Owing to the breaking of shape symmetry by this change, the new IRG 2039 may have to-eye orders with non-zero diffraction efficiency, the magnitude of which we expect to depend on the similarity of the shapes for structures S1 and S2. Geometric morphing methods may be used to create a range of shapes with a controllable difference. For example, two shapes may be used to represent two extreme possibilities of shape and from these a morph used to compute intermediate shapes which may then be used in an IRG. As long as the morph is smooth and continuous then it is possible in principle to produce shapes with a continuous degree of difference from each other, providing for a broad range of geometry changes. With the exception of relative lattice shift, all the methods listed above may be regarded as examples of shape difference constrained to a particular aspect such as height or rotation.

h) Optical properties difference—FIG. 20*h* shows a top view of part of an IRG 2040. Here the structures S1 2041 and S2 2042 are the same and the lattice offset vector is given by ½(p$_x$, p$_y$), which means that IRG 2040 is an FSIRG. By changing the composition of the structure S2 2042 to form a new structure S2 2043 such that at least one intrinsic optical property is different to S1 2040*a* modified IRG 2044 is created. Owing to the breaking of composition symmetry this new IRG 2044 may have to-eye orders with non-zero diffraction efficiency, the magnitude of which we expect to depend on the degree of difference of the optical properties of structures S1 and S2.

i) Splitting or merging structures—FIG. 20*i* shows a top view of part of an IRG 2045. Here the structures S1 2046 and S2 2047 are the same and the lattice offset vector is given by ½(p$_x$, p$_y$), which means that IRG 2045 is an FSIRG. By replacing structure S2 2047 with a new structure composed of multiple elements 2048 a modified IRG 2049 is created. Due to the breaking of shape symmetry the new IRG 2049 may have to-eye orders with non-zero diffraction efficiency. As well as splitting structures into multiple elements it is also possible to merge structures together. In fact, both of these changes can be viewed as a form of geometric morph and on this basis a range of intermediate structures may be created to provide for a range of degree of shape symmetry breaking. For example, FIG. 20j shows a top view of a single structure 2050. This structure may be elongated to form a new structure 2051. By narrowing the centre of structure 2051 a shape may be created that appears to be two elements fused together 2052. By narrowing the waist between the structures to the point that the elements are separated a new structure 2053 composed of two elements 2054 and 2055 may be formed. Thus, structures 2051 and 2052 may be considered to be intermediate structures within a range of structures between structure 2050 and 2053.

It should be noted that in applications of an IRG as part of a DWC it is preferable that any differences created in an IRG using the methods described above, or otherwise, should not alter the periodicity or orientation of lattices L1 and L2 of the IRG. Doing so would change the directions of the various diffraction orders and may disrupt the function of the IRG in a DWC. The methods described above may be applied individually or combined together and even repeated multiple times. In principle any of the shape modification methods identified previously may be used to create a break of symmetry, including draft modification, slant transformation, rounding as well as single and multilayer coating methods. As such the modifications detailed above should be considered to be examples of a wide variety of modifications. For example, any modification to geometry may in principle be applied to just structure S1 and/or periodic structure PS1, or just to structure S2 and/or periodic structure PS2. Alternatively, a geometric modification may be applied to both sets of structures but to a different degree. For example, both periodic structures PS1 and PS2 of an IRG may undergo slant modification with symmetry breaking achieved by altering the magnitude and/or direction of the slant applied to periodic structure PS1 relative to that applied to periodic structure PS2.

It will be appreciated that these modifiers need not use an FSIRG as a starting point and may be used to augment an IRG where differences between the underlying periodic structures already exists. It is also important to note that the methods for inducing differences between the periodic structures PS1 and PS2 outlined above are just a sample of the different possible modifications that enable the described advantages for controlling the diffraction efficiencies of the diffraction orders of an IRG.

Use of Interleaved Rectangular Gratings with Diffractive Waveguide Combiners

Figure 21A:
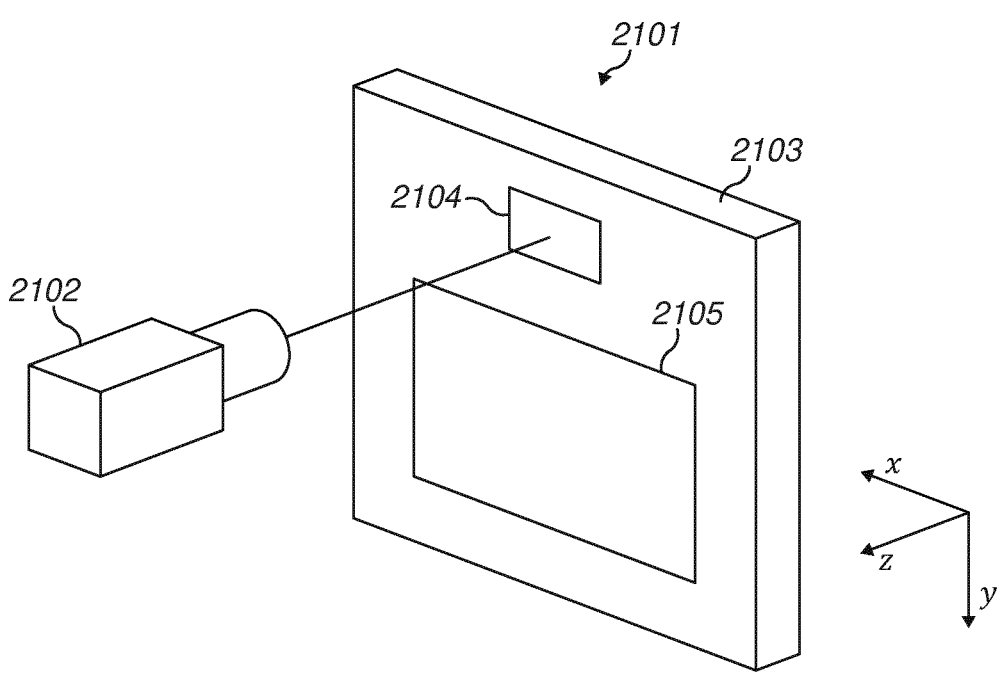
FIG. 21a is a perspective view of a diffractive waveguide combiner featuring an interleaved rectangular grating according to an aspect of the present invention.
Figure 21B:
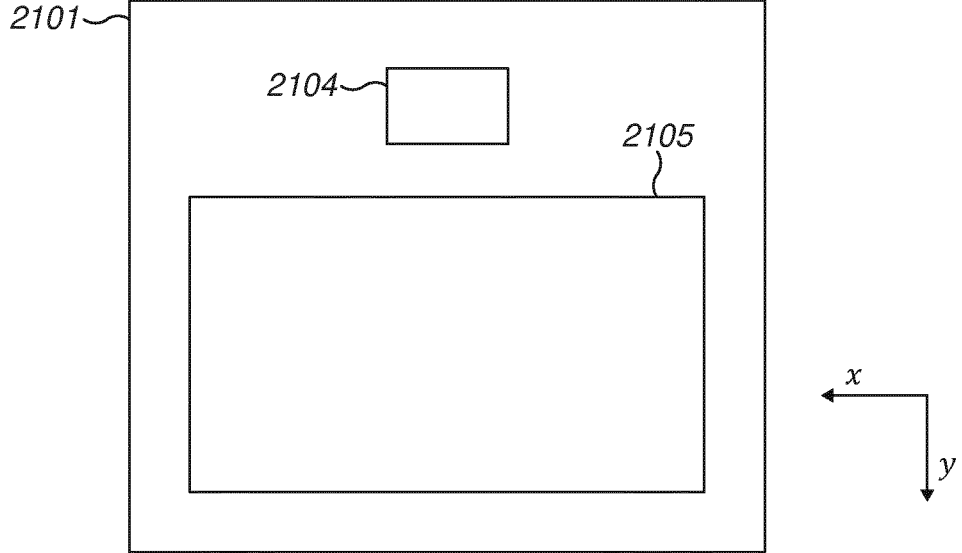

FIGS. 21a, 21b show, respectively, a perspective view and a top view of a layout for an augmented reality display system including a diffractive waveguide combiner which employs an embodiment of an interleaved rectangular grating. A diffractive waveguide combiner 2101 consisting of a light transmissive substrate 2103 configured as a planar slab waveguide, an input grating 2104 and an output element configured as an interleaved rectangular grating 2105. The medium M surrounding the DWC 2101 has a refractive index of less than the substrate 2103. Typically this medium will be air, but this need not be the case. The medium M will typically be the same on all sides of the waveguide but this need not be the case. Typically the substrate 2103 has a thickness that may be between 0.1 mm and 4.0 mm and preferably a thickness that may be between 0.25 mm and 1.0 mm. The outer profile of the substrate 2103 in the xy-plane is shown to be rectangular in FIG. 21a but this may be a wide range of shapes as long as the input grating 2104 and IRG 2105 can be accommodated to the sizes required to receive the output from a projector 2102 and the design eyebox of the system.

The waveguiding faces of the substrate 2103 have a very low roughness, along with a high degree of flatness and parallelism to each other. The non-waveguiding faces of the substrate 2103 may be painted black or otherwise treated with a light absorptive material and may have a rough or smooth surface finish in order to reduce the scattering of light incident on the non-waveguiding faces back into the waveguide which can reduce the performance of the DWC 2101 by introducing artefacts such as haze.

Viewing of real-world light may be made possible through the waveguiding surfaces of the DWC 2101 as a consequence of the light transmissive property of the substrate 2103 and the existence of zeroth-order diffraction orders of the IRG with non-zero diffraction efficiency for real-world light incident on the DWC 2101 from the surrounding medium M. In other configurations where viewing of real-world light is not required a light occlusion device may be used on the opposite side of the DWC 2101 to that used for viewing where the occlusion device is configured to prevent light from the real-world from interfering with viewing of the projected image.

A projector 2102 is configured to produce an ensemble of collimated beams of light which are directed to fall onto the input grating 2104. The output from the projector 2102 may be monochromatic or cover a range of wavelengths to provide a full colour image. Together the ensemble of beams of light form an image focused at infinity which is to be displayed by the DWC 2101 in conjunction with transmissive viewing of real-world light through the DWC 2101. Light beams from the projector 2102 are coupled into the DWC 2101 by the input grating 2104 using methods described herein and undergo waveguided propagation towards the IRG 2105 wherein pupil replication for eyebox expansion and output coupling for observation both take place by repeated interactions of light beams with the IRG 2105 as a consequence of the diffractive scattering properties of the grating.

Typically the output beams from the projector 2102 are circular in shape and have a diameter of between 0.25 mm and 10 mm, and preferably a diameter between 1.0 mm and 6.0 mm. The ensemble of beams output from the projector 2102 will have a range of xy-wavevectors. For a projector based on a rectangular micro-display such an LCOS, DMD or micro-LED display panel, for each wavelength from the projector 2102 the range of xy-wavevectors will usually comprise an approximately rectangular region of k-space. Other light projection technologies may produce other shapes but any display system for projector 2102 that produces an image with a non-zero field of view will produce a range of xy-wavevectors that correspond to at least one region of k-space.

In some applications an observer (not shown) will view the light coupled out from the IRG 2105. In some arrangements the observer will be on the same side of the DWC 2101 as the projector 2102, in other arrangements the observer will be on the opposite side of the DWC 2101.

The planes of the input grating 2104 and IRG 2105 are configured parallel to the waveguiding surfaces of the substrate 2103. A Cartesian (x, y, z)-coordinate is defined where the xy-plane is parallel to the waveguiding surfaces and diffraction gratings of the DWC 2101. Both the input grating 2104 and IRG 2105 may be located on either of the outer waveguiding surfaces of the substrate 2103 or embedded within the substrate. The input grating 2104 and IRG 2105 need not lie within the same plane but the planes of the gratings should be parallel to each other. The input grating 2104 and IRG 2105 may be configured with grating vectors that are advantageous for the operation as a diffractive waveguide combiner for augmented or virtual reality display applications. As such the notable cumulative orders and nomenclature of tables 1 and 2 may be adopted to facilitate the description of the operation of the DWC 2101.

The input grating 2104 has a structure and composition suitable for the diffractive scattering of light and is a one-dimensional grating with a grating vector given by $$g_1 = \frac{2\pi}{p_y}(0, 1).$$ 
(182)

The period of the input grating $p_y$ is such that first-order diffraction scattering of light beams from the projector 2102 results in light beams waveguided within the substrate 2103 by total internal reflection. It has been found for many applications that it may be preferable for $p_y$ to be in the range 150 nm to 800 nm, and for applications using visible light it may be preferable for $p_y$ to be in the range 250 nm to 600 nm.

Depending on the range of wavelengths output by the projector, and the refractive index of the substrate 2103 it may not be possible to find a value of $p_y$ where all xy-wavevectors will lie within the waveguiding range of the substrate 2103 after first order diffraction by the input grating 2104. In this case the designer may select a combined range of field of view and display wavelengths so that the resulting range of xy-wavevectors may be accommodated within the waveguiding region of the DWC 2101 or a selected portion thereof.

If the substrate 2103 has a refractive index n, the medium M has a refractive index $n_0$, and $\lambda_1$ and $\lambda_2$ are the shortest and longest wavelengths in vacuum of the range required for display by the DWC 2101, respectively, then in order for TIR waveguiding of the entire field of view and range of wavelengths to be possible $p_y$ should satisfy the following inequalities in order for TIR waveguiding of the entire field of view and range of wavelengths to be possible:

$$p_y \leq \frac{\lambda_1}{n_0\left(1 + \sin\frac{\Theta_y}{2}\right)}; \text{ and}$$
(183)

$$p_y > \frac{\lambda_2\sqrt{1 + \tan^2\frac{\Theta_x}{2} + \tan^2\frac{\Theta_y}{2}}}{\sqrt{n^2\left(1 + \tan^2\frac{\Theta_x}{2} + \tan^2\frac{\Theta_y}{2}\right) - n_0^2\tan^2\frac{\Theta_x}{2} - n_0\tan\frac{\Theta_y}{2}}},$$
(184)

where $\Theta_x$ and $\Theta_y$ are, respectively, the horizontal and vertical field of view of the display in the medium M. Here $\Theta_x$ is defined by considering the angle subtended by the range of wavevectors when projected into the xz-plane, and $\Theta_y$ is defined by considering the angle subtended by the range in wavevectors projected in the yz-plane. Here it is assumed that the beam corresponding to the centre of the field of view is incident normal to the plane input grating 2104. It will be clear to someone skilled in the art that other arrangements are also possible where the projector 2102 is tilted so that the centre of the field of view is not normal to the plane of the input grating 2104 and in such a case equations (183) and (184) should be adjusted accordingly.

For some systems it is advantageous for the useable region in k-space available for waveguiding by TIR to be smaller than the limits forced by TIR and evanescence. One reason to do this is to ensure that the distance between successive pupil replications, such as predicted by equation (85), are maintained within a desired range. Such a circumstance may be taken into account by defining a cropped waveguiding region where the xy-wavevector $(k_x, k_y)$ of a waveguided light beam in the DWC 2101 satisfies $$(1+f_1)^2 n_0^2 k_0^2 \leq k_x^2 + k_y^2 < (1-f_2)^2 n^2 k_0^2.$$
(185)

Here the parameter $f_1$ provides for an increase of the minimum angle of incidence of waveguided light beams on the surfaces of the DWC 2101 as compared to the TIR limit, and the parameter $f_2$ provides for a decrease in the maximum angle of incidence of waveguided light beams from the surfaces of the DWC 2101 from the limit of 90°. The parameters $f_1$ and $f_2$ should satisfy the inequalities $$0 \leq f_1 \leq 1, 0 \leq f_2 \leq 1 \text{ and } (1+f_1)n_0 < (1-f_2)n.$$
(186)

Constraining the field of view to fit within the cropped waveguiding region of equation (185) requires that $p_y$ should satisfy the following inequalities:

$$\hspace{8cm} (187)$$

$$p_y \leq \frac{\lambda_1}{n_0\left(1 + \sin\frac{\Theta_y}{2}\right)}; \text{ and}$$

$$\hspace{8cm} (188)$$

$$p_y > \frac{\lambda_2\sqrt{1 + \tan^2\frac{\Theta_x}{2} + \tan^2\frac{\Theta_y}{2}}}{\sqrt{n^2(1-f_2)^2\left(1 + \tan^2\frac{\Theta_x}{2} + \tan^2\frac{\Theta_y}{2}\right) - n_0^2\tan^2\frac{\Theta_x}{2} - n_0\tan\frac{\Theta_y}{2}}},$$

If these inequalities cannot be satisfied simultaneously, then the combined range of wavelengths and field of view is too large for the cropped waveguiding region of the substrate 2103.

Generally the input grating 2104 should be large enough to receive the entire ensemble of beams from the projector 2102 so that no light from the projector is wasted however this need not be the case. In principle light may be coupled into the waveguiding region of k-space by the input grating 2104 via both the $m_1 = +1$ and $m_1 = -1$ diffraction orders. This will result in ensembles of light beams travelling in both the general +y- and −y-directions. Only the +y-direction is desirable for the purposes of the DWC 2101. As such the input grating 2104 may feature a structure and composition for its unit cell such that the diffraction efficiency of the $m_1 = +1$ order is much greater than that of the $m_1 = -1$ order over the range of incident beam angles and wavelengths provided by the projected light. This may help increase the overall optical efficiency of the DWC 2101.

The IRG 2105 may be arranged so that the centre of the grating lies approximately in the +y-direction relative to the centre of the input grating 2104. The lattices L1 and L2 of the IRG 2105 are constructed from the grating vectors $$g_x = \frac{2\pi}{p_x}(1, 0),$$ (189)

$$g_y = \frac{2\pi}{p_y}(0, 1).$$ (190)

Here, the period in the y-direction, $p_y$, has been set equal to that of the input grating 2104. The period in the x-direction, $p_x$, may be chosen such that for the intended range of wavelengths and field of view at least some portion of the corresponding xy-wavevectors will continue to undergo waveguided propagation within the substrate 2103 after a beam that has first been coupled into the waveguide by first order diffraction by the input grating 2104 then undergoes a T+X to T−X turn order, as defined in table 2 in FIG. 46. In some embodiments it is advantageous to ensure that wave-guided beams corresponding to beams from the projector 2102 that initially possess a positive $k_x$ value remain wave-guided after a T−X turn order and beams corresponding to beams from the projector 2102 that initially have a negative $k_x$ value remain waveguided after a T+X turn order. This is to ensure advantageous coverage of the eyebox by ensuring that light beams which travel in the +x direction after output are distributed to the −x side of the DWC 2101 relative to the centre of the input beam location, and, similarly, light beams which travel in the −x direction after output are distributed to the +x side of the DWC 2101. This may provide a better prospect for ensuring that the projected eyebox for beams that travel in the ±x-directions after output is covered by appropriate pupil replication events. To ensure this condi-tion, and assuming that the cropped waveguiding region described by inequality (185) applies, then $p_x$ must satisfy the following inequalities:

$$p_x \leq \frac{\lambda_1}{n_0\left(1 + f_1 + \sin\frac{\Theta_x}{2}\right)}; \text{ and}$$ (191)

$$p_x > \frac{\lambda_2}{\sqrt{n^2(1 - f_2)^2 - n_0^2\sin^2\frac{\Theta_y}{2}}}.$$ (192)

In most circumstances it has been found that it is prefer-ential for $p_x$ to be in the range $0.5p_y \leq p_x \leq 2p_y$.

The IRG 2105 should be large enough to provide pupil replication sufficient to cover the intended size of the eyebox of the system, including taking into account projection of the eyebox for all points of the field of view from the defined position to the plane of the IRG 2105. If the central ray exits the DWC 2101 at normal incidence to the surface, then for an eyebox size of w in the x-direction and h in the y-direc-tion at located a perpendicular distance s from the wave-guide then size of the IRG 2105 should satisfy $$W \geq w + d_p + 2s \tan\frac{\Theta_x}{2},$$ (193)

in the x-direction, and $$H \geq h + d_p + 2s \tan\frac{\Theta_y}{2},$$ (194)

in the y-direction. Here $d_p$ is the diameter of the entrance pupil of a system used to observe the output from the grating and the output grating has been sized to ensure that in principle the entrance pupil can be filled at all positions within the eyebox. In some configurations it is advantageous to ensure that the eyebox may be covered by pupils arising from light beams following a path that feature only a single T+X or T−X turn order into the {±1, −1} cumulative orders of the IRG 2105 and no other turn orders before the beams are output. This requires that the dimension of the output grating in the y-direction is increased at each end by a distance depending on the intended layout of the input grating 2104 and IRG 2105 and which may be computed in a straightforward fashion by analytical or computational raytracing of the corners of the field of view for the longest and shortest wavelengths intended for the design.

The relations (183), (184), (187), (188), (191), (192), (193) and (194) are valid for a rectangular field of view oriented to the x- and y-directions of the DWC 2101 and such that the centre of the field of view is at normal incidence to the DWC 2101. Other shapes and orientations of the field of view are possible in which case the corre-sponding expressions for the grating periods $p_x$ and $p_y$ and the minimum size of the IRG 2105 will be changed accord-ingly but may be derived using either the inequality (185) for $p_x$ and $p_y$, or from geometric ray tracing from the eyebox for the size of the IRG 2105.

The structure of the IRG 2105 may be composed of one or more materials and may be configured as a surface relief structure, a surface relief structure with one or more layers of coating, an embedded structure, an embedded structure with one or more layers of coating, a multilayer surface relief structure, a multilayer surface relief structure with one or more layers of coating, a multilayer embedded structure, or a multilayer embedded structure with one or more layers of coating. At least one of the materials of the IRG 2105 may have at least one optical property which is different to the medium surrounding the IRG 2105. For an embedded struc-ture this medium is the substrate 2103, for a surface relief structure this medium is the medium surrounding the sub-strate 2103, which may be air.

Alternatively, the IRG 2105 may be configured as a variation of optical properties within a thin layer of material on the surface of the substrate 2103 or a thin layer of material within the substrate 2103. In these cases the layer of material may be a liquid crystal, a photopolymer or any other material capable of supporting a spatial variation of optical properties such as refractive index, electric permit-tivity, magnetic permeability, birefringence and/or absorp-tivity.

Generally it is advantageous for the structure and com-position of the IRG 2105 to be tailored such that the efficiencies of the diffraction orders yield a good balance of performance across the properties listed in table 3 in FIG. 47. As noted previously in order for to-eye orders to have non-zero diffraction efficiency some form of symmetry breaking should exist from the condition of a fully symmet-ric interleaved grating.

Use of Multiple Diffractive Waveguide Combiners

The finite range of xy-wavevectors afforded by the cropped waveguiding region described by inequality (185) limits the combined range of wavelengths and field of view that may be supported by a single DWC 2101. By stacking together two or more DWCs on top of each other a com-posite DWC may be realised. In principle, the range of wavelengths and/or size of field of view of projected light that can be displayed by such a system may be larger than a system relying on a single DWC. Projected light coupled out from DWCs that are further from a viewer's eye than the nearest DWC will pass through the DWCs nearer to the eye in the same way as real-world. Thus, the overall output from a composite DWC is a combination of the outputs from the individual DWCs. In such a system each DWC need only handle a portion of the range of wavelengths and/or gaze angles of projected light required for the total system. As long as the ranges of wavelengths and gaze angles handled by each DWC overlap each other to some extent, then the total range of wavelengths and/or field of view of projected light that may be displayed by the composite DWC may be increased relative to that of a DWC based on a single waveguide composed of the same substrate material.

One way in which this may be accomplished is to employ different grating periods $p_x$ and $p_y$ for each of the individual DWCs of a composite DWC. Based on inequality (185) each DWC will be able to convey different ranges of wavelengths and/or gaze angles of projected light.

Figure 22A:
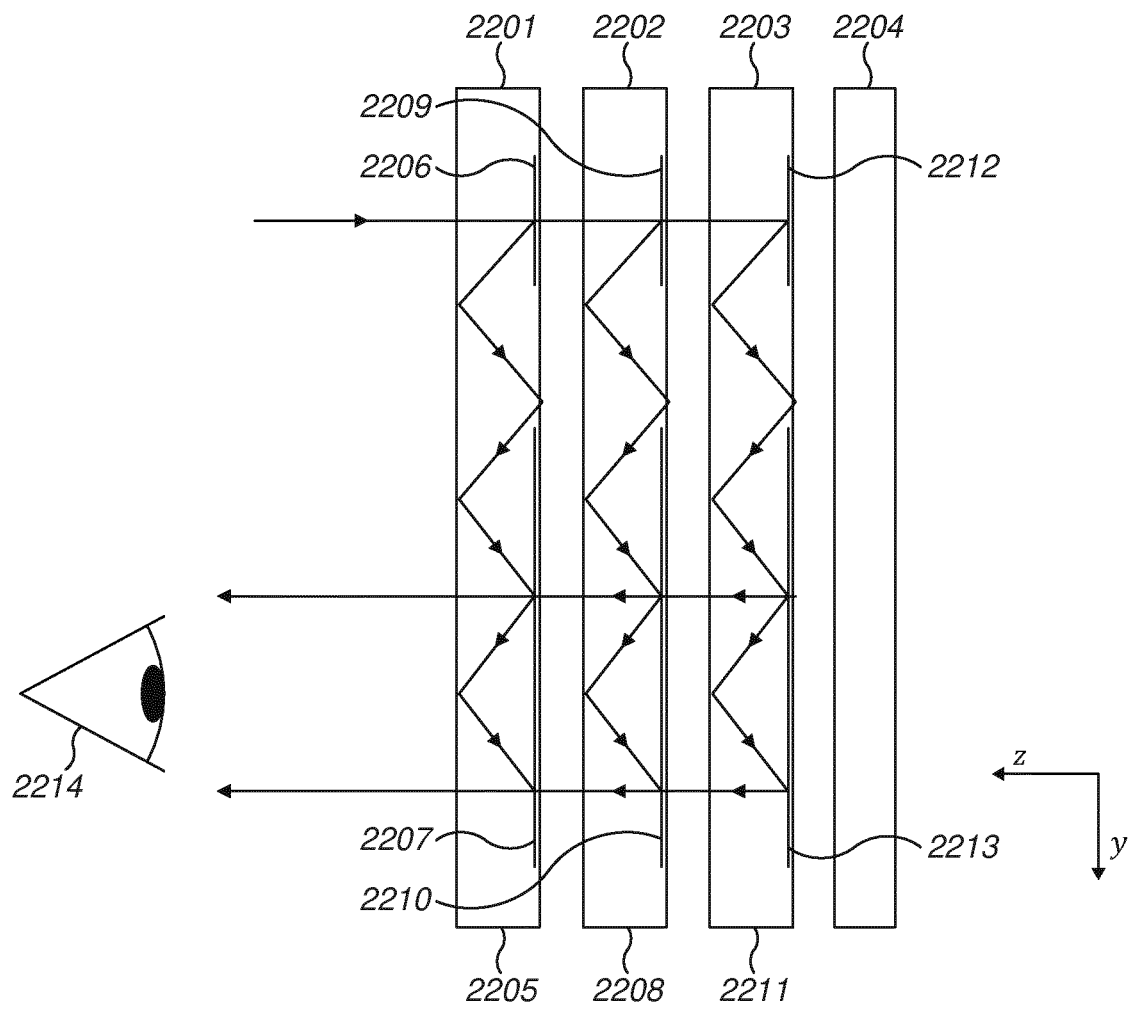
FIG. 22a shows cross-sectional view of a configuration of the invention that uses multiple diffractive waveguide combiners.

By way of example FIG. 22a shows a system where three DWCs 2201, 2202, 2203 are provided as part of an augmented reality display system. Each DWC 2201, 2202, 2203 is configured in a fashion similar to DWC 2101. A cover glass 2204 is also incorporated to protect the front facing surface of DWC 2203. DWC 2201 is composed of a substrate 2205 which forms a planar slab waveguide into which is incorporated an input grating 2206 and IRG 2207, configured as an output element of DWC 2201. DWC 2202 is composed of a substrate 2208 which forms a planar slab waveguide into which is incorporated an input grating 2209 and IRG 2210, configured as an output element of DWC 2202. DWC 2203 is composed of a substrate 2211 which forms a planar slab waveguide into which is incorporated an input grating 2212 and IRG 2213, configured as an output element of DWC 2203. Preferentially the DWCs 2201, 2202 and 2203 are parallel to each other to a high degree. A projector (not shown) produces an image bearing ensemble of light beams which is directed onto the input grating 2206. By ensuring that the input gratings 2209 and 2212 lie along the path of projected light as conveyed by zeroth order transmission of any preceding input gratings, as well as ensuring that a non-negligible fraction of the light incident on input gratings 2206 and 2209 is transmitted through these gratings, the projected light may be coupled into all three DWCs. Preferentially the IRGs 2207, 2210 and 2213 overlap each other spatially when viewed in the xy-plane so that the output from each IRG can be overlapped, this will allow an observer 2214 to simultaneously observe light from all three DWCs and thus see an image combined from the overlap of the output of each DWC.

Projected light coupled into each of the DWCs 2201, 2202 and 2203 will behave in a fashion similar to the single DWC 2101. In this case each DWC has grating periods chosen to suit a portion of the wavelengths and/or field of view of the projected light output by the projector.

For a normal RGB colour display each waveguide may be optimized for a single component colour, red, green or blue. This optimization may apply not only to the choice of grating periods $p_x$ and $p_y$, but also to the design of the structures of the IRGs 2207, 2210, 2213. Use of a smaller range of wavelengths may allow for improved control of diffraction efficiencies as the intrinsic variation associated with the wavelength of an incident light beam may be significantly reduced. In this way not only may an extended field of view and/or wavelength range be accommodated by a display system, but also the performance of the system may be made more optimal.

Figure 22B:
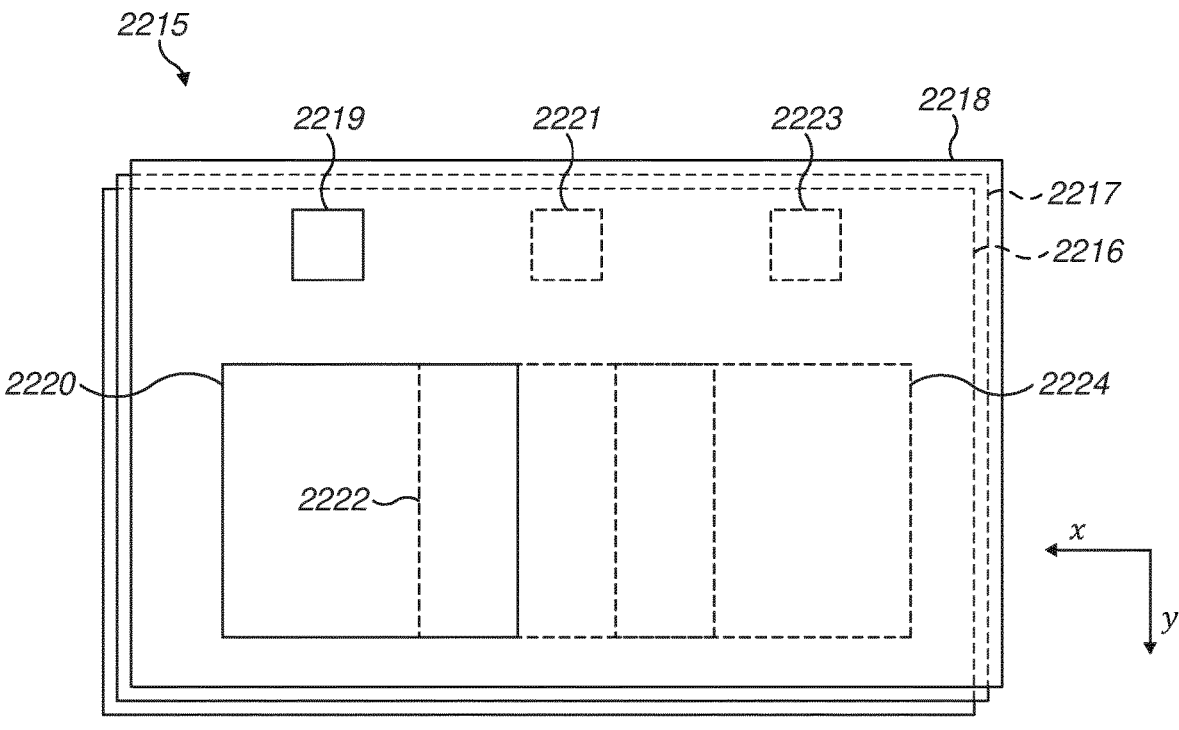
FIGS. 22b-c show top views of other configurations of the invention that use multiple diffractive waveguide combiners.

In another variation multiple projectors may be used. Here the output from each projector may be coupled to all the DWCs in the stack or just some of the DWCs in the stack. FIG. 22b shows a top view of a DWC stack 2215 of three DWCs 2216, 2217, and 2218. DWC 2216 has an input grating 2219 and an IRG 2220 configured as an output element of the DWC. DWC 2217 has an input grating 2221 and an IRG 2222 configured as an output element of the DWC. DWC 2218 has an input grating 2223 and an IRG 2224 configured as an output element of the DWC. The size and position of the input gratings 2219, 2221, and 2223 when viewed in the xy-plane need not be the same. Similarly, the size and position of the IRGs 2220, 2222 and 2224 when viewed in the xy-plane need not be the same. In this configuration separate projectors may be used to direct projected light into each of the DWCs 2216, 2217 and 2218. This may allow for an increase in the field of view by facilitating the use of projectors with a smaller field of view output in combination with separate DWCs optimized for a portion of the total field of view of the system.

Figure 22C:
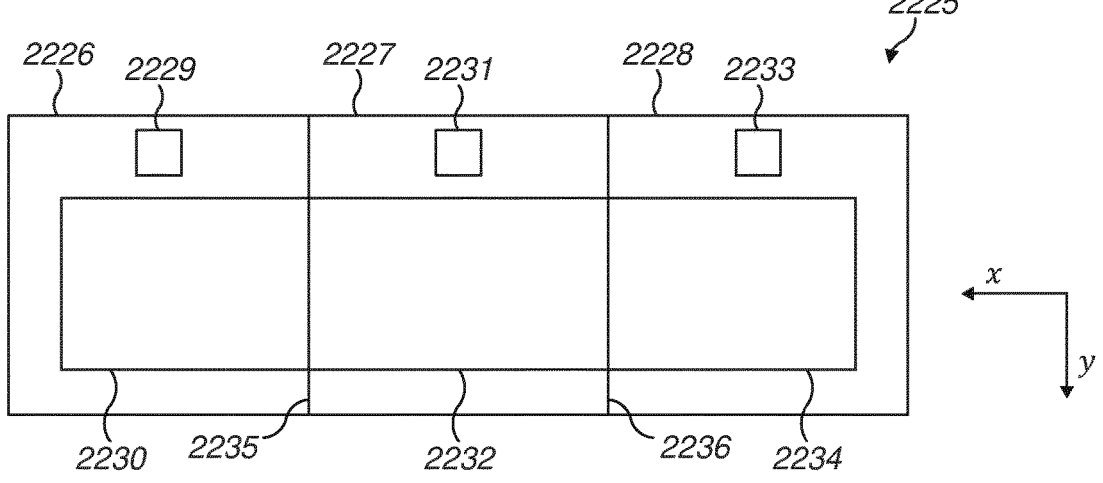

FIG. 22c shows a top view of another variation of a system using multiple DWCs 2225. In this system three DWCs 2226, 2227 and 2228 are placed adjacent to each other in order to provide an increase in the field of view of a system in the xz-plane and/or an increase in the size of the eyebox of a system in the x-direction. DWC 2226 has an input grating 2229 and an IRG 2230 configured as an output element of the DWC. DWC 2227 has an input grating 2231 and an IRG 2232 configured as an output element of the DWC. DWC 2227 has an input grating 2233 and an IRG 2234 configured as an output element of the DWC. Separate projectors may be used to send projected light into each of the DWCs 2226, 2227 and 2228. Preferably in some configurations DWCs 2226 and 2227 are joined together, forming a seam 2235, and DWCs 2227 and 2228 are joined together, forming a seam 2236. In such a configuration it may be advantageous for the seam to incorporate a light absorbing material so that light from one DWC is not coupled into the others. Each of the DWCs 2226, 2227 and 2228 may have its own design and be optimized for a different range of wavelengths and field of view of projected light. In another configuration the DWCs 2226, 2227 and 2228 need not be coplanar and in some configurations it may be advantageous to turn the DWCs 2226 and 2228 inwards towards an observer to create a wrap effect. Such an approach may further help to increase the total field of view of a system.

It will be appreciated that in principle any number of DWCs may be used in a multiple DWC system and that a combination of the methods described here may be used. For example, one configuration could take several multiply stacked waveguides as shown in FIG. 22a and place them adjacent to each other in a fashion similar to that shown in FIG. 22c.

Manufacturing Processes for Interleaved Rectangular Gratings

Practical realisation of a DWC that features an IRG at its output element may require the use of manufacturing processes capable of creating sub-micron scale optical structures or patterns of variations of optical properties. Depending on the intended application these processes may need to be scalable to large volumes and/or low cost. Well-established processes that may be suitable for use in IRG fabrication include the following:

i) Ruling/Scribing—By precisely running an extremely sharp tool on a suitable substrate a 1D grating can be made and by performing a second pass at a rotation of 90° a 2D rectangular grating can be made which can then be transferred into other materials by replication methods such as casting or embossing. However, the shapes that can be made by this method are very limited and it is difficult to achieve carefully controlled symmetry breaking as required for many IRGs when applied in a DWC.

ii) Direct writing—Using nanoscale machining processes such as focused ion beam milling (FIB) combined with a computerised control system it is possible to directly write a wide range of nanoscale structures, such as required for an IRG that employs surface relief structures. Depending on the material for the substrate of a DWC such milling could be directly into the substrate or a thin layer of a suitable material deposited on top of the substrate.

iii) Lithography—Using a method to create a nanoscale pattern in a suitable resist material followed by an etching process to remove material in the target part can allow a wide range of nanoscale structures to be made, such as those suitable for an IRG that employs surface relief structures. Such processes are well suited to creating binary structures. These processes may be applied multiple times to create so-called multi-level structures which can have a more complex shape than binary structures. The patterning of the resist can be accomplished by several processes including those that use direct writing of a single exposure point such as an electron beam (e-beam lithography) or rely on replication of a primary mask, which may be a scaled-up version of the intended design such as is typical in optical lithography processes including UV/EUV lithography. Depending on the material used for the substrate of a DWC, such lithography may be used to etch directly into the substrate or a thin layer of a suitable material deposited on top of the substrate. Coating multiple layers of material onto a substrate followed by a suitable resist material and then using lithography methods to etch into the multiple layers may provide for an IRG with multi-layered structures featuring a variety of materials that vary according to distance in the direction normal to the plane of the grating.

iv) Replication onto substrate—Methods such as direct writing or lithography can be used to form a mastering surface from which an IRG can be replicated onto a substrate. Here moulding methods such as nano-imprint lithography may be used to replicate an inverse version of the master pattern in formable materials such as thermoplastic resins, UV-curable resins, and thermally-curable resins. Such resins may be applied as a thin-layer of coating onto a substrate followed by a patterning step by the mastering surface and a curing step to fix the structure. Use of replication can allow for higher volume and lower cost production of DWC parts compared to direct writing and lithography methods. Multiple replication steps after mastering may be applied to increase the number of available moulds, or provide for moulds with multiple dies of the same part. Replication methods can be applied to rigid substrates, such as glass wafers, or flexible substrates, such as polymer films. Flexible substrates allow the use of reel-to-reel methods for the application of nanoimprinted structures. The resulting nano-imprinted foil can then be applied to a rigid substrate in a separate lamination process.

v) Injection moulding/casting—Methods such as direct writing or lithography can be used to form a mastering tool. When appropriately configured, this mastering tool can be incorporated into an injection mould tool and used to fabricate substrate parts from thermoplastic resins where the IRG is formed as a surface relief structure that is an intrinsic part of the moulded substrate. Thermoset resins may also be formed into similar parts using related casting processes.

vi) Patterning liquid crystals—An IRG realised as a periodic variation in the orientation of a liquid crystal may be created using pattern exposure methods to induce orientation in thin layers of liquid crystal polymers which are then cured into a set resin (e.g. using UV photo-polymerisation). Multiple layers may then be built up with variations in the liquid crystal orientation at each layer allowing for the formation of three-dimensional structures of oriented liquid crystals. Here the patterning of the orientation of the liquid crystals would be according to the principles of an interleaved rectangular grating where the grating plane is parallel to the liquid crystal layers. Orientation of the liquid crystals prior to curing in place may be accomplished by direct-write methods using tightly focused UV lasers. Achieving sufficient resolution to enable fabrication of an IRG is very challenging using these methods.

vii) Photopolymer exposure—Another approach for creating an IRG that is realised as a variation of optical properties embedded into a layer of material is to use certain photopolymers. Materials such as Bayfol® HX film (Covestro AG) may be modified by exposure to intense light such that the refractive index of the film changes. Such modification may be accomplished by interfering different light beams or using direct-writing methods with focused light beams. In both cases the formation of structures small enough for use in making an IRG with visible light is very challenging. Furthermore, owing to the small refractive index differences afforded by these materials (e.g. $\Delta n \approx 0.035$ for Bayfol® HX film) multiple layers will typically be needed to create non-neglible diffraction efficiencies. However, the number of layers should not be so large that three-dimension Bragg diffraction effects become significant.

viii) Coating—As discussed elsewhere coating processes can be used to add one or more layers of different materials to an IRG which can modify its optical properties. Such processes can be applied in a directional fashion, such as well-collimated physical vapour deposition, or can be applied in a less directionally selective fashion, such as using orientation tumbling processes with PVD, plasma coating processes or, for particularly conformal coatings atomic layer deposition.

ix) Encapsulation/lamination/multilayer—An IRG produced as a surface relief structure can be made into an embedded structure by encapsulating it in a material that extends the substrate to essentially envelope the IRG. Over-moulding provides for one range of methods for doing this. Another approach may use a thin layer of adhesive material which is sufficient to encapsulate the surface relief structure and onto which a second layer of substrate material is laminated, this second material may or may not be the same material as the original substrate. Related methods may also be used to create multilayer structures. Here a resin coating process of a dissimilar material to a previously formed surface relief structure is deposited to encapsulate the structure and provide a new base layer onto which additional surface relief structures can be formed. As noted elsewhere, by carefully controlling the thickness of such layers coherent effects may be exploited between the layers allowing for a greater degree of control over the diffraction scattering properties of an IRG formed by this approach.

Further Examples of Interleaved Rectangular Gratings Used in Diffractive Waveguide Combiners The general layout shown in FIGS. 21a-b is suitable for accommodating a wide range of examples of the invention but it will be appreciated by those skilled in the art that specific details such as the shape of the overall DWC, the exact location and shape of the various grating regions and other optical elements, the design position with respect to an observer, as well as the choice of grating periods will depend on the specific design requirements of a particular system such as the intended projector field of view, eyebox size, position of wear and design form factor.

There now follows a number of specific embodiments of the invention. It will be appreciated by someone skilled in the art that these cases are examples and there exists a great variety of designs made possible by the present invention and the methods disclosed herein.

Figure 23:
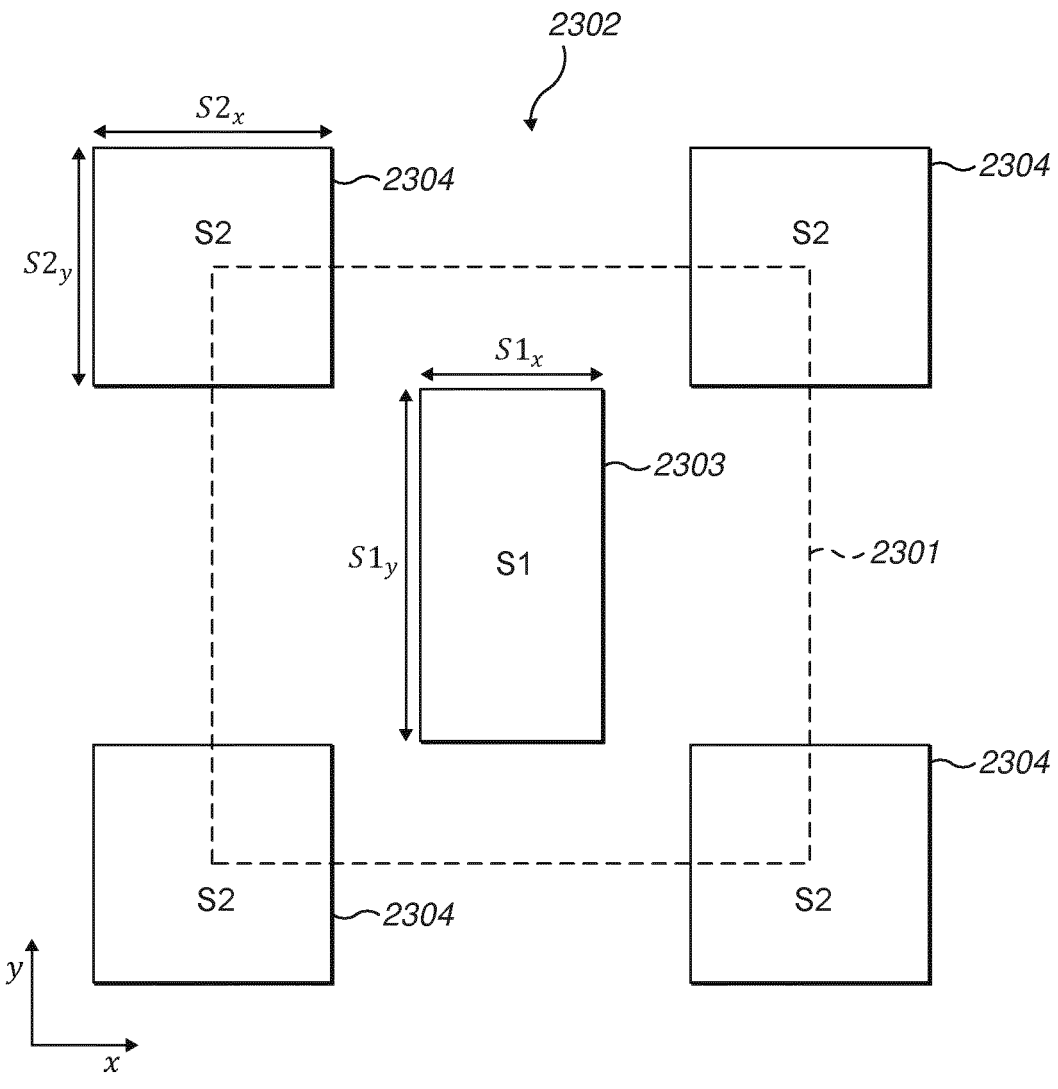
FIG. 23 is a top view of a unit cell of an interleaved rectangular grating according to the present invention where one array of optical structures may have a different shape compared to the other array of optical structures.

Example 1—Interleaved Rectangular Gratings Using Scaling to Introduce Shape Symmetry Breaking FIG. 23 is a top view of a unit cell 2301 which may be repeated across the xy-plane to form an IRG 2302. The IRG 2302 may be configured for use as the output element of a DWC such as the DWC 2101. The IRG 2302 has a surface relief structure which protrudes into a surrounding medium, in this case air. Periodic structure PS1 of the IRG 2302 is composed of copies of structure S1 2303 which has a rectangular cross-sectional shape when viewed in the plane of the grating and protrudes out of the plane of the grating into the surrounding air. Structure S1 2303 has sides of length $S1_x$ and $S1_y$ in the x- and y-directions, respectively. In the example shown $S1_y > S1_x$. The period of the lattice L1 and L2 of the IRG 2302, and so the length of the sides of unit cell 2301, is $p_x$ in the x-direction and $p_y$ in the y-direction.

Periodic structure PS2 of the IRG 2302 is composed of copies of structure S2 2304 which also has a rectangular cross-sectional shape when viewed in the plane of the grating and protrudes out of the plane of the grating into the surrounding air. Structure S2 2304 has sides of length $S2_x$ and $S2_y$ in the x- and y-directions, respectively. Owing to the chosen position for the unit cell 2301 there are four parts of separate copies of structure S2 2304 within the unit cell 2301. Structures S1 2303 and S2 2304 have the same material composition and materials as each other.

In the example shown in FIG. 23 it can be seen that $S1_x < S2_x$ and $S1_y > S2_y$. By varying the size, and/or shape, of structure S1 2303 and/or structure S2 2304 the efficiency of the diffraction orders can be varied.

Figure 24:
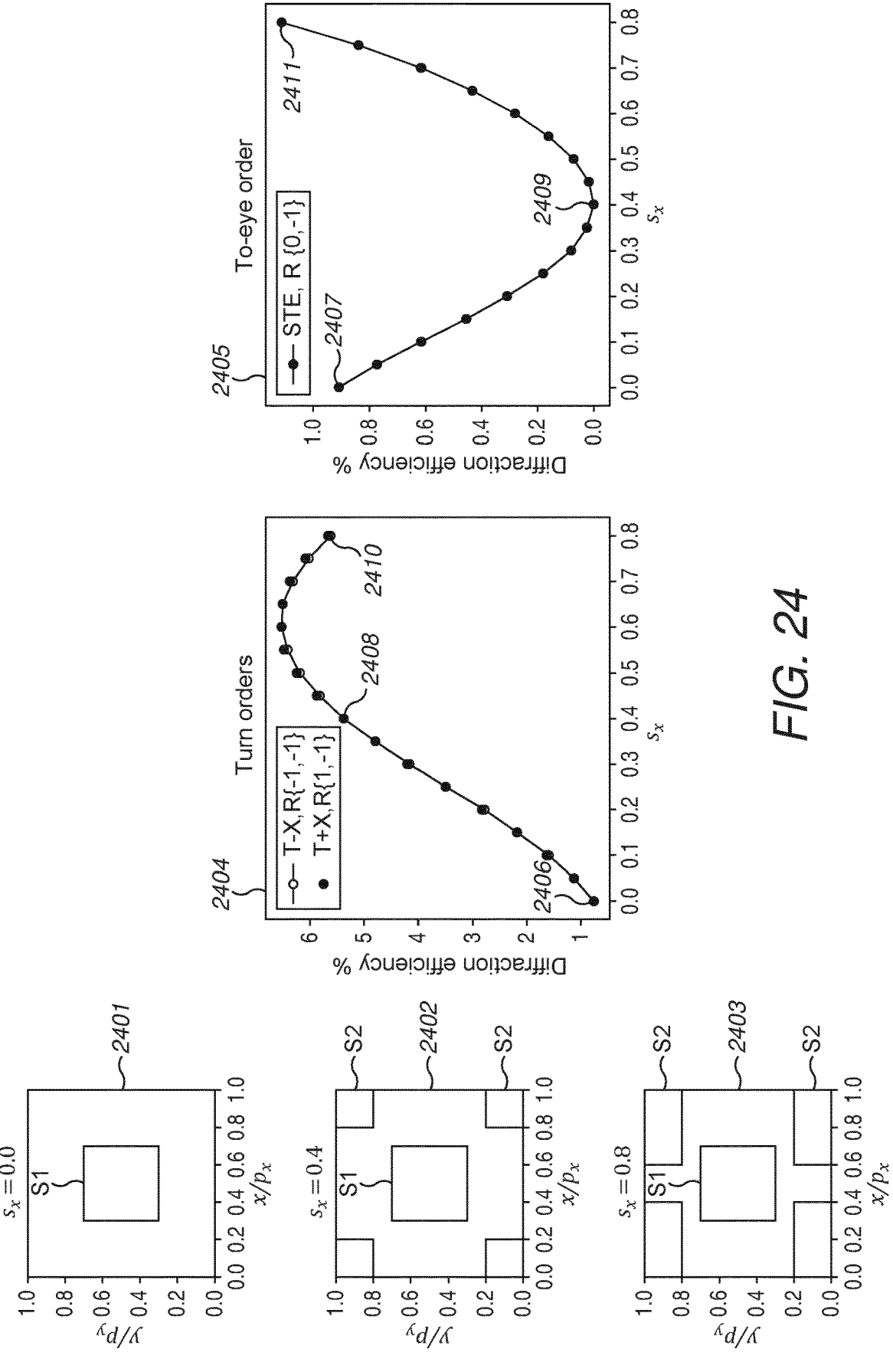
FIG. 24 shows a series of unit cell configurations based on the general definition shown in FIG. 23 as well as graphs showing how the diffraction efficiency of two turn orders and a to-eye order vary depending on a parameter governing the shape of an aspect of one the structures making up an interleaved rectangular grating.
Figure 25:
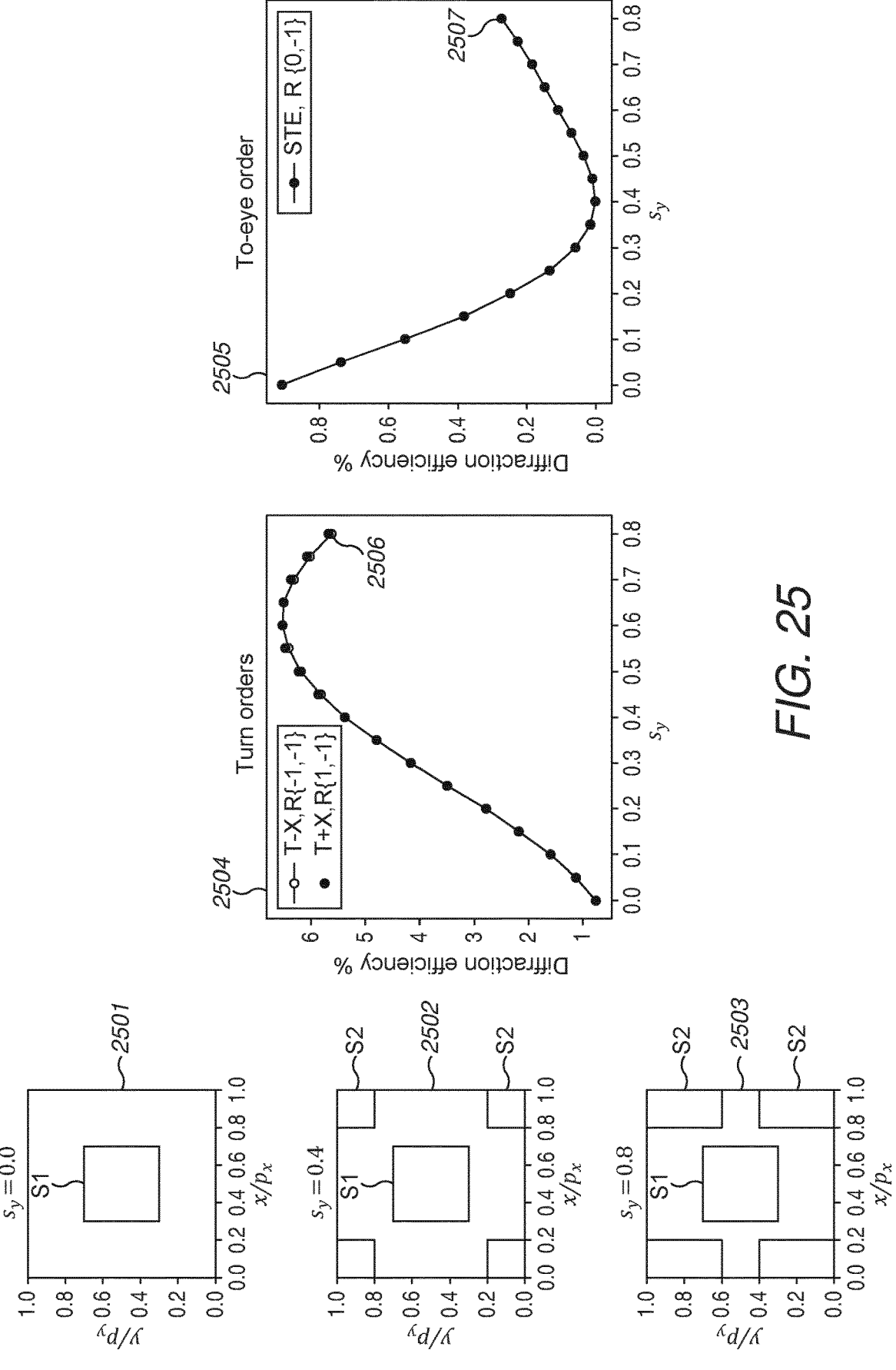
FIG. 25 shows a series of unit cell configurations based on the general definition shown in FIG. 23 as well as graphs showing how the diffraction efficiency of two turn orders and a to-eye order vary depending on a parameter governing the shape of an aspect of one the structures making up an interleaved rectangular grating.
Figure 26:
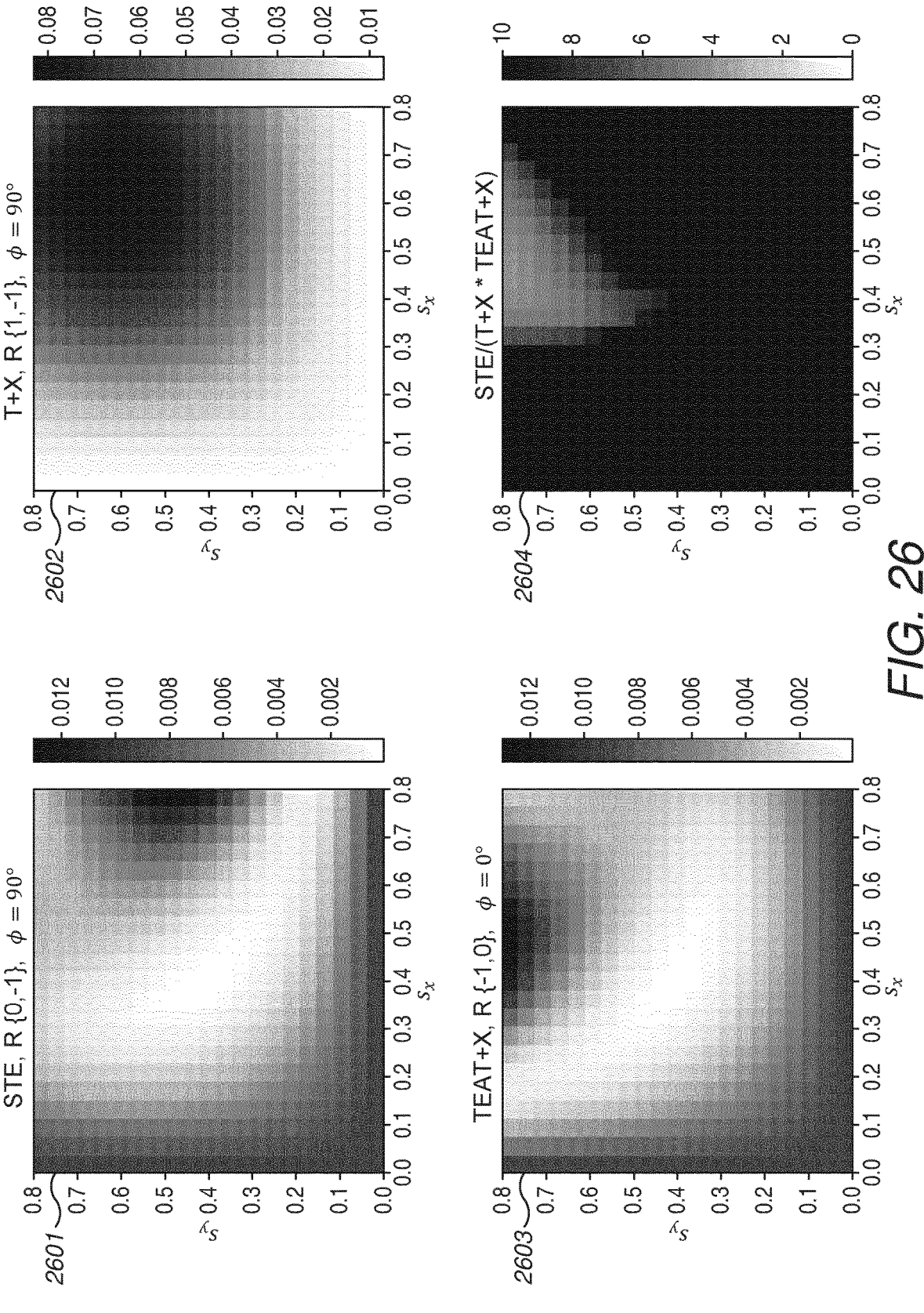
FIG. 26 shows a series of heatmaps demonstrating the variation of diffraction efficiency of various diffraction orders with respect to parameters governing the shape of one of the structures making up the interleaved rectangular grating.

FIGS. 24, 25 and 26 show various graphs for diffraction efficiency calculation of IRGs formed from specific examples of the unit cell shown. For the purposes of these calculations $p_x = p_y = 355$ nm, the structures have a height of 100 nm, the IRG is composed of a material with a refractive index of 1.82 and is on a substrate with a refractive index of 1.82. Unless stated otherwise, the incident beam used in the calculations has a wavelength in vacuum of 528 nm and is incident with spherical angles according to equation (7) of $\theta = 55°$ and $\phi = 90°$.

FIG. 24 shows a series of graphs showing how the diffraction efficiency of turn orders and to-eye orders change based on the extent of the difference in shape between one array of optical structures with respect to the other array of optical structures.

Insets 2401, 2402 and 2403 show example unit cells that can make up an IRG 2105 as described above. Note that the x- and y-axes of these graphs are normalized to the period in the x-direction, $p_x$, and the period in the y-direction, $p_y$, of the IRG, respectively. The structures shown in 2401, 2402, and 2403 have the same parameters as the IRG 2302 and in all cases the structure S1 of the insets has side lengths of the rectangle given by $S1_x = 0.4p_x$ and $S1_y = 0.4p_y$.

The structures S2 in insets 2401, 2402, and 2403 has the same length parameter in the y-direction which is given by $S2_y = 0.4p_y$. In inset 2401 structure S2 has a length parameter in the x-direction of zero, $S2_x = 0$, which essentially means that there is no structure S2 in this unit cell. In inset 2402 the structure S2 has a length parameter in the x-direction of $S2_x = 0.4p_x$, which means that an IRG constructed using the unit cell of 2402 will be a fully symmetric interleaved rectangular grating (FSIRG) where the to-eye orders must have zero efficiency. In inset 2403 the structure S2 has a length parameter in the x-direction of $S2_x = 0.8p_x$. Thus, the insets 2401, 2402, and 2403 show a progression in the size of structure S2 in the x-direction from being absent through to being the same as structure S1 and then being significantly longer than structure S1.

Graphs 2404 and 2405 show the result of computation of the diffraction efficiencies for various diffraction orders of an IRG 2101 composed from a general case of the structures S1 and S2 shown in 2401, 2402, and 2403. For these graphs the size of the structure S2 in the x-direction is varied according to the parameter $s_x$ such that $S2_x = s_x p_x$. Graph 2404 shows how the diffraction efficiency of the $\{-1, -1\}$ T–X and $\{1, -1\}$ T+X turn orders in reflection vary with respect to $s_x$, and graph 2405 shows how the $\{0, -1\}$ STE to-eye order in reflection varies with respect to $s_x$.

The points 2406 and 2407 correspond to the unit cell shown in 2401, which is essentially a conventional rectangular grating, and show that for this grating the turn orders have relatively low efficiency, whereas the to-eye order has relatively high efficiency. The points 2408 and 2409 correspond to the unit cell shown in 2402, which is an FSIRG, and show that the turn orders have moderate efficiency whereas the to-eye order has zero efficiency, as expected. The points 2410 and 2411 correspond to the unit cell shown in 2403, which is a general case for an IRG and show that the diffraction efficiency of both the turn orders and the to-eye order are relatively high. The region between $s_x = 0.4$ and $s_x = 0.8$ shows comparatively little relative variation of the turn orders, whereas there is a very large relative variation of the to-eye order, thus demonstrating how an IRG can afford a significant degree of control of the diffraction efficiencies of to-eye orders relative to turn orders.

FIG. 25 shows a series of graphs showing how the diffraction efficiency of turn orders and to-eye orders vary based on variation of the length of structure S2 in the y-direction, whilst keeping the length of structure S2 in the x-direction constant and the same as structure S1, $S2_x = S1_x = 0.4p_x$. Here the parameter $s_y$ is used to define the length of structure S2 in the y-direction such that $S2_y = s_y p_y$. Inset 2501 shows the case $s_y = 0$ and results in a unit cell that is identical to inset 2401. Inset 2502 shows the case $s_y=0.4$ and results in a unit cell that is identical to inset 2402. Inset 2503 shows the case $s_y=0.8$.

Graphs 2504 and 2505 show the result of computation of the diffraction efficiencies for various diffraction orders of an IRG 2101 composed from the structures S1 and S2 of a form shown in insets 2501, 2502, and 2503. Here the length of structure S2 in the y-direction is varied according to the parameter $s_y$. The points 2506 and 2507 correspond to the unit cell shown in 2503. As can be seen the behaviour of the diffraction efficiencies is similar to that exhibited in graphs 2404 and 2405. However, whereas the T−X, T+X turn order diffraction efficiencies of the points 2506 are similar to those of the points 2410, the STE to-eye order diffraction efficiency of the point 2507 is significantly lower than that of the point 2411. Nonetheless significant variation is still seen in the STE to-eye order between the values $s_y=0.4$ and $s_y=0.8$. Thus, not only does the relative size of structure S2 to structure S1 affect the strength of the to-eye orders but the horizontal vs aspect ratio of the shape of structure S2 can have a significant effect.

FIG. 26 shows a series of heatmaps demonstrating the variation of the diffraction efficiency of various diffraction orders with respect to the x- and y-direction dimensions of structure S2 of the IRG 2302. Here the rectangular structure S1 is kept fixed with dimensions $S1_x=0.4p_x$ and $S1_y=0.4p_y$, whereas the rectangular structure S2 has dimensions $S2_x=s_xp_x$ and $S2_y=s_yp_y$. Heatmap 2601 shows the variation of the diffraction efficiency of the $\{0, -1\}$ STE to-eye order in reflection. It can be seen that the diffraction efficiency is largest at approximately $S2_x=0.8p_x$ and $S2_y=0.5p_y$. Heatmap 2602 shows the variation of the diffraction efficiency of the $\{1, -1\}$ T+X turn order in reflection. It can be seen that the diffraction efficiency is largest at approximately $S2_x=0.6p_x$ and $S2_y=0.6p_y$. Heatmap 2603 shows the variation of the diffraction efficiency of the $\{-1,0\}$ TEAT+X to-eye order in reflection. It can be seen that the diffraction efficiency is largest at approximately $S2_x=0.5p_x$ and $S2_y=0.8p_y$. Heatmap 2604 shows the ratio of the diffraction efficiency of the $\{0, -1\}$ STE to-eye order to the product of the diffraction efficiencies of the $\{1, -1\}$ T+X turn order and the $\{-1,0\}$ TEAT+X to-eye order. It has been found that for some configurations of a DWC it is advantageous to the uniformity of the output if this ratio is close to unity. As shown on heatmap 2604 this identifies a region in the vicinity of $s_x=0.5$ and $s_y=0.8$.

Figure 27:
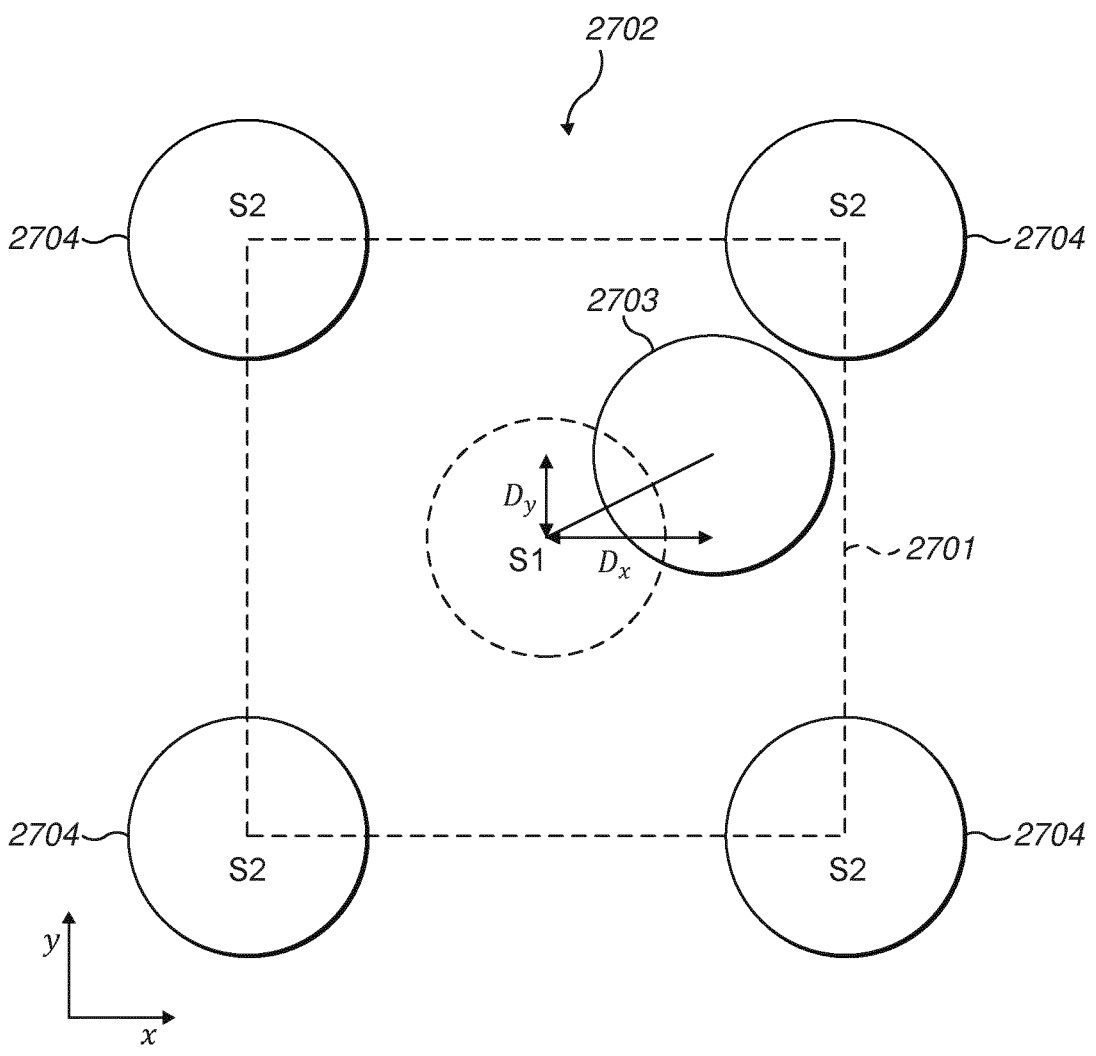
FIG. 27 is a top view of a unit cell of an interleaved rectangular grating according to the present invention showing a shift of one array of optical structures with respect to the other array of optical structures.

Example 2—Interleaved Rectangular Gratings Using Relative Lattice Position Shifts to Introduce Position Symmetry Breaking FIG. 27 shows a top view of a unit cell 2701 which may be repeated across the xy-plane to form an IRG 2702. The IRG 2702 may be configured for use as the output element of a DWC such as the DWC 2101. IRG 2702 has a surface relief structure which protrudes into a surrounding medium, in this case air.

Structures S1 2703 and S2 2704 of the IRG 2702 have the same size, shape and material composition. The structures have a circular cross-sectional shape when viewed in the plane of the grating and protrude out of the plane of the grating into the surrounding air. The period of lattice L1 and L2 of IRG 2702, and so the length of the sides of unit cell 2701, is $p_x$ in the x-direction and $p_y$ in the y-direction. The lattice offset vector of the IRG 2702 has a value defined to be $$o_{xy} = \frac{1}{2}(p_x, p_y) - (D_x p_x, D_y p_y). \tag{195}$$

As such $D_x$ and $D_y$ are relative lattice shift parameters for describing the displacement between lattices L1 and L2 of IRG 2702. It should be noted that for the case $D_x=D_y=0$ the IRG will be an FSIRG and so the diffraction efficiencies of the to-eye orders in table 2 in FIG. 46 will have zero efficiency. The parameters $D_x$ and $D_y$ therefore describe a degree of broken position symmetry for the IRG 2702, and so should the diffraction efficiencies of the various diffraction orders of the IRG 2702, in particular the to-eye orders of table 2 in FIG. 46. In some arrangements the shift may be in only the x- or y-directions by setting $D_y=0$ or $D_x=0$, respectively.

FIGS. 28*a-c*, 29*a-c*, 30, 31, and 32 show various graphs for diffraction efficiency calculation of IRGs formed from specific examples of the unit cell shown. For the purposes of these calculations $p_x=p_y=355$ nm, the structures have a height of 100 nm, the IRG is composed of a material with a refractive index of 1.82 and is on a substrate with a refractive index of 1.82. Unless stated otherwise, the incident beam used in the calculations has a wavelength in vacuum of 528 nm and is incident with spherical angles according to equation (7) of $\theta=55°$ and $\phi=90°$.

Figure 28A:
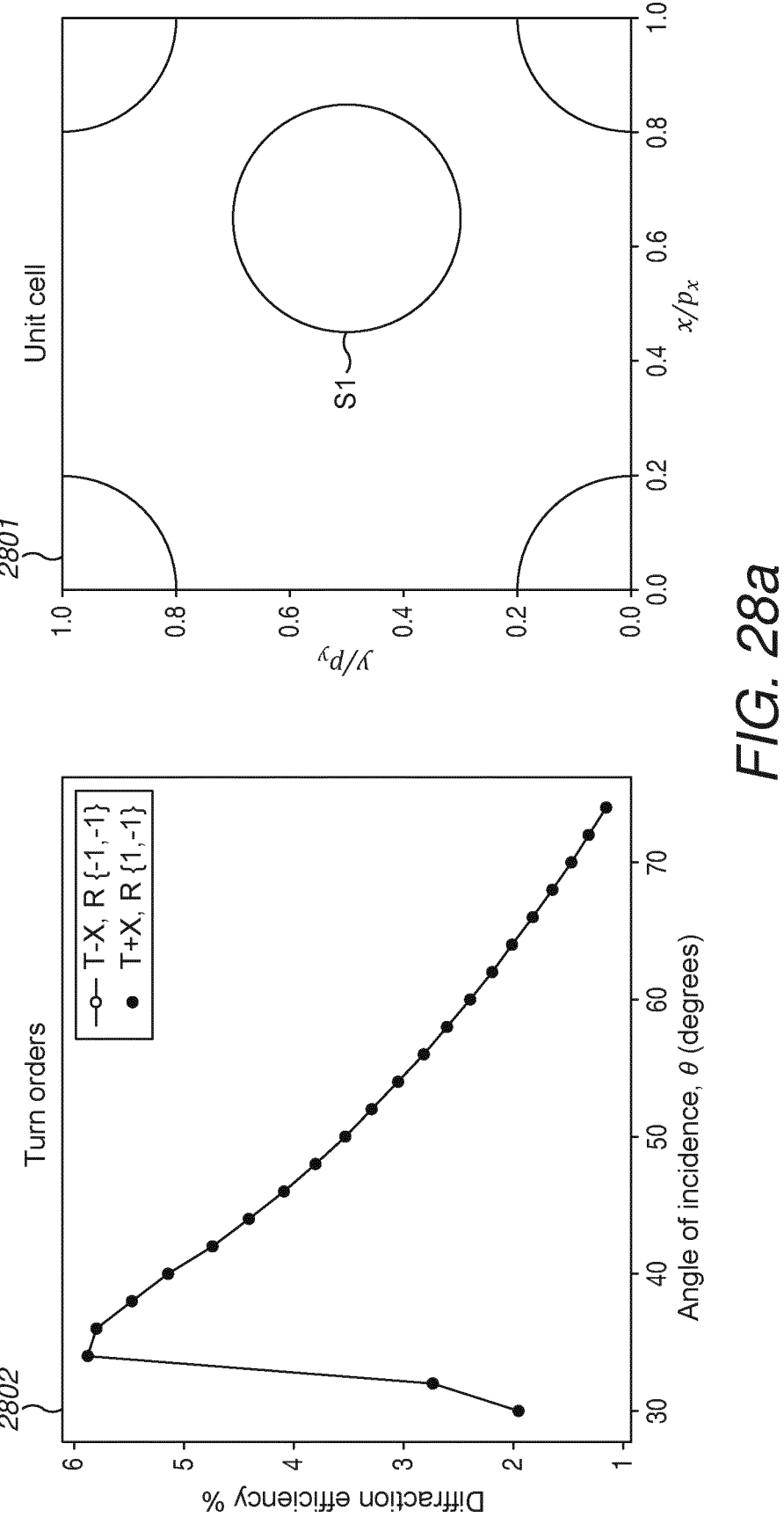
FIGS. 28a-c are a series of unit cell configurations and graphs showing how the diffraction efficiency of two turn orders varies with respect to angle of incidence for a number of interleaved rectangular gratings with unit cells based on the general definition shown in FIG. 27.
Figure 28B:
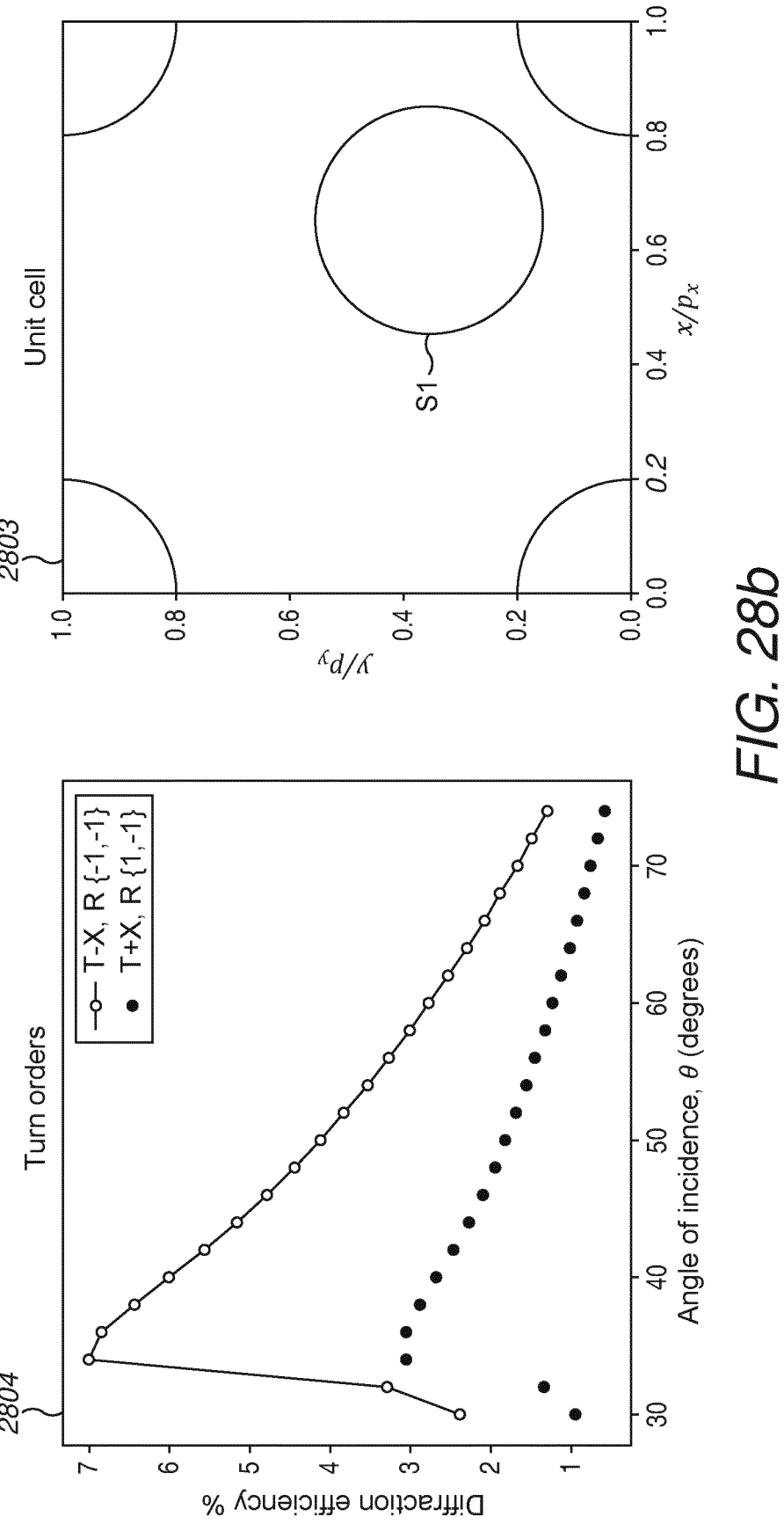
Figure 28C:
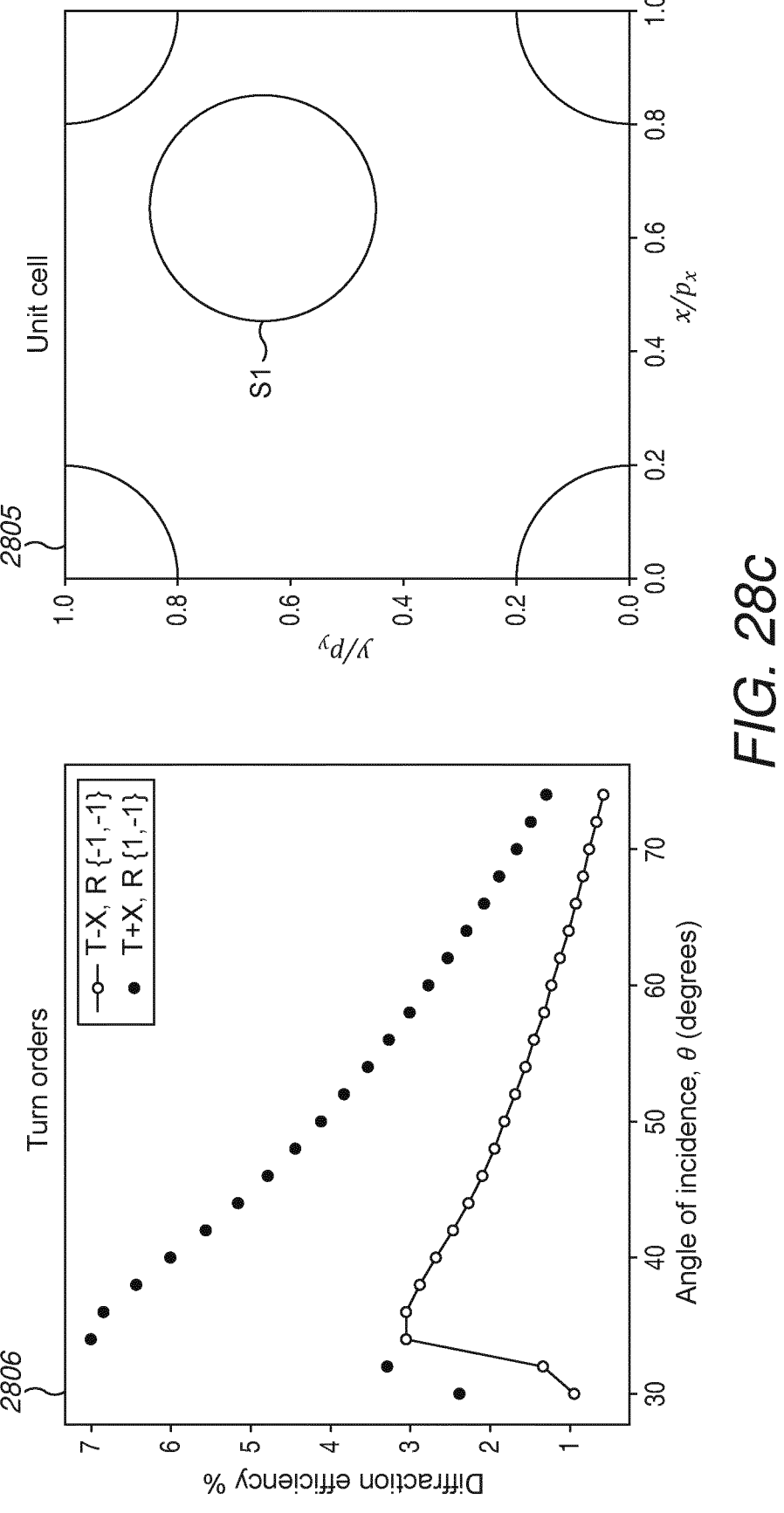

FIGS. 28*a-c* show the variation of two turn orders with respect to angle of incidence $\theta$ that results for various shifts between lattices L1 and L2 of IRG 2702. Here the circular structures S1 and S2 of the IRG have a diameter of $0.4p_x$. FIG. 28*a* shows unit cell 2801. In unit cell 2801 lattice L1 of IRG 2702 is shifted in the positive x-direction relative to lattice L2, i.e. $D_x>0$ and $D_y=0$. Graph 2802 in FIG. 28*a* shows for this arrangement the variation of the diffraction efficiency of the $\{-1, -1\}$ T−X and $\{1, -1\}$ T+X turn orders in reflection with respect to the angle of incidence on the IRG 2702 of a light beam with an xy-wavevector pointing in the y-direction only. As shown in Graph 2802 the diffraction efficiency of the T+X turn orders is the same as the T−X turn orders.

FIG. 28*b* shows unit cell 2803. In unit cell 2803 lattice L1 of IRG 2702 is shifted in the positive x-direction and the negative y-direction relative to lattice L2, i.e. $D_x>0$ and $D_y<0$. Graph 2804 in FIG. 28*b* shows for this arrangement the variation of the diffraction efficiency of the $\{-1, -1\}$ T−X and $\{1, -1\}$ T+X turn orders with respect to the angle of incidence on the IRG 2702 of a light beam with an xy-wavevector pointing in the positive y-direction only. As shown in Graph 2804 the diffraction efficiency of the T−X turn order is different to the T+X turn order in this arrangement, with the T−X order being relatively much stronger.

FIG. 28*c* shows unit cell 2805. In unit cell 2805 lattice L1 is shifted in the positive x-direction and the positive y-direction relative to lattice L2, i.e. $D_x>0$ and $D_y>0$. Graph 2806 in FIG. 28*c* shows for this arrangement the variation of the diffraction efficiency of the $\{-1, -1\}$ T−X and $\{1, -1\}$ T+X turn orders with respect to the angle of incidence on the IRG 2702 of a light beam with an xy-wavevector pointing in the positive y-direction only. As shown in Graph 2806 the diffraction efficiency of the T−X turn order is different to the T+X turn order in this arrangement, with the T+X order being relatively much stronger.

Thus, by having a displacement from the centre position in both the x- and y-directions differences in turn orders that are produced can be achieved. By varying the shift the diffraction efficiency of turn orders can be emphasised to a degree.

Figure 29A:
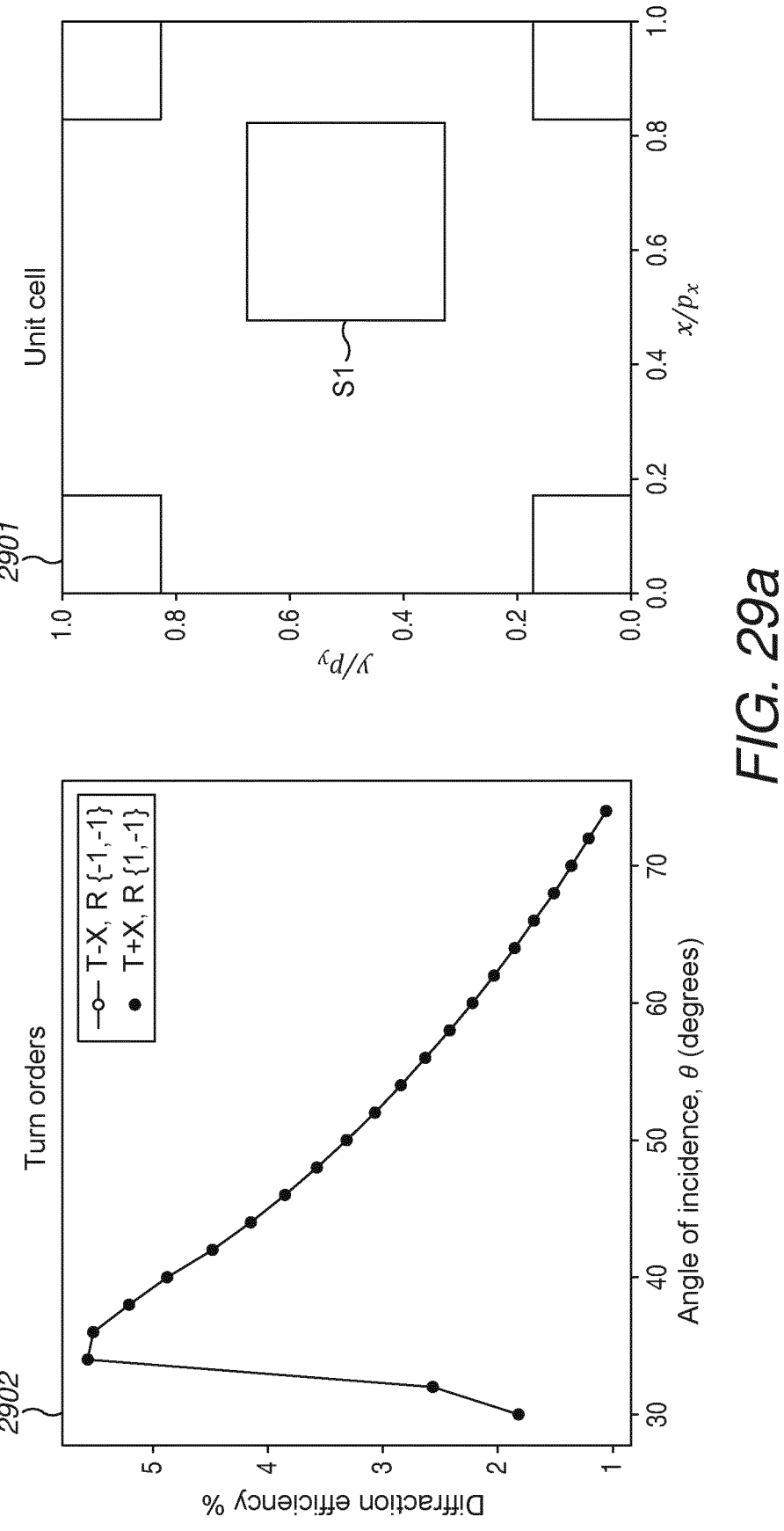
FIGS. 29a-c are a series of unit cell configurations and graphs showing how the diffraction efficiency of two turn orders varies with respect to angle of incidence for a number of interleaved rectangular gratings with unit cells based on identical arrays of square structures with different shift between the structures.
Figure 29B:
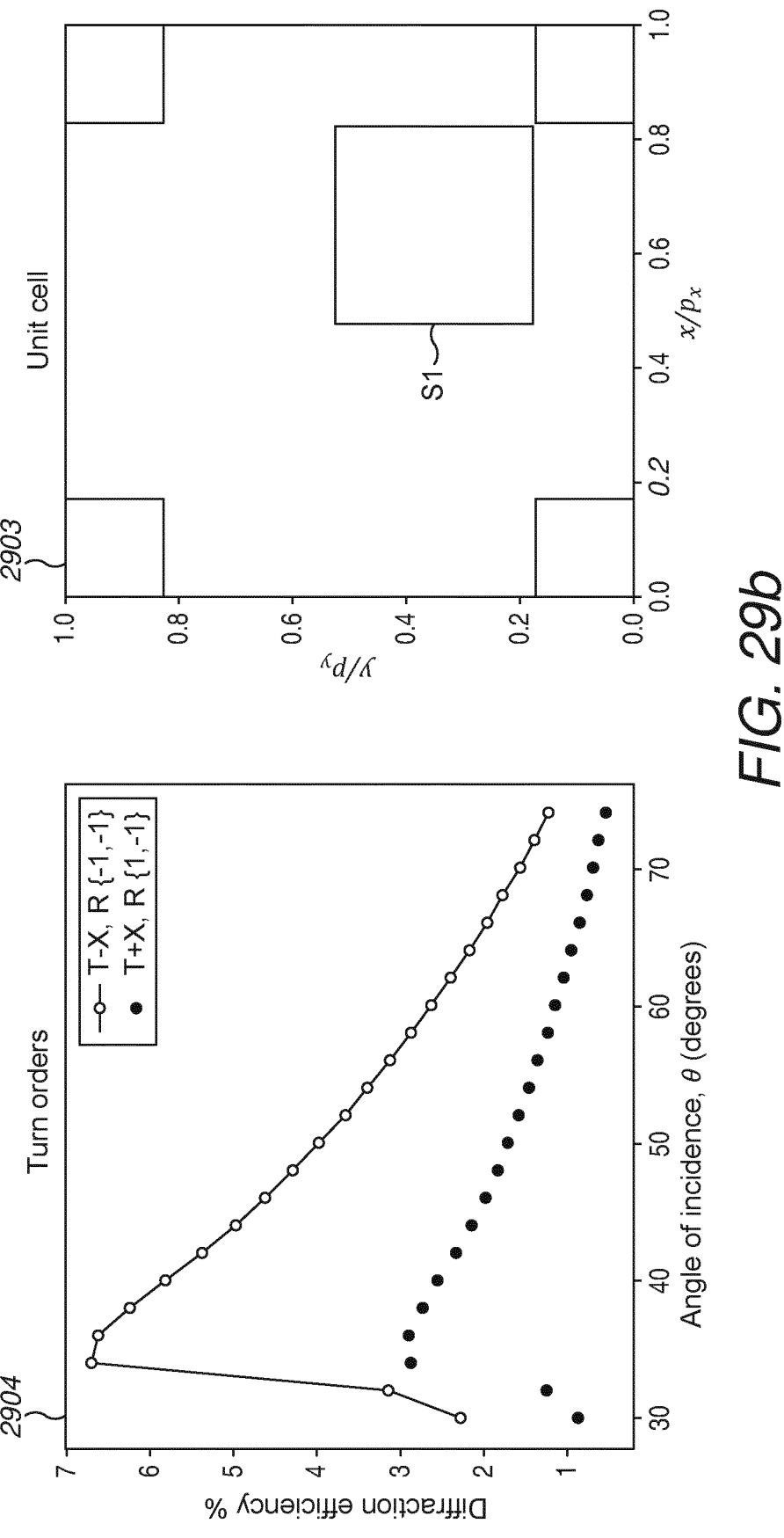
Figure 29C:
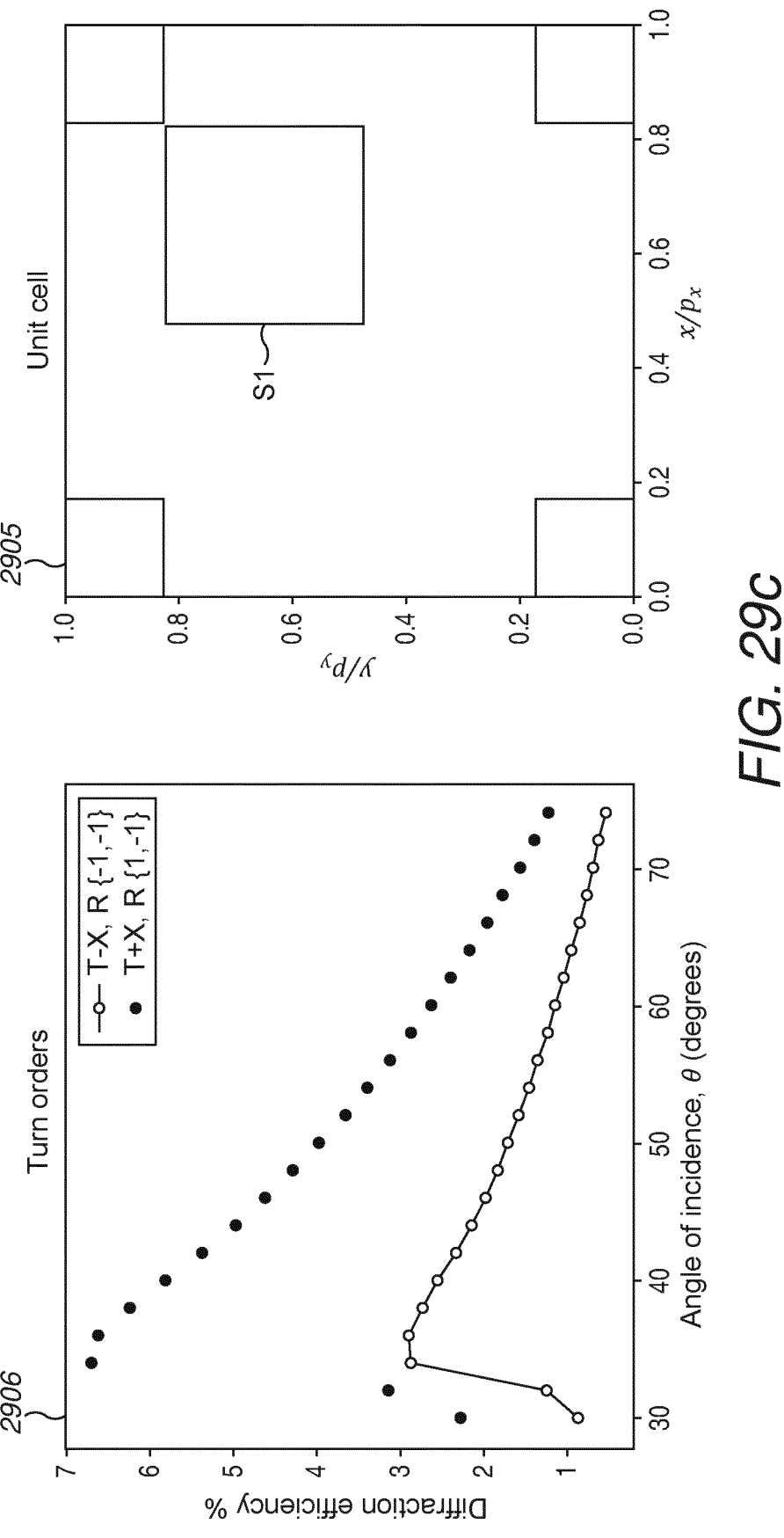

FIGS. 29a-c show that the same effect to that as described in relation to FIGS. 28a-c can also be achieved for square nanostructures. Here $S1_x=S2_x=S1_y=S2_y=0.35p_x$.

FIG. 29a shows unit cell 2901. In unit cell 2901 lattice L1 is shifted in the positive x-direction relative to lattice L2, i.e. $D_x>0$ and $D_y=0$. Graph 2902 in FIG. 29a shows for this arrangement the variation of the diffraction efficiency of the $\{-1, -1\}$ T−X and $\{1, -1\}$ T+X turn orders with respect to the angle of incidence of a light beam on an IRG with unit cell 2901, and where the xy-wavevector of the incident beam points in the positive y-direction only. As shown in Graph 2902 the diffraction efficiency of the T+X and T−X turn orders is the same in this arrangement.

FIG. 29b shows unit cell 2903. In unit cell 2903 lattice L1 is shifted in the positive x-direction and the negative y-direction relative to lattice L2, i.e. $D_x>0$ and $D_y<0$. Graph 2904 in FIG. 29b shows for this arrangement the variation of the diffraction efficiency of the $\{-1, -1\}$ T−X and $\{1, -1\}$ T+X turn orders with respect to the angle of incidence of a light beam on an IRG with unit cell 2903, and where the xy-wavevector of the incident beam points in the positive y-direction only. As shown in Graph 2904 the diffraction efficiency of the T−X turn order is different to the T+X turn order in this arrangement, with the T−X order being relatively much stronger.

FIG. 29c shows unit cell 2905. In unit cell 2905 lattice L1 is shifted in the positive x-direction and the positive y-direction relative to lattice L2, i.e. $D_x>0$ and $D_y>0$. Graph 2906 in FIG. 29c shows for this arrangement the variation of the diffraction efficiency of the $\{-1, -1\}$ T−X and $\{1, -1\}$ T+X turn orders with respect to the angle of incidence of a light beam on an IRG with unit cell 2905, and where the xy-wavevector of the incident beam points in the positive y-direction only. As shown in Graph 2906 the diffraction efficiency of the T−X turn order is different to the T+X turn order in this arrangement, with the T+X order being relatively much stronger.

Figure 30:
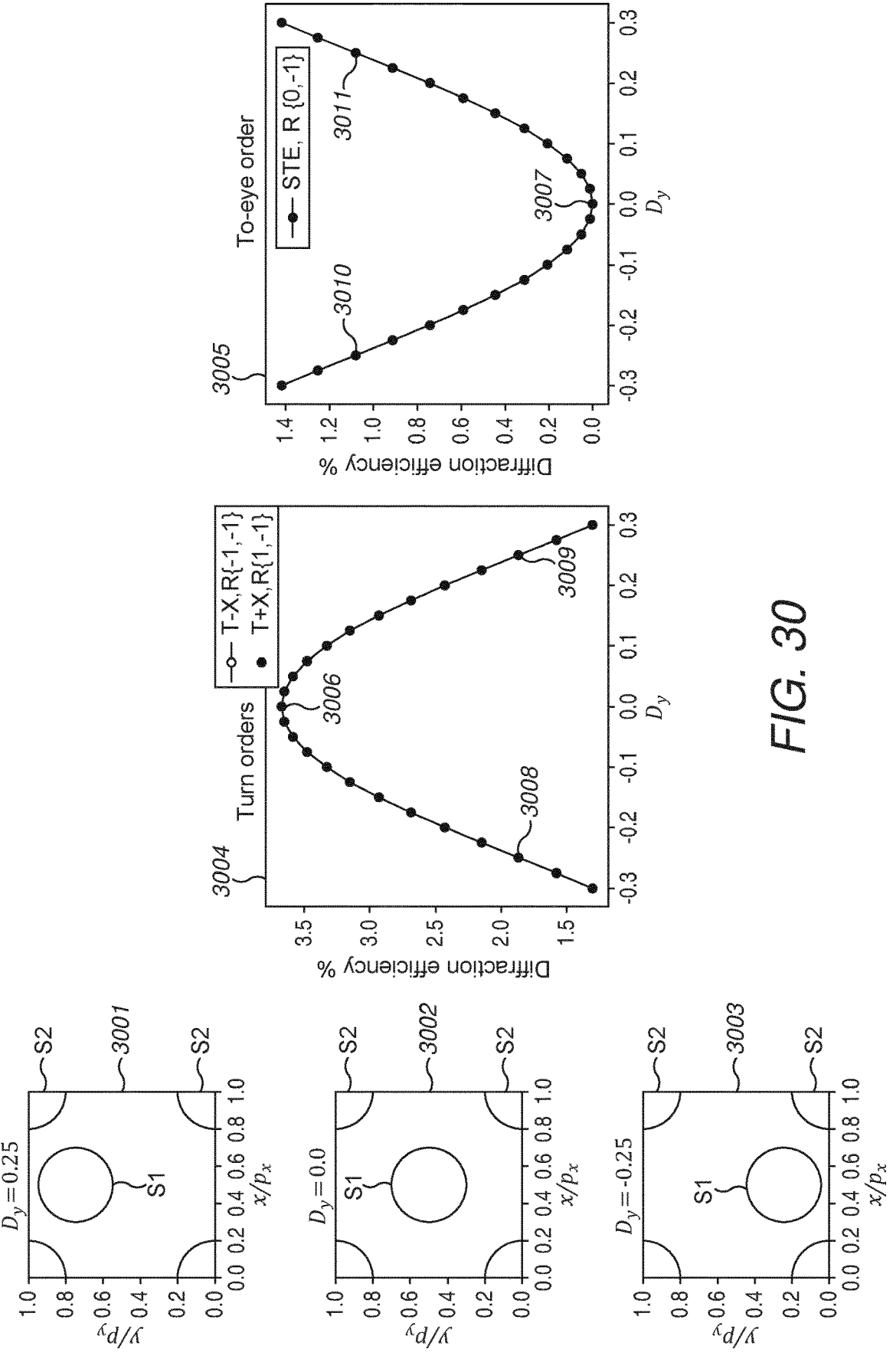
FIG. 30 is a series of graphs corresponding to examples of the present invention showing how the diffraction efficiency of turn orders and to-eye orders varies with respect to the vertical shift of one array of optical structures with respect to the other array of optical structures of an interleaved rectangular grating.

FIG. 30 shows how changes in the shift between lattices L1 and L2 of IRG 2702 in the y-direction affect the diffraction efficiencies of the T−X and T+X turn orders in reflection and the STE to-eye order in reflection.

Unit cell 3001 is a specific instance of IRG 2702 with lattice displacement parameters given by $D_x=0$ and $D_y=0.25$. Unit cell 3002 is another instance of IRG 2702 with lattice displacement parameters given by $D_x=D_y=0$ and so is an FSIRG. Unit cell 3003 is a further instance of IRG 2702 with lattice displacement parameters given by $D_x=0$ and $D_y=-0.25$.

Graph 3004 shows how the diffraction efficiency of the T−X and T+X turn orders vary with respect to the parameter $D_y$ of IRG 2702. Graph 3005 shows how the diffraction efficiency of the STE to-eye order varies with respect to the parameter $D_y$ of IRG 2702.

The points 3006 and 3007 correspond to unit cell 3002 and show that the diffraction efficiency of the STE to-eye order is zero, as expected, and the diffraction efficiency of the T−X and T+X turn orders are at a maximum with respect to $D_y$. The point 3008 corresponds to the unit cell 3001 and the point 3009 corresponds to the unit cell 3003. Both points 3008 and 3009 show a significant reduction of the diffraction efficiency relative to the point showing here that variation of $D_y$ has a moderate effect on the relative efficiency of the T−X and T+X turn orders. The point 3010 corresponds to the unit cell 3001 and the point 3011 corresponds to the unit cell 3003. Both points 3010 and 3011 show a significant increase in the diffraction efficiency of the STE to-eye order as a result of variation of $D_y$. Thus, for IRG 2702 shifting the lattice L1 in the y-direction relative to lattice L2 can introduce the to-eye orders in a controlled way. As can be seen from these figures varying the lattice offset parameters provides control over the diffraction efficiency of the diffraction orders produced by the IRG 2702.

The points 3008 and 3009 have the same value as do the points 3010 and 3011. This is because the IRG resulting from unit cell 3001 is identical to the IRG resulting from unit cell 3003. This can be seen by identifying that shifting the position of the reference rectangle for unit cell 3001 by $0.5p_x$ in the x-direction and $0.75p_y$ in the y-direction results in unit cell 3003.

Figure 31:
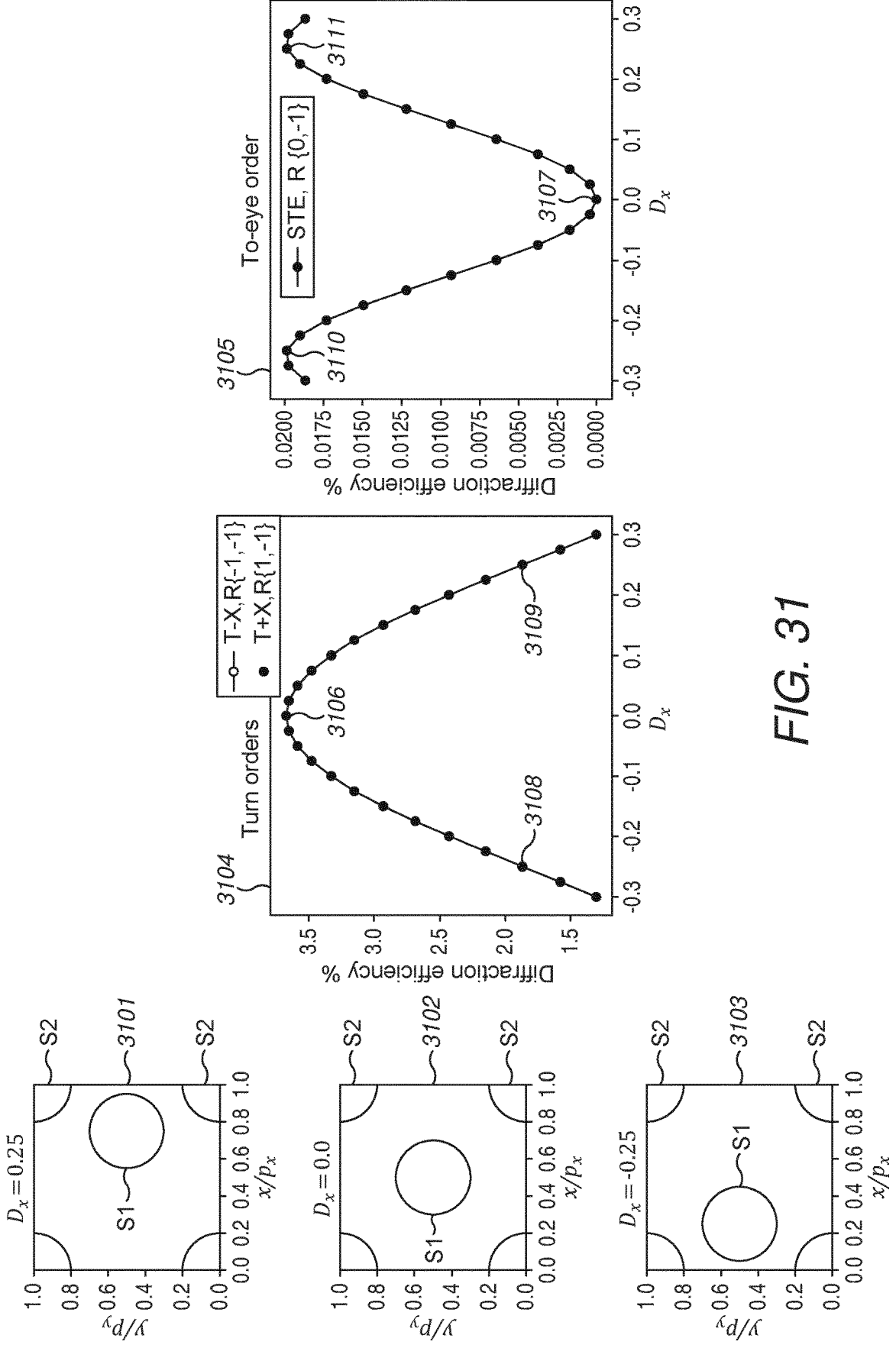
FIG. 31 is a series of graphs corresponding to examples of the present invention showing how the diffraction efficiency of turn orders and to-eye orders varies with respect to the horizontal shift of one array of optical structures with respect to the other array of optical structures of an interleaved rectangular grating.

FIG. 31 shows how changes in the shift between lattices L1 and L2 of IRG 2702 in the x-direction affect the diffraction efficiencies of the T−X and T+X turn orders and the STE to-eye order.

Unit cell 3101 is a specific instance of IRG 2702 with lattice displacement parameters given by $D_x=0.25$, $D_y=0$. Unit cell 3102 is another instance of IRG 2702 where $D_x=D_y=0$, and so is an FSIRG. Unit cell 3103 is a further instance of IRG 2702 with lattice displacement parameters given by $D_x=-0.25$, $D_y=0$.

Graph 3104 shows how the diffraction efficiency of the T−X and T+X turn orders vary with respect to the parameter $D_x$ of IRG 2702. Graph 3105 shows how the diffraction efficiency of the STE to-eye order varies with respect to the parameter $D_x$ of IRG 2702. The points 3106 and 3107 correspond to the unit cell 3102 and show that the diffraction efficiency of the STE to-eye order is zero, as expected, and the diffraction efficiency of the T−X and T+X turn orders are at a maximum with respect to $D_x$. The point 3108 corresponds to the unit cell 3101 and the point 3109 corresponds to the unit cell 3103. Both points show a significant reduction of the diffraction efficiency relative to the point showing here that variation of $D_x$ has a moderate effect on the relative efficiency of the T−X and T+X turn orders. The point 3110 corresponds to the unit cell 3101 and the point 3111 corresponds to the unit cell 3103. Both points show a significant increase in the diffraction efficiency of the STE to-eye order as a result of variation of $D_x$. Thus, by shifting the lattice L1 of IRG 2702 in the x-direction relative to lattice L2 the to-eye orders can be introduced. As can be seen from these figures varying the lattice offset parameters provides control over the diffraction efficiency of the diffraction orders produced by IRG 2702.

The points 3108 and 3109 have the same value as do the points 3110 and 3111. This is because the IRG resulting from the unit cell 3101 will be identical to the IRG resulting from the unit cell 3103. This can be seen by identifying that shifting the position of the reference rectangle for unit cell 3101 by $0.75p_x$ in the x-direction and $0.5p_y$ in the y-direction results in unit cell 3103.

Figure 32:
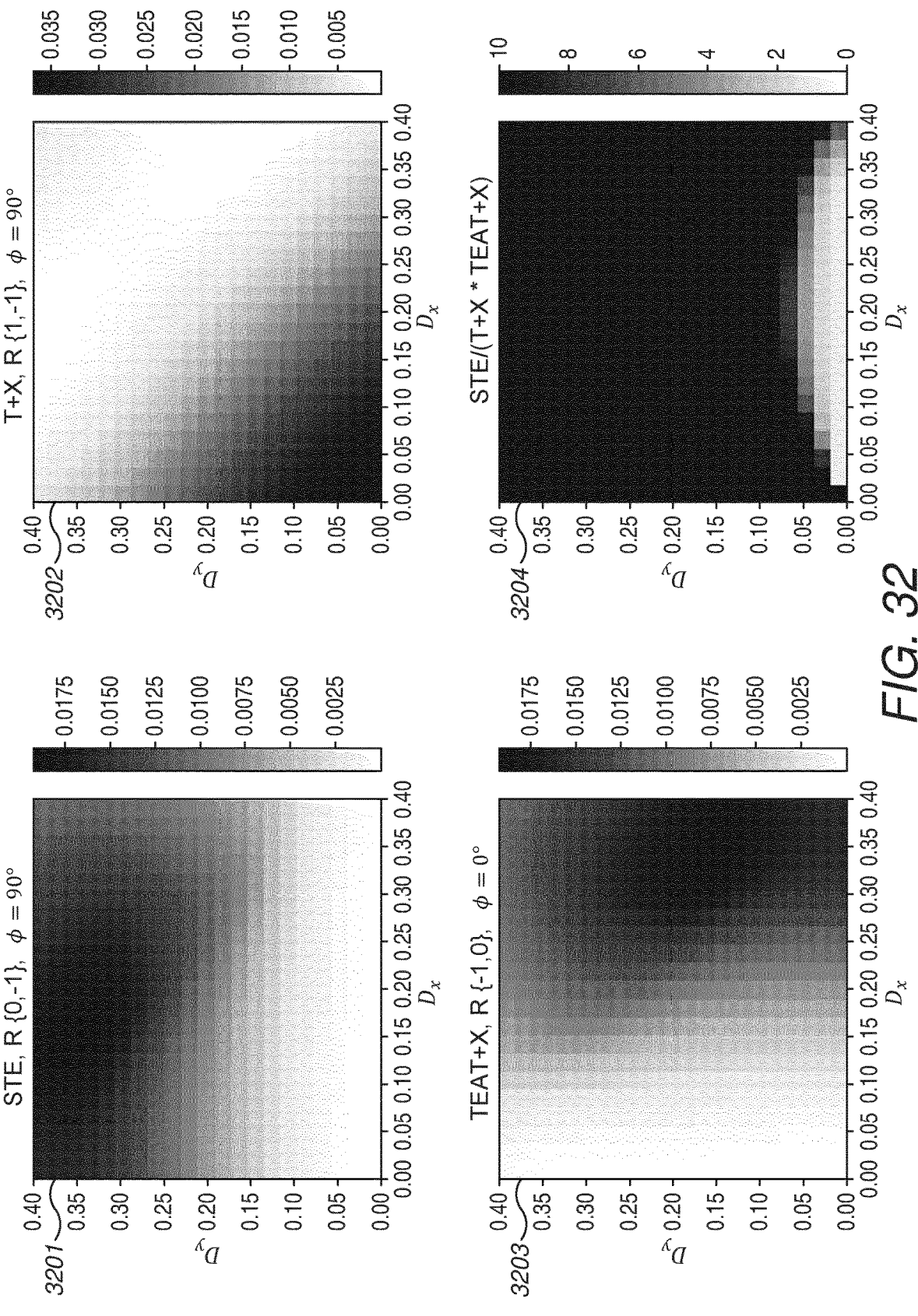
FIG. 32 is a series of heatmaps corresponding to examples of the present invention showing the variation of diffraction efficiency of various diffraction orders with respect to parameters governing the shift of one array of optical structures relative to the other array of optical structures of an interleaved rectangular grating.

FIG. 32 shows a series of heatmaps demonstrating the variation of the diffraction efficiency of various diffraction orders with respect to the relative lattice shift parameters $D_x$ and $D_y$ of IRG 2702. Heatmap 3201 shows the variation of the diffraction efficiency of the $\{0, -1\}$ STE to-eye order. It can be seen that the diffraction efficiency is largest at approximately $D_x=0.2$ and $D_y=0.4$. Heatmap 3202 shows the variation of the diffraction efficiency of the $\{1, -1\}$ T+X turn order. It can be seen that the diffraction efficiency is largest at approximately $D_x=D_y=0$. Heatmap 3203 shows the variation of the diffraction efficiency of the $\{-1,0\}$ TEAT+X to-eye order. It can be seen that the diffraction efficiency is largest at approximately $D_x$=0.4 and $D_y$=0.2. Heatmap 3204 shows the ratio of the diffraction efficiency of the {0, −1} STE to-eye order to the product of the diffraction efficiencies of the {1, −1} T+X turn order and the {−1,0} TEAT+X to-eye order. It has been found that for some configurations of a DWC it is advantageous to the uniformity of the output if this ratio is neither too large or too small, but somewhere close to unity. As shown on 3204 this identifies a region in the vicinity of $D_y$=0.

FIGS. 33a-d and 34a-d provide a series of heatmaps showing the results of ray trace simulations of the luminance output that would be observed if the DWC 2101 was configured with variations of the IRG 2702 as the output element 2105. The heatmaps show the predicted luminance output from the IRG with respect to horizontal and vertical gaze angle and where the input has uniform luminance with respect to gaze angle over a rectangular field of view. For the purposes of these simulations λ=528 nm, $p_x$=$p_y$=355 nm, the structures have a height of 100 nm, the IRG is composed of a material with a refractive index of 1.82 and is on a substrate with a refractive index of 1.82.

FIGS. 33a-d show the observable consequence of how displacement of lattice L1 relative to lattice L2 of the IRG 2702 affects the to-eye orders produced. For each different unit cell 3301-3304 its respective ray trace heatmap is shown in inset 3305-3308.

Figures 33A, 33B:
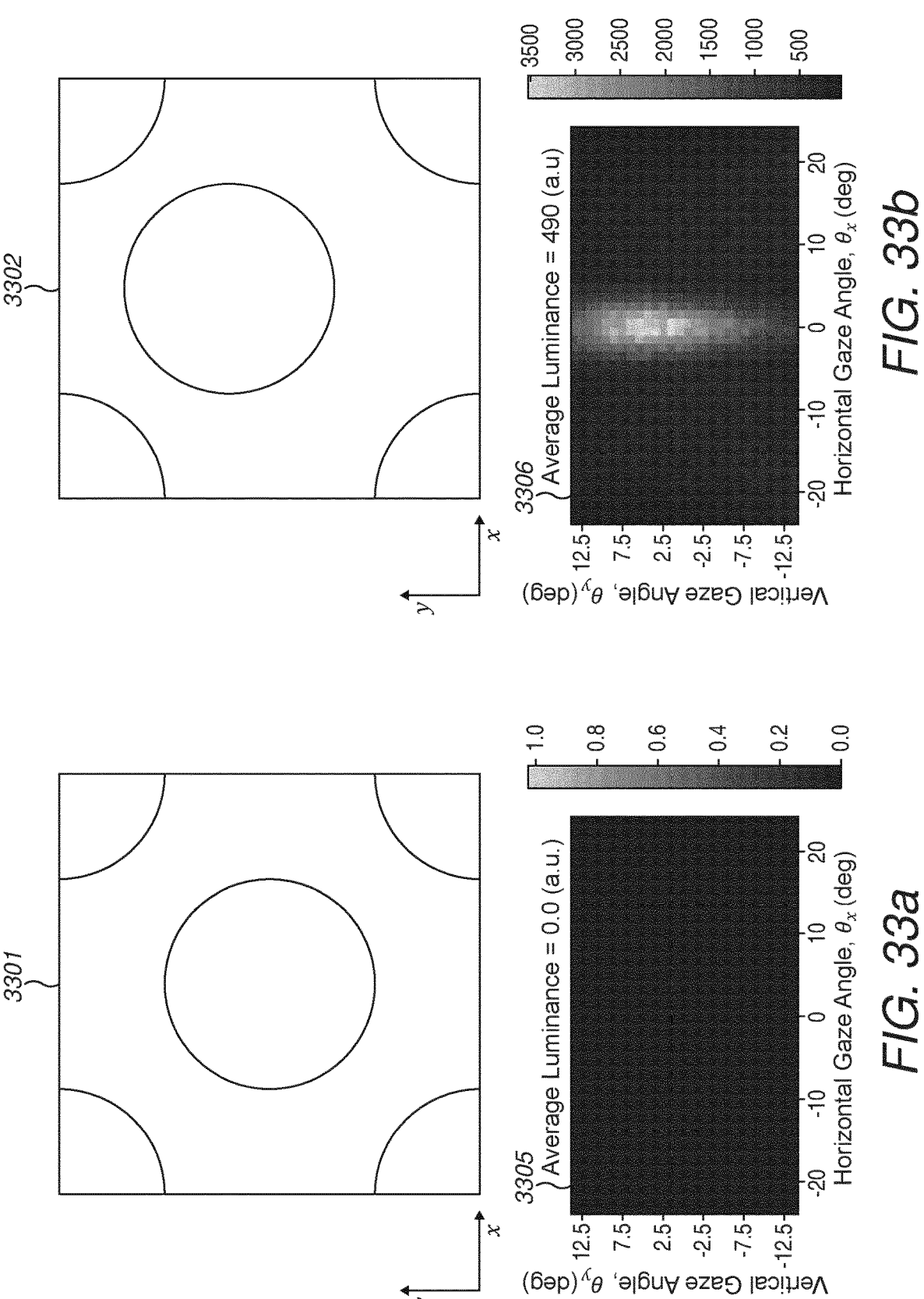
FIGS. 33a-d are a series of unit cell configurations and heatmaps showing the results of simulation of the luminance output from diffractive waveguide combiners with output elements composed as interleaved rectangular gratings featuring various shifts between the arrays of structure in the y-direction.

FIG. 33a shows unit cell 3301 and its heatmap 3305. Unit cell 3301 corresponds to lattice shift parameters $D_x$=$D_y$=0, i.e. an FSIRG. As can be seen in its corresponding ray trace heatmap 3305 there is zero output as a consequence of the zero diffraction efficiency of the to-eye orders.

FIG. 33b shows unit cell 3302 and its heatmap 3306. Unit cell 3302 corresponds to lattice shift parameters $D_x$=0 and $D_y$=0.1. As can be seen in its corresponding ray trace heatmap 3306 a non-zero luminance is achieved as a consequence of non-zero diffraction efficiency of the to-eye orders.

Figures 33C, 33D:
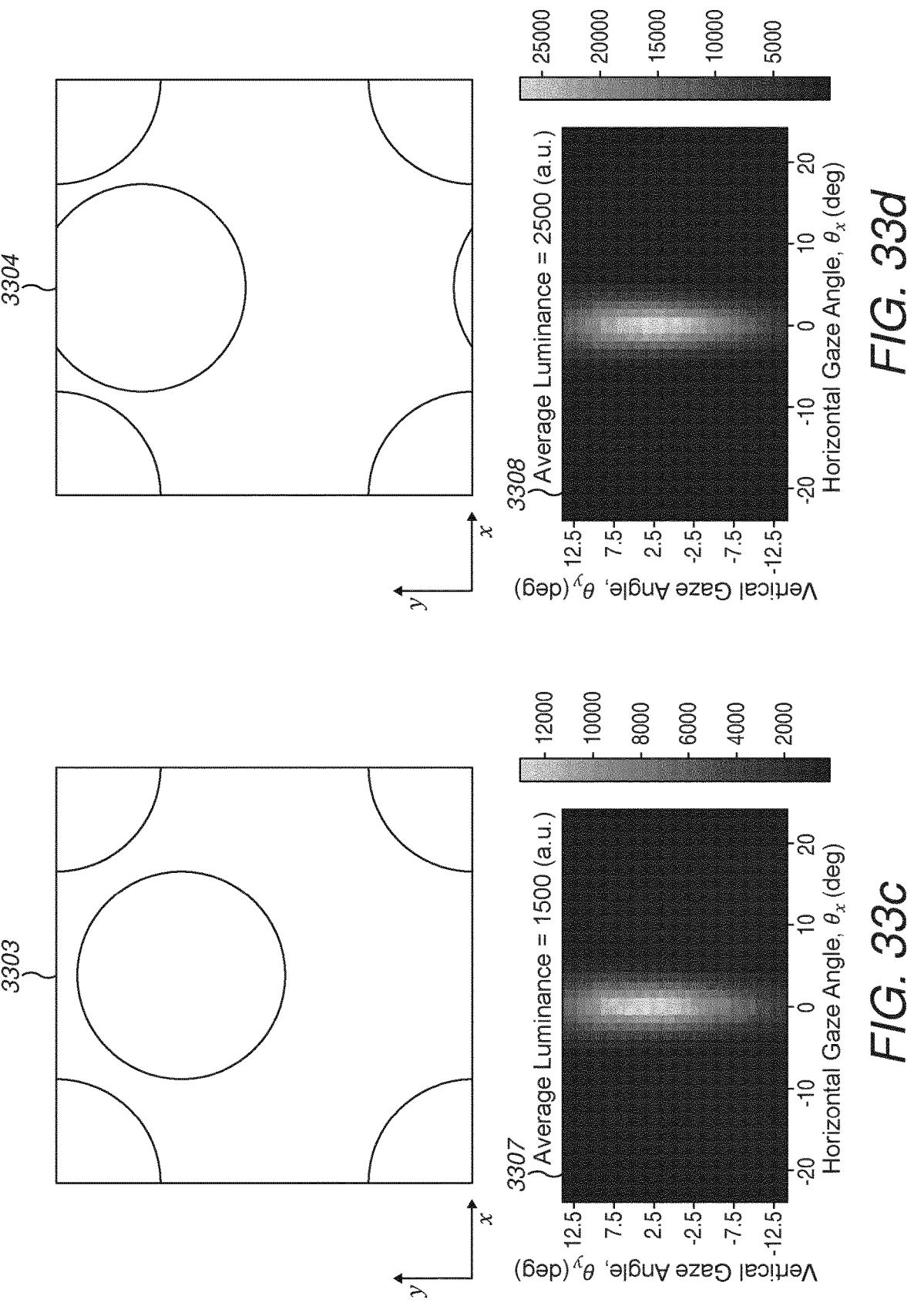

FIG. 33c shows unit cell 3303 and its heatmap 3307. Unit cell 3303 corresponds to lattice shift parameters $D_x$=0 and $D_y$=0.2. As can be seen in its corresponding ray trace heatmap 3307 an increased level of luminance relative to heatmap 3306 can be seen as a consequence of non-zero diffraction efficiency of the to-eye orders and an increase in the diffraction efficiency of these orders due to the increase in $D_y$.

FIG. 33d shows unit cell 3304 and its heatmap 3308. Unit cell 3304 corresponds to lattice shift parameters $D_x$=0 and $D_y$=0.3. As can be seen in its corresponding ray trace heatmap 3308 a further increased level of luminance relative to heatmap 3307 can be seen as a consequence of non-zero diffraction efficiency of the to-eye orders and a further increase in the diffraction efficiency of these orders due to the further increase in $D_y$.

Thus, an increase in the displacement in the y-direction of lattice L1 relative to lattice L2 of IRG 2702 can increase the to-eye orders that are produced. However, it is also clear from the heatmaps 3306-3308 that the luminance has poor uniformity with respect to gaze angle, showing a bright central band and low luminance elsewhere. The input luminance used in the simulations was uniform so this is a result of the interplay between the various beam paths through the DWC 2101 arising due to the diffraction efficiencies of the various orders.

FIGS. 34a-d provide a series of heatmaps showing the results of ray trace simulations of the luminance output that would be observed if the DWC 2101 was configured with variations of IRG 2702 as the output element 2105. The heatmaps show the predicted luminance with respect to horizontal and vertical gaze angle, that is the gaze angle subtended by projection of the direction of observation into the xz-plane and yz-plane, respectively. FIGS. 34a-d show the observable consequence of how displacement of lattice L1 relative to lattice L2 of IRG 2702 affects the to-eye orders produced. For each different unit cell 3401-3404 its respective ray trace heatmap is shown in inset 3405-3408.

Figures 34A, 34B:
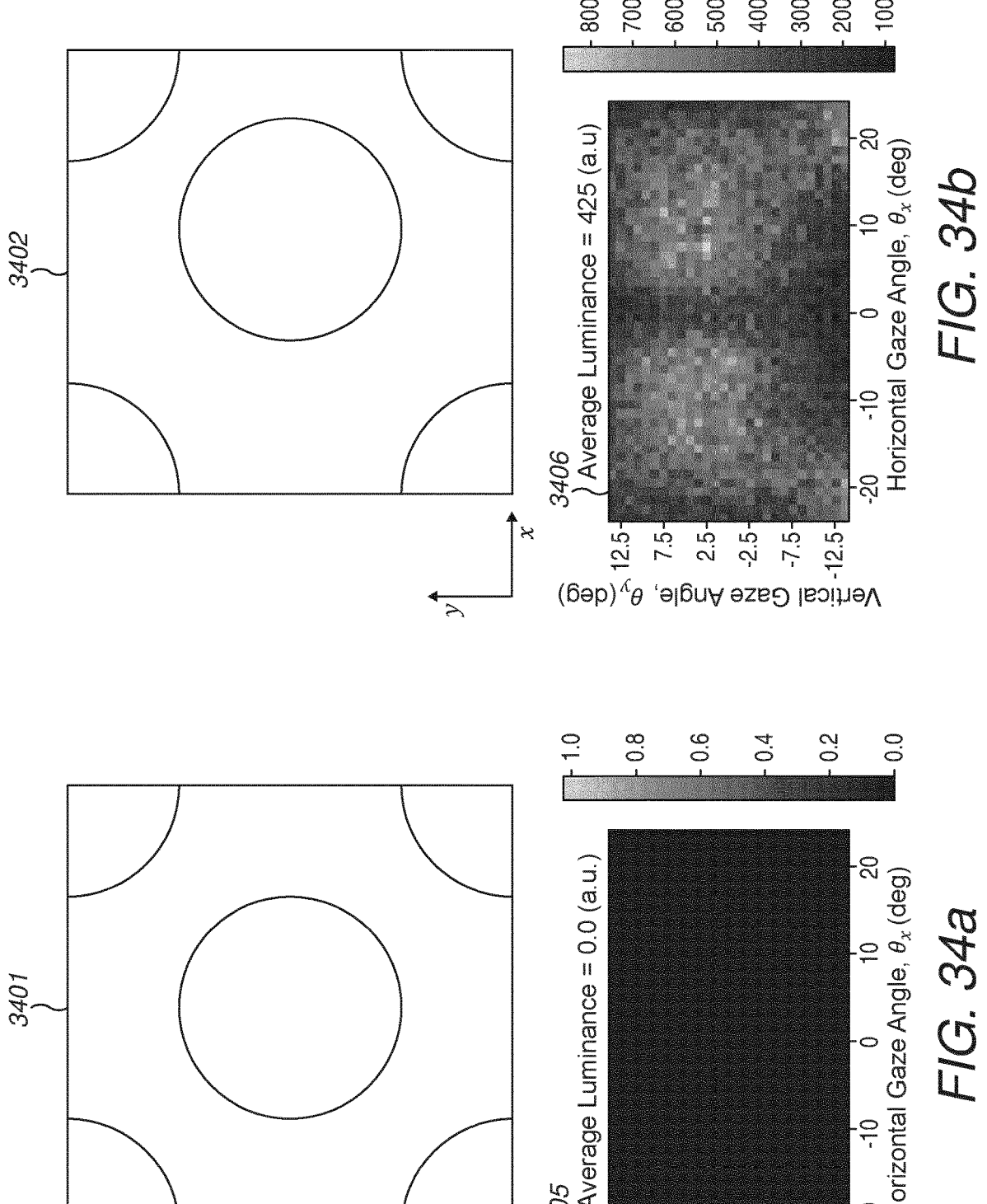
FIGS. 34a-d are a series of unit cell configurations and heatmaps showing the results of simulation of the luminance output from diffractive waveguide combiners with output elements composed as interleaved rectangular gratings featuring various shifts between the arrays of structure in the x-direction.

FIG. 34a shows unit cell 3401 and its heatmap 3405. Unit cell 3401 corresponds to lattice shift parameters $D_x$=$D_y$=0, i.e. an FSIRG. As can be seen in its corresponding ray trace heatmap 3405 there is zero output as a consequence of the zero diffraction efficiency of the to-eye orders.

FIG. 34b shows unit cell 3402 and its heatmap 3406. Unit cell 3402 corresponds to lattice shift parameters $D_x$=0.1 and $D_y$=0. As can be seen in its corresponding ray trace heatmap 3406 a non-zero luminance is achieved as a consequence of non-zero diffraction efficiency of the to-eye orders.

Figures 34C, 34D:
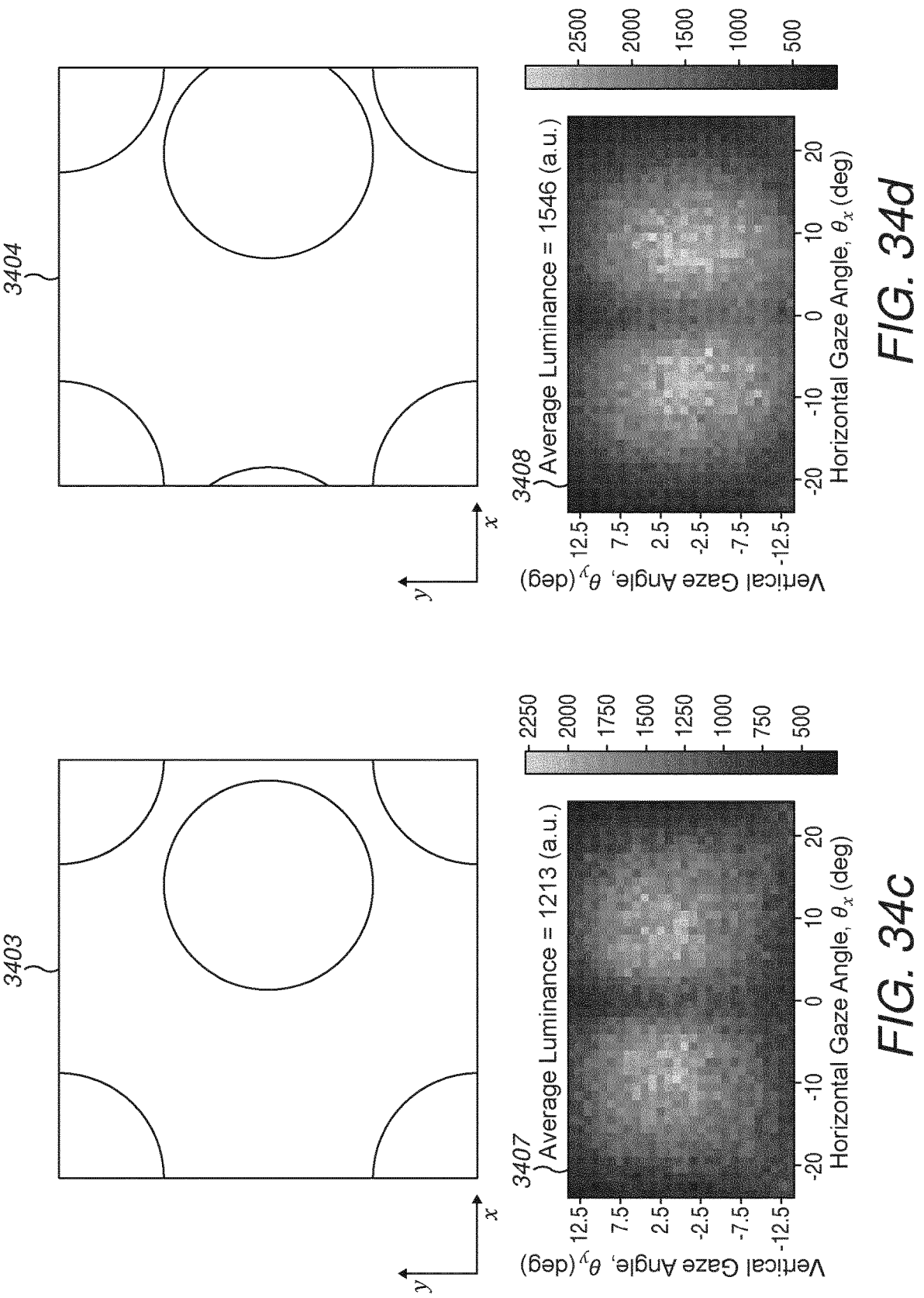

FIG. 34c shows unit cell 3403 and its heatmap 3407. Unit cell 3403 corresponds to lattice shift parameters $D_x$=0.2 and $D_y$=0. As can be seen in its corresponding ray trace heatmap 3407 an increased level of luminance relative to heatmap 3406 can be seen as a consequence of non-zero diffraction efficiency of the to-eye orders and an increase in the diffraction efficiency of these orders due to the increase in $D_x$.

FIG. 34d shows unit cell 3404 and its heatmap 3408. Unit cell 3404 corresponds to lattice shift parameters $D_x$=0.3 and $D_y$=0. As can be seen in its corresponding ray trace heatmap 3408 a further increased level of luminance relative to heatmap 3407 can be seen as a consequence of non-zero diffraction efficiency of the to-eye orders and a further increase in the diffraction efficiency of these orders due to the further increase in $D_x$.

Thus, an increase in the displacement in the x-direction of lattice L1 relative to lattice L2 of IRG 2702 can increase the to-eye orders that are produced. It is also clear from the heatmaps 3406-3408 that the luminance has much superior uniformity compared to 3306-3308. The input to the simulations in all cases was the same so the difference here shows that the various diffraction orders are such that a more favourable balance of beam paths through the DWC 2101 is produced resulting in a more uniform luminance output.

The figures and embodiments described above demonstrate that introducing a degree of symmetry breaking to an interleaved rectangular grating, such as modifying the shape of one of the structures S1 or S2 of the IRG, or the lattice offset vector $o_{xy}$ of the IRG, then a degree tailoring of the efficiency of diffraction orders that are produced can be achieved which may be used to manipulate advantageously the uniformity of the luminance output from a DWC which makes use of such an IRG as an output element.

Figure 35B:
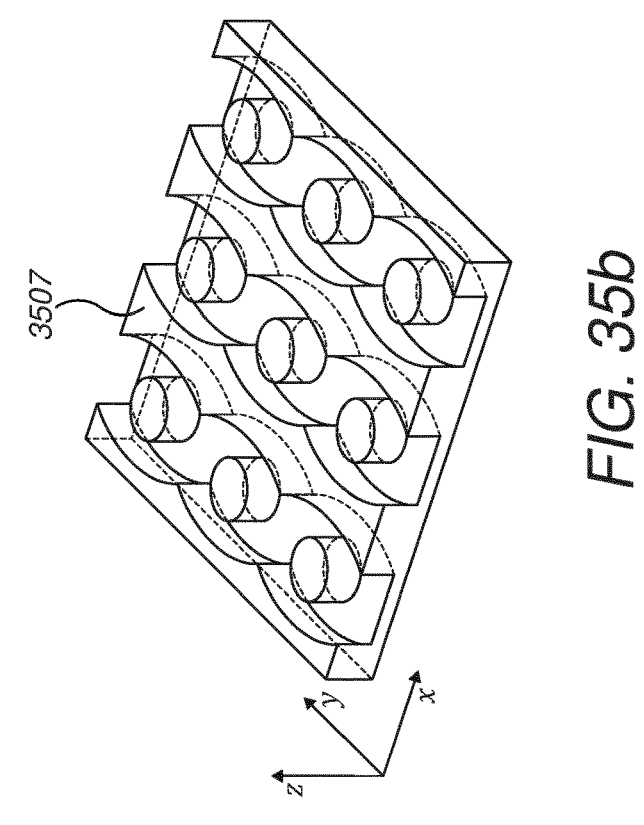
Figure 35A:
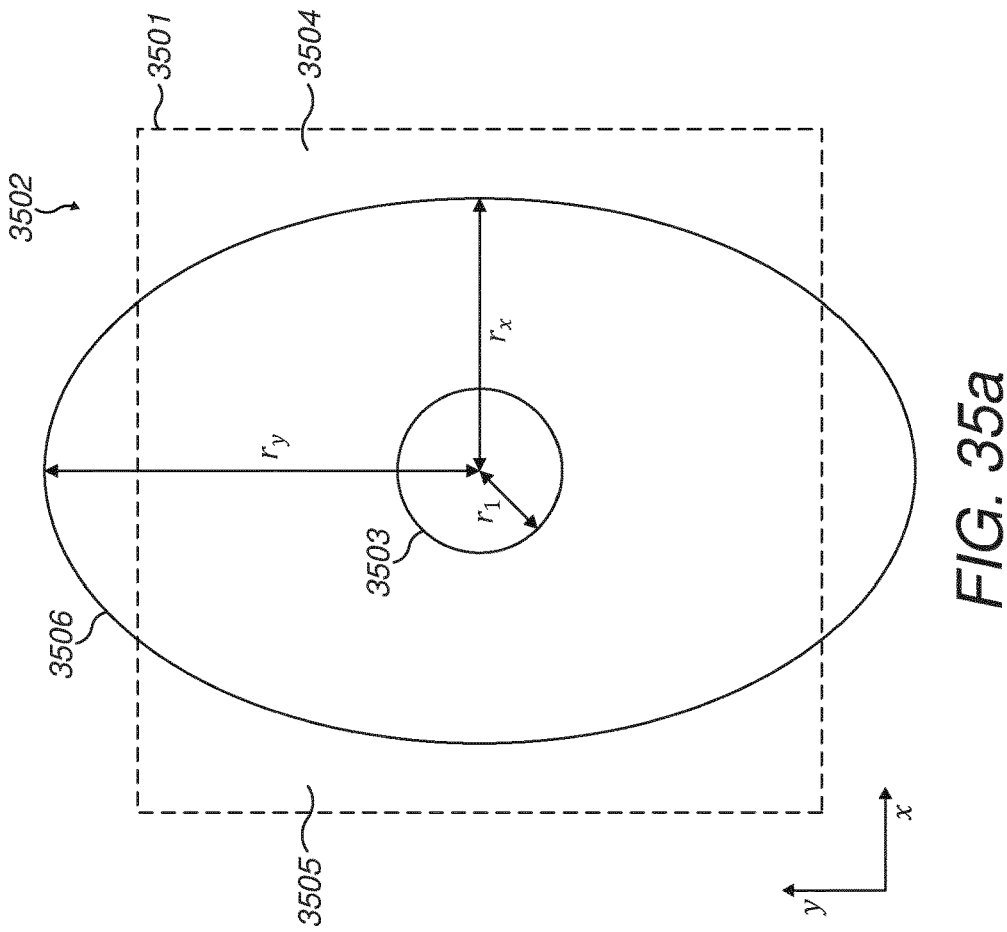
FIG. 35a shows a top view further configuration of a unit cell according to the present invention.

Example 3—Interleaved Rectangular Gratings
Using General Shape Modifications to Introduce
Shape Symmetry Breaking FIG. 35a shows a top view of a unit cell 3501 which may be repeated across the xy-plane to form an IRG 3502. The IRG 3502 may be configured for use as the output element of a DWC, such as the DWC 2101. The IRG 1902 has a surface relief structure which protrudes into a surrounding medium, in this case air. The structures S1 and S2 of the IRG 3502 are defined to have the same optical properties. The period of the lattice L1 and L2 of the IRG 3502, and so the length of the sides of unit cell 3501, is $p_x$ in the x-direction and $p_y$ in the y-direction. The lattice offset vector of the IRG 3502, $o_{xy}$, has a value of ½($p_x$, $p_y$).

The structure S1 of the IRG 1902 is a pillar with a circular cross-sectional shape 3503 when viewed in the plane of the grating. The structure S1 has a radius of $r_1 p_x$. The structure S2 is represented as multiple elements 3504, 3505 within the unit cell and is formed by cutting an ellipse-shaped section from a uniform slab of material across the whole unit cell such that the two elements 3504 and 3505 remain which are placed on the plane of the grating along with structure S1. The ellipse is centred on the unit cell 3501 and has a size described by the parameters $r_x$ and $r_y$. The structure S1 is defined to be smaller than the ellipse defining structure S2. If $p_y r_y > p_x r_x$, then the major axis of the ellipse lies in the y-direction and has a size of $2 p_y r_y$, and the minor axis of the ellipse lies in the x-direction and has a size of $2 p_x r_x$. In this case $r_1 < r_x$. If $p_y r_y < p_x r_x$, then the minor axis of the ellipse lies in the y-direction and has a size of $2 p_y r_y$, and the major axis of the ellipse lies in the x-direction and has a size of $2 p_x r_x$. In this case $r_1 p_x < r_y p_y$. If $p_y r_y = p_x r_x$, then the ellipse is circular in shape and $r_1 < r_x$.

As a result of structure S2 of the IRG 3502 extending to the edges of the unit cell 3501 the structures of periodic structure PS2 of the IRG 3502 will be continuous when the structure is tiled across the plane as long as $r_x < 0.5$. FIG. 35b shows a 3×3 array of copies of the unit cell 3501 showing how structure S2 joins together to form continuous structures in the IRG 3502.

Figure 36:
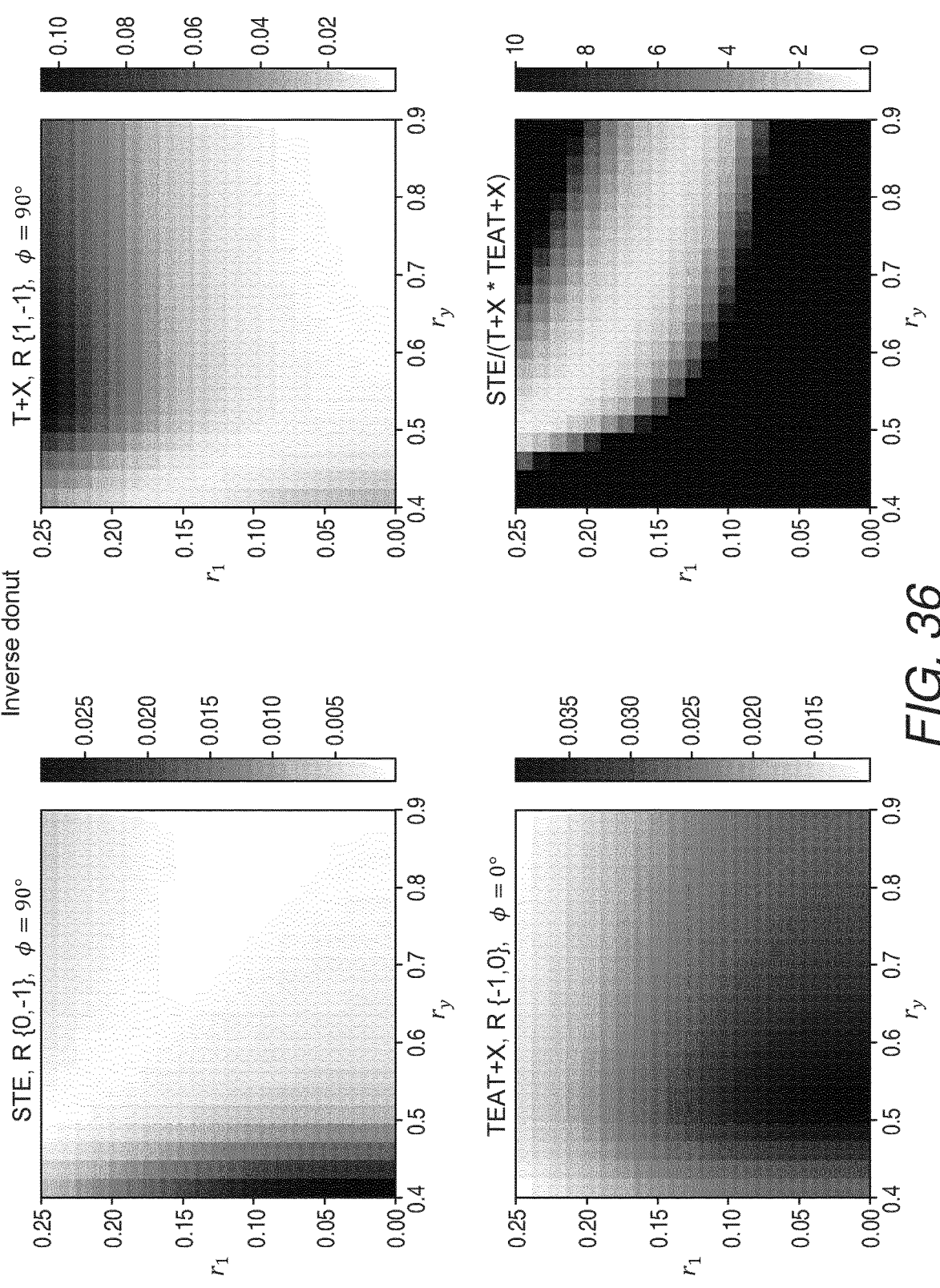

FIG. 36 shows a series of heatmaps demonstrating how the variation of the diffraction efficiency of various diffraction orders with respect to the parameters $r_1$ and $r_y$ describing the unit cell 3501. For the purposes of these calculations $p_x = p_y = 355$ nm, the structures have a height of 100 nm, the IRG is composed of a material with a refractive index of 1.82 and is on a substrate with a refractive index of 1.82. The incident beam used in the calculations has a wavelength in vacuum of 528 nm and is incident with spherical angles according to equation (7) of $\theta = 55°$ and $\phi$ as stated in the heading of each heatmap.

Figure 37:
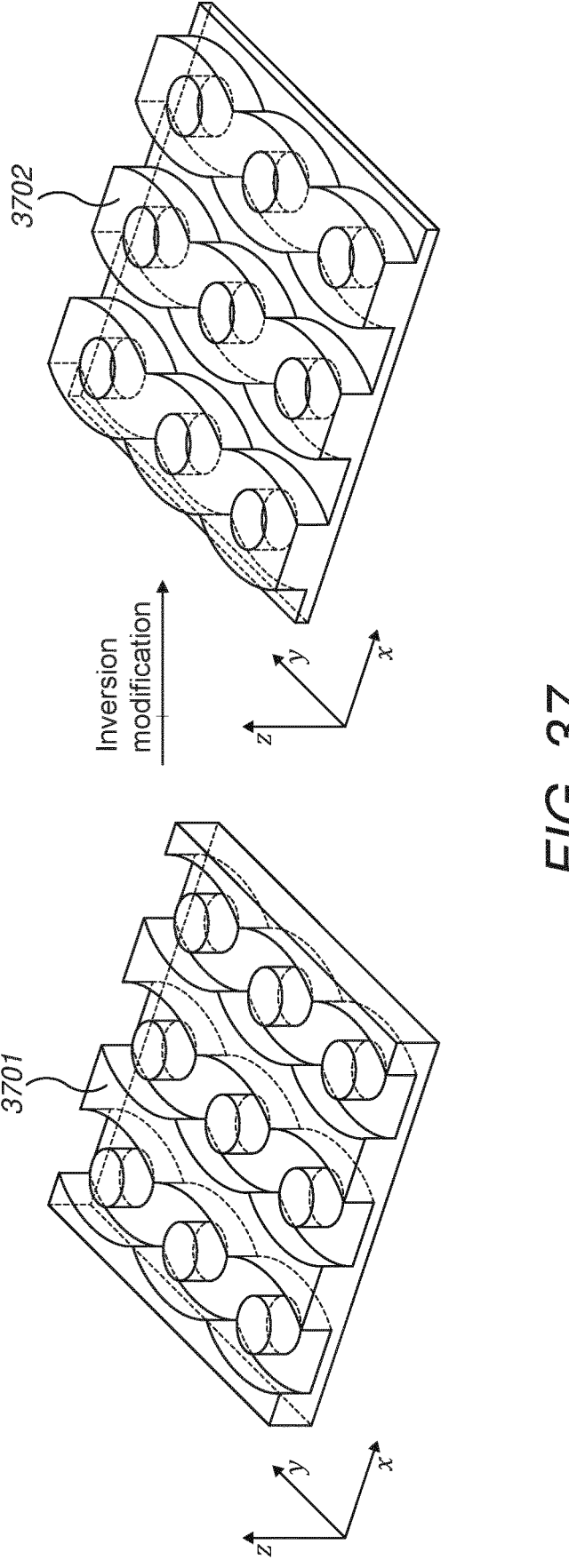
FIG. 37 shows a perspective view of the periodic structure shown in FIG. 35b and the periodic structure formed from the unit cell shown in FIG. 35a followed by inversion modification of the structure.

Example 4—Interleaved Rectangular Gratings Using Inversion Modification of Another Interleaved Rectangular Grating FIG. 37 shows a perspective view of a portion of an IRG 3701 formed from unit cell 3501. By applying inversion modification to the unit cell a new IRG structure can be formed 3702. Although the structures S1 and S2 as embodied in the result of the modification are characterised by a lack of material rather this structure will still obey the same rules regarding the symmetry of the periodic structures PS1 and PS2.

Figure 38:
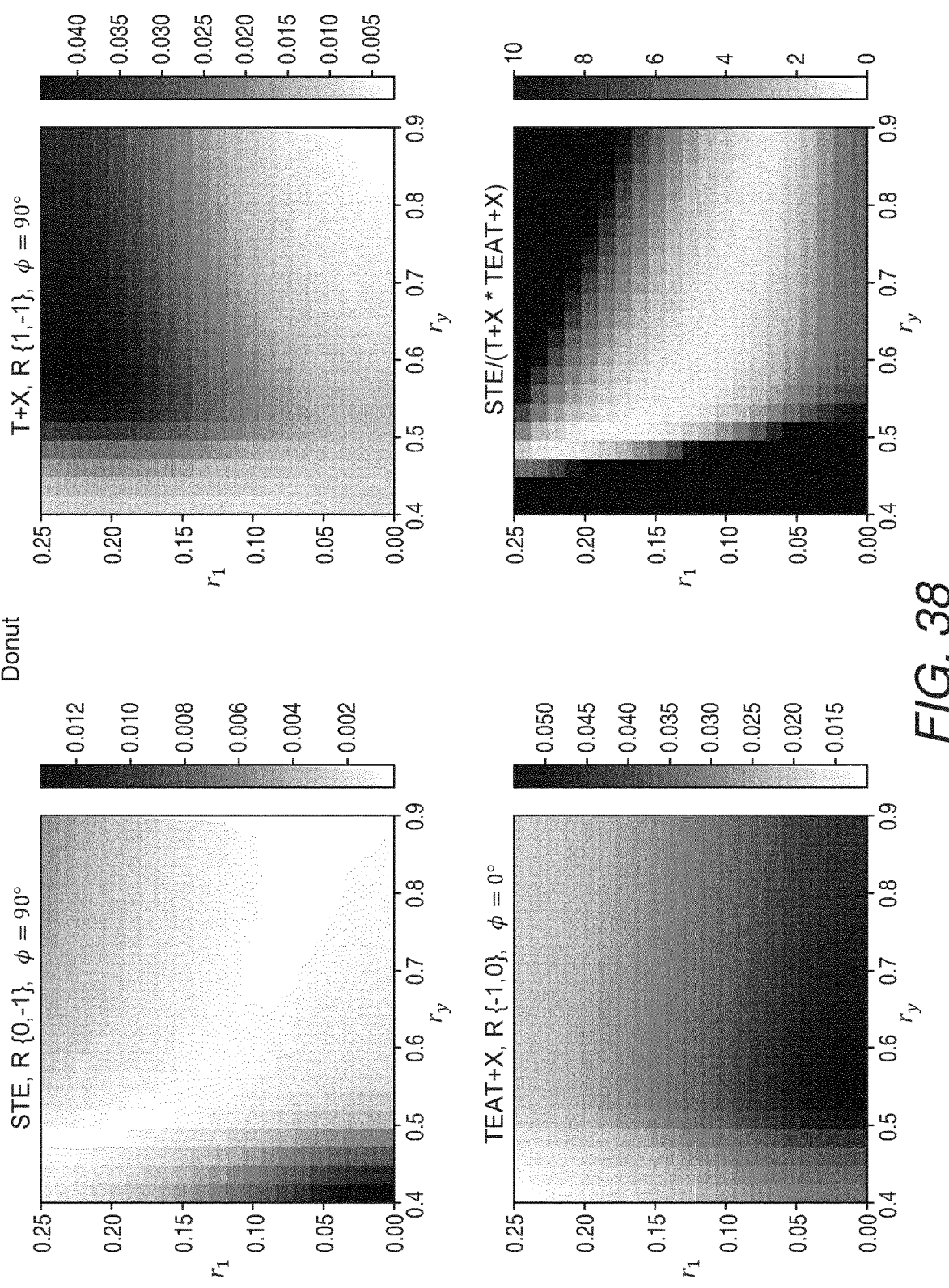
FIG. 38 shows a series of heatmaps demonstrating the variation of diffraction efficiency of various diffraction orders with respect to parameters governing the shape of the optical element in FIG. 35a followed by inversion modification of the structure.

FIG. 38 shows a series of heatmaps demonstrating how the variation of the diffraction efficiency of various diffraction orders with respect to the parameters $r_1$ and $r_y$ describing the unit cell 3501 followed by inversion modification to form the structure 3702. For the purposes of these calculations $p_x = p_y = 355$ nm, the structures have a height of 100 nm, the IRG is composed of a material with a refractive index of 1.82 and is on a substrate with a refractive index of 1.82. The incident beam used in the calculations has a wavelength in vacuum of 528 nm and is incident with spherical angles according to equation (7) of $\theta = 55°$ and $\phi$ as stated in the heading of each heatmap.

Diffractive Waveguide Combiners with Multiple Grating Elements

Figure 39A:
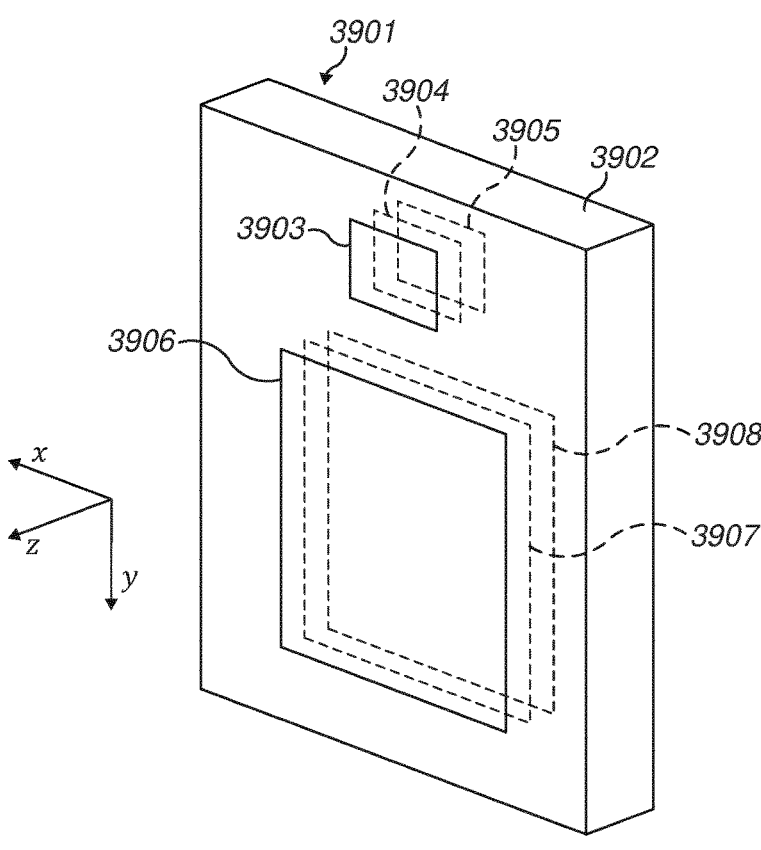
FIGS. 39a-b show a diffractive waveguide combiner that features multiple optical elements according to aspects of the present invention.
Figure 39B:
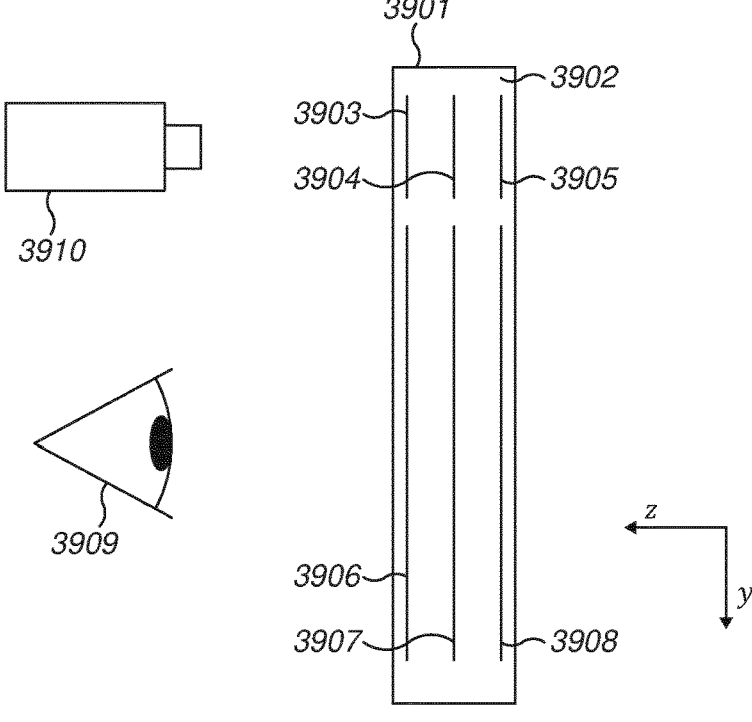

In some embodiments it is preferable to employ multiple interleaved rectangular gratings within a diffractive waveguide combiner in order to bring additional degrees of freedom for optimizing the performance of a DWC. FIG. 39a shows a perspective view of a DWC 3901 consisting of a flat, planar substrate 3902 arranged such that the faces of the waveguide are parallel to the xy-plane of a Cartesian (x, y, z)-coordinate system. FIG. 39b shows a cross-section view of the same DWC 3901.

A projector 3910 is used output projected light which is coupled into the DWC 3901 by a series of input gratings 3903, 3904 and 3905. When viewed in the xy-plane of the DWC 3901 the input gratings 3903, 3904 and 3905 have the same dimensions, shape and location as each other but are separated in the z-direction. Input grating 3903 is located on the waveguiding face of the DWC 3901 nearest to the projector 3910, input grating 3904 is embedded midway between the waveguiding faces of the DWC 3901 and input grating 3905 is located on the waveguiding face of the DWC 3901 farthest from the projector 3910. The size and shape of the region in the xy-plane covered by the input gratings 3903, 3904 and 3905 is sufficient to receive the complete ensemble of beams of light output by the projector 3910.

Projected light coupled into the waveguiding region of k-space propagates from the input gratings towards a series of output grating elements 3906, 3907 and 3908, configured as IRGs. When viewed in the xy-plane of the DWC 3901 the IRGs 3906, 3907 and 3908 have the same dimensions and location as each other but are separated in the z-direction. IRG 3906 is located on the waveguiding face of the DWC 3901 nearest to the projector 3910, IRG 3907 is embedded midway between the waveguiding faces of the DWC 3901 and input grating 3908 is located on the waveguiding face of the DWC 3901 farthest from the projector 3910. The size and shape of the region in the xy-plane covered by the IRGs 3906, 3907 and 3908 is consistent with the inequalities (193) and (194), based on projected light with a field of view of $\Theta_x$ in the xz-plane and $\Theta_y$ in the yz-plane and an eyebox covering a rectangle measuring w in the x-direction and h in the y-direction and located a distance s from the waveguide.

The input gratings 3903, 3904 and 3905 all have the same grating vector $g_1$ as given by equation (182), and which has a period $p_y$ based on the same design principles as input grating 2104 and so satisfies the inequalities (187) and (188). Similarly, IRGs 3906, 3907 and 3908 all have the same grating vectors $g_x$ and $g_y$ as given by equations (189) and (190) and which have period $p_y$ identical to the input gratings 3903, 3904 and 3905, and period $p_x$ based on the same design principles as IRG 2105 and so satisfies the inequalities (191) and (192). Preferably the IRGs are separated by a distance along the z-direction greater than the coherence length of the projected light. In this circumstance interactions of the light beam with each output grating element can be considered independent of the others, which simplifies design and analysis of the DWC 3901.

Each of the input gratings 3903, 3904, and 3905 provides an opportunity for coupling projected light into the waveguiding region of k-space to be conveyed through the waveguide. Although the grating vectors of the input gratings are the same the design and composition of the unit cells need not be identical. As such the different gratings may be optimized to provide preferential properties, such as more optimal coupling via a transmission diffraction order or a reflection diffraction order, or more optimal coupling for a range of wavelengths. The use of multiple input gratings means in general each incident beam of projected light may produce input beams that are shifted with respect to each other. This may provide advantageous coverage of the output eyebox.

Each of the IRGs 3906, 3907 and 3908 may provide the cumulative orders listed in table 1 in FIG. 45 and the diffraction orders listed in table 2 in FIG. 46. The geometry, composition and optical properties of the periodic structures making up each of the IRGs may be different. This affords the possibility that the different IRGs may be optimized to have scattering properties which may yield advantageous performance for the DWC 3901. In particular the gratings may be designed to have different magnitudes of diffraction efficiency for the various diffraction orders and different dependence on the wavelength, direction and polarization of incident beams of light.

By way of an example, in some configurations IRG 3906 may be configured as an FSIRG and so only have turn orders with non-zero diffraction efficiency, whereas IRG 3907 may be configured as an HSIRG and IRG 3908 may be configured as a VSIRG to provide a mixture of to-eye and turn back orders. By separating the gratings additional control may be afforded to improve the performance of the DWC 3901, in particular with respect to the properties listed in table 3 in FIG. 47. The only to-eye orders of a VSIRG with non-zero diffraction efficiency are the TEAT+X and TEAT−X order. These orders require that a waveguided beam of projected light first undergo a T+X or T−X turn order before output is possible. Similarly, the only to-eye orders of an HSIRG with non-zero diffraction efficiency are the STE and TEAT−Y orders.

Thus, for a DWC 3901 where IRG 3906 is an FSIRG, IRG 3907 is an HSIRG and IRG 3908 is a VSIRG then IRG 3906 may be designed to provide turn orders to distribute light beams across the grating whilst IRG 3908 provides output of these light beams after turning and IRG 3907 provides output of projected light before turning by the T+X, T−X orders or after turning by one of the TTB+X, TTB−X, UT+X, or UT−X orders. The magnitude of the diffraction orders provided by each of the IRGs may be controlled by modifying the various properties as discussed elsewhere in this description but may include the height, size and shape of structures composed of materials with optical properties contrasting the medium surrounding the DWC 3901 and/or the substrate 3902. In particular IRG 3907 being embedded in the substrate 3902 should have structures optical properties that contrast with the surrounding substrate.

In some configurations it is possible that some of the output grating elements 3906, 3907, and 3908 need not be configured as IRGs. For example, if the element 3908 was instead made a 1D grating with grating vector equal to $g_x$, as defined for the IRG 3906, then 1D grating 3908 would still provide to-eye orders for beams after T+X or T−X turn orders, but no other orders, such as the BT−Y and BRT+Y orders. Alternatively the element 3908 may be configured as a rectangular grating 3908 and provide the full range of diffraction orders listed in table 2 in FIG. 46 without exploiting any symmetry-based moderation of the diffraction efficiency of certain orders.

In some configurations only one or two of the input gratings 3903, 3904 and 3905 may be included in the DWC 3901. Similarly, in some configurations only one or two of the output grating elements 3906, 3907 and 3908 may be included in the DWC 3901. In other configurations the number of input gratings or output grating elements may be greater than three.

In some configurations the output grating elements 3906, 3907 and 3908 are composed of optical structures with optical properties that show strong dependence on wavelength. In such an arrangement each grating element may be designed to exhibit a significant variation of optical prop-erties to the surrounding material over a small range of wavelengths and so each corresponding grating element would be optimized for that range of wavelengths. In some configurations the properties of the grating elements 3906, 3907 and 3908 and the input gratings 3903, 3904 and 3905 are such that they only each only provide non-negligible diffraction efficiency for non-zero diffraction orders over a small range of wavelengths.

By matching the wavelength range for each input grating to a corresponding output grating and ensuring that these wavelength ranges are distinct from those of other input and output grating pairs it should be possible to ensure that a beam of a given wavelength will only interact non-negligibly with a pair of input and output gratings. For example, in some configurations input grating 3903 and output grating element 3906 may only interact significantly with light over the range 440 to 480 nm, corresponding to blue light, and input grating 3904 and output grating element 3907 may only interact significantly with light over the range 520 to 560 nm, corresponding to green light, and input grating 3905 and output grating element 3908 may only interact significantly with light over the range 600 to 640 nm, corresponding to red light.

If the wavelength ranges for the various grating pairs do not overlap, then in some configurations the grating vectors for the input gratings 3903, 3904 and 3905 need not be the same as each other, and also the grating vectors of the output grating elements 3906, 3907 and 3908 also need not be the same as each other. In this case the values for the grating periods $p_x$ and $p_y$ may be optimized for the wavelength range of each grating pair. Advantageously, it may be preferable for each input and output grating pair that one of the grating vectors of the output grating is the same as the grating vector of the input grating.

By reducing the range of wavelengths that need be accommodated by a pair of input and output gratings the size of field of view that may be accommodated within the inequalities (187), (188), (191) and (192) may be increased. Thus, the field of view that may be accommodated by the DWC may be increased. In a sense such an approach is similar to using multiple DWCs except here wavelength dependent properties of the gratings have been used rather than separate waveguides. If the grating vectors of the diffraction gratings differ, then it is important to ensure that the diffraction scattering of gratings for light beams with wavelengths outside the ranges is sufficiently weak. Otherwise the presence of gratings with different grating vectors may give rise to additional diffraction orders resulting in shifted and coloured ghost images that will generally be undesirable in an AR or VR display system.

Methods for engineering strong dependence on wavelength include using resonant scattering materials such as quantum dots or nanostructured metallic features for inducing surface plasmon resonances.

In other embodiments the multiple IRGs may have identical grating vectors and be stacked very close to each other such that they are located within the coherence length of the projected light. In some applications the projected light will be from LED-based light sources and have a wavelength range of 450 nm to 650 nm and a spectral width of 10 to 50 nm. In materials with refractive indices in the range 1.5 to 2.0 results in coherence lengths ranging from 2 μm to 28 μm. In such circumstances the composite of multiple IRGs is equivalent to a single multi-layer IRG as described above and should be treated as such for the purposes of analysis such as for the simulations of the scattering of electromagnetic waves from the IRG.

In some embodiments where each input and output grating pair are dedicated to a narrow range of wavelengths, or where the projected light may consist of only a narrow range of wavelengths it may be advantageous to relax the constraint that the grating vector of the input grating $g_1$ and the y-direction grating vector of the output grating $g_y$ should be the same. In this case light beams that are coupled out of the DWC with a cumulative order of $\{0, -1\}$ may contain an additional contribution to their xy-wavevector of $g_1$-$g_y$. This may be advantageous in some systems as such a difference can allow for an additional deflection to be applied to the output beam relative to that provided for the input. For example, it may be advantageous to have a projected light that is incident on an input grating such that the centre of the field of view is at normal incidence to the DWC but results in an output that is tilted horizontally and/or vertically from normal incidence. Such a tilt could be used to provide a pantoscopic tilt of face-form wrap angle for a DWC used as part of a head-mounted display.

If used with projected light covering a broad range of wavelengths a mismatch of $g_1$ and $g_y$ in a DWC may result in a blurring of the output and a separation of the colours of the image as a result of the well established dispersive properties of diffraction gratings. However, if the mismatch between $g_1$ and $g_y$ were pre-compensated using other elements, such as an additional diffraction grating between a projector and the input grating of the DWC, then such blurring may be reduced such that a mismatch between $g_1$ and $g_y$ may be feasible for systems that feature a broader range of wavelengths than might otherwise be feasible.

A range of methods may be used to manufacture DWCs with multiple gratings, including, but not limited to, the following:

i) Multi surface treatment—Methods for creating a grating element on the surface of a substrate such as a glass wafer may be employed on both the waveguiding faces of a planar substrate to provide for two input gratings which overlap in the xy-plane and/or two output grating elements which overlap in the xy-plane. Suitable methods for creating grating elements on each surface include nanoimprint lithography of a resin or lithographic etching of the substrate or a coating on the substrate, along with secondary processes such as single or multilayer coating.

ii) Repeated surface treatment—Methods for creating a grating element on the surface of a substrate may be employed repeatedly to create layers of grating structures. For each layer methods such as nanoimprint lithography of a resin or lithographic etching of a resin or coating may be used to create grating elements, along with secondary processes such as single or multilayer coating. In between each grating layer a uniform layer of resin may be applied to provide spatial separation between the gratings and a fresh, flat surface for performing a new grating structuring step, typically using the same process each time. By this approach many layers of grating structures may be formed.

iii) Rigid lamination—Separately prepared rigid substrates, such as glass wafers, each with one or both surfaces featuring grating elements may be laminated together using an optically transparent adhesive. If one or both of the faces bonded together contains a grating element, then the adhesive used to laminate the substrates together should have optical properties that provide at least one difference with the grating elements to ensure that the scattering properties of these elements is not cancelled out by index matching with the adhesive.

iv) Flexible lamination—Gratings may be formed on a flexible polymer film using methods such as reel-to-reel nanoimprint lithography. Multiple layers of gratings may be then formed in a DWC by laminating multiple layers of such polymer film onto a suitable substrate, such as a piece of glass. A resin may be applied between each layer of film to provide an adhesive function and also assist with levelling the films.

These methods may be applied together to increase the complexity of grating elements that can be retained within a single DWC. Furthermore, multiple DWCs each featuring multiple layers of grating elements may be employed in some display systems.

In all manufacturing methods it is advantageous if a high degree of parallelism is maintained between the various layers of grating as well as between the exterior faces of the DWC and the grating layers. This is because deviations from the parallel condition will lead to additional deviations in the beam paths of projected light. These deviations may result in degraded performance for viewing of projected light, such as reduced resolution.

Spatial Variation of Interleaved Rectangular Gratings

In other arrangements of the invention aspects of an IRG may vary with respect to position within one or more regions of the IRG. Variations of the IRG may be used to vary the diffraction efficiency of the various orders, both relative to each other and in absolute terms. Furthermore, the dependence of the diffraction orders on the direction, wavelength and polarization of incident beam of light may also be varied with respect to position on the IRG.

Aspects for spatial variation may include variation of the lattice offset vector $o_{xy}$, variation of the shape, optical properties and/or material composition of periodic structures PS1 and/or PS2, variation of the combination rules used for combining these periodic structures to form the IRG. In principle any of the methods for the design and modification of an IRG described previously, as well as any other methods for designing an IRG, may be used within specific subregions within an IRG to provide for spatial variations of the overall grating. Variations may be applied collectively to both periodic structures PS1 and PS2, to just one of the periodic structures or differentially between the periodic structures, for example, by using the methods described above for providing differences between the periodic structures of an IRG.

In many arrangements it is preferable for the grating vectors $g_x$ and $g_y$ used to construct lattices L1 and L2 to be kept the same across the IRG as this will ensure that the directional scattering properties of the grating are maintained.

As shown in previous examples, variation of parameters such as a difference in shape between structures S1 and S2 or the deviation of lattice offset vector from the position required for an FSIRG, $$o_{xy} = \frac{1}{2}(p_x, p_y),$$

may be used to vary the diffraction efficiency of to-eye orders with greater sensitivity than turn orders. Spatial variation of an IRG may provide advantages for optimizing an IRG for use in a DWC such as with respect to some or all of the properties listed in table 3 in FIG. 47 above. For example, as light extends towards the edges of the grating it may be advantageous for the magnitude of to-eye orders to increase in order to compensate for the loss of light from the grating as it is coupled out. In this way, the variation of luminance output may be reduced with respect to eyebox position and/or gaze angle, and so the uniformity improved.

Figure 40A:
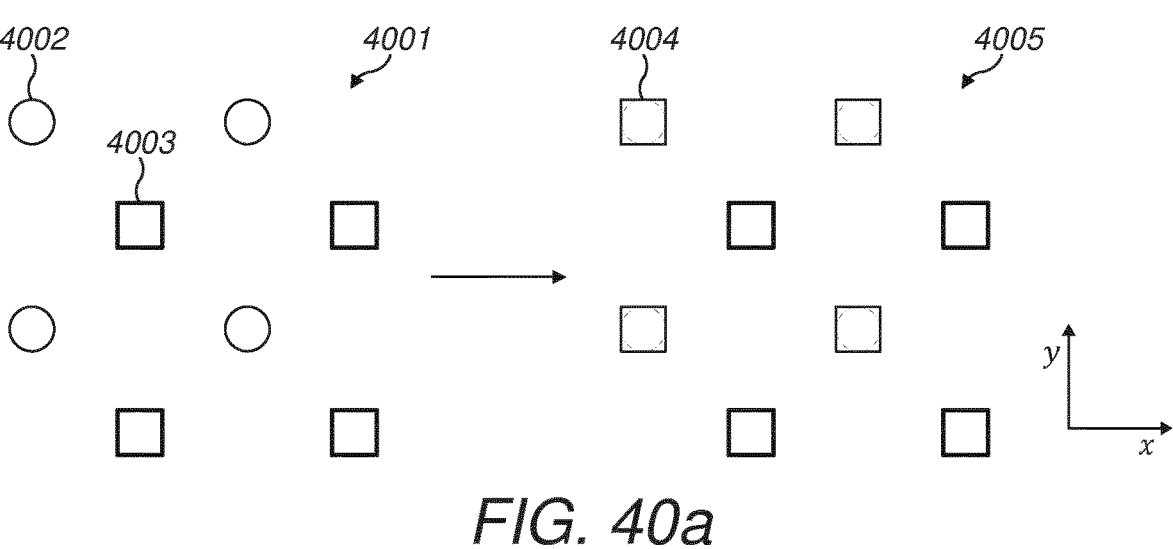
FIGS. 40a-h show examples of various types of spatial variation for optical elements according to aspects of the present invention.

In some arrangements it may advantageous for the type of grating to be varied with respect to position. By doing this certain diffraction orders can be made zero whereas others can be made relatively large. FIG. 40*a* shows a top view of part of an IRG 4001. Here periodic structure PS1 is composed of pillar-shaped structures 4002 with a circular profile when viewed in the xy-plane and periodic structure PS2 is composed of pillar-shaped structures 4003 with a square profile when viewed in the xy-plane. The height and material composition of the structures is the same. The value of the lattice offset vector is $$o_{xy} = \frac{1}{2}(p_x, p_y).$$

By changing the shape of structures 4002 into new structures 4004 with the same shape as s structures 4003 the IRG will be transitioned into the FSIRG 4005 where the to-eye orders of table 2 in FIG. 46 necessarily have zero diffraction efficiency. Within the region of an IRG configured as an FSIRG there would only be a capacity to turn light beams, not output them.

Figure 40B:
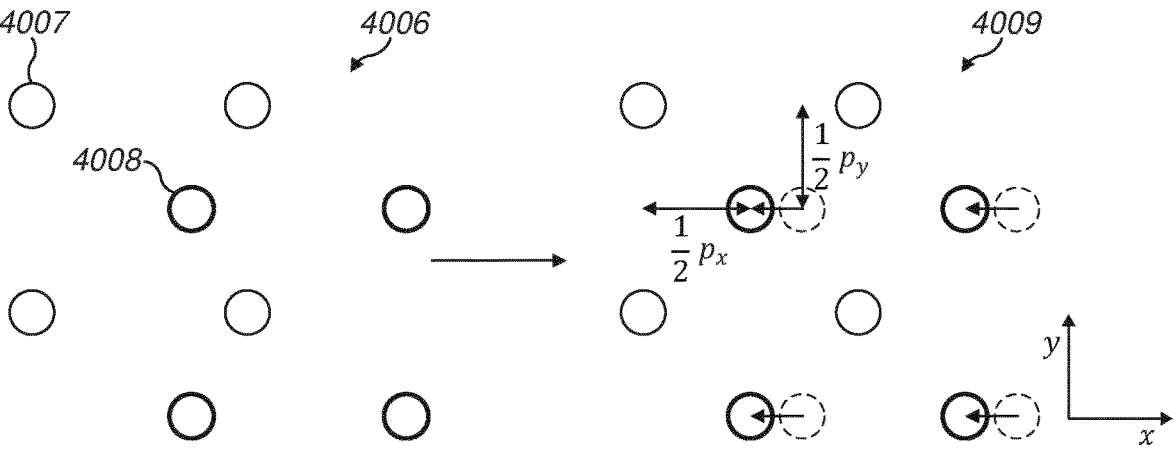

FIG. 40*b* shows a top view of part of an IRG 4006 consisting of pillar-shaped structures. Here the structures 4007 of periodic structure PS1 and the structures 4008 of periodic structure PS2 have identical shape and composition but the lattice offset vector $o_{xy}$ deviates from the values required for the special cases of the FSIRG, VSIRG and HSIRG. For this grating all non-evanescent diffraction orders may have non-zero diffraction efficiency. By changing the lattice offset vector to the value $$o_{xy} = \frac{1}{2}(p_x, p_y)$$

IRG 4006 will become an FSIRG 4009 and the diffraction efficiency of the to-eye diffraction orders of table 2 in FIG. 46 will necessarily become zero. Similarly, by changing the lattice offset vector to $$o_{xy} = \frac{1}{2}(p_x, 0)$$

an HSIRG will be formed, or by changing the lattice offset vector to $$o_{xy} = \frac{1}{2}(0, p_y)$$

a VSIRG will be formed, each of which have their own range of available diffraction orders.

Figure 40C:
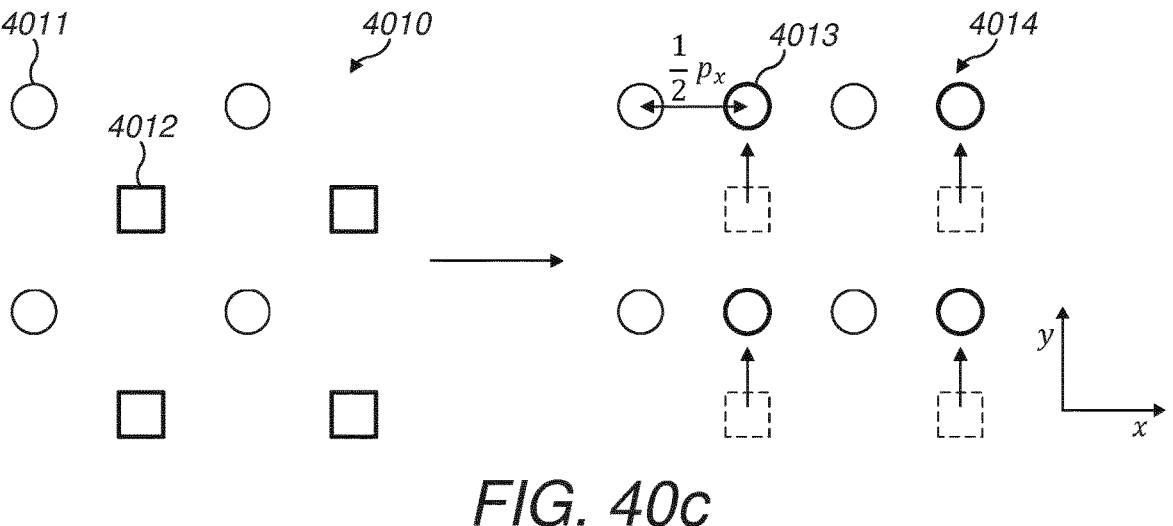

Multiple aspects of a grating may be changed simultaneously in order to accomplish a change in grating type. For example, FIG. 40*c* shows a top view of part of an IRG 4010 with periodic structure PS1 consisting of pillar shaped structures 4011 with circular profile and periodic structure PS2 consisting of pillar shaped structures 4012 with square profile. By shifting the lattice offset vector of the IRG to $$o_{xy} = \frac{1}{2}(p_x, 0)$$

in conjunction with applying a shape change to the structures of periodic structure PS2 to form structures 4013 that match the shape and composition of structures 4011 the IRG can be changed into an HSIRG 4014.

Variation Between Types of Grating

Figure 40D:
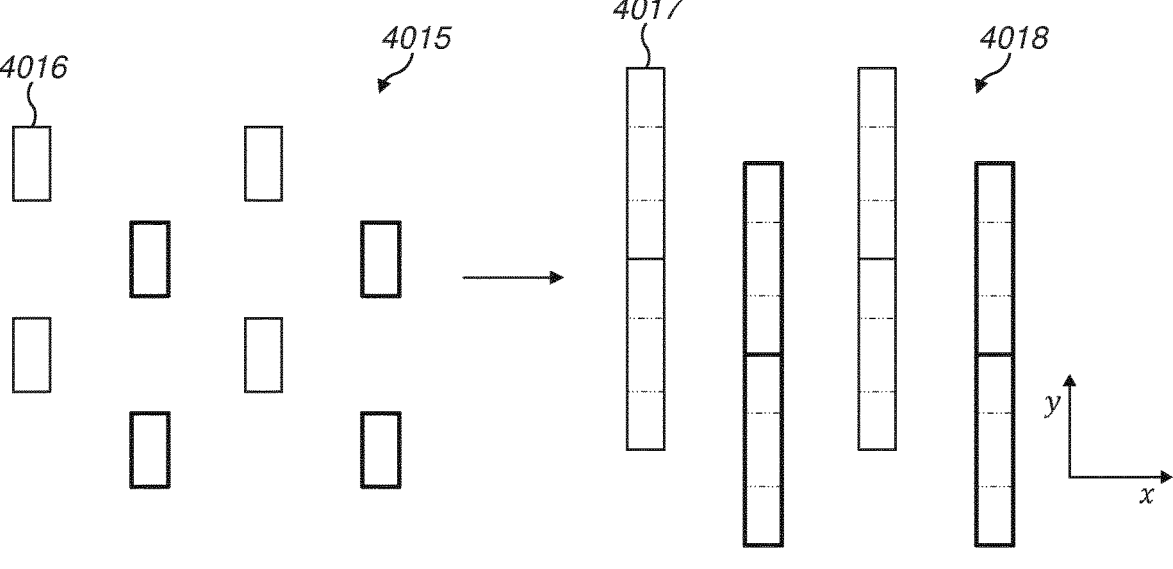

It is also possible to transition some parts of an IRG into a one-dimensional grating. FIG. 40*d* shows a top view of part of an FSIRG 4015 consisting of pillar shaped structures 4016 with rectangular profile. By elongating the pillars such that they merge into each other forming long, continuous structures 4017 a 1D grating 4018 may be formed with a grating vector given by $$g_{1D} = \frac{2\pi}{p_x}(2, 0). \tag{196}$$

In this case only the BT−X and BT+X diffraction orders of table 2 in FIG. 46 will have non-zero diffraction efficiency, meaning that such a grating region may be used to turn beams back in the x-direction within a DWC. This may be helpful to improve the confinement of projected light to within a specific region of a DWC, potentially allowing for multiple output coupling diffraction events from other regions of the grating with to-eye orders with non-zero diffraction efficiency. A similar transition could be used to blend together structures in the x-direction forming a 1D grating with a grating vector given by $$g_{1D} = \frac{2\pi}{p_y}(0, 2), \tag{197}$$

and where only the BT−Y and BRT+Y diffraction orders of table 2 in FIG. 46 will have non-zero diffraction efficiency.

Figure 40E:
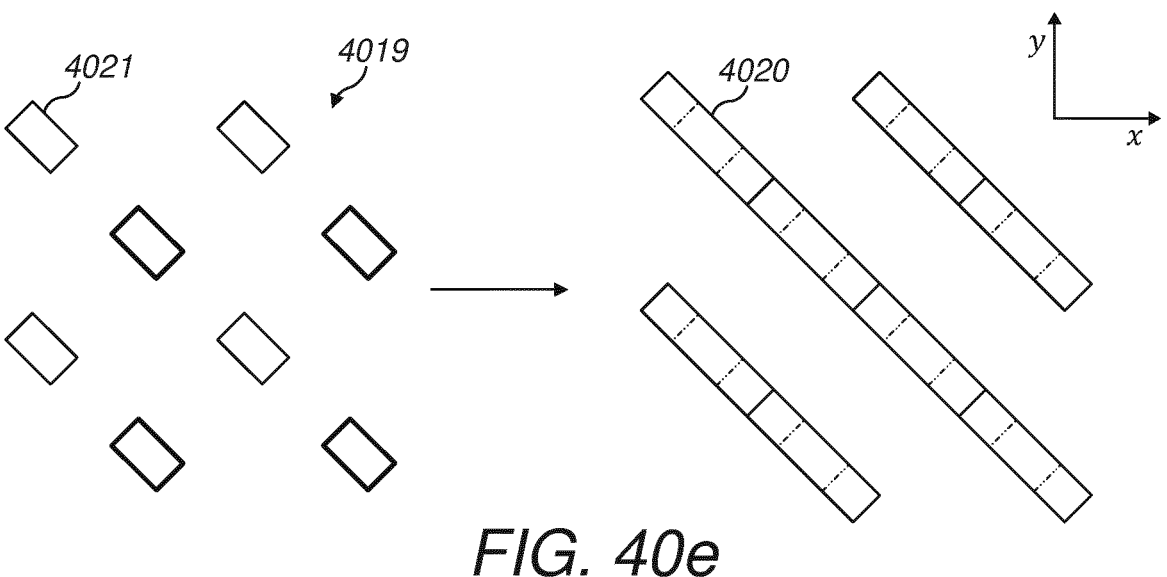

FIG. 40*e* shows a transition from an IRG 4019 to a diagonal 1D grating 4020 by elongation of the structures 4021 along the diagonals of the grating. Grating 4020 will have the grating vector $$g_{1D} = 2\pi\left(\frac{1}{p_x}, \frac{1}{p_y}\right). \tag{198}$$

For this grating only the T−X and UT−X diffraction orders of table 2 in FIG. 46 will have non-zero diffraction efficiency so a region of grating with such features will have very specific turning properties for any incident light beams. Similarly a blend may be performed along the diagonal as mirrored about the y-axis resulting in a 1D grating with grating vector $$g_{1D} = 2\pi\left(-\frac{1}{p_x}, \frac{1}{p_y}\right), \tag{199}$$

and where in this case only the T+X and UT+X diffraction orders of table 2 in FIG. 46 will have non-zero diffraction efficiency.

It should be noted that the transitions shown in FIGS. 40*d* and 40*e* need not begin with an FSIRG and by using a combination of lattice position shifting and shape changes, such as geometric morphing, a suitable transition to the 1D gratings may be accomplished.

Figure 40F:
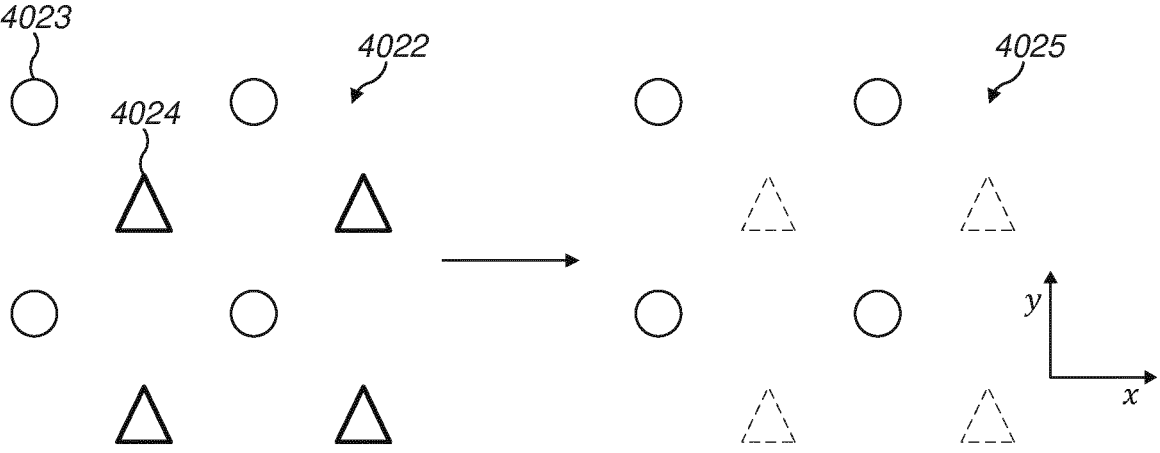

Another form of transition is to eliminate one of the periodic structures altogether. FIG. 40*f* shows an IRG 4022 consisting of pillar shaped structures 4023 and 4024 for the periodic structures PS1 and PS2, respectively. By reducing the size of the structures 4024 of periodic structure PS2 to zero a rectangular grating 4025 may be formed. Such a grating has a potential for stronger scattering by to-eye diffraction orders.

Figure 40G:
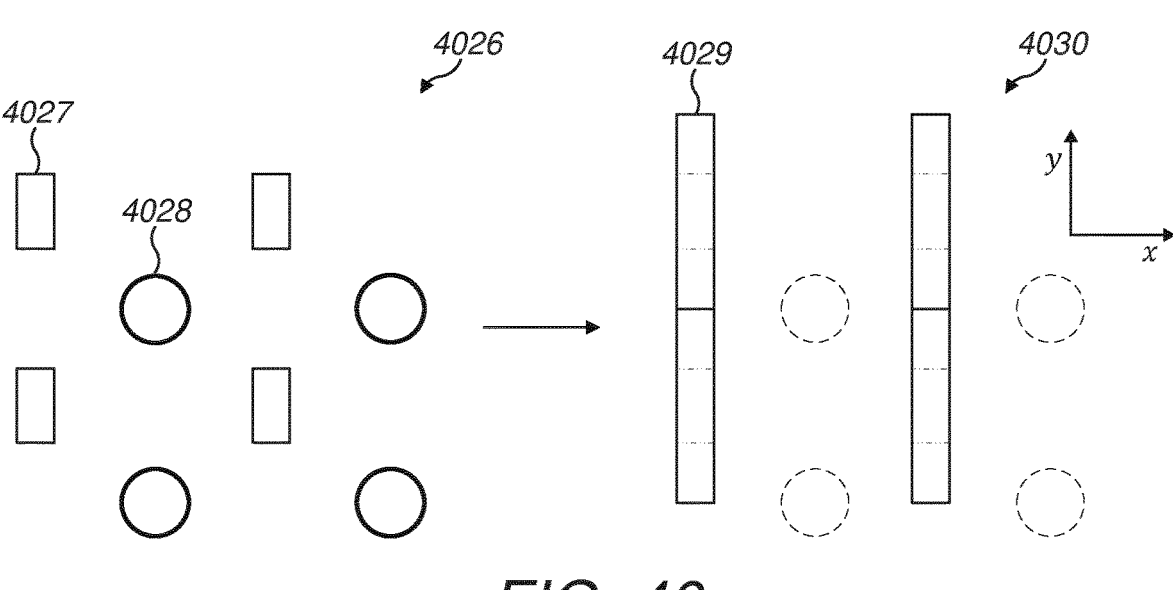

FIG. 40*g* shows an IRG 4026 consisting of pillar shaped structures 4027 and 4028 for the periodic structures PS1 and PS2, respectively. By transforming the structures of PS1 so that they blend together to form long continuous structures in the y-direction 4029 as well as reducing the structures of PS2 to zero a 1D grating 4030 may be formed with grating vector given by $$g_{1D} = \frac{2\pi}{p_x}(1, 0). \tag{200}$$

Light beams incident on such a grating may be diffracted by the TEAT+X and TEAT−X to-eye orders and BT−X and BT+X back turn orders of table 2 in FIG. 46, but other diffraction orders will have zero diffraction efficiency. Similarly by applying the blend of structures 4027 in the x-direction a 1D grating with grating vector given by $$g_{1D} = \frac{2\pi}{p_y}(0, 1), \tag{201}$$

will be formed, and which will provide non-zero diffraction efficiency for scattering by the STE and TEAT−Y to-eye orders as well as the BT−Y and BRT+Y back turn orders of table 2 in FIG. 46.

It should be noted that all variations of a grating as an FSIRG, HSIRG, VSIRG and the various 1D gratings essentially all represent particular special cases of a generalised interleaved rectangular grating and so may be described using the same lattices L1 and L2 of an IRG.

Figure 40H:
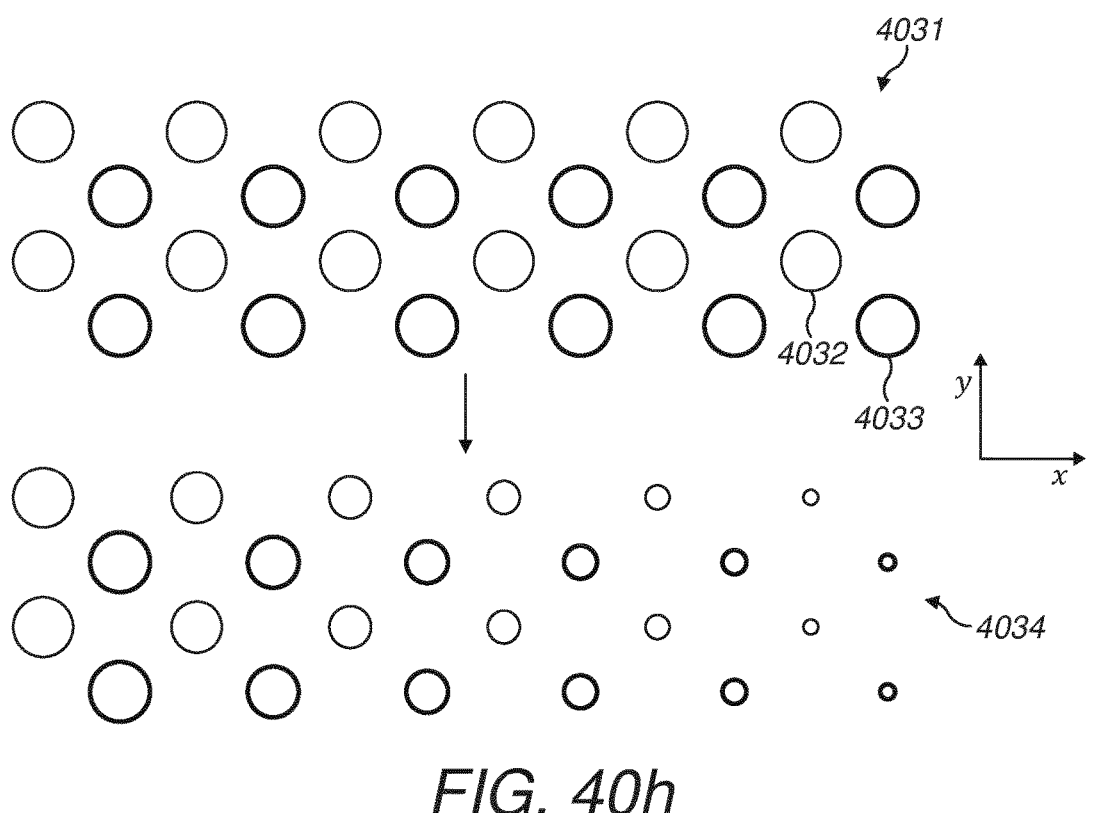

FIG. 40*h* shows a top view of part of an IRG 4031 consisting of pillar shaped structures 4032 and 4033 for periodic structures PS1 and PS2, respectively. By gradually reducing the size of the structures 4032 and 4033 with respect to position along one or more directions will result in a region 4034 where the grating features exhibit a gradient in size. Generally reducing the size of the grating features will result in reduction of the efficiency of non-zero diffraction orders. In turn this will reduce the visibility of such regions of the grating compared to parts of the DWC lacking grating structures. Preferably, by applying such a variation in an IRG towards the edge of the grating region on a DWC this may have the advantage of reducing the visibility of the grating region as seen by external observers.

Generally such a transition will occur over a distance of 1 mm to 10 mm of a defined edge. This is so as to be gradual enough to accomplish a smooth transition, but not so large so as to incur excessive additional fabrication costs due to increase in the size of the grating.

Alternatively or additionally, a gradual reduction in the height of nanostructures may be applied towards the edge of a grating region to accomplish a similar effect. For gratings consisting of a variation of optical properties due to variations within a material, such as gradients in refractive index, then the magnitude of the variations of the properties can be reduced progressively towards the edge of a grating region to accomplish a similar effect.

Example Layout of Spatial Variations

Figure 41:
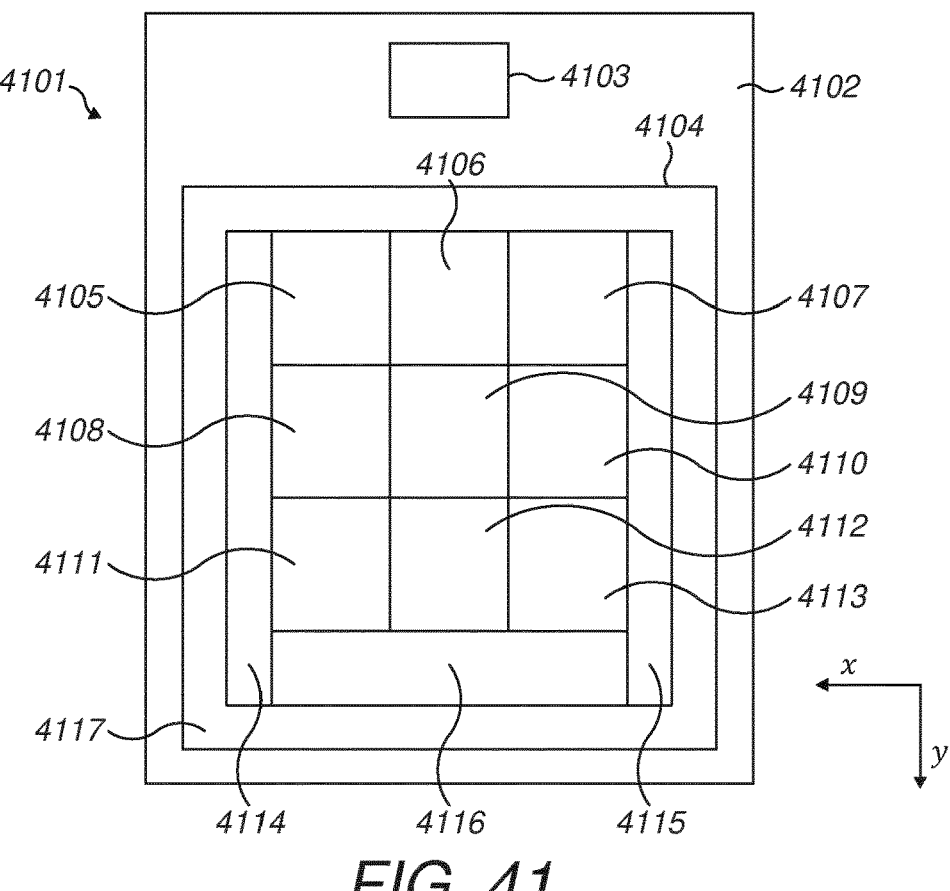
FIG. 41 is a top view of a diffractive waveguide combiner featuring an output grating element with spatial variations according to aspects of the present invention.

FIG. 41 shows a DWC 4101 consisting of a light transmissive planar substrate 4102 within which there is an input grating 4103 for receiving projected light and coupling it into waveguiding within the substrate and an output grating element 4104 based on an interleaved rectangular grating and split into multiple subregions. These subregions may feature variations of the IRG using the methods described above.

Preferably, all subregions of the grating element 4104 are based on the same lattices L1 and L2 of an IRG and so for all regions the notable diffraction orders and nomenclature of tables 1 and 2 may be adopted. Furthermore in many cases it is preferable for the configuration of the gratings of DWC 4101 to be equivalent to those of DWC 2101. Thus, the input grating 4103 has grating vector $g_1$ as given by equation (182) and period $p_y$ based on the same design principles as input grating 2104 and the inequalities (187) and (188). Similarly the output grating element 4104 have grating vectors $g_x$ and $g_y$ given by equations (189) and (190), where the period $p_y$ is identical to that of the input grating 4103 and period $p_x$ based on the same design principles as IRG 2105 and the inequalities (191) and (192).

The central part of grating element 4104 consists of a 3×3 grid of subregions 4105-4113. The subregions along the central strip 4106, 4107, and 4108 may be configured as IRGs with a small degree of break in symmetry to output some projected light via to-eye orders, in particular the STE order. These IRGs should also provide turn orders, in particular the T+X and T−X orders. In the absence of turn orders beams of projected light will tend to run along the central strip of the waveguide, thus the turn orders are to distribute light outwards to other parts of the grating and expand the size of the eyebox. The degree of symmetry breaking may be increased from subregion 4106 to 4107 to 4108 in order to increase the amount of light that is coupled out of the waveguide and compensate for the loss of light due to prior turning and output coupling of beams of light as they propagate down the DWC 4101. There are multiple ways in which this may be accomplished. For example the lattice offset vector may be increased from subregion 4106 to 4107 to 4108, or geometric morphing may be used increase the shape difference between the structures S1 and S2 of each IRG subregion. In some configurations it is advantageous for the diffraction efficiency of the T+X and T−X turn orders to also increase. This may be accomplished by varying the size and/or height of the structures S1 and S2 from subregion 4106 to 4107 to 4108. This may also assist in compensating for the depletion of light as it propagates down the waveguide.

The strip on the +x side of the 3×3 grid, consisting of subregions 4105, 4108 and 4111 may also consists of IRGs. Here the IRGs may be configured to have relatively high diffraction efficiencies for the TEAT+X and TEAT−X to-eye diffraction orders, in particular the TEAT+X diffraction order as the predominant path for beams into these subregions is likely to be via the {1, −1} cumulative order of the output grating element 4104. Similarly, the strip on the −x side of the 3×3 grid, consisting of subregions 4107, 4110 and 4113 consists of IRGs configured to have relatively high diffraction efficiencies for the TEAT+X and TEAT−X to-eye diffraction orders, in particular the TEAT−X diffraction order as the predominant path for beams into these subregions is likely to be via the {−1, −1} cumulative order of the output grating element 4104.

Alternatively, in other configurations the subregions 4105, 4107, 4108, 4110, 4111 and 4113 may be 1D gratings with grating vector $g_{1D}$ given by equation (200). In this case the TEAT+X and TEAT−X to-eye orders can be made relatively large without interference from other turn orders, except for the x-direction back turn orders, BT+X and BT−X.

In some configurations subregions 4114 and 4115 lie outside of the projected eyebox of the system. Light that reaches these regions is potentially wasted so there is no advantage to providing to-eye diffraction orders. By configuring these regions as 1D gratings with grating vector $g_{1D}$ given by equation (196) the back turn orders BT+X and BT−X may be provided, without light losses to any to-eye orders. These orders will turn beams of light back towards the interior of the grating where they may then be usefully out-coupled from the grating, thus increasing the efficiency of the system. As there are no to-eye orders the diffraction efficiency of these regions can be made very large in order to favour efficient return of light to the grating interior without concern for inducing large non-uniformities in the output from the grating element 4104. Preferably, subregion 4114 is optimized to particularly favour the BT−X order and subregion 4115 is optimized to particularly favour the BT+X order. In other configurations subregions 4114 and 4115 are configured as HSIRGs, which also provide a mechanism for providing back-turn orders in the x-direction.

Similarly, in some configurations subregion 4116 lies outside the projected eyebox of the system and may be configured as a 1D grating with grating vector $g_{1D}$ given by equation (197) in order to provide back turn orders BT−Y and BRT+Y without light losses to any to-eye orders. Such orders will turn light beams back towards the interior of the grating where they may then be usefully out-coupled from the grating. Alternatively, subregion 4116 may be configured as a VSIRG, which also provides suitable back-turn orders in the y-direction.

One advantage of the diffraction orders provided by the IRG is that there are fewer cumulative orders allowed that correspond to waveguided propagation compared to other schemes based on 2D gratings, such as WO 2018/178626. This can improve the efficiency with which structures designed to turn beams back from the periphery of a grating region as typically each region only need be concerned with light propagating due to a single cumulative order of the 2D grating element based on an IRG.

The subregion 4117 is located around the periphery of the grating. In some configurations this region lies outside the projected eyebox of the system and the grating may be configured to have a structure that fades-out in a fashion equivalent to that shown in FIG. 40*h*. In this way the edges of the output grating element 4104 may be softened and so its appearance within the DWC made less noticeable to an external observer.

Figure 42:
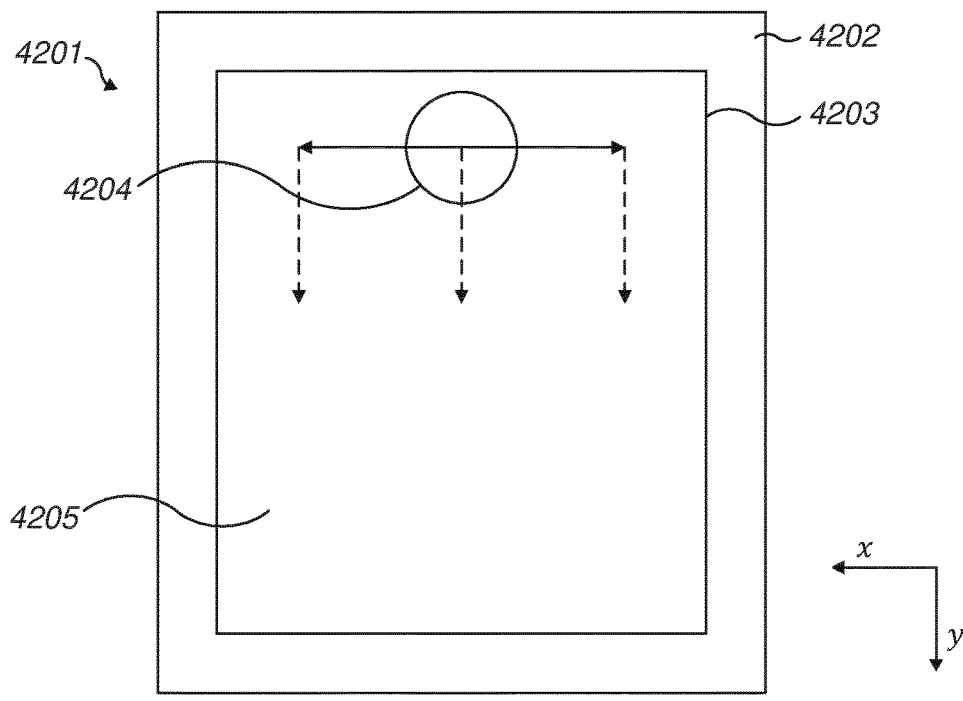
FIG. 42 is a top view of a diffractive waveguide combiner featuring a grating element with spatial variations according to aspects of the present invention such that it may be used for both input and output coupling of light.

FIG. 42 shows a DWC 4201 consisting of a light transmissive planar substrate 4202 within which there is a spatially varying grating element 4203. Preferably, the grating element 4203 is an IRG configured with grating vectors based on similar principles to those used for DWC 2101.

Since an IRG can couple light out of a DWC for observation it can also couple projected light into the waveguide via diffraction orders with opposite sign to the out-coupled orders. Typically the diffraction efficiency of such coupling is relatively low, as required for effective pupil replication and eyebox expansion. In some arrangements a subregion 4204 is configured to provide efficient in coupling of light via diffraction orders leading to propagation in generally in the +x, −x and +y directions. Once coupled into the DWC such beams of light will then propagate into the rest of the grating region 4205 which may be configured as an IRG with diffraction properties optimized for serving as an output element of a DWC. The region 4205 need not be uniform and may contain many subregions with different properties as may provide advantageous properties. For example, the areas on the −x and +x sides of the subregion 4204 may be configured as 1D gratings according to equation (198) on the −x side and equation (199) on the +x side each of which will preferentially turn light beams towards the general +y direction, as required for useful output into the eyebox of an observation system. In this way a single grating element may provide all the functions required of a DWC for use in an AR- or VR-display system.

Interpolation Methods for Transition of Spatial Variations of Interleaved Rectangular Gratings Abrupt changes in a grating element containing multiple subregions with different configurations of an IRG, such as the example discussed above may induce unwanted effects, depending on the magnitude of the changes. For example, changes in the scattering properties of a grating may lend it a tiled or mosaic-like appearance for an external observer, which may be undesirable for the cosmetic appearance of a product. The projected light contributing to an observation at a particular location within the eyebox and gaze angle within the system field of view must necessarily come from a corresponding patch of the output element on a DWC. This patch has a size, shape and location determined by projecting the entrance pupil of an observation system (such as an eye) backwards along the gaze path onto the output element. Undesirable non-uniformities in brightness and/or colour may be experienced by a viewer as their observation moves with location within the eyebox as driven by changes in which subregions illuminating different parts of the observed field of view. Sudden changes in grating properties may also result in variations of the wavefront of beams that overlap such transitions. This may bring undesirable effects such as reduction in the sharpness of focus that may be achieved by such a beam.

Various methods may be used to mitigate these effects. One method is to reduce the magnitude of variation by subdividing each subregion into a number of smaller subregions. The grating in each of these subregions may then be designed to have structures and composition that provide a more gradual variation of scattering properties compared to those of neighbouring sub-regions. For example, each of the nine subregions within the 3×3 grid of subregions in grating 4104 may be divided into a 3×3 grid, thus resulting in an overall grid of 9×9 subregions. This subdivision may be applied iteratively to form ever greater number of subregions, with the ultimate limit being subregions corresponding to single unit cells.

Essentially, a process of subdivision followed by adjustment of the grating properties in the new subregions to provide for more gradual transitions in scattering properties is a form of interpolation adapted to optical structures of a diffraction grating. As such a broad range of interpolation methods, including parametric and non-parametric techniques may be applicable to this task.

As all subregions are based on the same grating lattices L1 and L2, and in the case that the material composition of the grating does not vary between subregions then a wide range of transitions may in principle be accomplished by changes in the lattice offset vector $o_{xy}$ of the IRG in each subregion and/or changes in the shape of the structures S1 and S2 of the IRG in each subregion. Depending on how the shapes of the gratings vary the latter may be possible via the geometry morphing methods outlined above or by simpler methods based on changes to the size, orientation, height and/or blaze of the structures. For structures generated based on parametric description, such as those shown in FIG. 23, intermediate shapes may be generated by interpolation of parameter values with respect to position.

In one approach the design of a grating may be prescribed at a series of N xy-coordinates $\{(x_1, y_1), (x_2, y_2), \ldots, (x_N, y_N)\}$. The points may or may not lie on a grid, but in general should not all lie on a line. In-between each of these locations interpolation methods are used to prescribe the design at each unit cell based on the coordinates of the unit cell. If the series of prescribed points lies on a grid, then methods such as bilinear and bicubic interpolation may be used. Other methods may be used if the points are not on a grid, including methods based on thin plate splines, Kriging, polynomial basis functions and triangular irregular networks with linear interpolation. The scattered Interpolant function in Matlab® provides an implementation of linear interpolation methods for irregularly distributed data points. Outside the convex hull enclosing the points extrapolation methods may be used to prescribe required designs. Such extrapolation may choose to clamp properties to those at the edge of the convex hull or use various methods to generate new values such as linear extrapolation.

Interpolation and extrapolation may be performed on any parametric values describing the design of an IRG in a region, including the lattice offset vector, values governing the size and shape of structures S1 and S2, and parameters governing any transformations.

Figure 43:
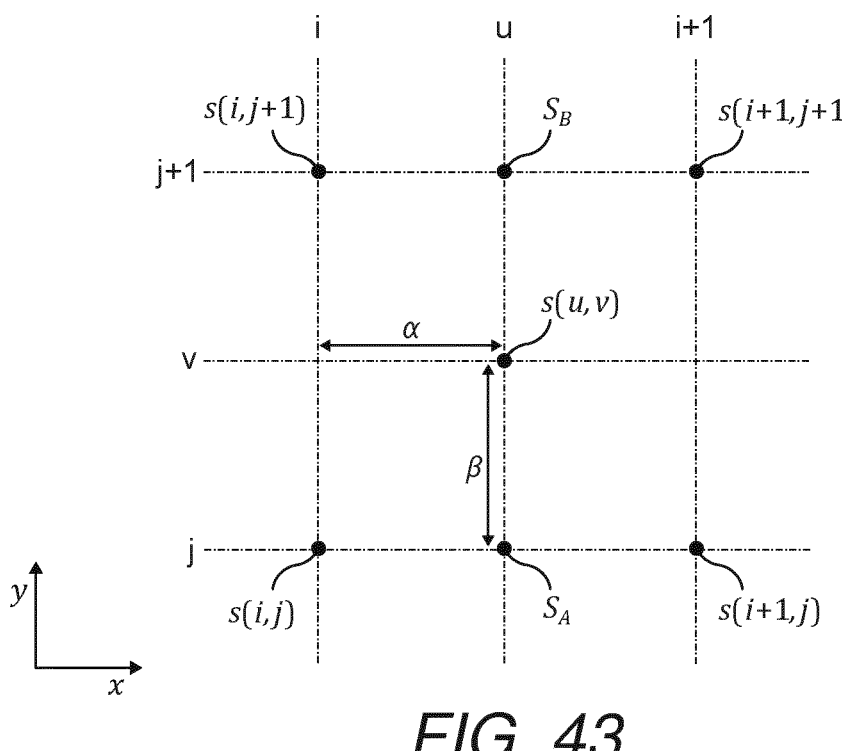
FIG. 43 shows an interpolation scheme that may be applied to the present invention.

By way of example, FIG. 43 shows a section of a grid with columns indexed by the integer i and rows indexed by the integer j. The points on the grid correspond to xy-coordinates which are arranged on a grid in the xy-plane of a spatially varying IRG. The index (i, j) has coordinates $(x_i, y_j)$ given by $$(x_i, y_j) = (x_0 + iP, y_0 + jQ), \quad (202)$$

where $(x_0, y_0)$ is an origin for the grid, P the period of the grid in the x-direction and Q the period of the grid in the y-direction. The periods P and Q are not to be confused with the periods of the IRG $p_x$ and $p_y$ which will generally be much smaller in value. Advantageously P and Q may be an integer multiple of $p_x$ and $p_y$, respectively. At each point on the grid a scalar value for which interpolation is required is defined. If we use the notation s(i, j) to denote this scalar value at the point on the grid $(x_i, y_j)$, then the bilinearly interpolated value at an intermediate point with coordinates (u, v), s(u, v) may be found by the following procedure:

i) the values of i and j for the nearest grid point where $x_i \leq u$ and $y_j \leq v$ are computed by the formulae $$i = \text{floor}\left(\frac{u - x_0}{P}\right), \text{and} \quad (203)$$

-continued $$j = \text{floor}\left(\frac{v - y_0}{Q}\right); \quad (204)$$

ii) parameters $\alpha$ and $\beta$ are then computed by the formulae $$\alpha = \frac{x - x_0 - iP}{P}, \text{and} \quad (205)$$

$$\beta = \frac{y - y_0 - jQ}{Q}; \quad (206)$$

iii) the bilinearly interpolated value s(u, v) is then given by $$s(u,v) = (1-a)(1-\beta)s(i,j) + \alpha(1-\beta)s(i+1,j) + (1-\alpha)\beta s(i,j+1) + \alpha\beta s(i+1,j+1). \quad (207)$$

It should be noted that if the point (u, v) lies outside the grid, then the value s(u, v) may be clamped to a value on the edge of the grid or extrapolated based on the x- and y-gradient of the points on the grid closest to the point. It is often preferable to avoid extrapolation as this may lead to parameter values which lie outside a range of valid values. Alternatively a grid may be defined with an extent larger than the final grating design to ensure that no extrapolation occurs over the physical extent of the actual grating.

Any number of parameters describing an IRG may be interpolated by this approach by treating each parameter as a separate grid of scalar values and performing interpolation on these values. For example, for grating designs where variation of the lattice offset vector is used to control the strength of diffraction orders, interpolation may be applied separately to the x- and y-components of the lattice offset vector. In this way a range of variations of both shape, lattice offset and even grating composition may be handled by interpolation methods.

In other approaches, interpolation and extrapolation may used to provide target values required for diffraction efficiencies of the grating with respect to position. These target values may then be related back to corresponding designs of IRG. As there are many diffraction orders, each of which may have a nonlinear dependence on the direction, wavelength and polarization of incident beams or light it may be necessary to perform some selection as to which diffraction orders, and which incident beam conditions are used to provide the target values. For example, a simple approach would be to select a single diffraction order and a single direction and wavelength for an incident beam and perform interpolation on this to select the value of a single parameter for the IRG at interpolated locations. For example, the diffraction efficiency of the to eye order shown in graph 2405 may be used to select values of $s_x$ in the range $0.4 \leq s_x \leq 0.8$. Any efficiency value between 0% and ~1% may be uniquely related to a value of $s_x$. A range of incident beam properties could be taken into account by constructing an average measurement of efficiency over a desired range of incident beam directions and/or wavelengths. Such an average may be weighted to afford more importance to particular directions and/or wavelengths of the incident beam.

For grating designs with multiple parameters it may be desirable to generate multiple targets for the diffraction efficiency at intermediate locations. This may be performed by looking at multiple diffraction orders and/or defining multiple ranges of incident beam properties for computing average performance. In such an approach interpolation may be performed on the value derived by each range of incident beam properties for each of the diffraction orders under consideration. The resulting values of diffraction efficiency may then be used to select a grating design.

Typically it may not be possible for designs to provide the exact diffraction efficiencies desired. In this case it may be preferable to employ a multi-objective optimization to find or otherwise select a grating design that provides a best-fit approximation of the targets. For example, one approach may be to select a variation of grating design based on the minimum least squares difference with respect to the various target diffraction efficiencies required. Weighting of different contributions may be used if certain diffraction orders and/or certain ranges of incident beam parameters are more important. Such an optimization may be constrained to designs that are of a form similar to the surrounding grating, differing in details such as lattice offset or structure size, or may allow for a wider exploration of grating design in order to deliver the diffraction efficiencies desired.

As described above a geometric morph may be used to create a shape that represents an intermediate form between two different shapes. When interpolating across a grid with two-dimensional spatial variation it may be necessary to combine contributions from more than two shapes. For example, equation (207) shows that bilinear interpolation on a two-dimensional grid will in general combine four values from points on the grid to form each interpolated value. Extending such a concept to geometric morphing requires some method to combine four shapes together.

A method analogous to bilinear interpolation is to reduce the combination of multiple shapes into a succession of pair-wise geometric morphs. Here we may suppose that the shape of part of an IRG, such as structure S1 or S2 is defined on the grid of points shown in FIG. 43 with indices as described above and coordinates of grid points defined according to equation (202). For convenience we use the same notation s(i, j) as before, except now we note that this denotes a shape at the grid point $(x_i, y_j)$ rather than a scalar value. As described previously a morph may be governed by a parameter which describes the transition from one shape to another. For convenience we will represent a morph using a function-based notation, thus we may define that if A and B are the shapes of the two end-points of the morph and $\gamma$ is a parameter governing the morph as described previously then the morphed shape C is given by $$C=\text{morph}(\gamma,A,B). \tag{208}$$

Here we note that based on the definition of $\gamma$, morph(0, A, B)=A and morph(1, A, B)=B. As mentioned above, there are many algorithms described in the public domain which may be used to perform the actual morph function, which need not be defined in detail here to outline the approach required for interpolation of shapes defined at points on a grid. Using this definition interpolated shape at the coordinate (u, v), s(u, v) may be computed using the following approach:

i) values of i, j, $\alpha$, and $\beta$ are computed according to equations (203), (204), (205) and (206).

ii) a new shape $S_A$ is created by morphing between s(i, j) and s(i+1, j), using $\alpha$ as the parameter governing the morph according to $$S_A=\text{morph}(1-\alpha,s(i,j),s(i+1,j)). \tag{209}$$

iii) a new shape $S_B$ is created by morphing between s(i, j+1) and s(i+1, j+1), using $\alpha$ as the parameter governing the morph according to $$S_B=\text{morph}(1-\alpha,s(i,j+1),s(i+1,j+1)). \tag{210}$$

iv) the final interpolated shape s(u, v) is created by morphing between $S_A$ and $S_B$, using $\beta$ as the parameter governing the morph according to $$s(u,v)=\text{morph}(1-\beta,S_A,S_B). \tag{211}$$

We may expand this result to show that the result is from successive applications of the morph function $$s(u,v)=\text{morph}(1-\beta,\text{morph}(1-\alpha,s(i,j),s(i+1,j)),\text{morph}(1-\alpha,s(i,j+1),s(i+1,j+1))). \tag{212}$$

Figure 44:
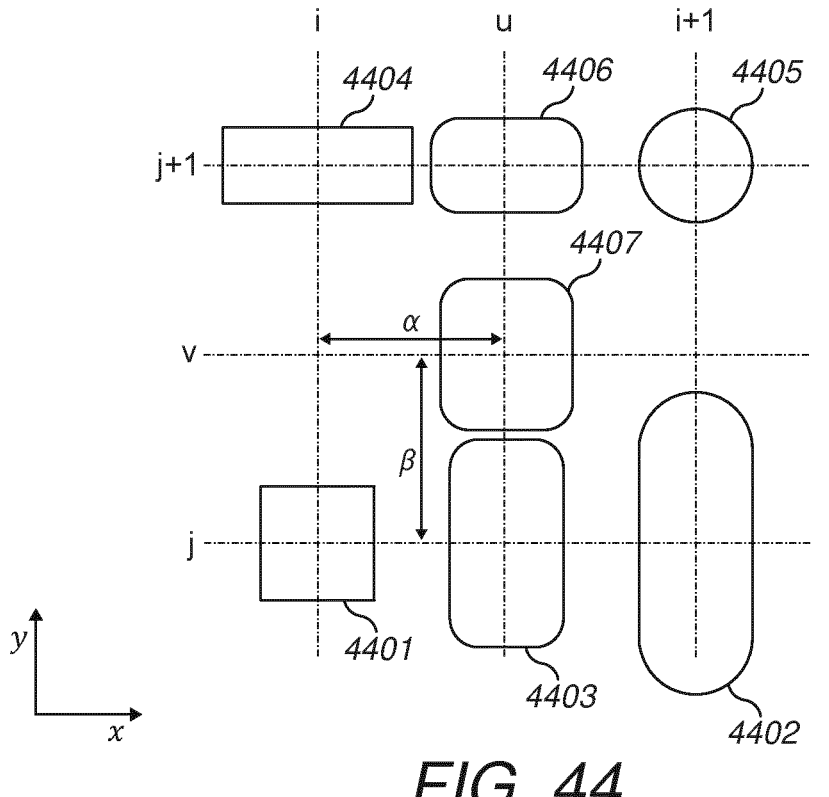
FIG. 44 shows a top view of geometric morphing methods applied to the present invention.

FIG. 44 shows an example of this process, shapes 4401 and 4402 are morphed to produce the shape 4403. Similarly shapes 4404 and 4405 are geometrically morphed to produce the shape 4406. Finally shapes 4403 and 4406 are geometrically morphed to produce the shape 4407.

This approach is in fact equivalent to an approach which may be used to derive equation (207). Linear interpolation between the values s(i, j) and s(i+1, j) with respect to the parameter $\alpha$ derived according to equation (205) gives the value $$S_A=(1-\alpha)s(i,j)+\alpha s(i+1,j). \tag{213}$$

Similarly linear interpolation between the values s(i, j+1) and s(i+1, j+1) with respect to the parameter $\alpha$ gives the value $$S_B=(1-\alpha)s(i,j+1)+\alpha s(i+1,j+1). \tag{214}$$

Performing linear interpolation between the values $S_A$ and $S_B$ with respect to the parameter $\beta$ derived according to equation (206) gives the value $$S_C=(1-\beta)S_A+\beta S_B, \tag{215}$$

which expands to give $$S_C=(1-\alpha)(1-\beta)s(i,j)+\alpha(1-\beta)s(i+1,j)+(1-\alpha)\beta s(i,j+1)+\alpha\beta s(i+1,j+1). \tag{216}$$

We note that the expression for $S_C$ in equation (216) is the same as s(u, v) given in equation (207). This demonstrates a conceptual equivalence between bilinear interpolation of numerical values and interpolation of shapes using geometric morphing.

Function-Based Methods for Spatial Variations of Interleaved Rectangular Gratings Another approach for describing spatial variations of IRGs is to use functions of (x, y)-coordinate in the xy-plane of the IRG to describe how parameters of the IRG vary with position, including parameters describing the shapes of the structures as well as the lattice offset vector of the IRG. For example, the description of periodic structures PS1 and PS2 given by equations (130) and (131), respectively, can be expanded to include position dependent parameters and so written as $$P_1(x, y) = \sum_{i=-\infty}^{\infty} \sum_{j=-\infty}^{\infty} C(ip_x, jp_y)S_1(x - ip_x, y - jp_y, a_1(ip_x, jp_y)), \tag{217}$$

and $$P_2(x, y) = \sum_{i=-\infty}^{\infty} \sum_{j=-\infty}^{\infty} C(ip_x, jp_y)S_2(x - ip_x - o_x(ip_x, jp_y), y - jp_y - o_y(ip_x, jp_y), a_2(ip_x, jp_y)). \tag{218}$$

Here the terms $a_1(x, y)$ and $a_2(x, y)$ are vector functions of position where each element of the vector corresponds to a parameter used to prescribe the shape of structure S1 and S2, respectively. As such the definitions of the structure functions $S_1(\ )$ and $S_2(\ )$ have been expanded to express the input parameter values explicitly, whereas previously for structures that do not vary with position any parameters could be included implicitly within the definition of the functions themselves. It should be noted that here $a_1(x, y)$ and $a_2(x, y)$ are evaluated at the points of lattice L1 with coordinates given by $(ip_x, jp_y)$, this ensures that the values of the parameters are constant for each instance of the structure function on the lattice. Equation (218) also shows that the x- and y-components of the lattice offset vector may be expressed as scalar functions depending on the points of lattice L1 of the IRG.

A similar use of expanded definition may be applied to the volumetric descriptions of periodic structures PS1 and PS2 given by equations (176) and (177) to give $$P_1(x, y, z) = \sum_{i=-\infty}^{\infty} \sum_{j=-\infty}^{\infty} C(ip_x, jp_y) N_1 \left(x - ip_x, y - jp_y, z, a_1(ip_x, jp_y)\right), \tag{219}$$

and $$P_2(x, y, z) = \sum_{i=-\infty}^{\infty} \sum_{j=-\infty}^{\infty} C(ip_x, jp_y) N_2(x - ip_x - \tag{220}$$
$$o_x(ip_x, jp_y), y - jp_y - o_y(ip_x, jp_y), z, a_2(ip_x, jp_y)).$$

Each element of $a_1(x, y)$ and $a_2(x, y)$, as well as $o_x(x, y)$ and $o_y(x, y)$, is a scalar function of position. In principle any form of function that yields valid, finite values at each evaluation point may be used. For some representations it may be advantageous to construct each scalar function from a basis set of functions. For example, if $B_i(x)$ is a series of one-dimensional basis functions described by the index i then a two-dimensional scalar function $F(x, y)$ could be constructed as $$F(x, y) = \sum_{i=0}^{N_1} B_i(x) \sum_{j=0}^{N_2} b_{ij} B_j(y). \tag{221}$$

Here $N_1$ and $N_2$ are limits on the x- and y-dependent terms allowed for $F(x, y)$ and $b_{ij}$ is a coefficient for the contribution of the $B_i(x)B_j(y)$ term to $F(x, y)$. Suitable forms for the basis functions include simple polynomials, $B_i(x)=x^i$, Chebyshev polynomials of the first and second kind, Legendre polynomials, or a Fourier series, $B_i(x)=\sin(2\pi ix/T+\phi_i)$ where an additional set of phase parameters $\phi_i$ must be defined as well as the period T. For some representations, such as those based on polynomials, it may be advantageous to use normalization constants to control the range of $(x, y)$ values applied to the basis functions in order to avoid numerical stability issues associated with the computation of high order terms. If $n_x$ and $n_y$ are normalization constants, then a suitable modification of equation (221) is $$F(x, y) = \sum_{i=0}^{N_1} B_i(x/n_x) \sum_{j=0}^{N_2} b_{ij} B_j(y/n_y). \tag{222}$$

Typically the values of $n_x$ and $n_y$ will be such that over the dimensions over the grating $|x/n_x| \leq 1$ and $|y/n_y| \leq 1$.

Two-dimensional basis functions, such as the Zernike polynomials, may also be suitable representations for $F(x, y)$; typically these will also employ some form of normalization on the x and y values. Alternatively, any scalar function could be constructed in a piecewise fashion, such as a piecewise polynomial, or as a two-dimensional non-uniform rational B-spline surface (NURBS surface).

In another approach any scalar function describing a parameter value or lattice offset component may use interpolation between a series of points defined on the xy-plane in a fashion similar to that outlined previously.

In general, neither the functions used to describe each of these scalar functions nor any coefficients on which these functions may depend need be the same for various parameters being described by the functions. Furthermore, multiple scalar function types may be combined simultaneously in a single, overall scalar function describing a parameter value or lattice offset component.

Functional definitions may also be used to apply to other aspects for creation of an IRG structure. For example, geometry modifiers may be made position dependent and that position dependence described using methods such as those outlined here.

Many functional definitions will depend on coefficients or other parameters for describing the functions. In many cases selection of the values of these parameters will be important for determining the performance of an IRG in a given application, for instance as an output element of an IRG. If the performance of the IRG in an intended application can be measured by one or more numerical values, then a wide variety of optimization techniques may be used to guide the selection of parameter values.

In some approaches, simulations may be used to compute the output from a DWC using the IRG where the input consists of an ensemble of beams with uniform luminance over a defined field of view and selection of wavelengths. The criteria listed in table 3 in FIG. 47 may be used to inform the computation of values from such a simulation which provide a measurement of the performance of the system. For example, the average output luminance may provide a measurement of the efficiency of the system, and the variance of the output luminance may provide a measurement of the direction uniformity. Depending on the optimization method used these values may be combined together using a suitable function or kept separate. A common approach in optical design is to combine various aspects of performance in an overall scalar merit function which is intended to measure the overall performance of the system. Linear weighting coefficients, or other methods may be used to scale and emphasise the relative importance of various measurements to the overall performance measurement of the system. By convention such calculations are often arranged such that a minimum value will represent best performance but this need not be the case. There exists a great variety of optimization methods which may then be used to find sets of values for prescribing the spatial variation of parameters governing a spatially varying IRG. Such methods include, but are not limited to steepest-gradient methods, quasi-Newton methods, the Nelder-Mead method, genetic algorithms, brute force search algorithms, simulated annealing algorithms and hybrid methods which combine two or more of these techniques.

Simulation of a DWC with a spatially varying IRG will typically employ a combination of ray tracing methods, to compute the effect of the many different beam paths possible in an IRG, in conjunction with wave-based computation, to compute the scattering properties of the IRG. For a spatially varying IRG the scattering properties may require computation at each location of the grating. If variations of the grating are sufficiently gradual, then invoking periodic boundary conditions across a single unit cell and computing scattering properties based on this may provide an adequate approximation. This significantly reduces the computational burden required. Abrupt changes in the grating may also be computed using this approach as long as the distance between abrupt changes is much larger than the wavelength of light and for beams much larger than the unit cell of the grating.

If the scattering properties of an IRG vary with respect to position in a continuous and well-behaved manner, then interpolation methods may be used to further reduce the computational burden. Here the scattering properties of the grating may be calculated at various reference positions and interpolation then used to compute the scattering properties at intermediate locations. Typically, such interpolation will be performed on the values corresponding to a single diffraction order at a single direction of incident beam with a single wavelength.

Various methods for spatial variation may be applied selectively to different subregions of an IRG and combined together. For example, function-based methods could be used to describe parametric spatial variations within a subregion of an IRG and then combined with interpolation methods to transition another subregion of an IRG.

Phase Compensation and Modulation Methods for Interleaved Rectangular Gratings

Unless stated otherwise all phase shifts should be assumed to be in radians for this description. As well as changing the magnitude of various diffraction orders, spatial variations of an IRG may also affect the polarization-dependent phase shift imparted to the electric field of diffracted orders. Such phase variation can affect the wavefront of a scattered light beam which may degrade the image sharpness that may be achieved for projected light beams. As described above, in general there are multiple paths by which projected light beams derived from the same input beam may come to output at a particular location on a DWC that uses an IRG as an output element. If these paths acquire different phase shifts due from scattering by non-zero diffraction orders from a spatially varying IRG, then complex interference effects may occur when the beams are recombined which may degrade the uniformity of the output.

In practical terms it is desirable to keep non-planar phase variations across a light beam or a typical observation pupil to within a small fraction of $2\pi$. For some systems it has been found that it is preferable to constrain the range of phase departure from planarity across a wavefront of 2 mm diameter to be less than $\pi/2$. For systems targeting lower image resolution a phase departure of less than $\pi/2$ across a wavefront (or portion thereof) of 1 mm diameter may be acceptable. For high resolution systems a phase departure of less than $\pi/2$ across a wavefront (or portion thereof) of 4 mm diameter may be required. Depending on the nature of phase departure it may be favourable to construct a statistical measure of the phase departure across a wavefront. A common measure is the root-mean-square (RMS) of the phase departure from a planar wavefront and in this case it may be preferable to ensure that rms phase departure is less than $\pi/4$ across a wavefront (or portion thereof) of 2 mm diameter or less than $\pi/4$ across a wavefront of 4 mm diameter for high resolution systems.

For some configurations of a spatially varying IRG it may be advantageous to include some form of phase compensation to balance against variations of the phase imparted by diffraction orders of the IRG. One method by which this may be achieved is to introduce a within a region of the IRG an overall position shift of the IRG lattices. For example, suppose we have an IRG with lattice functions for lattices L1 and L2 given by $$L_1(x, y) = \sum_{i=-\infty}^{\infty} \delta(x - ip_x) \sum_{j=-\infty}^{\infty} \delta(y - jp_y), \tag{223}$$

and $$L_2(x, y) = \sum_{i=-\infty}^{\infty} \delta(x - ip_x - o_x) \sum_{j=-\infty}^{\infty} \delta(y - jp_y - o_y), \tag{224}$$

respectively. If we shift these lattices by a distance $d_x$ in the x-direction and $d_y$ in the y-direction, then the new lattice functions for lattices L1 and L2 will be given by $$L_1(x, y) = \sum_{i=-\infty}^{\infty} \delta(x - ip_x - d_x) \sum_{j=-\infty}^{\infty} \delta(y - jp_y - d_y), \tag{225}$$

and $$L_2(x, y) = \sum_{i=-\infty}^{\infty} \delta(x - ip_x - o_x - d_x) \sum_{j=-\infty}^{\infty} \delta(y - jp_y - o_y - d_y), \tag{226}$$

respectively. Position shifting the lattice of the IRG in this way will not affect the directions of the various diffraction orders. However, when scattering from an IRG composed of lattices described by equations (225) and (226) a diffracted beam of order $\{m_x, m_y\}$ will acquire an extra phase shift of $$\phi(m_x, m_y) = -2\pi\left(\frac{m_x d_x}{p_x} + \frac{m_y d_y}{p_y}\right) \tag{227}$$

compared to the phase of a beam scattering from an otherwise identical IRG composed of lattices described by equations (223) and (224). Note that only non-zeroth order scattering attracts this phase shift effect.

By making $d_x$ and $d_y$ scalar functions of the (x, y)-coordinates, which we term lattice shift functions, the phase shift can be varied over an IRG. The position dependent phase shift is thus given by $$\phi(x, y, m_x, m_y) = -2\pi\left(\frac{m_x d_x(x, y)}{p_x} + \frac{m_y d_y(x, y)}{p_y}\right) \tag{228}$$

When used with lattice functions it is convenient to evaluate the lattice shift functions at the points of lattice L1. Thus, we may write the lattice functions for lattices L1 and L2 as $$L_1(x, y) = \sum_{i=-\infty}^{\infty} \sum_{j=-\infty}^{\infty} \delta(x - ip_x - d_x(ip_x, jp_y))\delta(y - jp_y - d_y(ip_x, jp_y)), \tag{229}$$

and $$L_2(x, y) = \tag{230}$$

$$\sum_{i=-\infty}^{\infty} \sum_{j=-\infty}^{\infty} \delta(x - ip_x - o_x - d_x(ip_x, jp_y))\delta(y - jp_y - o_y - d_y(ip_x, jp_y)),$$

respectively. Note here that both lattice L1 and L2 are shifted collectively by $(d_x, d_y)$ so this modification to the lattices of the IRG is quite distinct to variations of the lattice offset vector, which controls the relative offset between the two lattices.

Instead of adding a position dependent shift to the construction lattices of an IRG, in some arrangements it is preferable to apply a position dependent deviation to the lattice itself. This may be accomplished by shifting the (x, y)-coordinates of a representation of an IRG by the coordinate transformations $$x \rightarrow x - d_x(x,y), \tag{231}$$

and $$y \rightarrow y - d_y(x,y). \tag{232}$$

For example, if I(x, y) is an IRG surface function, then after shifting the modified IRG surface function I'(x, y) would be given by $$I'(x,y) = I(x - d_x(x,y), y - d_y(x,y)). \tag{233}$$

Essentially, equation (233) states that a new grating surface function I'(x, y) is formed by distortion of the coordinate system of I(x, y). This may result in a distortion of the structures of the IRG, not just the distribution of the lattice points although for small shifts the alteration of the structures may have a negligible impact on the diffraction efficiencies of the structures.

It is important to note that the transformations of equations (231) and (232) may be applied to any description of a grating, not just one that may be expressed as a surface function. This is because any representation of a grating must ultimately provide some description with reference to the (x, y, z)-coordinate system of the physical world, thus by introducing the transformations of (231) and (232) as an additional step between the coordinates of the real world and the coordinate-dependent description of a grating the necessary distortion will be accomplished. This distortion may be applied at various steps depending on the task at hand. For example, if creating a voxel-based representation of the grating then the voxel coordinates may be transformed according to (231) and (232) and the resulting shifted coordinates used for reference to the structure to determine the voxel properties at that point.

Preferably, the functions $d_x(x, y)$ and $d_y(x, y)$ when used with the transformations (231) and (232) should be continuously differentiable (class $C^1$), meaning that both of these functions and the first derivatives of these functions with respect to position are continuous. This is in order to avoid discontinuities or other features in a grating which may cause difficulties when trying to realise the grating in the physical world.

For small variations in the x- and y-coordinates, the phase shift introduced by the transformations (231) and (232) will be given by equation (228). Here the term small means that the relative size of the unit cells after coordinate transformation do not deviate significantly from the size of the unit cell before transformation. As a rule of thumb a deviation of less than 0.1% in either the x- or y-directions is desirable, although over short regions of rapid variation of the grating larger deviations may be acceptable. Here the term short would mean much smaller than the pupil size for the system, so generally much less than 1 mm. Under such circumstances the functions $d_x(x, y)$ and $d_y(x, y)$ have a similar effect whether they are used to shift the underlying lattice positions of an IRG representation or used to distort the (x, y)-coordinates of the complete representation of the IRG. This leaves the designer with a choice in how to implement such shifts within an IRG which may then be dictated by whatever best suits the representation used to describe the IRG.

The phase compensation at a given location on the lattice may be set according to the variation of the phase shift arising from spatial variations of the IRG. Generally, it may not be possible to determine an exact value for the phase compensation required at a given location as the phase shift from variations of the IRG will depend on diffraction order as well as direction of the incident beam. In this case an average phase shift from the lattice may be computed based on the most important diffraction orders and incident beam directions at a given location. The phase compensation required and so the values of $d_x$ and $d_y$ may then be set accordingly.

For some embodiments rather than seek to compensate phase shifts occurring as a result of spatial variations it may be preferable to deliberately induce phase variations between different beam paths. In this case the goal is not to ensure that all beams are coherent with respect to each other, but rather to disrupt coherent interference effects. Such a method is particularly applicable when the number of beams contributing to an output beam is large as each may potentially acquire a phase shift with little relation to that of other beams. A quasi-random mixture of phases between many beams will mean that neither constructive nor destructive interference is particularly favoured and so the output from such an IRG should be much less sensitive to these interference effects.

This is particularly relevant if there are other sources of variations in a DWC which may cause additional phase variations between beams taking different paths through the DWC. For example, small variations in the thickness of the DWC substrate due to manufacturing tolerances will incur variations in the optical path length that may not be accounted for by a design but can cause interference effects that significantly disrupt the uniformity of output from an IRG.

In order to accomplish such arrangements the lattice shift functions $d_x(x, y)$ and $d_y(x, y)$ may be configured to have a quasi-random variation with respect to position. However, any variation should not be too extreme as sudden or rapid variations of $d_x(x, y)$ and/or $d_y(x, y)$ with respect to position may result in undesirable defects in the shape of an IRG or undesirable effects on the output of projected light from an IRG such as loss of image sharpness, distortion and/or colour separation. Therefore, in some configurations it is preferable to set a maximum value for the magnitude of the x- and y-gradients of $d_x(x, y)$ and/or $d_y(x, y)$ to minimise unwanted optical degradation.

The maximum gradients depend on the wavelength, lattice pitch and diffraction order, and may be set according to the inequalities $$|\nabla d_x(x, y)| < \frac{\eta p_x}{\lambda |m_x|}, \tag{234}$$

and $$|\nabla d_y(x, y)| < \frac{\eta p_y}{\lambda |m_y|}. \tag{235}$$

Here $\nabla$ is the vector gradient operator, confined here to the xy-plane which can be written in row vector form as $$\nabla = \left(\frac{\partial}{\partial x}, \frac{\partial}{\partial y}\right). \tag{236}$$

The coefficient $\eta$ in inequalities (234) and (235) has a value informed by the maximum perturbation to the wavefront across a beam deemed to be tolerable. It has been found that a value of $\eta < 5 \times 10^{-4}$ is suitable for many configurations or for lower resolution systems $\eta < 1 \times 10^{-3}$. In many systems the diffraction orders used in inequalities (234) and (235) will be $|m_x| = |m_y| = 1$.

It is important that the value of $\eta$ should not be too small or the induced phase shifts will be too small to have a significant effect. For quasi-random distributions of phase shift effects it may be useful to characterise the magnitude of variation required in statistical terms. In some configurations, it may be preferable to compute at each position of an IRG the average phase shift over a circular region centred at that location and typically of 2 to 4 mm in diameter or 1 to 6 mm in diameter. The average phase shift $\Phi_{av}(x, y, w, m_x, m_y)$ for the $\{m_x, m_y\}$ diffraction order over a circle of diameter w centred at (x, y) may be found by the polar integral $$\Phi_{av}(x, y, w, m_x, \tag{237}$$

$$m_y) = \frac{4}{\pi w^2} \int_0^{\frac{w}{2}} \int_0^{2\pi} \phi(x + \rho\cos\varphi, y + \rho\sin\varphi, m_x, m_y)\rho d\varphi d\rho.$$

Typically, the diameter w will be the same as the size of the pupil of an observer, or the size of the pupil of the input beams of projected light. For many arrangements it may be advantageous if the standard deviation of $\Phi_{av}(x, y, w, m_x, m_y)$ computed over the require region of an IRG satisfies $$STD(\Phi_{av}(x, y, w, m_x, m_y)) > \zeta\pi. \tag{238}$$

Here the STD(A(x, y)) indicates computation of the standard deviation of the spatially dependent quantity A(x, y) over a defined region of interest. It may also be advantageous if the average of the magnitude of the gradient of $\Phi_{av}(x, y, w, m_x, m_y)$ satisfies $$AV(|\nabla\Phi_{av}(x, y, w, m_x, m_y)|) > \frac{\zeta\pi}{w}, \tag{239}$$

as this may help ensure that phase variations are sufficiently rapid. Here AV(A(x, y)) indicates computation of the average of the spatially dependent quantity A(x, y) over a defined region of interest. It has been found that the coefficient $\zeta$ should preferably satisfy $\zeta > 0.1$ or $\zeta > 0.25$ or $\zeta > 0.5$ in order to ensure that phase shifts of sufficient magnitude and variability are induced across an IRG. For such an IRG it is preferable that the gradient constraints of inequalities (234) and (235) are still respected. For practical applications it is necessary to specify diffraction orders for the phase shift functions. It has been found that in many cases setting $|m_x| = |m_y| = 1$ is adequate to provide effective constraints.

There are many suitable representations which may be used for the shift functions $d_x(x, y)$ and $d_y(x, y)$, including the use of basis functions along the lines of equation (221) such as simple x- and y-polynomials, Chebyshev polynomials, Legendre polynomials and Fourier series. Other representations include, but are not limited to Zernike polynomials, piecewise polynomials and NURBS surfaces.

With a suitable representation, designing the lattice shift functions $d_x(x, y)$ and $d_y(x, y)$ to suit the various requirements described above is a matter of selecting appropriate parameters and aspects such as the number of terms to use. For example, if using a Fourier series representation it may be desirable to restrict the number of terms such that the shortest spatial frequency is comparable to the size of an observation pupil. This may help limit the gradient of the scalar function. The parameters of a representation may be set by a variety of methods, including the use of pseudo-random number generators. Such approaches may be applied iteratively to ensure that the various constraints and inequalities detailed above are respected.

If a representation of an IRG uses a construction principle based on lattice functions along the lines of equations (229) and (230), then it is not necessary for $d_x(x, y)$ and $d_y(x, y)$ to be smooth and continuous functions. This allows the use of other methods for the functions of $d_x(x, y)$ and $d_y(x, y)$ in addition to those disclosed above. For example, methods based on recursive subdivision of a grid in the plane of the grating followed by deviation by pseudo-random numbers may be used. Under these circumstances the gradient constraints of inequalities (234) and (235) need not be respected. Instead, we need only be concerned with the values of $d_x(x, y)$ and $d_y(x, y)$ at the lattice points $(ip_x, jp_y)$. We may then set constraints for the maximum changes in value of $d_x(x, y)$ and $d_y(x, y)$ between adjacent lattice points according to:

$$\left| d_x((i+1)p_x, jp_y) - d_x(ip_x, jp_y) \right| < \frac{\eta p_x^2}{\lambda|m_x|}; \tag{240}$$

$$\left| d_x(ip_x, (j+1)p_y) - d_x(ip_x, jp_y) \right| < \frac{\eta p_x p_y}{\lambda|m_x|}; \tag{241}$$

$$\left| d_y((i+1)p_x, jp_y) - d_y(ip_x, jp_y) \right| < \frac{\eta p_x p_y}{\lambda|m_y|}; \text{and} \tag{242}$$

$$\left| d_y(ip_x, (j+1)p_y) - d_y(ip_x, jp_y) \right| < \frac{\eta p_y^2}{\lambda|m_y|}. \tag{243}$$

It has been found that typically it is preferable if the coefficient $\eta$ has a value of $\eta < 5 \times 10^{-4}$ or for lower resolution systems $\eta < 1 \times 10^{-3}$. The most important diffraction orders typically satisfy $|m_x| = |m_y| = 1$.

The requirements on the average phase shift and gradient of the average phase shift given by inequalities (238) and (239) will remain applicable in principle. However, in order to compute these quantities evaluation of the phase shift should only be performed only at the lattice points $(ip_x, jp_y)$. This will turn the integrals into a summation over the lattice points lying within a circular region of diameter w centred at the position (x, y). The resulting expression for the average phase shift is thus given by $$\tag{244}$$

$$\Phi_{av}(x, y, w, m_x, m_y) = \frac{\sum_{i=-\infty}^{\infty}\sum_{j=-\infty}^{\infty} \phi(ip_x, jp_y, m_x, m_y) rect\left(\frac{2\left((ip_x - x)^2 + (jp_y - y)^2\right)}{w^2}\right)}{\sum_{i=-\infty}^{\infty}\sum_{j=-\infty}^{\infty} rect\left(\frac{2\left((ip_x - x)^2 + (jp_y - y)^2\right)}{w^2}\right)},$$

where the function rect(x) is as defined by equation (146). Strictly speaking the gradient of this function may not be smooth owing to the discrete nature by which lattice points may or may not lie within the circular aperture used to evaluate $\Phi_{av}$(x, y, w, $m_x$, $m_y$). This may cause issues when applying the gradient operator as required for inequality (239). This may be mitigated by using numerical differentiation to compute the gradient of $\Phi_{av}$(x, y, w, $m_x$, $m_y$) by finite difference over a distance of at least several lattice periods in the x- or y-direction, as required by the direction of the derivative. For example, a suitable definition of the gradient operator applied to $\Phi_{av}$(x, y, w, $m_x$, $m_y$) as defined by equation (244) may be given by $$\nabla\Phi_{av}(x, y, w, m_x, m_y) \triangleq \qquad (245)$$

$$\left( \frac{1}{\Delta_x}[\Phi_{av}(x + \Delta_x, y, w, m_x, m_y) - \Phi_{av}(x, y, w, m_x, m_y)], \right.$$

$$\left. \frac{1}{\Delta_y}[\Phi_{av}(x, y + \Delta_y, w, m_x, m_y) - \Phi_{av}(x, y, w, m_x, m_y)] \right),$$

where the finite difference parameters $\Delta_x$ and $\Delta_y$ are distances of at least several lattice periods in the x- and y-directions, respectively. For example, suitable finite difference parameters may be $\Delta_x \sim 10p_x$ and $\Delta_y \sim 10p_y$, or larger.

In some arrangements, it may be desirable to allow for abrupt changes in the shift functions $d_x$(x, y) and/or $d_y$(x, y). Alternatively, it may be desirable to allow for rapid changes in the shift functions over a short region, typically much smaller than the size of typical light beams. Under these circumstances the gradient constraints of inequalities (234) and (235) are no longer appropriate. Instead, a useful quantity is the root-mean-square (rms) phase shift, $$\Phi_{rms}^2(x, y, w, m_x, m_y) = \frac{4}{\pi w^2} \int_0^{\frac{w}{2}} \int_0^{2\pi} (\phi(x + \rho\cos\varphi, y + \rho\sin\varphi, m_x, m_y) - \qquad (246)$$

$$\Phi_{av}(x, y, w, m_x, m_y))^2 \rho d\varphi d\rho.$$

This will provide a measure of the perturbation to the wavefront of a beam. For an IRG constructed on a lattice along the lines of equations (229) and (230) and so where evaluation of the lattice shift functions $d_x$(x, y) and $d_y$(x, y) is performed only at the discrete points of a lattice an expression for the rms phase shift equivalent to equation (246) may be given by $$\Phi_{rms}^2(x, y, w, m_x, m_y) = \qquad (147)$$

$$\frac{\sum_{i=-\infty}^{\infty}\sum_{j=-\infty}^{\infty}\left(\phi(ip_x, jp_y, m_x, m_y) - \Phi_{av}(x, y, w, m_x, m_y)\right)^2 rect\left(\frac{2((ip_x - x)^2 + (jp_y - y)^2)}{w^2}\right)}{\sum_{i=-\infty}^{\infty}\sum_{j=-\infty}^{\infty} rect\left(\frac{2((ip_x - x)^2 + (jp_y - y)^2)}{w^2}\right)}.$$

Typically, the diameter w used to evaluate equations (247) and (248) will be the smaller of the size of pupil of the observer and the size of the beams of projected light as input into a DWC that features a grating with this modification. By setting a limit to $\Phi_{rms}$(x, y, w, $m_x$, $m_y$) at all positions of the grating where light beams may interact and be output towards an observer a limit to the degradation in image quality may be imposed. This may be expressed by requiring that the rms phase shift satisfies $$\Phi_{rms}(x,y,w,m_x,m_y)<\kappa\pi, \qquad (248)$$

where $\kappa$ is a coefficient that determines the degree to which a compromise in image fidelity may be tolerated. For low-resolution systems a value of $\kappa$=0.5 may be appropriate whereas for medium-resolution systems a value of $\kappa$=0.25 may be required. For high-resolution systems a smaller value in the range $0\leq\kappa<0.12$ may be necessary in order to not significantly reduce image quality. A smaller value of $\kappa$ reduces the extent to which significant phase differences may be engineered into the layout of the grating. In order to ensure that sufficient phase shifts are generated the conditions given by inequalities (238) and (239) may still apply to a grating that satisfies inequality (248). To avoid artefacts arising from the overlap of discrete lattice points with the measurement circle of the rms phase shift, finite difference methods over several lattice periods may be used to evaluate the x- and y-gradients of $\Phi_{rms}$(x, y, w, $m_x$, $m_y$). This may be particularly appropriate for systems where equation (247) is used to find $\Phi_{rms}$(x, y, w, $m_x$, $m_y$).

Thus, a flexible range of methods for imparting position-dependent phase shift to the non-zero diffraction orders of an IRG have been established.

Another method for inducing a path-dependent phase shift for the various beams propagating through a DWC is to introduce a small variation in the thickness of the DWC. Such a variation may be accomplished in a number of ways. For an IRG which employs a surface relief structure a base layer of variable thickness may be added underneath the surface relief structure. Another approach is to vary the thickness of the substrate of the DWC such that the surfaces are no longer quite parallel. This may be accomplished by various methods including fabricating substrates with a deliberate thickness variation or by application of a layer of transparent resin of variable thickness to one of the outer surfaces of the substrate. Such a resin layer may be the same as that used for a surface relief structure of an appropriate IRG.

Preferably any thickness variations of the DWC will be relatively small, typically less than 10 μm as well as gradual in nature. An increase in DWC thickness of t will increase the optical path length for a beam between successive bounces within the waveguide by 2t cos θ, where θ is the angle of incidence of the beam on the waveguide surface. If we represent the thickness variation is a scalar function of position t(x, y), then the extra phase acquired after a double reflection from the waveguide may be written as $$\phi_t(x, y) = \frac{4\pi n\cos\theta t(x, y)}{\lambda}, \qquad (249)$$

where n is the refractive index of the variable thickness medium and will typically be close in value to that of the substrate. If the angle of incidence of the beam changes from $\theta_1$ to $\theta_2$ due to a non-zeroth order diffraction of a beam, then the phase acquired is given by $$\phi_t(x, y) = \frac{2\pi n t(x, y)}{\lambda\cos\theta_1}(1 + \cos(\theta_1 + \theta_2)), \qquad (250)$$

Unlike position shifts of the lattice, phase shifts due to thickness variation will be incurred after every double reflection of a waveguided beam. As such phase shifts due to thickness variations may accumulate more rapidly than those due to lattice position shift.

Any variation of thickness must be associated with a variation in the parallelism between the surfaces of a DWC. Such a variation may cause waveguided beams of projected light to acquire a tilt or higher order wavefront variations that degrade optical performance by causing a loss of image sharpness, colour separation or distortion. In order to control these effects it may be advantageous to constrain the magnitude of the gradient of t(x, y) such that it satisfies $$|\nabla t(x, y)| < \frac{\tau}{2n\cos\theta}, \qquad (251)$$

where the coefficient $\tau$ is such that $$\frac{\tau}{2n\cos\theta} < 2 \times 10^{-4}.$$

In order to have an appreciable effect preferably the phase shift $\phi_t(x, y)$ should have statistical properties similar to those required from phase shifts due to the lattice shift functions above.

There are many suitable representations which may be used for the scalar function t(x, y), including the use of basis functions along the lines of equation (221) such as simple x- and y-polynomials, Chebyshev polynomials, Legendre polynomials and Fourier series. Other representations include, but are not limited to Zernike polynomials, piecewise polynomials and NURBS surfaces. Methods similar to those used for the lattice shift functions may be employed to suitably configure a representation of t(x, y) with the required properties.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A diffraction grating for use as an output element of a diffractive waveguide combiner for an augmented reality or virtual reality display, comprising:

a first rectangular periodic array of optical structures arranged on a plane, wherein a period of the first rectangular periodic array is defined by a spacing between neighbouring optical structures of the first rectangular periodic array in each of a first direction and a second direction that is different from the first direction in the plane of the diffraction grating such that the neighbouring optical structures are not in contact with each other, the first rectangular periodic array forming a first 2D lattice with rectangular symmetry;

a second rectangular periodic array of optical structures arranged on the plane, wherein a period of the second rectangular periodic array is defined by a spacing between neighbouring optical structures of the second rectangular periodic array in each of the first direction and the second direction such that the neighbouring optical structures are not in contact with each other, the second rectangular periodic array forming a second 2D lattice with rectangular symmetry;

wherein the first rectangular periodic array of optical structures is overlaid on the second rectangular periodic array of optical structures in the plane such that the first rectangular periodic array and the second rectangular periodic array are spatially offset from one another on the plane in the first direction and the second direction and are not in contact with each other, and an optical structure from the second rectangular periodic array of optical structure is disposed between one of the neighbouring optical structures of the first rectangular periodic array in the plane of the diffraction grating; and wherein each of the optical structures in the first rectangular periodic array of optical structures includes a first shape in the plane of the diffraction grating and each of the optical structures in the second rectangular periodic array of optical structures includes a second shape in the plane that is different from the first shape, the first rectangular periodic array of optical structures and the second rectangular periodic array of optical structures configured to receive light from an input direction and to couple orders of the light in directions that are at angles to the input direction thereby providing two-dimensional expansion of the light, and configured to couple out orders of the light towards a viewer.

2. The diffraction grating of claim 1, wherein the optical structures of the first rectangular periodic array and the optical structures of the second rectangular periodic array further differ from one another in at least one characteristic by one or more of:

the optical structures of the first rectangular periodic array having a different size in the plane to the optical structures in the second rectangular periodic array;

the optical structures of the first rectangular periodic array having a different orientation in the plane to the optical structures in the second rectangular periodic array;

the optical structures of the first rectangular periodic array having a different physical extent or height in a direction perpendicular to the plane to the optical structures in the second rectangular periodic array; and the optical structures of the first rectangular periodic array having a different blaze to the optical structures in the second rectangular periodic array.

3. The diffraction grating of claim 1, wherein the optical structures of the first rectangular periodic array and the optical structures of the second rectangular periodic array further differ from one another in at least one characteristic by the optical structures of the first rectangular periodic array having at least one of a different refractive index, electric permittivity, magnetic permeability, absorptivity, or birefringence, to the optical structures of the second rectangular periodic array.

4. The diffraction grating of claim 1, wherein the first rectangular periodic array of optical structures is offset from the second rectangular periodic array of optical structures by a factor which is different to half the period of the first rectangular periodic array in the first direction and the first rectangular periodic array of optical structures is offset from the second rectangular periodic array of optical structures by a factor which is different to half the period of the first rectangular periodic array in the second direction.

5. The diffraction grating of claim 1, wherein the diffraction grating varies spatially across the plane through at least one of a characteristic of the optical structures of the first rectangular periodic array of optical structures or a characteristic of the optical structures of the second rectangular periodic array of optical structures varying spatially across the plane.

6. The diffraction grating of claim 1, wherein the diffraction grating varies spatially across the plane through a measure of the difference in characteristics or a measure of a factor which is different to half the period varying across the plane.

7. The diffraction grating of claim 1, wherein the diffraction grating varies spatially across the plane through the optical structures of the first rectangular periodic array and the optical structures of the second rectangular periodic array having a gradually decreasing size in the plane or height in a direction perpendicular to the plane towards an edge of the diffraction grating.

8. The diffraction grating of claim 1, wherein the diffraction grating varies spatially across the plane along at least one of the first direction in the plane or along the second direction in the plane, the second direction orthogonal to the first direction, such that the diffraction grating comprises at least one region where the first rectangular periodic array of optical structures and the second rectangular periodic array of optical structures do not differ from one another in at least one characteristic and in this region the first rectangular periodic array of optical structures are offset from the second rectangular periodic array of optical structures in both the first direction and the second direction by a factor which is identical to half the period of the first rectangular periodic array and the second rectangular periodic array.

9. The diffraction grating of claim 1, wherein the diffraction grating varies spatially across the plane along at least one of the first direction in the plane or along the second direction in the plane, the second direction orthogonal to the first direction, such that the diffraction grating comprises at least one region where the first rectangular periodic array of optical structures and the second rectangular periodic array of optical structures do not differ from one another in at least one characteristic and in this region the first rectangular periodic array of optical structures are offset from the second rectangular periodic array of optical structures in the first direction by a factor which is identical to half the period of the first rectangular periodic array and the second rectangular periodic array, and having no offset from the second rectangular periodic array of optical structures in the second direction.

10. The diffraction grating of claim 1, wherein the diffraction grating varies spatially across the plane along the first direction in the plane and/or along the second direction in the plane, the second direction orthogonal to the first direction, such that the diffraction grating comprises at least one region where the first rectangular periodic array of optical structures and the second rectangular periodic array of optical structures do not differ from one another in at least one characteristic and in this region the first rectangular periodic array of optical structures are offset from the second rectangular periodic array of optical structures in the second direction by a factor which is identical to half the period of the first rectangular periodic array and the second rectangular periodic array, and having no offset from the second rectangular periodic array of optical structures in the first direction.

11. The diffraction grating of claim 1, wherein the diffraction grating varies spatially across the plane forming a region of the diffraction grating where either the first rectangular periodic array of optical structures or the second rectangular periodic array of optical structures provides negligible diffraction of the light.

12. The diffraction grating of claim 1, wherein the diffraction grating varies spatially across the plane forming a plurality of regions each of the plurality of regions comprising a boundary between the other plurality of regions at which the spatial variation occurs.

13. The diffraction grating of claim 1, wherein the first rectangular periodic array of optical structures are arranged on a first lattice and the second rectangular periodic array of optical structures are arranged on a second lattice wherein the first lattice and the second lattice both experience a spatially dependent shift with respect to each other in one or more regions across the plane of the diffraction grating thereby to provide phase variation to compensate for grating variations or reduce multi-beam interference effects.

14. The diffraction grating of claim 1, wherein the diffraction grating undergoing a distortion within the plane of the diffraction grating the distortion comprising a shift in a position of the first rectangular periodic array of optical structures and the second rectangular periodic array of optical structures with respect to each other thereby to provide phase variation to compensate for grating variations or reduce multi-beam interference effects.

15. A diffractive waveguide combiner for an augmented reality or virtual reality display, comprising:

a waveguide, the waveguide being a substrate configured to transmit light, and having arranged in or on the waveguide:

an output grating including:

a first rectangular periodic array of optical structures arranged on a plane, wherein a period of the first rectangular periodic array is defined by a spacing between neighbouring optical structures of the first rectangular periodic array in each of a first direction and a second direction that is different from the first direction in the plane of the output grating such that the neighbouring optical structures are not in contact with each other, the first rectangular periodic array forming a first 2D lattice with rectangular symmetry;

a second rectangular periodic array of optical structures arranged on the plane, wherein a period of the second rectangular periodic array is defined by a spacing between neighbouring optical structures of the second rectangular periodic array in each of the first direction and the second direction such that the neighbouring optical structures are not in contact with each other, the second rectangular periodic array forming a second 2D lattice with rectangular symmetry;

wherein the first rectangular periodic array of optical structures is overlaid on the second rectangular periodic array of optical structures in the plane such that the first rectangular periodic array and the second rectangular periodic array are spatially offset from one another on the plane in the first direction and the second direction and are not in contact with each other, and an optical structure from the second rectangular periodic array of optical structure is disposed between one of the neighbouring optical structures of the first rectangular periodic array in the plane of the output grating; and wherein each of the optical structures of the first rectangular periodic array of optical structures includes a first shape in the plane of the output grating and each of the optical structures of the second rectangular periodic array of optical structures includes a second shape in the plane that is different from the first shape, the first rectangular periodic array of optical structures and the second rectangular periodic array of optical structures configured to receive light from an input direction and to couple orders of the light in directions that are at angles to the input direction thereby providing two-dimensional expansion of the light, and configured to couple out orders of the light towards a viewer; and an input grating for coupling in light into the waveguide towards the output grating.

16. The diffractive waveguide combiner according to claim 15, wherein the waveguide comprises multiple output gratings, and wherein the multiple output gratings at least partially overlap in the plane of the waveguide and are offset from each other in the direction perpendicular to the plane of the waveguide.

17. The diffractive waveguide combiner according to claim 16, wherein the arrangement of the optical structures of the first rectangular periodic array and the optical structures of the second rectangular periodic array between the multiple output gratings differ from one another.

18. The diffractive waveguide combiner according to claim 17, wherein the arrangement of the optical structures of a first of the multiple output gratings such that the first multiple output grating predominantly provides two dimensional expansion of the light, and the arrangement of the optical structures of a second of the multiple output gratings predominantly couples out orders of the light towards a viewer.

19. The diffractive waveguide combiner according to claim 15, wherein the waveguide comprises multiple output gratings, and wherein the period of the first and second rectangular periodic arrays of each of the multiple output gratings are identical.

20. The diffractive waveguide combiner according to claim 15, wherein the waveguide has a thickness in a direction perpendicular to the plane of the waveguide which varies across the plane of the waveguide such that phase variation of light is achieved to compensate for grating variations or reduce multi-beam interference effects.

21. The diffractive waveguide combiner according to claim 15, wherein the output grating varies spatially across the plane, and wherein the input grating is formed from a region of the output grating.

22. The diffractive waveguide combiner according to claim 15, wherein the output grating and/or the input grating are formed of a surface relief structure on the waveguide.

23. The diffractive waveguide combiner according to claim 22, wherein the output grating and/or the input grating comprises one or more layers of coating applied on top of the surface relief structures.

24. The diffractive waveguide combiner according to claim 15, wherein at least one of the output grating or the input grating is formed of an embedded structure in the waveguide.

25. The diffractive waveguide combiner according to claim 15, wherein at least one of the output grating or the input grating is composed of multiple distinct elements located at different positions orthogonal to the plane of the waveguide.

26. The diffractive waveguide combiner according to claim 15, wherein at least one of the output grating or the input grating is comprised of a layer within the waveguide having a variation of optical properties relative to the surrounding waveguide.

27. An augmented reality or virtual reality display, comprising:

a diffractive waveguide combiner including:

a waveguide, the waveguide being a substrate configured to transmit light, and having arranged in or on the waveguide:

an output grating including:

a first rectangular periodic array of optical structures arranged on a plane, wherein a period of the first rectangular periodic array is defined by a spacing between neighbouring optical structures of the first rectangular periodic array in each of a first direction and a second direction that is different from the first direction in the plane of the output grating such that the neighbouring optical structures are not in contact with each other, the first rectangular periodic array forming a first 2D lattice with rectangular symmetry;

a second rectangular periodic array of optical structures arranged on the plane, wherein a period of the second rectangular periodic array is defined by a spacing between neighbouring optical structures of the second rectangular periodic array in each of the first direction and the second direction such that the neighbouring optical structures are not in contact with each other, the second rectangular periodic array forming a second 2D lattice with rectangular symmetry;

wherein the first rectangular periodic array of optical structures is overlaid on the second rectangular periodic array of optical structures in the plane such that the first rectangular periodic array and the second rectangular periodic array are spatially offset from one another on the plane in the first direction and the second direction and are not in contact with each other, and an optical structure from the second rectangular periodic array of optical structure is disposed between one of the neighbouring optical structures of the first rectangular periodic array in the plane of the output grating; and wherein each of the optical structures in the first rectangular periodic array of optical structures includes a first shape in the plane of the output grating and each of the optical structures in the second rectangular periodic array of optical structures includes a second shape in the plane that is different from the first shape, the first rectangular periodic array of optical structures and the second rectangular periodic array of optical structures configured to receive light from an input direction and to couple orders of the light in directions that are at angles to the input direction thereby providing two-dimensional expansion of the light, and configured to couple out orders of the light towards a viewer; and an input grating for coupling in light into the waveguide towards the output grating.

28. The augmented reality or the virtual reality display of claim 27, wherein the optical structures of the first rectangular periodic array and the optical structures of the second rectangular periodic array further differ from one another in at least one characteristic by one or more of:

the optical structures of the first rectangular periodic array having a different size in the plane to the optical structures in the second rectangular periodic array;

the optical structures of the first rectangular periodic array having a different orientation in the plane to the optical structures in the second rectangular periodic array;

the optical structures of the first rectangular periodic array having a different physical extent or height in a direction perpendicular to the plane to the optical structures in the second rectangular periodic array; and the optical structures of the first rectangular periodic array having a different blaze to the optical structures in the second rectangular periodic array.

* * * * *